US 12,534,512 B2

(12) United States Patent
Crowe, Jr.

(10) Patent No.: US 12,534,512 B2
(45) Date of Patent: Jan. 27, 2026

(54) HUMAN MONOCLONAL ANTIBODIES TO HANTAVIRUS AND METHODS OF USE THEREFORE

(71) Applicant: Vanderbilt University, Nashville, TN (US)

(72) Inventor: James E. Crowe, Jr., Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 932 days.

(21) Appl. No.: 17/775,942

(22) PCT Filed: Nov. 10, 2020

(86) PCT No.: PCT/US2020/059781
§ 371 (c)(1),
(2) Date: May 11, 2022

(87) PCT Pub. No.: WO2021/096829
PCT Pub. Date: May 20, 2021

(65) Prior Publication Data
US 2022/0380442 A1 Dec. 1, 2022

Related U.S. Application Data

(60) Provisional application No. 62/933,755, filed on Nov. 11, 2019.

(51) Int. Cl.
C07K 16/10 (2006.01)
A61P 31/14 (2006.01)
A61K 39/00 (2006.01)

(52) U.S. Cl.
CPC .............. C07K 16/10 (2013.01); A61P 31/14 (2018.01); A61K 39/00 (2013.01); C07K 2317/21 (2013.01); C07K 2317/24 (2013.01); C07K 2317/31 (2013.01); C07K 2317/622 (2013.01)

(58) Field of Classification Search
None
See application file for complete search history.

(56) References Cited

U.S. PATENT DOCUMENTS

| 5,851,796 | A | 12/1998 | Schatz |
| 7,919,314 | B2 | 4/2011 | Zvirbliene et al. |
| 8,008,000 | B2 | 8/2011 | Bartholomeusz et al. |
| 2004/0053216 | A1 | 3/2004 | Hooper et al. |
| 2008/0247944 | A1 | 10/2008 | Graziano et al. |
| 2009/0142363 | A1 | 6/2009 | Toji et al. |
| 2016/0075797 | A1 | 3/2016 | Weaver et al. |

FOREIGN PATENT DOCUMENTS

| WO | WO 2000/008043 A2 | 2/2000 |
| WO | WO 2018/175531 A2 | 9/2018 |

OTHER PUBLICATIONS

Fulhorst CF, Milazzo ML, Armstrong LR, Childs JE, Rollin PE, Khabbaz R, Peters CJ, Ksiazek TG. Hantavirus and arenavirus antibodies in persons with occupational rodent exposure. Emerg Infect Dis. Apr. 2007; 13(4):532-8. (Year: 2007).*
Almagro JC, Fransson J. Humanization of antibodies. Front Biosci. Jan. 1, 2008;13:1619-33. (Year: 2008).*
Edwards et al. The remarkable flexibility of the human antibody repertoire;isolation of over one thousand different antibodies to a single protein,BLyS. J Mol Biol Nov. 14, 2003;334(1):103-18. (Year: 2003).*
Arikawa, J. et al., " Characterization of Hantaan virus envelope glycoprotein antigenic determinants defined by monoclonal antibodies," J Gen Virol, 70 (1989): 615-624.
Bharadwaj, M. et al., "Humoral immune responses in the hantavirus cardiopulmonary syndrome," The Journal of Infectious Diseases, 182 (2000): 43-48.
Boudreau, E. F. et al., "A Phase 1 clinical trial of Hantaan virus and Puumala virus M-segment DNA vaccines for hemorrhagic fever with renal syndrome," Vaccine, 30.11 (2012): 1951-1958.
Brocato, R. L. et al., "Construction and nonclinical testing of a Puumala virus synthetic M gene-based DNA vaccine," Clinical and Vaccine Immunology, 20.2 (2013): 218-226.
Chu, Y-K. et al., "Cross-neutralization of hantaviruses with immune sera from experimentally infected animals and from hemorrhagic fever with renal syndrome and hantavirus pulmonary syndrome patients," The Journal of Infectious Diseases, 172 (1995): 1581-1584.
Custer, D. M. et al., "Active and passive vaccination against hantavirus pulmonary syndrome with Andes virus M genome segment-based DNA vaccine," Journal of Virology, 77.18 (2003): 9894-9905.
Duehr, J. et al., "Neutralizing monoclonal antibodies against the Gn and the Gc of the Andes Virus glycoprotein spike complex protect from virus challenge in a preclinical hamster model," mBio, 11.2 (2020): e00028-00020, 1-20.
Engdahl, T. B. et al., "Humoral immunity to hantavirus infection," mSphere, 5.4 (2020): e00482-20, 1-11.
Engdahl, T. B. et al., "Isolation of New World Hantavirus Neutralizing Monoconal Antibodies," Department of Pathology, Mictobiology and Immunology, The Vanderbilt Vaccine Center, and Department of Pediatrics, Vanderbilt Medical Center, (2019), Poster.
Garrido, J. L. et al., "Two recombinant human monoclonal antibodies that protect against lethal Andes hantavirus infection in vivo," Science Translational Medicine, 10 (2018): eaat6420, 1-11.
Guttieri, M. C. et al., "Expression of a human, neutralizing monoclonal antibody specific to Puumala virus G2-protein in stably-transformed insect cells," Journal of Immunological Methods, 246 (2000):97-108.
Heiskanen, T. et al., "Phage-displayed peptides mimicking the discontinuous neutralization sites of puumala Hantavirus envelope glycoproteins," Virology, 262 (1999): 321-332.

(Continued)

Primary Examiner — Aurora M Fontainhas
Assistant Examiner — Jennifer A Benavides
(74) Attorney, Agent, or Firm — pH IP Law

(57) ABSTRACT

The present disclosure is directed to antibodies binding to and neutralizing hantavirus and methods for use thereof.

22 Claims, 36 Drawing Sheets
Specification includes a Sequence Listing.

(56) References Cited

OTHER PUBLICATIONS

Hooper, J. W. et al., "DNA vaccination with the Hantaan virus M gene protects Hamsters against three of four HFRS hantaviruses and elicits a high-titer neutralizing antibody response in Rhesus monkeys," *Journal of Virology*, 75.18 (2001): 8469-8477.
Hooper, J. W. et al., "Hantaan/Andes virus DNA vaccine elicits a broadly cross-reactive neutralizing antibody response in nonhuman primates," *Virology*, 347 (2006): 208-216.
Hooper, J. W. et al., "A novel Sin Nombre virus DNA vaccine and its inclusion in a candidate pan-hantavirus vaccine against hantavirus pulmonary syndrome (HPS) and hemorrhagic fever with renal syndrome (HFRS)," *Vaccine*, 31 (2013): 4314-4321.
Hooper, J. W. et al., "A Phase 1 clinical trial of Hantaan virus and Puumala virus M-segment DNA vaccines for haemorrhagic fever with renal syndrome delivered by intramuscular electroporation," *Clin Microbiol Infect*, 20 Suppl 5 (2014): 110-117.
Justé, A et al., "Characterization of *Tetragenococcus* strains from sugar thick juice reveals a novel species, *Tetragenococcus osmophilus* sp. nov., and divides *Tetragenococcus halophilus* into two subspecies, *T. halophilus* subsp. *halophilus* subsp. nov. and *T. halophilus* subsp. *flandriensis* subsp. nov.," *International Journal of Systematic and Evolutionary Microbiology*, 62 (2012): 129-137.

Koch, J. et al., "Human recombinant neutralizing antibodies against hantaan virus G2 protein," *Virology*, 308 (2003): 64-73.
Li, S. et al., "A molecular-level account of the antigenic hantaviral surface," *Cell Reports*, 15 (2016): 959-967.
Liu, X-1. et al., "Epidemic hemorrhagic fever complicated with late pregnancy," *Medicine*, 96.40 (2017): 1-3.
Lundkvist, A. et al., "Puumala and Dobrava viruses cause hemorrhagic fever with renal syndrome in Bosnia-Herzegovina: evidence of highly cross-neutralizing antibody responses in early patient sera," Journal of Medical Virology, 53.1 (1997): 51-59.
PCT International Search Report and Written Opinion issued in International Patent Application No. PCT/US2020/059781, mailed Apr. 1, 2021.
PCT International Preliminary Report on Patentability issued in International Patent Application No. PCT/US2020/059781, mailed May 27, 2022.
Probst, A. et al., "UvrABC system protein A" 1-2, Accession A0A2M6WUT6, 2018.
Tischler, N. D. et al., "Human and rodent humoral immune responses to Andes virus structural proteins," *Virology*, 334 (2005): 319-326.
Wang, M. et al., "Epitope mapping studies with neutralizing and non-neutralizing monoclonal antibodies to the G1 and G2 envelope glycoproteins of Hantaan virus," *Virology*, 197.2 (1993): 757-766.

\* cited by examiner

| Group | mAb | Neutralization IC50 (ng/mL) | | | | IC90 (ng/mL) | | Binding EC50 (ng/mL) | | PCDH-1 blocking (%) | Fusion index (%) |
|---|---|---|---|---|---|---|---|---|---|---|---|
| | | WT SNV | pVSV/SNV | WT ANDV | pVSV/ANDV | WT SNV | WT ANDV | SNV | ANDV | | |
| 1 | SNV-42 | 2.4 | 5.1 | NT | > | 28 | NT | 5.9 |

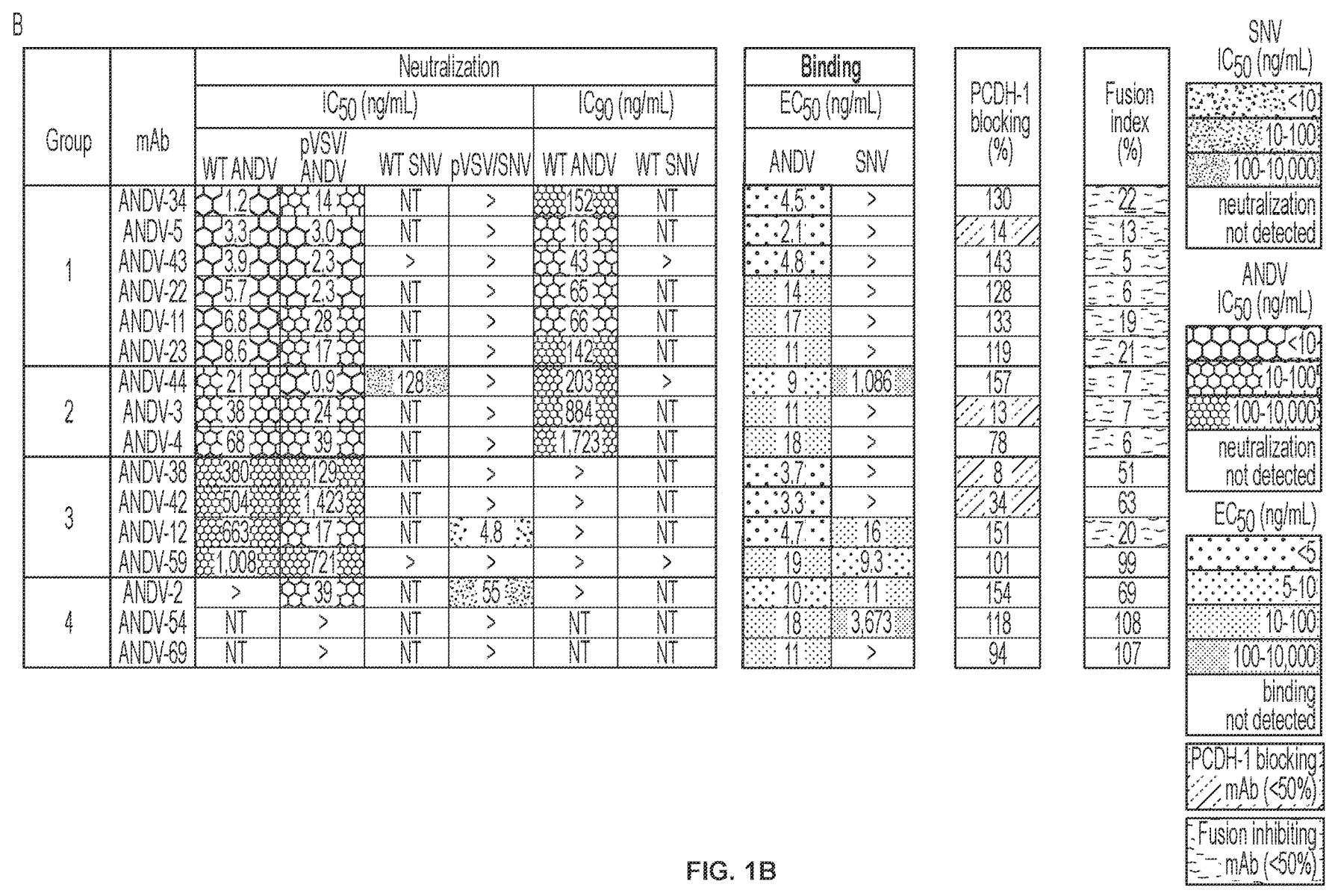

| Group | mAb | Neutralization IC50 (ng/mL) | | | IC90 (ng/mL) | | Binding EC50 (ng/mL) | | PCDH-1 blocking (%) | Fusion index (%) |
|---|---|---|---|---|---|---|---|---|---|---|
| | | WT ANDV | pVSV/ANDV | WT SNV pVSV/SNV | WT ANDV | WT SNV | ANDV | SNV | | |
| 1 |

IC50 (ng/mL): <10, 10-100, 100-10,000, neutralization not detected

EC50 (ng/mL): <5, 5-10, 10-100, 100-10,000, neutralization not detected

| Group | mAb | Neutralization IC50 (ng/mL) | | | | Binding EC50 (ng/mL) | | | |
|---|---|---|---|---|---|---|---|---|---|
| | | pVSV/PUUV | pVSV/DOBV | pVSV/HTNV | pVSV/SEOV | PUUV | DOBV | HTNV | SEOV |
| 1 | SNV-42 | > | > | > | > | > | > | > | > |
| 2 | SNV-53 | 173 | 116 | 52 | 95 | 196 | 9.3 | 2.1 | 5.0 |
| 3 | SNV-24 | 12 | 11 | 34 | 21 | 8.2 | 0.5 | 0.3 | 2.7 |
| | SNV-68 | 3.9 | 10 | 630 | 37 | 35 | 3.6 | 4.6 | 3.4 |
| | SNV-21 | > | > | > | > | 1,793 | > | > | > |
| | SNV-25 | 104 | 3,652 | > | > | 10 | 57 | 12 | 46 |
| | SNV-3 | > | > | > | > | > | > | > | > |
| | SNV-27 | 113 | > | > | > | 26 | 837 | > | > |
| | SNV-30 | 91 | > | > | > | 5.1 | > | > | > |
| | SNV-36 | 101 | > | > | > | 39 | > | > | > |
| | SNV-45 | 518 | > | > | > | 24 | > | > | > |
| | SNV-50 | > | > | > | > | > | > | > | > |
| 4 | SNV-56 | > | > | > | > | 8.1 | 2.3 | 1.8 | 1.8 |
| | SNV-57 | 28 | 13 | 25 | 36 | 21 | > | > | > |
| | SNV-62 | 49 | > | > | > | 38 | > | > | > |
| | SNV-67 | 53 | > | > | > | 15 | 42 | 147 | 3,217 |
| | SNV-32 | 659 | > | > | > | 10 | 247 | 30 | 878 |
| | SNV-39 | > | > | > | > | > | > | > | > |
| | SNV-65 | > | > | > | > | > | > | > | > |
| | SNV-66 | > | > | > | > | > | > | > | > |

| Group | mAb | Neutralization IC50 (ng/mL) | | | | Binding EC50 (ng/mL) | | | |
|---|---|---|---|---|---|---|---|---|---|
| | | pVSV/PUUV | pVSV/DOBV | pVSV/HTNV | pVSV/SEOV | PUUV | DOBV | HTNV | SEOV |
| 1 | ANDV-34 | > | > | > | > | > | > | > | > |
| | ANDV-5 | > | > | > | > | 148 | > | > | > |
| | ANDV-43 | > | > | > | > | > | > | > | > |
| | ANDV-22 | > | > | > | > | > | > | > | > |
| | ANDV-11 | > | > | > | > | > | > | > | > |
| | ANDV-23 | > | > | > | > | > | > | > | > |
| 2 | ANDV-44 | > | > | > | > | > | > | 260 | > |
| | ANDV-3 | > | > | > | > | > | > | > | > |
| | ANDV-4 | > | > | > | > | > | > | > | > |
| 3 | ANDV-38 | > | > | > | > | > | > | > | > |
| | ANDV-42 | > | > | > | > | > | > | > | > |
| | ANDV-12 | > | > | > | > | > | > | > | > |
| | ANDV-59 | > | > | > | > | 123 | > | > | > |
| 4 | ANDV-2 | > | > | > | > | > | > | > | > |
| | ANDV-54 | > | > | > | > | > | > | > | > |
| | ANDV-69 | > | > | > | > | 541 | > | > | > |

FIG. 2C

| Site | | A1 | | | | | | | | | |
|---|---|---|---|---|---|---|---|---|---|---|---|
| | mAb | SNV-36 | SNV-62 | SNV-67 | SNV-25 | SNV-68 | SNV-24 | SNV-57 | SNV-32 | SNV-45 | SNV-27 |
| A1 | SNV-36 | 14 | 21 | 32 | 13 | 5 | 21 | 1 | 104 | 98 | 119 |
| | SNV-62 | 16 | 1 | 3 | 2 | 4 | 27 | 1 | 7 | 1 | 2 |
| | SNV-67 | 53 | 17 | 20 | 13 | 30 | 49 | 13 | 10 | 3 | 1 |
| | SNV-25 | 7 | 0 | 1 | 1 | 1 | 9 | 1 | 3 | 1 | 1 |
| | SNV-68 | 10 | 1 | 3 | 1 | 4 | 17 | 1 | 17 | 1 | 2 |
| | SNV-24 | 4 | 3 | 3 | 9 | 3 | 18 | 1 | 11 | 19 | 19 |
| | SNV-57 | 22 | 10 | 13 | 19 | 13 | 29 | 1 | 26 | 22 | 55 |
| | SNV-32 | 129 | 51 | 27 | 64 | 66 | 88 | 60 | 7 | 1 | 12 |
| | SNV-45 | 125 | 42 | 33 | 75 | 66 | 102 | 52 | 8 | 1 | 15 |
| | SNV-27 | 131 | 6 | 5 | 11 | 6 | 83 | 33 | 13 | 2 | 1 |
| | SNV-30 | 88 | 2 | 2 | 5 | 3 | 37 | 3 | 4 | 1 | 1 |
| | SNV-50 | 118 | 59 | 50 | 96 | 79 | 107 | 82 | 81 | 35 | 82 |
| A2 | ANDV-59 | 97 | 82 | 71 | 73 | 88 | 93 | 96 | 92 | 90 | 81 |
| | ANDV-69 | 117 | 93 | 90 | 78 | 97 | 96 | 99 | 108 | 94 | 96 |
| B | ANDV-54 | 129 | 99 | 89 | 121 | 103 | 112 | 105 | 118 | 96 | 116 |

FIG. 3 second mAb

| | | A2 | | | | C1 | | | | C2 | | |
|---|---|---|---|---|---|---|---|---|---|---|---|---|
| SNV-30 | SNV-50 | ANDV-59 | ANDV-69 | ANDV-54 | ANDV-43 | ANDV-22 | ANDV-44 | SNV-53 | ANDV-2 | SNV-21 | ANDV-12 | ANDV-11 |
| 82 | 22 | 64 | 90 | 110 | 92 | 105 | 96 | 96 | 53 | 104 | 88 | 100 |
| 8 | 4 | 17 | 73 | 100 | 84 | 101 | 94 | 88 | 92 | 101 | 86 | 104 |
| 12 | 20 | 19 | 60 | 100 | 88 | 94 | 98 | 94 | 97 | 94 | 88 | 104 |
| 1 | 3 | 64 | 82 | 105 | 87 | 97 | 95 | 88 | 85 | 96 | 84 | 100 |
| 7 | 6 | 81 | 90 | 102 | 90 | 108 | 98 | 94 | 97 | 104 | 84 | 99 |
| 20 | 71 | 101 | 93 | 105 | 89 | 101 | 95 | 93 | 86 | 111 | 93 | 101 |
| 49 | 63 | 95 | 95 | 100 | 89 | 104 | 94 | 91 | 77 | 105 | 93 | 104 |
| 32 | 47 | 100 | 96 | 105 | 88 | 102 | 95 | 95 | 91 | 100 | 91 | 102 |
| 35 | 17 | 93 | 95 | 100 | 86 | 105 | 94 | 85 | 100 | 105 | 85 | 103 |
| 20 | 87 | 110 | 93 | 106 | 91 | 98 | 97 | 91 | 99 | 104 | 91 | 102 |
| 1 | 11 | 96 | 90 | 110 | 89 | 99 | 95 | 93 | 89 | 99 | 86 | 98 |
| 77 | 4 | 7 | 43 | 100 | 86 | 104 | 91 | 81 | 98 | 106 | 92 | 103 |
| 78 | 9 | 1 | 15 | 104 | 98 | 88 | 101 | 91 | 93 | 88 | 99 | 101 |
| 95 | 4 | 2 | 6 | 99 | 95 | 95 | 104 | 90 | 92 | 96 | 98 | 103 |
| 104 | 88 | 101 | 106 | 35 | 89 | 102 | 95 | 96 | 101 | 106 | 90 | 99 |

FIG. 3
CONTINUED

| | D | | E | | | F | | | | |
|---|---|---|---|---|---|---|---|---|---|---|
| | ANDV-23 | ANDV-34 | SNV-39 | SNV-56 | SNV-65 | ANDV-38 | ANDV-42 | ANDV-4 | ANDV-3 | ANDV-5 |
| | 118 | 116 | 100 | 100 | 99 | 100 | 111 | 98 | 104 | 107 |
| | 118 | 118 | 103 | 92 | 94 | 99 | 109 | 94 | 100 | 104 |
| | 115 | 115 | 107 | 102 | 102 | 97 | 105 | 98 | 102 | 104 |
| | 113 | 120 | 101 | 96 | 98 | 100 | 110 | 100 | 99 | 104 |
| | 117 | 118 | 103 | 95 | 97 | 99 | 105 | 97 | 102 | 107 |
| | 115 | 116 | 99 | 97 | 96 | 101 | 110 | 95 | 102 | 108 |
| | 119 | 116 | 104 | 92 | 93 | 102 | 110 | 97 | 100 | 103 |
| | 115 | 117 | 100 | 96 | 95 | 100 | 112 | 98 | 101 | 105 |
| | 117 | 115 | 101 | 90 | 96 | 101 | 107 | 100 | 97 | 101 |
| | 114 | 118 | 99 | 95 | 98 | 102 | 111 | 101 | 99 | 103 |
| | 116 | 119 | 100 | 97 | 98 | 102 | 111 | 97 | 97 | 105 |
| | 117 | 115 | 102 | 91 | 98 | 99 | 105 | 94 | 97 | 102 |
| | 101 | 97 | 94 | 91 | 98 | 95 | 99 | 96 | 97 | 101 |
| | 101 | 93 | 97 | 93 | 96 | 94 | 98 | 93 | 96 | 101 |
| | 119 | 113 | 100 | 95 | 97 | 96 | 109 | 97 | 97 | 101 |

Residual binding of second mAb
- <33%
- 33-66%
- >66%

Ultra-potent ANDV neutralizing mAb

Potent ANDV neutralizing mAb

ANDV neutralizing mAb

SNV/ANDV cross-neutralizing mAb non-neutralizing mAb

FIG. 3 CONTINUED first mAb

| | | | | | | | | | | | |
|---|---|---|---|---|---|---|---|---|---|---|---|
| C1 | ANDV-43 | 121 | 95 | 93 | 110 | 95 | 106 | 93 | 111 | 100 | 114 |
| | ANDV-22 | 120 | 94 | 85 | 111 | 91 | 103 | 90 | 117 | 92 | 112 |
| | ANDV-44 | 119 | 96 | 89 | 110 | 94 | 109 | 88 | 121 | 97 | 121 |
| | SNV-53 | 117 | 84 | 91 | 113 | 89 | 107 | 78 | 108 | 86 | 96 |
| C2 | ANDV-2 | 107 | 98 | 93 | 99 | 100 | 104 | 88 | 114 | 95 | 102 |
| | SNV-21 | 117 | 86 | 83 | 121 | 96 | 107 | 92 | 108 | 86 | 89 |
| | ANDV-12 | 110 | 94 | 93 | 103 | 101 | 111 | 99 | 109 | 86 | 82 |
| D | ANDV-11 | 114 | 95 | 94 | 115 | 97 | 105 | 87 | 110 | 94 | 110 |
| | ANDV-23 | 118 | 98 | 88 | 102 | 94 | 102 | 93 | 116 | 95 | 102 |
| | ANDV-34 | 121 | 92 | 90 | 108 | 92 | 100 | 92 | 113 | 85 | 109 |
| E | SNV-39 | 116 | 88 | 87 | 106 | 93 | 90 | 95 | 113 | 90 | 88 |
| | SNV-56 | 120 | 92 | 92 | 115 | 99 | 108 | 96 | 109 | 88 | 111 |
| | SNV-65 | 120 | 89 | 88 | 107 | 96 | 108 | 96 | 116 | 84 | 100 |
| F | ANDV-38 | 127 | 101 | 95 | 104 | 93 | 107 | 96 | 118 | 93 | 114 |
| | ANDV-42 | 128 | 102 | 87 | 109 | 99 | 109 | 98 | 117 | 96 | 124 |
| | ANDV-4 | 106 | 93 | 76 | 94 | 98 | 95 | 88 | 111 | 100 | 108 |
| | ANDV-3 | 119 | 90 | 90 | 101 | 90 | 101 | 92 | 103 | 89 | 84 |
| | ANDV-5 | 107 | 76 | 64 | 65 | 76 | 95 | 80 | 81 | 75 | 82 |

FIG. 3
CONTINUED

| 106 | 92 | 84 | 95 | 104 | 39 | 51 | 47 | 32 | 88 | 98 | 83 | 95 |
|---|---|---|---|---|---|---|---|---|---|---|---|---|
| 105 | 87 | 72 | 90 | 100 | 34 | 30 | 29 | 15 | 88 | 23 | 26 | 96 |
| 106 | 89 | 88 | 94 | 106 | 33 | 33 | 23 | 7 | 90 | 10 | 0 | 97 |
| 106 | 72 | 87 | 90 | 101 | 48 | 66 | 51 | 17 | 11 | 27 | 3 | 101 |
| 101 | 85 | 92 | 93 | 102 | 89 | 110 | 100 | 43 | 5 | 43 | 21 | 103 |
| 101 | 80 | 83 | 87 | 104 | 96 | 63 | 93 | 32 | 12 | 18 | 8 | 102 |
| 102 | 80 | 97 | 100 | 100 | 97 | 77 | 88 | 33 | 11 | 24 | 11 | 100 |
| 108 | 86 | 99 | 97 | 99 | 18 | 31 | 31 | 69 | 84 | 99 | 81 | 15 |
| 103 | 84 | 86 | 88 | 92 | 78 | 81 | 86 | 87 | 89 | 89 | 80 | 100 |
| 103 | 93 | 86 | 91 | 97 | 54 | 78 | 79 | 83 | 87 | 89 | 72 | 28 |
| 99 | 86 | 91 | 99 | 110 | 84 | 100 | 95 | 92 | 92 | 96 | 90 | 99 |
| 101 | 78 | 101 | 96 | 100 | 79 | 105 | 92 | 84 | 98 | 104 | 92 | 103 |
| 103 | 77 | 99 | 94 | 101 | 83 | 106 | 95 | 83 | 95 | 104 | 88 | 96 |
| 101 | 93 | 115 | 93 | 89 | 78 | 104 | 90 | 93 | 91 | 100 | 84 | 103 |
| 109 | 93 | 74 | 74 | 85 | 80 | 102 | 95 | 91 | 94 | 105 | 90 | 102 |
| 103 | 14 | 2 | 13 | 98 | 81 | 100 | 96 | 91 | 84 | 100 | 82 | 97 |
| 97 | 8 | 2 | 6 | 93 | 72 | 99 | 93 | 93 | 87 | 100 | 84 | 56 |
| 77 | 2 | 0 | 3 | 100 | 66 | 94 | 90 | 82 | 80 | 88 | 76 | 38 |

FIG. 3
CONTINUED

| 116 | 111 | 108 | 102 | 101 | 95 | 108 | 99 | 98 | 100 |
|---|---|---|---|---|---|---|---|---|---|
| 108 | 106 | 99 | 102 | 101 | 96 | 104 | 98 | 98 | 103 |
| 115 | 106 | 106 | 99 | 102 | 96 | 108 | 98 | 97 | 101 |
| 116 | 115 | 100 | 95 | 91 | 99 | 110 | 96 | 100 | 105 |
| 116 | 116 | 102 | 99 | 100 | 97 | 107 | 99 | 105 | 106 |
| 114 | 116 | 103 | 96 | 99 | 103 | 109 | 94 | 102 | 107 |
| 118 | 112 | 104 | 97 | 100 | 99 | 108 | 99 | 99 | 103 |
| 110 | 8 | 100 | 95 | 95 | 90 | 94 | 66 | 15 | 87 |
| 25 | 5 | 92 | 85 | 94 | 91 | 95 | 89 | 90 | 95 |
| 41 | 11 | 90 | 78 | 88 | 88 | 91 | 90 | 85 | 93 |
| 113 | 116 | 8 | 1 | 1 | 90 | 98 | 75 | 75 | 94 |
| 118 | 115 | 69 | 4 | 24 | 93 | 96 | 77 | 83 | 95 |
| 117 | 118 | 65 | 4 | 15 | 88 | 97 | 77 | 80 | 93 |
| 113 | 106 | 91 | 71 | 84 | 5 | 19 | 6 | 9 | 50 |
| 116 | 91 | 92 | 64 | 75 | 13 | 22 | 4 | 25 | 53 |
| 116 | 111 | 89 | 81 | 83 | 85 | 81 | 7 | 48 | 71 |
| 112 | 106 | 84 | 42 | 53 | 19 | 28 | 3 | 7 | 50 |
| 111 | 107 | 75 | 44 | 50 | 78 | 49 | 0 | 0 | 6 |

| mAb | IC50 (ng/mL) pVSV/SNV | pVSV/ANDV |
|---|---|---|
| SNV-3 | 2.6 | > |
| SNV-21 | 113 | 6.9 |
| SNV-24 | 10 | 1.0 |
| SNV-25 | 30 | 6.0 |
| SNV-27 | 195 | 32 |
| SNV-30 | 79 | 60 |
| SNV-32 | 1,933 | > |
| SNV-36 | 16 | 4.0 |
| SNV-39 | > | > |
| SNV-42 | 21 | > |
| SNV-45 | 384 | 744 |
| SNV-50 | 213 | > |
| SNV-53 | 9 | 14 |
| SNV-56 | > | > |
| SNV-57 | 7 | 11 |
| SNV-62 | 37 | 27 |
| SNV-65 | > | > |
| SNV-66 | > | > |
| SNV-67 | 137 | 9 |
| SNV-68 | 361 | 0.2 |

FIG. 7A

SNV IC50 (ng/mL): <10, 10-100, 100-10,000, no neutralization detected

ANDV IC50 (ng/mL): <10, 10-100, 100-10,000, no neutralization detected

FIG. 7B pVSV/SNV; pVSV/ANDV — % relative infectivity vs mAb concentration (log10 ng/mL)

Legend: SNV-3, SNV-21, SNV-24, SNV-25, SNV-27, SNV-30, SNV-32, SNV-36, SNV-39, SNV-42, SNV-45, SNV-50, SNV-53, SNV-56, SNV-57, SNV-62, SNV-65, SNV-66, SNV-67, SNV-68, DENV 2D22

FIG. 10 second mAb

| mAb | SNV-50 | SNV-36 | SNV-45 | SNV-27 | SNV-32 | SNV-30 | SNV-24 | SNV-57 | SNV-25 |
|---|---|---|---|---|---|---|---|---|---|
| SNV-50 | 10 | 72 | 83 | 88 | 63 | 60 | 85 | 100 | 50 |
| SNV-36 | 64 | 22 | 110 | 90 | 79 | 68 | 17 | 13 | 28 |
| SNV-45 | 93 | 96 | 37 | 13 | 21 | 43 | 65 | 69 | 40 |
| SNV-27 | 121 | 105 | 54 | 11 | 32 | 44 | 76 | 90 | 41 |
| SNV-32 | 111 | 104 | 42 | 23 | 15 | 44 | 62 | 63 | 55 |
| SNV-30 | 101 | 87 | 40 | 4 | 6 | 11 | 17 | 18 | 8 |
| SNV-24 | 91 | 24 | 62 | 37 | 24 | 35 | 16 | 14 | 28 |
| SNV-57 | 101 | 41 | 74 | 47 | 37 | 42 | 27 | 24 | 38 |
| SNV-25 | 46 | 24 | 41 | 8 | 9 | 15 | 17 | 11 | 13 |
| SNV-68 | 42 | 27 | 44 | 6 | 18 | 25 | 24 | 18 | 17 |
| SNV-62 | 47 | 19 | 45 | 7 | 14 | 22 | 18 | 13 | 15 |
| SNV-67 | 48 | 21 | 48 | 8 | 18 | 25 | 22 | 15 | 18 |
| SNV-39 | 106 | 102 | 112 | 89 | 84 | 91 | 97 | 101 | 92 |
| SNV-56 | 106 | 101 | 112 | 84 | 81 | 92 | 88 | 104 | 94 |
| SNV-65 | 96 | 103 | 96 | 94 | 95 | 96 | 102 | 94 | 95 |
| SNV-66 | 72 | 54 | 90 | 38 | 64 | 83 | 93 | 78 | 74 |
| SNV-21 | 88 | 96 | 103 | 89 | 82 | 88 | 96 | 104 | 98 |
| SNV-53 | 91 | 103 | 106 | 78 | 81 | 90 | 86 | 107 | 90 |
| SNV-3 | 94 | 91 | 96 | 84 | 78 | 79 | 86 | 94 | 85 |
| SNV-42 | 85 | 92 | 98 | 88 | 79 | 76 | 78 | 88 | 81 |

(first mAb — row labels)

FIG. 11

| SNV-68 | SNV-62 | SNV-67 | SNV-39 | SNV-56 | SNV-65 | SNV-66 | SNV-21 | SNV-53 | SNV-3 | SNV-42 |
|---|---|---|---|---|---|---|---|---|---|---|
| 71 | 52 | 49 | 103 | 129 | 103 | 97 | 81 | 84 | 82 | 87 |
| 17 | 31 | 31 | 94 | 119 | 98 | 100 | 82 | 97 | 85 | 91 |
| 44 | 52 | 42 | 107 | 110 | 93 | 97 | 82 | 85 | 78 | 81 |
| 30 | 56 | 48 | 112 | 109 | 93 | 94 | 100 | 96 | 91 | 96 |
| 44 | 58 | 52 | 113 | 105 | 96 | 87 | 96 | 99 | 92 | 99 |
| 5 | 17 | 12 | 106 | 106 | 97 | 90 | 97 | 96 | 84 | 97 |
| 18 | 39 | 29 | 92 | 108 | 96 | 96 | 93 | 96 | 87 | 90 |
| 29 | 45 | 46 | 102 | 122 | 101 | 84 | 93 | 101 | 88 | 94 |
| 7 | 18 | 34 | 92 | 110 | 96 | 101 | 88 | 100 | 91 | 97 |
| 10 | 25 | 20 | 85 | 99 | 101 | 88 | 93 | 100 | 92 | 92 |
| 9 | 18 | 15 | 84 | 94 | 102 | 81 | 95 | 99 | 93 | 97 |
| 10 | 23 | 18 | 86 | 93 | 98 | 94 | 93 | 102 | 92 | 99 |
| 99 | 103 | 93 | 66 | 21 | 7 | 9 | 90 | 102 | 81 | 100 |
| 103 | 109 | 114 | 76 | 33 | 46 | 12 | 97 | 101 | 89 | 95 |
| 93 | 103 | 96 | 54 | 21 | 3 | 9 | 93 | 99 | 94 | 94 |
| 68 | 81 | 64 | 14 | 3 | 0 | 8 | 87 | 91 | 76 | 86 |
| 111 | 110 | 106 | 98 | 106 | 95 | 99 | 25 | 38 | 79 | 87 |
| 96 | 98 | 92 | 109 | 120 | 100 | 93 | 15 | 18 | 79 | 70 |
| 96 | 95 | 91 | 99 | 97 | 85 | 86 | 73 | 76 | 13 | 41 |
| 86 | 92 | 85 | 104 | 114 | 97 | 84 | 72 | 64 | 46 | 16 |

Residual binding of second mAb
- <33%
- 33-66%
- >66%

HUMAN MONOCLONAL ANTIBODIES TO HANTAVIRUS AND METHODS OF USE THEREFORE

PRIORITY CLAIM

This application is a national phase application under 35 U.S.C. § 371 of International Application No. PCT/US2020/059781, filed Nov. 10, 2020, which claims benefit of priority to U.S. Provisional Application Ser. No. 62/933,755, filed Nov. 11, 2019, the entire contents of which are hereby incorporated by reference.

GOVERNMENT SUPPORT CLAUSE

This invention was made with government support under grant numbers T32CM008320-29 and TR002243 awarded by the National Institutes of Health. The government has certain rights in the invention.

BACKGROUND

1. Field of the Disclosure

The present disclosure relates generally to the fields of medicine, infectious disease, and immunology. More particular, the disclosure relates to human antibodies binding to Hantavirus.

2. Background

Hantaviruses are members of the order Bunvavirales and are global emerging pathogens transmitted by rodents (Plyusnin et al., 1996). Hantaviruses are endemic in many regions worldwide and categorized into two groups based on geography and pathogenesis of infection. New World hantaviruses (NWH), including Andes virus (ANDV) and Sin Nombre virus (SNV), cause hantavirus cardiopulmonary syndrome (HCPS), and are newly emerging viruses in North and South America with a case fatality rate of about 40% (Kruger et al., 2015; Morens and Fauci, 2020). Hantaviruses are spread mostly through the inhalation of aerosolized rodent feces, however, recent outbreaks of ANDV infection also have included instances of human-to-human transmission (Alonso et al., 2020; Martinez et al., 2005). Old World hantaviruses (OWH), including Hantaan (HTNV), Puumala (PUUV), Dobrava-Belgrade (DOBV), and Seoul (SEOV), cause hemorrhagic fever with renal syndrome (HFRS) with a 1 to 15% mortality rate (Kruger et al., 2015). There are currently no FDA-approved vaccines or therapeutics for hantavirus infection; however clinical trials have commenced using direct immunization DNA vaccines or passive transfer of immune serum (Boudreau et al., 2012; Brocato et al., 2013; Custer et al., 2003; Hooper et al., 2014a; Hooper et al., 2001a; Hooper et al., 2008; Hooper et al., 2014b). Human monoclonal antibodies (mAbs) isolated from B cells of human survivors of ANDV infection have shown therapeutic efficacy in animal models of lethal disease, and murine mAbs derived from B cells of immunized mice also show efficacy in similar models (Duehr et al., 2020; Garrido et al., 2018). Finally, clinical research has shown that the induction of high titers of serum neutralizing antibodies in humans correlates with increased survival following human NWH infection (Bharadwaj et al., 2000). Thus, a robust humoral immune response to NWH infection is critical for surviving infection, but the molecular and genetic basis for human neutralizing antibody responses to NWH species is poorly characterized.

Neutralizing antibodies are elicited against the surface glycoprotein spike, a heterotetramer composed of enveloped glycoproteins Gn and Gc (Huiskonen et al., 2010; Li et al., 2016; Serris et al., 2020). Gn forms a square-shaped complex at the distal end of the spike, and is proposed to play a role in viral attachment and fusion control (Serris et al., 2020). Gc is a class 11 fusion protein that changes conformation under low pH conditions in the late endosome and induces fusion of the viral and host membranes (Allen et al., 2018; Guardado-Calvo et al., 2016; Willensky et al., 2016). B cell epitopes have been mapped through peptide scanning to Gn and Gc, although it is currently unknown which epitopes are immunodominant or correspond to recognition by antibodies with inhibitory activity (Arikawa et al., 1989; Engdahl and Crowe, 2020; Heiskanen et al., 1999; Koch et al., 2003).

Broadly neutralizing antibodies (bnAbs) have been characterized for numerous viral families including coronaviruses (Wec et al., 2020), alphaviruses (Fox et al., 2015; Powell et al., 2020b), influenza viruses (Bangaru et al., 2019; Corti et al., 2011), and ebolaviruses (Flyak et al., 2018; Wec et al., 2016). However, there have been few studies characterizing cross-neutralizing immunity to hantavirus infection (Bharadwaj et al., 2000; Chu et al., 1995; Li et al., 2016; Lundkvist et al., 1997; Tischler et al., 2005). Serological studies of HFRS patient sera have demonstrated modest neutralizing activity for at least two species of OWHs, while most HCPS patient sera exhibited neutralizing activity for diverse OWH and NWH species (Chu et al., 1995; Lundkvist et al., 1997). Previous studies of candidate DNA vaccines for the M segment (Gn/Gc protein-encoding) genes from different hantavirus species have demonstrated the importance of the humoral immune response to the surface glycoproteins in protection (Hooper et al., 2014b). Cross-reactivity and cross-protection have been evaluated in the setting of experimental DNA vaccination in animals, but the constructs tested to date do not elicit a broadly cross-reactive neutralizing antibody response (Boudreau et al., 2012; Brocato et al., 2013; Custer et al., 2003; Hooper et al., 2001a; Hooper et al., 2014b). Also, murine mAbs have been generated against HTNV Gc protein that exhibited cross-reactive binding to other OWH species, but they did not possess cross-neutralizing activity (Arikawa et al., 1989; Wang et al., 1993). Studies of human mAbs to SNV have not been published to date, and there is still little information on the cross-neutralizing humoral immune response to hantavirus infection.

Hantavirus is highly deadly and, depending on the type of hantavirus, death rates can approach 40%. Unfortunately, there are no FDA or WHO approved vaccines available. The development of vaccines and improved therapies is therefore very important.

SUMMARY

Thus, in accordance with the present disclosure, a method of detecting a hantavirus infection in a subject comprising (a) contacting a sample from said subject with an antibody or antibody fragment having clone-paired heavy and light chain CDR sequences from Tables 3 and 4, respectively; and (b) detecting hantavirus in said sample by binding of said antibody or antibody fragment to a hantavirus antigen in said sample. The sample may be a body fluid, such as blood, sputum, tears, saliva, mucous or serum, semen, cervical or vaginal secretions, amniotic fluid, placental tissues, urine, exudate, transudate, tissue scrapings or feces. Detection may comprise ELISA, RIA, lateral flow assay or Western blot. The method may further comprise performing steps (a) and (b) a second time and determining a change in hantavirus antigen levels as compared to the first assay. The antibody or antibody fragment may be encoded by clone-paired variable sequences as set forth in Table 1, by light and heavy chain variable sequences having 70%, 80%, or 90% identity to clone-paired variable sequences as set forth in Table 1, or by light and heavy chain variable sequences having 95% identity to clone-paired sequences as set forth in Table 1. The antibody or antibody fragment may comprise light and heavy chain variable sequences according to clone-paired sequences from Table 2, may comprise light and heavy chain variable sequences having 70%, 80% or 90% identity to clone-paired sequences from Table 2, or may comprise light and heavy chain variable sequences having 95% identity to clone-paired sequences from Table 2. The antibody fragment may be recombinant scFv (single chain fragment variable) antibody, Fab fragment, F(ab')$_2$ fragment, or Fv fragment.

In another embodiment, there is provided a method of treating a subject infected with hantavirus or reducing the likelihood of infection of a subject at risk of contracting hantavirus, comprising delivering to said subject an antibody or antibody fragment having clone-paired heavy and light chain CDR sequences from Tables 3 and 4, respectively. The antibody or antibody fragment may be encoded by clone-paired variable sequences as set forth in Table 1, by light and heavy chain variable sequences having 70%, 80%, or 90% identity to clone-paired variable sequences as set forth in Table 1, or by light and heavy chain variable sequences having 95% identity to clone-paired sequences as set forth in Table 1. The antibody or antibody fragment may comprise light and heavy chain variable sequences according to clone-paired sequences from Table 2, may comprise light and heavy chain variable sequences having 70%, 80% or 90% identity to clone-paired sequences from Table 2, or may comprise light and heavy chain variable sequences having 95% identity to clone-paired sequences from Table 2. The antibody fragment may be recombinant scFv (single chain fragment variable) antibody, Fab fragment, F(ab')$_2$ fragment, or Fv fragment. The antibody may be an IgG, or a recombinant IgG antibody or antibody fragment comprising an Fc portion mutated to alter (eliminate or enhance) FcR interactions, to increase half-life and/or increase therapeutic efficacy, such as a LALA, N297, GASD/ALIE, YTE or LS mutation or glycan modified to alter (eliminate or enhance) FcR interactions such as enzymatic or chemical addition or removal of glycans or expression in a cell line engineered with a defined glycosylating pattern. The antibody may be a chimeric antibody or a bispecific antibody.

The antibody or antibody fragment may be administered prior to infection or after infection. The subject may be a pregnant female, a sexually active female, or a female undergoing fertility treatments. Delivering may comprise antibody or antibody fragment administration, or genetic delivery with an RNA or DNA sequence or vector encoding the antibody or antibody fragment. The antibody or antibody may reduce mortality of a population of patients as compared to those not treated with said antibody or antibody fragment. The antibody or antibody may treat a symptom of hantavirus infection in a subject as compared to a subject not treated with said antibody or antibody fragment.

In yet another embodiment, there is provided a monoclonal antibody, wherein the antibody or antibody fragment is characterized by clone-paired heavy and light chain CDR sequences from Tables 3 and 4, respectively. The antibody or antibody fragment may be encoded by clone-paired variable sequences as set forth in Table 1, by light and heavy chain variable sequences having 70%, 80%, or 90% identity to clone-paired variable sequences as set forth in Table 1, or by light and heavy chain variable sequences having 95% identity to clone-paired sequences as set forth in Table 1. The antibody or antibody fragment may comprise light and heavy chain variable sequences according to clone-paired sequences from Table 2, may comprise light and heavy chain variable sequences having 70%, 80% or 90% identity to clone-paired sequences from Table 2, or may comprise light and heavy chain variable sequences having 95% identity to clone-paired sequences from Table 2. The antibody fragment may be recombinant scFv (single chain fragment variable) antibody, Fab fragment, F(ab')$_2$ fragment, or Fv fragment. The antibody may be an IgG, or a recombinant IgG antibody or antibody fragment comprising an Fc portion mutated to alter (eliminate or enhance) FcR interactions, to increase half-life and/or increase therapeutic efficacy, such as a LALA, N297, GASD/ALIE, YTE or LS mutation or glycan modified to alter (eliminate or enhance) FcR interactions such as enzymatic or chemical addition or removal of glycans or expression in a cell line engineered with a defined glycosylating pattern. The antibody may be a chimeric antibody or a bispecific antibody. The antibody or antibody fragment may further comprise a cell penetrating peptide and/or is an intrabody.

In still yet another embodiment, there is provided a hybridoma or engineered cell encoding an antibody or antibody fragment wherein the antibody or antibody fragment is characterized by clone-paired heavy and light chain CDR sequences from Tables 3 and 4, respectively. The antibody or antibody fragment may be encoded by clone-paired variable sequences as set forth in Table 1, by light and heavy chain variable sequences having 70%, 80%, or 90% identity to clone-paired variable sequences as set forth in Table 1, or by light and heavy chain variable sequences having 95% identity to clone-paired sequences as set forth in Table 1. The antibody or antibody fragment may comprise light and heavy chain variable sequences according to clone-paired sequences from Table 2, may comprise light and heavy chain variable sequences having 70%, 80% or 90% identity to clone-paired sequences from Table 2, or may comprise light and heavy chain variable sequences having 95% identity to clone-paired sequences from Table 2. The antibody fragment may be recombinant scFv (single chain fragment variable) antibody, Fab fragment, F(ab')$_2$ fragment, or Fv fragment. The antibody may be an IgG, or a recombinant IgG antibody or antibody fragment comprising an Fc portion mutated to alter (eliminate or enhance) FcR interactions, to increase half-life and/or increase therapeutic efficacy, such as a LALA, N297, GASD/ALIE, YTE or LS mutation or glycan modified to alter (eliminate or enhance) FcR interactions such as enzymatic or chemical addition or removal of glycans or expression in a cell line engineered with a defined glycosylating pattern. The antibody may be a chimeric antibody or a bispecific antibody. The antibody or antibody fragment may further comprise a cell penetrating peptide and/or is an intrabody.

A further embodiment involves a vaccine formulation comprising one or more antibodies or antibody fragments characterized by clone-paired heavy and light chain CDR sequences from Tables 3 and 4, respectively. At least one of said antibodies or antibody fragments may be encoded by light and heavy chain variable sequences according to clone-paired sequences from Table 1, by light and heavy chain variable sequences having at least 70%, 80%, or 90% identity to clone-paired sequences from Table 1, or by light and heavy chain variable sequences having at least 95% identity to clone-paired sequences from Table 1. At least one of said antibodies or antibody fragments may comprise light and heavy chain variable sequences according to clone-paired sequences from Table 2, may comprise light and heavy chain variable sequences having 95% identity to clone-paired sequences from Table 2, or may comprise light and heavy chain variable sequences having 70%, 80% or 90% identity to clone-paired sequences from Table 2.

The vaccine formulation may comprise at least one antibody fragment that is a recombinant scFv (single chain fragment variable) antibody. Fab fragment, F(ab')$_2$ fragment, or Fv fragment. The vaccine formulation may comprise at least one antibody that is a chimeric antibody or is bispecific antibody. The at least one antibody may be an IgG, or a recombinant IgG antibody or antibody fragment comprising an Fc portion mutated to alter (eliminate or enhance) FcR interactions, to increase half-life and/or increase therapeutic efficacy, such as a LALA, N297, GASD/ALIE, YTE or LS mutation or glycan modified to alter (eliminate or enhance) FcR interactions such as enzymatic or chemical addition or removal of glycans or expression in a cell line engineered with a defined glycosylating pattern. The at least one antibody or antibody fragment may further comprise a cell penetrating peptide and/or is an intrabody.

In yet a further embodiment, there is provided a vaccine formulation comprising one or more expression vectors encoding a first antibody or antibody fragment as described herein. The expression vector(s) may be Sindbis virus or VEE vector(s). The vaccine formulation may be formulated for delivery by needle injection, jet injection, or electroporation. The vaccine formulation may further comprise one or more expression vectors encoding for a second antibody or antibody fragment, such as a distinct antibody or antibody fragment as described here.

Also provided is method of protecting the health of a placenta and/or fetus of a pregnant a subject infected with or at risk of infection with hantavirus comprising delivering to said subject an antibody or antibody fragment having clone-paired heavy and light chain CDR sequences from Tables 3 and 4, respectively. The antibody or antibody fragment may be encoded by clone-paired variable sequences as set forth in Table 1, by light and heavy chain variable sequences having 70%, 80%, or 90% identity to clone-paired variable sequences as set forth in Table 1, or by light and heavy chain variable sequences having 95% identity to clone-paired sequences as set forth in Table 1. The antibody or antibody fragment may comprise light and heavy chain variable sequences according to clone-paired sequences from Table 2, may comprise light and heavy chain variable sequences having 70%, 80% or 90% identity to clone-paired sequences from Table 2, or may comprise light and heavy chain variable sequences having 95% identity to clone-paired sequences from Table 2. The antibody fragment may be recombinant scFv (single chain fragment variable) antibody, Fab fragment, F(ab')$_2$ fragment, or Fv fragment. The antibody may be an IgG, or a recombinant IgG antibody or antibody fragment comprising an Fc portion mutated to alter (eliminate or enhance) FcR interactions, to increase half-life and/or increase therapeutic efficacy, such as a LALA, N297, GASD/ALIE, YTE or LS mutation or glycan modified to alter (eliminate or enhance) FcR interactions such as enzymatic or chemical addition or removal of glycans or expression in a cell line engineered with a defined glycosylating pattern. The antibody may be a chimeric antibody or a bispecific antibody. The antibody or antibody fragment may further comprise a cell penetrating peptide and/or is an intrabody.

The antibody or antibody fragment may be administered prior to infection or after infection. The subject may be a pregnant female, a sexually active female, or a female undergoing fertility treatments. Delivering may comprise antibody or antibody fragment administration, or genetic delivery with an RNA or DNA sequence or vector encoding the antibody or antibody fragment. The antibody or antibody fragment ma increase the size of the placenta as compared to an untreated control. The antibody or antibody fragment may reduce viral load and/or pathology of the fetus as compared to an untreated control.

In still yet a further embodiment, there is provided a method of determining the antigenic integrity, correct conformation and/or correct sequence of a hantavirus antigen comprising (a) contacting a sample comprising said antigen with a first antibody or antibody fragment having clone-paired heavy and light chain CDR sequences from Tables 3 and 4, respectively; and (b) determining antigenic integrity, correct conformation and/or correct sequence of said antigen by detectable binding of said first antibody or antibody fragment to said antigen. The sample may comprise recombinantly produced antigen or a vaccine formulation or vaccine production batch. Detection may comprise ELISA, RIA, western blot, a biosensor using surface plasmon resonance or biolayer interferometry, or flow cytometric staining. The first antibody or antibody fragment may be encoded by clone-paired variable sequences as set forth in Table 1, by light and heavy chain variable sequences having 70%, 80%, or 90% identity to clone-paired variable sequences as set forth in Table 1, or light and heavy chain variable sequences having 95% identity to clone-paired sequences as set forth in Table 1. The first antibody or antibody fragment may comprise light and heavy chain variable sequences according to clone-paired sequences from Table 2, may comprise light and heavy chain variable sequences having 70%, 80% or 90% identity to clone-paired sequences from Table 2 or may comprise light and heavy chain variable sequences having 95% identity to clone-paired sequences from Table 2. The first antibody fragment may be a recombinant scFv (single chain fragment variable) antibody, Fab fragment, F(ab')$_2$ fragment, or Fv fragment. The method may further comprise performing steps (a) and (b) a second time to determine the antigenic stability of the antigen over time.

The method may further comprise (c) contacting a sample comprising said antigen with a second antibody or antibody fragment having clone-paired heavy and light chain CDR sequences from Tables 3 and 4, respectively; and (d) determining antigenic integrity of said antigen by detectable binding of said second antibody or antibody fragment to said antigen. The second antibody or antibody fragment may be encoded by clone-paired variable sequences as set forth in Table 1, by light and heavy chain variable sequences having 70%, 80%, or 90% identity to clone-paired variable sequences as set forth in Table 1, or light and heavy chain variable sequences having 95% identity to clone-paired sequences as set forth in Table 1. The second antibody or antibody fragment may comprise light and heavy chain variable sequences according to clone-paired sequences from Table 2, may comprise light and heavy chain variable sequences having 70%, 80% or 90% identity to clone-paired sequences from Table 2, or may comprise light and heavy chain variable sequences having 95% identity to clone-paired sequences from Table 2. The second antibody fragment may be a recombinant scFv (single chain fragment variable) antibody, Fab fragment, F(ab')$_2$ fragment, or Fv fragment. The method may further comprise performing steps (c) and (d) a second time to determine the antigenic stability of the antigen over time.

In another embodiment, there is provided a human monoclonal antibody or antibody fragment, hybridoma or engineered cell producing the same, or method of using the same in a hantavirus therapy, wherein said antibody binds to hantavirus viral fusion protein (Gc) and neutralizes Si Nombre virus (SNV), Andes virus ANDV), Puumala virus (PUUV), Hantaan virus (HNTV). Seoul virus (SEOV) and Dobrava virus (DOB).

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIGS. 1A-C. NWH-reactive mAbs isolated from individuals previously infected with SNV or ANDV exhibit diverse patterns of neutralization potency, cross-reactivity, and mechanisms of neutralization. Neutralization potency of SNV-reactive mAbs (FIG. 1A) or ANDV-reactive mAbs (FIG. 1B) to pseudotyped VSV particles (pVSV/SNV or pVSV/ANDV), SNV strain SN77734 (wt SNV), or ANDV strain Chile-9717869 (wt ANDV). Antibodies in a dilution series of decreasing concentrations were incubated with pVSVs or authentic virus, the suspension was used to inoculate cells, and then GFP+ cells or foci were counted to determine relative infectivity. $IC_{50}$ or $IC_{90}$ values were obtained using non-linear fit analysis with the top of curve constrained to 100 and the bottom of curve constrained to 0, using Prism software version 7 (GraphPad Software). Colors indicate relative potency of antibody. Data shown are average values from 2 to 3 independent experiments. Binding to proteins for each hantavirus species was determined by flow cytometric analysis. Gn and Gc were displayed on the surface of mammalian cells and incubated with decreasing concentrations of mAb. $EC_{50}$ binding values were obtained using non-linear fit analysis with the bottom of curve constrained to 0, using Prism software. The value for % PE-positive cells was determined by gating on cells stained only with secondary antibodies. Symbols indicate relative potency of antibody. >, indicates neutralization or reactivity was not detected at the highest concentration tested, 20 µg/mL. NT, indicates that the mAb was not tested. Data shown as are average values from 3 independent experiments. PCDH-1 blocking (%) was determined through a flow cytometric assay, in which mAbs were added at saturating concentration prior to the addition of soluble PCDH-1 domain, sEC1 labeled with Alexa Fluor 647 dye. PCDH-1 blocking was defined by reduction of the maximal binding score to <50% of un-competed binding (green boxes). Data shown are average values from 3 independent experiments. Fusion index (%) was determined by adding mAbs to Vero cells transfected with cDNAs encoding SNV or ANDV Gn/Gc, and then inducing fusion through exposure to medium with low pH and counting the % of multinucleated cells by fluorescent microscopy. The % of multinucleated cells in mAb-treated samples then was divided by % of multinucleated cells in a non-mAb treated sample (representing maximal fusion index). Fusion-inhibiting mAbs were defined by reduction of the maximal fusion index to <50% of non-mAb treated cells (yellow boxes). Data shown are average values from 3 independent experiments. (FIG. 1C) Representative binding curves of neutralizing antibodies mediating complete (top) or incomplete (bottom) neutralization for wt SNV (left) or wt ANDV (right). Dotted lines indicate 10% or 50% relative infectivity. Data shown are average values for technical replicates±S.D. The experiment was performed 2 to 3 times independently with similar results; one experiment is shown.

FIGS. 2A-C. NWH-reactive mAbs show binding and neutralizing activity against OWH species. (FIG. 2A) Binding and neutralization potency of mAbs isolated from SNV-immune human individuals to four OWH species, Puumala (PUUV), Dobrava-Belgrade (DOBV), Hantaan (HTNV), and Seoul (SEOV). (FIG. 2B) Binding and neutralization potency of mAbs isolated from ANDV-immune human individual to four pathogenic OWH species. Neutralization activity was determined through a pseudovirus neutralization assay described previously, using pVSVs bearing glycoproteins from PUUV (pVSV/PUUV), DOBV (pVSV/DOBV), HTNV (pVSV/HTNV), and SEOV (pVSV/SEOV). Binding was determined through flow cytometry based binding assay as described previously. $IC_{50}$ values were obtained using non-linear fit analysis with the top of curve constrained to 100 and the bottom of curve constrained to 0, using Prism software version 7 (GraphPad Software). $EC_{50}$ binding values were obtained using non-linear fit analysis with the bottom of curve constrained to 0, using Prism software. Data are shown as average values from 3 independent experiments. Symbols indicate relative potency of antibody. >, indicates no detectable neutralization or reactivity at concentrations higher than 20 µg/mL. (FIG. 2C) Representative neutralization curves from four bnAbs, SNV-24, SNV-53, SNV-57, and SNV-68. Data shown are average values for technical replicates±S.D. The experiment was performed 3 times independently with similar results; one experiment is shown.

FIG. 3. NWH-reactive antibodies bind to at least eight major antigenic sites based on competition-binding analysis. Unlabeled antibodies were incubated with Expi293F cells transfected with cDNA encoding ANDV Gn/Gc at saturating concentrations and then competed with a second antibody labeled with Alexa Fluor 647. Percent competition was analyzed and quantified through flow cytometry as compared to the un-competed binding of the second mAb. Competing antibodies were defined as those with <33% of the maximal un-competed binding in the presence of an unlabeled first antibody (black). Non-competing antibodies were defined as those with >66% of the maximal un-competed binding (white). Intermediate competing antibodies were defined as those with 33 to 66% of the maximal un-competed binding (gray). Antibodies are labeled based on neutralization potency to ANDV and SNV. Antibodies were clustered based on Pearson correlation generated relatedness score based on normalized competition values. Values are averages are from 3 independent experiments.

FIGS. 4A-C. NWH mAbs protect Syrian hamsters in ANDV challenge. (FIG. 4A) 8-week old Syrian hamsters (n=6/treatment group) were inoculated with 200 PFU of ANDV i.m., and 5 mg/kg of indicated mAb was administered i.p. at 3 and 8 dpi. Animals were treated with a dengue-specific mAb (rDENV 2D22) to serve as an isotype control. Statistical analysis was done using a log-rank (Mantel-Cox) test comparing each group to the control (rDENV 2D22); $*p<0.01$, $p<0.01$, $*p<0.001$, ns=non-significant. (FIG. 4B) body weight measurements averaged for each treatment group. (FIG. 4C) Lungs and livers were collected upon euthanasia and used to determine viral titer in tissue. Dots with black borders indicate animals that were found dead or euthanized according to IACUC protocol before the termination of the study.

FIGS. 7A-B, Related to FIGS. 1A-C. SNV-reactive mAb neutralizing activity against pVSV/SNV or pVSV/ANDV titrated on human umbilical vein endothelial cells (HUVECs). (FIG. 7A) pVSV neutralization assays were conducted as previously described and $IC_{50}$ values were generated by a nonlinear regression. Values are indicated based on potency. (FIG. 7B) Representative binding curves of SNV-reactive antibodies. Data shown are average values for technical replicates±S.D. The experiment was performed 3 times independently with similar results; one experiment is shown.

FIGS. 8A-B, Related to FIGS. 1A-C. Fusion inhibiting activity by New World mAbs. Representative fluorescent microscopy images used to calculate fusion index of New World hantavirus mAbs. Vero cells transfected with SNV (FIG. 8A) or ANDV (FIG. 8B) M segments were incubated with SNV (FIG. 8A) or ANDV (FIG. 8B) mAbs prior to low pH treatment. Nuclei were labeled with DAPI and Gn/Gc were detected with a combination of human hantavirus mAbs (SNV-27, SNV-56, and ANDV-44) and anti-human IgG Alexa Fluor 568. Gray arrows indicate multinucleated cells. White scale bar indicates 100 μm.

FIG. 11, related to FIG. 3. SNV-reactive antibodies bind to at least 4 major antigenic sites, based on competition-binding analysis. Unlabeled antibodies were incubated at saturating concentrations with Expi293F cells transfected with cDNA encoding SNV Gn/Gc proteins and then a second antibody labeled with Alexa Fluor 647 was applied. Percent binding of the second mAb was analyzed and quantified through flow cytometry as compared to the un-competed binding of that mAb. The presence of competition defined as <33% of the maximal un-competed binding in the presence of an unlabeled first antibody (black). Non-competing antibodies were defined as those with >66% of the maximal un-competed binding (white). Intermediate competition was defined as those with 33 to 66% of the maximal un-competed binding (gray). Antibodies were clustered based on Pearson correlation generated relatedness score based on normalized competition values. Values are averages are from 3 independent experiments.

Figure 13:
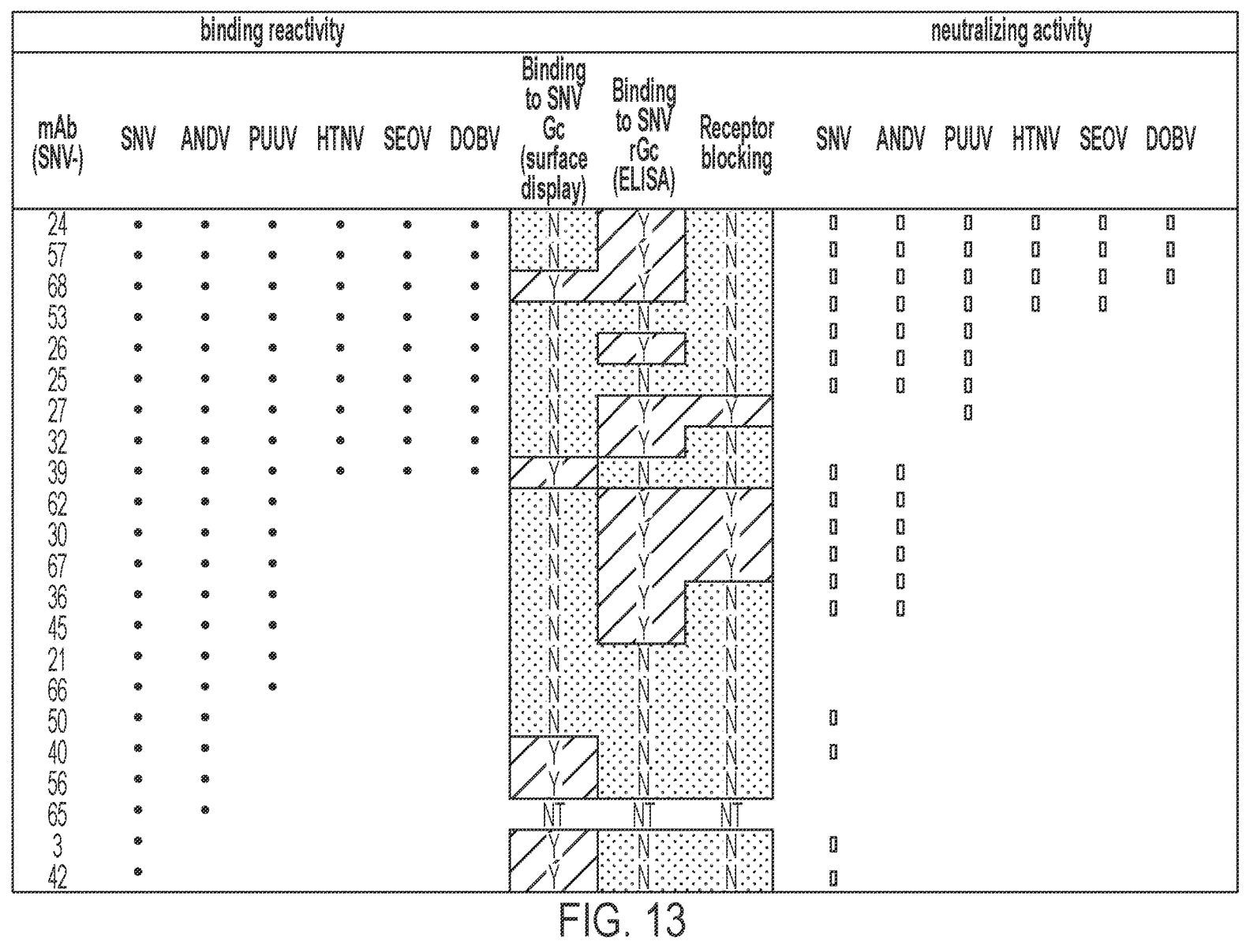

FIG. 13. Summary table of mAb functionalities and breadth.

DESCRIPTION OF ILLUSTRATIVE EMBODIMENTS

Figure 1C:
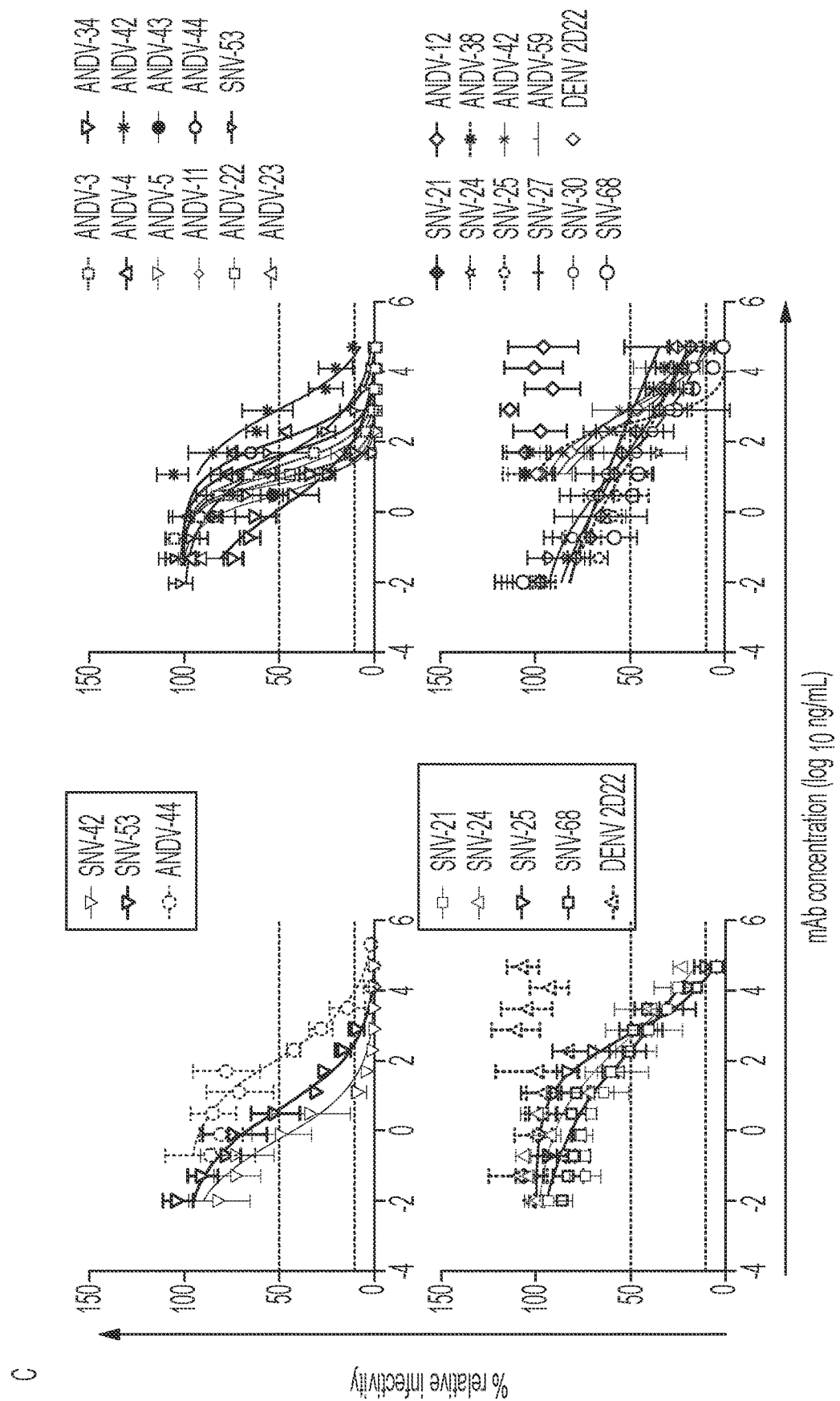

As discussed above, hantavirus infections can be fatal in a high percentage of victims, thereby making the need for vaccines and improved therapies an urgent healthcare need. Here, the inventor reports the development of broadly neutralizing human monoclonal antibodies and their use in preventing and treating hantavirus infections.

These and other aspects of the disclosure are described in detail below.

I. HANTAVIRUS

An orthohantavirus, or hantavirus, is a single-stranded, enveloped, negative-sense RNA virus in the family Hantaviridae of the order Bunvavirales. These viruses normally infect rodents, but do not cause disease in them. Humans may become infected with hantaviruses through contact with rodent urine, saliva, or feces. Some strains cause potentially fatal diseases in humans, such as hantavirus hemorrhagic fever with renal syndrome (HFRS), or hantavirus pulmonary syndrome (HPS), also known as hantavirus cardiopulmonary syndrome (HCPS), while others have not been associated with known human disease. HPS (HCPS) is a "rare respiratory illness associated with the inhalation of aerosolized rodent excreta (urine and feces) contaminated by hantavirus particles."

Human infections of hantaviruses have almost entirely been linked to human contact with rodent excrement; however, in 2005 and 2019, human-to-human transmission of the Andes virus was reported in South America.

Hantavirus is named for the Hantan River area in South Korea where an early outbreak was observed during the Korean War. The virus was isolated in 1976 by Ho-Wang Lee.

Hemorrhagic fever with renal syndrome (HFRS) is a group of clinically similar illnesses caused by species of hantaviruses from the family Hantaviridae. It is also known as Korean hemorrhagic fever, epidemic hemorrhagic fever, and nephropathia epidemica. The species that cause HFRS include Hantaan, Dobrava-Belgrade, Saaremaa, Seoul, and Puumala. It is found in Europe, Asia, and Africa. In hantavirus-induced hemorrhagic fever incubation time is two to four weeks in humans before symptoms develop. Their severity depends on the viral load.

Hantavirus pulmonary syndrome (HPS) is found in North, Central and South America. It is an often-fatal pulmonary disease. In the United States, the causative agent is the Sin Nombre virus carried by deer mice. Prodromal symptoms include flu-like symptoms such as fever, cough, muscle pain, headache, and lethargy. It is characterized by a sudden onset of shortness of breath with rapidly evolving pulmonary edema that is often fatal despite intervention with mechanical ventilation and potent diuretics. The fatality rate is 36%.

Hantavirus pulmonary syndrome was first recognized during the 1993 outbreak in the Four Corners region of the southwestern United States. It was identified by Dr. Bruce Tempest. It was originally called "Four Corners disease," but the name was changed to "Sin Nombre virus" after complaints by Native Americans that the name "Four Corners" stigmatized the region. It has since been identified throughout the United States. Rodent control in and around the home remains the primary prevention strategy.

Hantaviruses are bunyaviruses. The order Bunyavirales is divided into twelve families. Like all members of this order, hantaviruses have genomes comprising three negative-sense, single-stranded RNA segments, and so are classified as negative sense RNA viruses. Members of other Bunyavirales families are generally arthropod-borne viruses,[11] but hantaviruses are thought to be transmitted to humans mainly through inhalation of aerosolized rodent excreta, or rodent bites.

Like other members of Bunyavirales, orthohantaviruses are enveloped viruses with a genome that consists of three single-stranded, negative-sense RNA segments designated S (small), M (medium), and L (large). The S RNA encodes the nucleocapsid (N) protein. The M RNA encodes a polyprotein that is cotranslationally cleaved to yield the envelope glycoproteins Gn (formerly G1) and Gc (formerly G2).

The L RNA encodes the L protein, which functions as the viral transcriptase/replicase. Within virions, the genomic RNAs of hantaviruses are thought to complex with the N protein to form helical nucleocapsids, the RNA component of which circularizes due to sequence complementarity between the 5' and 3' terminal sequences of genomic segments.

As with other Bunyavirales, each of the three segments has a consensus 3'-terminal nucleotide sequence (AUCAUCAUC), which is complementary to the 5'-terminal sequence and is distinct from those of the other four genera in the family. These sequences appear to form panhandle structure which seem likely to play a role in replication and encapsidation facilitated by binding with the viral nucleocapsid (N) protein. The large segment is 6530-6550 nucleotides (nt) in length, the medium is 3613-3707 nt in length and the small is 1696-2083 nt in length.

No nonstructural proteins are known, unlike the other genera in this family. At the 5' and 3' of each segment are short noncoding sequences: the noncoding segment in all sequences at the 5' end is 37-51 nt. The 3' noncoding regions differ: L segment 38-43 nt; M segment 168-229 nt; and S segment 370-730 nt. The 3' end of the S segment is conserved between the genera suggesting a functional role.

Hantavirus virions are about 120-160 nanometers (nm) in diameter. The lipid bilayer of the viral envelope is about 5 nm thick and is embedded with viral surface proteins to which sugar residues are attached. These glycoproteins, known as Gn and Gc, are encoded by the M segment of the viral genome. They tend to associate (heterodimerize) with each other and have both an interior tail and an exterior domain that extends to about 6 nm beyond the envelope surface.

Inside the envelope are the nucleocapsids. These are composed of many copies of the nucleocapsid protein N, which interact with the three segments of the viral genome to form helical structures. The virally encoded RNA polymerase is also found in the interior. By mass, the virion is greater than 50% protein, 20-30% lipid and 2-7% carbohydrate. The density of the virions is 1.18 gram per cubic centimeter. These features are common to all members of the Hantaviridae family.

Entry into host cells is thought to occur by attachment of virions to cellular receptors and subsequent endocytosis. Nucleocapsids are introduced into the cytoplasm by pH-dependent fusion of the virion with the endosomal membrane. After the release of the nucleocapsids into cytoplasm, the complexes are targeted to the ER-Golgi Intermediate compartments (ERGIC) through microtubular-associated movement resulting in the formation of viral factories at ERGIC.

These factories then facilitate transcription and subsequent translation of the viral proteins. Transcription of viral genes must be initiated by association of the L protein with the three nucleocapsid species. In addition to transcriptase and replicase functions, the viral L protein is also thought to have an endonuclease activity that cleaves cellular messenger RNAs (mRNAs) for the production of capped primers used to initiate transcription of viral mRNAs. As a result of this cap snatching, the mRNAs of hantaviruses are capped and contain non-templated 5'-terminal extensions.

The G1 (or Gn) and G2 (Gc) glycoproteins form hetero-oligomers and are then transported from the endoplasmic reticulum to the Golgi complex, where glycosylation is completed. The L protein produces nascent genomes by replication via a positive-sense RNA intermediate. Hantavirus virions are believed to assemble by association of nucleocapsids with glycoproteins embedded in the membranes of the Golgi, followed by budding into the Golgi cisternae. Nascent virions are then transported in secretory vesicles to the plasma membrane and released by exocytosis.

The pathogenesis of hantavirus infections is unclear as there is a lack of animal models to describe it (rats and mice do not seem to acquire severe disease). While the primary site of viral replication in the body is not known, in HFRS the main effect is in the blood vessels while in HPS most symptoms are associated with the lungs. In HFRS, there are increased vascular permeability and decreased blood pressure due to endothelial dysfunction and the most dramatic damage is seen in the kidneys, whereas in HPS, the lungs, spleen, and gall bladder are most affected. Early symptoms of HPS tend to present similarly to the flu (muscle aches, fever and fatigue) and usually appear around 2 to 3 weeks after exposure. Later stages of the disease (about 4 to 10 days after symptoms start) include difficulty breathing, shortness of breath and coughing.

The viruses that cause hantavirus hemorrhagic fever have not been shown to transfer from person to person, except for Andes virus. For other species of hantavirus, aerosolized rodent excreta or rodent bites are the only known routes of transmission to humans. Similar negative-stranded RNA viruses, such as Marburg and Ebola hemorrhagic fevers, can be transmitted by contact with infected blood and body fluids, and are known to spread to healthcare workers in African hospitals, but do not transfer readily in a modern hospital setting with the appropriate precautions. Transmission through fomites (inanimate objects exposed to infection) has not been demonstrated in hantavirus disease in either the hemorrhagic or pulmonary forms.

According to the CDC, the best prevention against contracting hantavirus is to eliminate or minimize contact with rodents in the home, workplace, or campsite. As the virus can be transmitted by rodent saliva, excretions, and bites, control of rats and mice in areas frequented by humans is key for disease prevention. General prevention can be accomplished by disposing of rodent nests, sealing any cracks and holes in homes where mice or rats could get in, setting up traps, or laying down poisons or using natural predators such as cats in the home.

The duration that hantaviruses remain infectious in the environment varies based on factors such as the rodent's diet, temperature, humidity, and whether indoors or outdoors. The viruses have been demonstrated to remain active for two to three days at normal room temperature, while ultraviolet rays in direct sunlight kills them within a few hours. However, rodent droppings or urine of indeterminate age should always be treated as infectious.

Although there are approved vaccines in China and Korea, there is no FDA-approved, commercially available vaccine against hantavirus. A vaccine known as Hantavax has been under study since 1990. As of, the development was in clinical phase 3 trial stage. This inactivated vaccine is thought not to be effective against European hantaviruses like the Puumala (PUUV) virus. A killed-virus vaccine is not being pursued because of the dangers associated with mass production under high containment as well as the unresolved questions about the efficiency of the vaccine. A number of labs have been working towards a vaccine that would deliver viral antigens by either DNA vectors or as recombinant proteins. No WHO-approved vaccine has gained widespread acceptance, but the Korean Army is one of the largest consumers of a hantavirus vaccine, second only to public health centers.

Ribavirin may be a drug for HPS and HFRS but its effectiveness remains unknown, still, spontaneous recovery is possible with supportive treatment. People with suspected hantavirus infection may be admitted to the hospital, given oxygen and mechanical ventilation support to help them breathe during the acute pulmonary stage with severe respiratory distress. Immunotherapy, administration of human neutralizing antibodies during acute phases of Hantavirus, has only been studied in mice, hamsters, and rats. There are no reports of controlled clinical trials.

Hantavirus infections have been reported from all continents but Australia. Regions especially affected by hemorrhagic fever with renal syndrome include China, the Korean Peninsula, Russia (Hantaan, Puumala and Seoul viruses), and northern and western Europe (Puumala and Dobrava virus). Regions with the highest incidences of hantavirus pulmonary syndrome include Argentina, Chile, Brazil, the United States, Canada, and Panama.

In 2010, a novel hantavirus, Sangassou virus was isolated in Africa which causes hemorrhagic fever with renal syndrome.

In China, Hong Kong, the Korean Peninsula and Russia, hemorrhagic fever with renal syndrome is caused by Hantaan, Puumala and Seoul viruses.

In Europe two hantaviruses—Puumala and Dobrava-Belgrade viruses—are known to cause hemorrhagic fever with renal syndrome. Puumala usually causes a generally mild disease—nephropathia epidemica—which typically presents with fever, headache, gastrointestinal symptoms, impaired renal function and blurred vision. Dobrava infections are similar except that they often also have hemorrhagic complications.

Puumala virus is carried by its rodent host, the bank vole (*Clethrionomys glareolus*), and is present throughout most of Europe except for the Mediterranean region. There are 4 known Dobrava virus genotypes, each are carried by a different rodent species. Genotype Dobrava is found in the yellow necked mouse (*Apodemus flavicollis*); Genotypes Saaremaa and Kurkino in the striped field mouse (*Apoderus agrarius*), and Genotype Sochi in the Black Sea field mouse (*Apodemus ponticus*).

In 2017 alone, the Robert Koch Institute (RKI) in Germany received 1,713 notifications of hantavirus infections.

In the U.S., minor cases of HPS include Sin Nombre virus, New York virus, Bayou virus, and possibly Black Creek Canal virus. As of January 2017, 728 cases of hantavirus had been reported in the U.S. cumulatively since 1995, across 36 states (not including cases with presumed exposure outside the U.S.). More than 96% of cases have occurred in states west of the Mississippi River. The top 10 states by number of cases reported (which differs slightly from a count ordered by the state of original exposure) were New Mexico (109), Colorado (104). Arizona (78), California (61), Washington (50), Texas (45), Montana (43), Utah (38), Idaho (21), and Oregon (21); 36% of the total reported cases have resulted in death.

In Mexico the following rodents have been found to carry hantaviruses: *Megadontomys thomasi, Neotoma picta, Peromyscus beatae, Reithrodontomys megalotis* and *Reithrodontomys sumichrasti*.

Although there are Sin Nombre virus-infected deer mice, the primary cause of the disease all across Canada, by June 2015, there had been only one documented case of hantavirus pulmonary syndrome in eastern Canada, with most cases in British Columbia, Alberta, Saskatchewan and Manitoba in the west. There were a total of 109 confirmed cases; about 30% of those infected died. In Canada "[a]ll cases occurred in rural settings and approximately 70% of the cases have been associated with domestic and farming activities."

The first confirmed death was in Northern British Columbia in January, 2013 and another in Kindersley, Saskatchewan, in June 2013.

Agents of HPS found in South America include the Andes virus (also called Oran, Castelo de Sonhos—Portuguese for "Castle of Dreams", Lechiguanas, Juquitiba, Araraquara, and Bermejo virus, among many other synonyms), which is the only hantavirus that has shown an interpersonal form of transmission, and the Laguna Negra virus, an extremely close relative of the previously known Rio Mamore virus.

Rodents that have been shown to carry hantaviruses include *Abrothrix longipilis* and *Oligoryzomys longicaudatus*.

II. MONOCLONAL ANTIBODIES AND PRODUCTION THEREOF

An "isolated antibody" is one that has been separated and/or recovered from a component of its natural environment. Contaminant components of its natural environment are materials that would interfere with diagnostic or therapeutic uses for the antibody, and may include enzymes, hormones, and other proteinaceous or non-proteinaceous solutes. In particular embodiments, the antibody is purified: (1) to greater than 95% by weight of antibody as determined by the Lowry method, and most particularly more than 99% by weight; (2) to a degree sufficient to obtain at least 15 residues of N-terminal or internal amino acid sequence by use of a spinning cup sequenator, or (3) to homogeneity by SDS-PAGE under reducing or non-reducing conditions using Coomassie blue or silver stain. Isolated antibody includes the antibody in situ within recombinant cells since at least one component of the antibody's natural environment will not be present. Ordinarily, however, isolated antibody will be prepared by at least one purification step.

The basic four-chain antibody unit is a heterotetrameric glycoprotein composed of two identical light (L) chains and two identical heavy (H) chains. An IgM antibody consists of 5 basic heterotetramer units along with an additional polypeptide called J chain, and therefore contain 10 antigen binding sites, while secreted IgA antibodies can polymerize to form polyvalent assemblages comprising 2-5 of the basic 4-chain units along with J chain. In the case of IgGs, the 4-chain unit is generally about 150,000 daltons. Each L chain is linked to an H chain by one covalent disulfide bond, while the two H chains are linked to each other by one or more disulfide bonds depending on the H chain isotype. Each H and L chain also has regularly spaced intrachain disulfide bridges. Each H chain has at the N-terminus, a variable region ($V_H$) followed by three constant domains ($C_H$) for each of the alpha and gamma chains and four $C_H$ domains for mu and isotypes. Each L chain has at the N-terminus, a variable region ($V_L$) followed by a constant domain ($C_L$) at its other end. The $V_L$ is aligned with the $V_H$ and the $C_L$ is aligned with the first constant domain of the heavy chain ($C_{H1}$). Particular amino acid residues are believed to form an interface between the light chain and heavy chain variable regions. The pairing of a $V_H$ and $V_L$ together forms a single antigen-binding site. For the structure and properties of the different classes of antibodies, see, e.g., Basic and Clinical Immunology, 8th edition, Daniel P. Stites, Abba I. Terr and Tristram G. Parslow (eds.), Appleton & Lange, Norwalk, Conn., 1994, page 71, and Chapter 6.

The L chain from any vertebrate species can be assigned to one of two clearly distinct types, called kappa and lambda based on the amino acid sequences of their constant domains ($C_L$). Depending on the amino acid sequence of the constant domain of their heavy chains ($C_H$), immunoglobulins can be assigned to different classes or isotypes. There are five classes of immunoglobulins: IgA, IgD, IgE, IgG, and IgM, having heavy chains designated alpha, delta, epsilon, gamma and mu, respectively. They gamma and alpha classes are further divided into subclasses on the basis of relatively minor differences in $C_H$ sequence and function, humans express the following subclasses: IgG1, IgG2, IgG3, IgG4, IgA1, and IgA2.

The term "variable" refers to the fact that certain segments of the V domains differ extensively in sequence among antibodies. The V domain mediates antigen binding and defines specificity of a particular antibody for its particular antigen. However, the variability is not evenly distributed across the 110-amino acid span of the variable regions. Instead, the V regions consist of relatively invariant stretches called framework regions (FRs) of 15-30 amino acids separated by shorter regions of extreme variability called "hypervariable regions" that are each 9-12 amino acids long. The variable regions of native heavy and light chains each comprise four FRs, largely adopting a beta-sheet configuration, connected by three hypervariable regions, which form loops connecting, and in some cases forming part of, the beta-sheet structure. The hypervariable regions in each chain are held together in close proximity by the FRs and, with the hypervariable regions from the other chain, contribute to the formation of the antigen-binding site of antibodies (see Kabat et al., Sequences of Proteins of Immunological Interest, 5th Ed. Public Health Service, National Institutes of Health, Bethesda, Md. (1991)). The constant domains are not involved directly in binding an antibody to an antigen, but exhibit various effector functions, such as participation of the antibody in antibody dependent cellular cytotoxicity (ADCC), antibody-dependent cellular phagocytosis (ADCP), antibody-dependent neutrophil phagocytosis (ADNP), and antibody-dependent complement deposition (ADCD).

The term "hypervariable region" when used herein refers to the amino acid residues of an antibody that are responsible for antigen binding. The hypervariable region generally comprises amino acid residues from a "complementarity determining region" or "CDR" (e.g., around about residues 24-34 (L1), 50-56 (L2) and 89-97 (L3) in the $V_L$, and around about 31-(H1), 50-65 (H2) and 95-102 (H3) in the $V_H$ when numbered in accordance with the Kabat numbering system; Kabat et al., Sequences of Proteins of Immunological Interest, 5th Ed. Public Health Service, National Institutes of Health, Bethesda, Md. (1991)); and/or those residues from a "hypervariable loop" (e.g., residues 24-34 (L1), 50-56 (L2) and 89-97 (L3) in the $V_L$, and 26-32 (H1), 52-56 (H2) and 95-101 (H3) in the $V_H$ when numbered in accordance with the Chothia numbering system; Chothia and Lesk, J. Mol. Biol. 196:901-917 (1987)); and/or those residues from a "hypervariable loop"/CDR (e.g., residues 27-38 (L1), 56-65 (L2) and 105-120 (L3) in the $V_L$, and 27-38 (H1), 56-65 (H2) and 105-120 (H3) in the $V_H$ when numbered in accordance with the IMGT numbering system; Lefranc, M. P. et al. Nucl. Acids Res. 27:209-212 (1999), Ruiz, M. et al. Nucl. Acids Res. 28:219-221 (2000)). Optionally the antibody has symmetrical insertions at one or more of the following points 28, 36 (L1), 63, 74-75 (L2) and 123 (L3) in the $V_L$, and 28, 36 (H1), 63, 74-75 (H2) and 123 (H3) in the $V_{sub}H$ when numbered in accordance with AHo; Honneger, A. and Plunkthun, A. J. Mol. Biol. 309:657-670 (2001)).

By "germline nucleic acid residue" is meant the nucleic acid residue that naturally occurs in a germline gene encoding a constant or variable region. "Germline gene" is the DNA found in a germ cell (i.e., a cell destined to become an egg or in the sperm). A "germline mutation" refers to a heritable change in a particular DNA that has occurred in a germ cell or the zygote at the single-cell stage, and when transmitted to offspring, such a mutation is incorporated in every cell of the body. A germline mutation is in contrast to a somatic mutation which is acquired in a single body cell. In some cases, nucleotides in a germline DNA sequence encoding for a variable region are mutated (i.e., a somatic mutation) and replaced with a different nucleotide.

The term "monoclonal antibody" as used herein refers to an antibody obtained from a population of substantially homogeneous antibodies, i.e., the individual antibodies comprising the population are identical except for possible naturally occurring mutations that may be present in minor amounts. Monoclonal antibodies are highly specific, being directed against a single antigenic site. Furthermore, in contrast to polyclonal antibody preparations that include different antibodies directed against different determinants (epitopes), each monoclonal antibody is directed against a single determinant on the antigen. In addition to their specificity, the monoclonal antibodies are advantageous in that they may be synthesized uncontaminated by other antibodies. The modifier "monoclonal" is not to be construed as requiring production of the antibody by any particular method. For example, the monoclonal antibodies useful in the present disclosure may be prepared by the hybridoma methodology first described by Kohler et al., Nature, 256:495 (1975), or may be made using recombinant DNA methods in bacterial, eukaryotic animal or plant cells (see, e.g., U.S. Pat. No. 4,816,567) after single cell sorting of an antigen specific B cell, an antigen specific plasmablast responding to an infection or immunization, or capture of linked heavy and light chains from single cells in a bulk sorted antigen specific collection. The "monoclonal antibodies" may also be isolated from phage antibody libraries using the techniques described in Clackson et al., Nature, 352:624-628 (1991) and Marks et al., J. Mol. Biol., 222: 581-597 (1991), for example.

A. General Methods

It will be understood that monoclonal antibodies binding to hantavirus will have several applications. These include the production of diagnostic kits for use in detecting and diagnosing hantavirus infection, as well as for treating the same. In these contexts, one may link such antibodies to diagnostic or therapeutic agents, use them as capture agents or competitors in competitive assays, or use them individually without additional agents being attached thereto. The antibodies may be mutated or modified, as discussed further below. Methods for preparing and characterizing antibodies are well known in the art (see, e.g., Antibodies: A Laboratory Manual, Cold Spring Harbor Laboratory, 1988; U.S. Pat. No. 4,196,265).

The methods for generating monoclonal antibodies (MAbs) generally begin along the same lines as those for preparing polyclonal antibodies. The first step for both these methods is immunization of an appropriate host or identification of subjects who are immune due to prior natural infection or vaccination with a licensed or experimental vaccine. As is well known in the art, a given composition for immunization may vary in its immunogenicity. It is often necessary therefore to boost the host immune system, as may be achieved by coupling a peptide or polypeptide immunogen to a carrier. Exemplary and preferred carriers are keyhole limpet hemocyanin (KLH) and bovine serum albumin (BSA). Other albumins such as ovalbumin, mouse serum albumin or rabbit serum albumin can also be used as carriers. Means for conjugating a polypeptide to a carrier protein are well known in the art and include glutaraldehyde, m-maleimidobencoyl-N-hydroxysuccinimide ester, carbodiimyde and bis-biazotized benzidine. As also is well known in the art, the immunogenicity of a particular immunogen composition can be enhanced by the use of non-specific stimulators of the immune response, known as adjuvants. Exemplary and preferred adjuvants in animals include complete Freund's adjuvant (a non-specific stimulator of the immune response containing killed *Mycobacterium tuberculosis*), incomplete Freund's adjuvants and aluminum hydroxide adjuvant and in humans include alum, CpG, MFP59 and combinations of immunostimulatory molecules ("Adjuvant Systems", such as AS01 or AS03). Additional experimental forms of inoculation to induce hantavirus-specific B cells is possible, including nanoparticle vaccines, or gene-encoded antigens delivered as DNA or RNA genes in a physical delivery system (such as lipid nanoparticle or on a gold biolistic bead), and delivered with needle, gene gun, transcutaneous electroporation device. The antigen gene also can be carried as encoded by a replication competent or defective viral vector such as adenovirus, adeno-associated virus, poxvirus, herpesvirus, or alphavirus replicon, or alternatively a virus like particle.

In the case of human antibodies against natural pathogens, a suitable approach is to identify subjects that have been exposed to the pathogens, such as those who have been diagnosed as having contracted the disease, or those who have been vaccinated to generate protective immunity against the pathogen or to test the safety or efficacy of an experimental vaccine. Circulating anti-pathogen antibodies can be detected, and antibody encoding or producing B cells from the antibody-positive subject may then be obtained.

The amount of immunogen composition used in the production of polyclonal antibodies varies upon the nature of the immunogen as well as the animal used for immunization. A variety of routes can be used to administer the immunogen (subcutaneous, intramuscular, intradermal, intravenous and intraperitoneal). The production of polyclonal antibodies may be monitored by sampling blood of the immunized animal at various points following immunization. A second, booster injection, also may be given. The process of boosting and titering is repeated until a suitable titer is achieved. When a desired level of immunogenicity is obtained, the immunized animal can be bled and the serum isolated and stored, and/or the animal can be used to generate MAbs.

Following immunization, somatic cells with the potential for producing antibodies, specifically B lymphocytes (B cells), are selected for use in the MAb generating protocol. These cells may be obtained from biopsied spleens, lymph nodes, tonsils or adenoids, bone marrow aspirates or biopsies, tissue biopsies from mucosal organs like lung or GI tract, or from circulating blood. The antibody-producing B lymphocytes from the immunized animal or immune human are then fused with cells of an immortal myeloma cell, generally one of the same species as the animal that was immunized or human or human/mouse chimeric cells. Myeloma cell lines suited for use in hybridoma-producing fusion procedures preferably are non-antibody-producing, have high fusion efficiency, and enzyme deficiencies that render then incapable of growing in certain selective media which support the growth of only the desired fused cells (hybridomas). Any one of a number of myeloma cells may be used, as are known to those of skill in the art (Goding, pp. 65-66, 1986; Campbell, pp. 75-83, 1984). HMMA2.5 cells or MFP-2 cells are particularly useful examples of such cells.

Methods for generating hybrids of antibody-producing spleen or lymph node cells and myeloma cells usually comprise mixing somatic cells with myeloma cells in a 2:1 proportion, though the proportion may vary from about 20:1 to about 1:1, respectively, in the presence of an agent or agents (chemical or electrical) that promote the fusion of cell membranes. In some cases, transformation of human B cells with Epstein Barr virus (EBV) as an initial step increases the size of the B cells, enhancing fusion with the relatively large-sized myeloma cells. Transformation efficiency by EBV is enhanced by using CpG and a Chk2 inhibitor drug in the transforming medium. Alternatively, human B cells can be activated by co-culture with transfected cell lines expressing CD40 Ligand (CD154) in medium containing additional soluble factors, such as IL-21 and human B cell Activating Factor (BAFF), a Type II member of the TNF superfamily. Fusion methods using Sendai virus have been described by Kohler and Milstein (1975; 1976), and those using polyethylene glycol (PEG), such as 37% (v/v) PEG, by Gefter et al. (1977). The use of electrically induced fusion methods also is appropriate (Goding, pp. 71-74, 1986) and there are processes for better efficiency (Yu et al., 2008). Fusion procedures usually produce viable hybrids at low frequencies, about $1\times10^{-6}$ to $1\times10^{-8}$, but with optimized procedures one can achieve fusion efficiencies close to 1 in 200 (Yu et al., 2008). However, relatively low efficiency of fusion does not pose a problem, as the viable, fused hybrids are differentiated from the parental, infused cells (particularly the infused myeloma cells that would normally continue to divide indefinitely) by culturing in a selective medium. The selective medium is generally one that contains an agent that blocks the de novo synthesis of nucleotides in the tissue culture medium. Exemplary and preferred agents are aminopterin, methotrexate, and azaserine. Aminopterin and methotrexate block de novo synthesis of both purines and pyrimidines, whereas azaserine blocks only purine synthesis. Where aminopterin or methotrexate is used, the medium is supplemented with hypoxanthine and thymidine as a source of nucleotides (HAT medium). Where azaserine is used, the medium is supplemented with hypoxanthine. Ouabain is added if the B cell source is an EBV-transformed human B cell line, in order to eliminate EBV-transformed lines that have not fused to the myeloma.

The preferred selection medium is HAT or HAT with ouabain. Only cells capable of operating nucleotide salvage pathways are able to survive in HAT medium. The myeloma cells are defective in key enzymes of the salvage pathway, e.g., hypoxanthine phosphoribosyl transferase (HPRT), and they cannot survive. The B cells can operate this pathway, but they have a limited life span in culture and generally die within about two weeks. Therefore, the only cells that can survive in the selective media are those hybrids formed from myeloma and B cells. When the source of B cells used for fusion is a line of EBV-transformed B cells, as here, ouabain may also be used for drug selection of hybrids as EBV-transformed B cells are susceptible to drug killing, whereas the myeloma partner used is chosen to be ouabain resistant.

Culturing provides a population of hybridomas from which specific hybridomas are selected. Typically, selection of hybridomas is performed by culturing the cells by single-clone dilution in microtiter plates, followed by testing the individual clonal supernatants (after about two to three weeks) for the desired reactivity. The assay should be sensitive, simple and rapid, such as radioimmunoassays, enzyme immunoassays, cytotoxicity assays, plaque assays dot immunobinding assays, and the like. The selected hybridomas are then serially diluted or single-cell sorted by flow cytometric sorting and cloned into individual antibody-producing cell lines, which clones can then be propagated indefinitely to provide mAbs. The cell lines may be exploited for MAb production in two basic ways. A sample of the hybridoma can be injected (often into the peritoneal cavity) into an animal (e.g., a mouse). Optionally, the animals are primed with a hydrocarbon, especially oils such as pristane (tetramethylpentadecane) prior to injection. When human hybridomas are used in this way, it is optimal to inject immunocompromised mice, such as SCID mice, to prevent tumor rejection. The injected animal develops tumors secreting the specific monoclonal antibody produced by the fused cell hybrid. The body fluids of the animal, such as serum or ascites fluid, can then be tapped to provide MAbs in high concentration. The individual cell lines could also be cultured in vitro, where the MAbs are naturally secreted into the culture medium from which they can be readily obtained in high concentrations. Alternatively, human hybridoma cells lines can be used in vitro to produce immunoglobulins in cell supernatant. The cell lines can be adapted for growth in serum-free medium to optimize the ability to recover human monoclonal immunoglobulins of high purity.

MAbs produced by either means may be further purified, if desired, using filtration, centrifugation and various chromatographic methods such as FPLC or affinity chromatography. Fragments of the monoclonal antibodies of the disclosure can be obtained from the purified monoclonal antibodies by methods which include digestion with enzymes, such as pepsin or papain, and/or by cleavage of disulfide bonds by chemical reduction. Alternatively, monoclonal antibody fragments encompassed by the present disclosure can be synthesized using an automated peptide synthesizer.

It also is contemplated that a molecular cloning approach may be used to generate monoclonal antibodies. Single B cells labelled with the antigen of interest can be sorted physically using paramagnetic bead selection or flow cytometric sorting, then RNA can be isolated from the single cells and antibody genes amplified by RT-PCR. Alternatively, antigen-specific bulk sorted populations of cells can be segregated into microvesicles and the matched heavy and light chain variable genes recovered from single cells using physical linkage of heavy and light chain amplicons, or common barcoding of heavy and light chain genes from a vesicle. Matched heavy and light chain genes form single cells also can be obtained from populations of antigen specific B cells by treating cells with cell-penetrating nanoparticles bearing RT-PCR primers and barcodes for marking transcripts with one barcode per cell. The antibody variable genes also can be isolated by RNA extraction of a hybridoma line and the antibody genes obtained by RT-PCR and cloned into an immunoglobulin expression vector. Alternatively, combinatorial immunoglobulin phagemid libraries are prepared from RNA isolated from the cell lines and phagemids expressing appropriate antibodies are selected by panning using viral antigens. The advantages of this approach over conventional hybridoma techniques are that approximately 104 times as many antibodies can be produced and screened in a single round, and that new specificities are generated by H and L chain combination which further increases the chance of finding appropriate antibodies.

Other U.S. patents, each incorporated herein by reference, that teach the production of antibodies useful in the present disclosure include U.S. Pat. No. 5,565,332, which describes the production of chimeric antibodies using a combinatorial approach; U.S. Pat. No. 4,816,567 which describes recombinant immunoglobulin preparations; and U.S. Pat. No. 4,867,973 which describes antibody-therapeutic agent conjugates.

B. Antibodies of the Present Disclosure

Antibodies according to the present disclosure may be defined, in the first instance, by their binding specificity. Those of skill in the art, by assessing the binding specificity/affinity of a given antibody using techniques well known to those of skill in the art, can determine whether such antibodies fall within the scope of the instant claims. For example, the epitope to which a given antibody bind may consist of a single contiguous sequence of 3 or more (e.g., 3, 4, 5, 6, 7, 8, 9, 10, 11, 12, 13, 14, 15, 16, 17, 18, 19, 20) amino acids located within the antigen molecule (e.g., a linear epitope in a domain). Alternatively, the epitope may consist of a plurality of non-contiguous amino acids (or amino acid sequences) located within the antigen molecule (e.g., a conformational epitope).

Various techniques known to persons of ordinary skill in the art can be used to determine whether an antibody "interacts with one or more amino acids" within a polypeptide or protein. Exemplary techniques include, for example, routine cross-blocking assays, such as that described in Antibodies. Harlow and Lane (Cold Spring Harbor Press, Cold Spring Harbor, N.Y.). Cross-blocking can be measured in various binding assays such as ELISA, biolayer interferometry, or surface plasmon resonance. Other methods include alanine scanning mutational analysis, peptide blot analysis (Reineke (2004) Methods Mol. Biol. 248: 443-63), peptide cleavage analysis, high-resolution electron microscopy techniques using single particle reconstruction, cryoEM, or tomography, crystallographic studies and NMR analysis. In addition, methods such as epitope excision, epitope extraction and chemical modification of antigens can be employed (Tomer (2000) Prot. Sci. 9: 487-496). Another method that can be used to identify the amino acids within a polypeptide with which an antibody interacts is hydrogen/deuterium exchange detected by mass spectrometry. In general terms, the hydrogen/deuterium exchange method involves deuterium-labeling the protein of interest, followed by binding the antibody to the deuterium-labeled protein. Next, the protein/antibody complex is transferred to water and exchangeable protons within amino acids that are protected by the antibody complex undergo deuterium-to-hydrogen back-exchange at a slower rate than exchangeable protons within amino acids that are not part of the interface. As a result, amino acids that form part of the protein/antibody interface may retain deuterium and therefore exhibit relatively higher mass compared to amino acids not included in the interface. After dissociation of the antibody, the target protein is subjected to protease cleavage and mass spectrometry analysis, thereby revealing the deuterium-labeled residues which correspond to the specific amino acids with which the antibody interacts. See, e.g., Ehring (1999) Analytical Biochemistry 267: 252-259; Engen and Smith (2001) Anal. Chem. 73: 256A-265A. When the antibody neutralizes hantavirus, antibody escape mutant variant organisms can be isolated by propagating hantavirus in vitro or in animal models in the presence of high concentrations of the antibody. Sequence analysis of the hantavirus gene encoding the antigen targeted by the antibody reveals the mutation(s) conferring antibody escape, indicating residues in the epitope or that affect the structure of the epitope allosterically.

The term "epitope" refers to a site on an antigen to which B and/or T cells respond. B-cell epitopes can be formed both from contiguous amino acids or noncontiguous amino acids juxtaposed by tertiary folding of a protein. Epitopes formed from contiguous amino acids are typically retained on exposure to denaturing solvents, whereas epitopes formed by tertiary folding are typically lost on treatment with denaturing solvents. An epitope typically includes at least 3, and more usually, at least 5 or 8-10 amino acids in a unique spatial conformation.

Modification-Assisted Profiling (MAP), also known as Antigen Structure-based Antibody Profiling (ASAP) is a method that categorizes large numbers of monoclonal antibodies (mAbs) directed against the same antigen according to the similarities of the binding profile of each antibody to chemically or enzymatically modified antigen surfaces (see US 2004/0101920, herein specifically incorporated by reference in its entirety). Each category may reflect a unique epitope either distinctly different from or partially overlapping with epitope represented by another category. This technology allows rapid filtering of genetically identical antibodies, such that characterization can be focused on genetically distinct antibodies. When applied to hybridoma screening, MAP may facilitate identification of rare hybridoma clones that produce mAbs having the desired characteristics. MAP may be used to sort the antibodies of the disclosure into groups of antibodies binding different epitopes.

The present disclosure includes antibodies that may bind to the same epitope, or a portion of the epitope. Likewise, the present disclosure also includes antibodies that compete for binding to a target or a fragment thereof with any of the specific exemplary antibodies described herein. One can easily determine whether an antibody binds to the same epitope as, or competes for binding with, a reference antibody by using routine methods known in the art. For example, to determine if a test antibody binds to the same epitope as a reference, the reference antibody is allowed to bind to target under saturating conditions. Next, the ability of a test antibody to bind to the target molecule is assessed. If the test antibody is able to bind to the target molecule following saturation binding with the reference antibody, it can be concluded that the test antibody binds to a different epitope than the reference antibody. On the other hand, if the test antibody is not able to bind to the target molecule following saturation binding with the reference antibody, then the test antibody may bind to the same epitope as the epitope bound by the reference antibody.

To determine if an antibody competes for binding with a reference anti-hantavirus antibody, the above-described binding methodology is performed in two orientations: In a first orientation, the reference antibody is allowed to bind to the hantavirus antigen under saturating conditions followed by assessment of binding of the test antibody to the hantavirus molecule. In a second orientation, the test antibody is allowed to bind to the hantavirus antigen molecule under saturating conditions followed by assessment of binding of the reference antibody to the hantavirus molecule. If, in both orientations, only the first (saturating) antibody is capable of binding to the hantavirus, then it is concluded that the test antibody and the reference antibody compete for binding to the hantavirus. As will be appreciated by a person of ordinary skill in the art, an antibody that competes for binding with a reference antibody may not necessarily bind to the identical epitope as the reference antibody but may sterically block binding of the reference antibody by binding an overlapping or adjacent epitope.

Two antibodies bind to the same or overlapping epitope if each competitively inhibits (blocks) binding of the other to the antigen. That is, a 1-, 5-, 10-, 20- or 100-fold excess of one antibody inhibits binding of the other by at least 50% but preferably 75%, 90% or even 99% as measured in a competitive binding assay (see, e.g., Junghans et al., Cancer Res. 1990 50:1495-1502). Alternatively, two antibodies have the same epitope if essentially all amino acid mutations in the antigen that reduce or eliminate binding of one antibody reduce or eliminate binding of the other. Two antibodies have overlapping epitopes if some amino acid mutations that reduce or eliminate binding of one antibody reduce or eliminate binding of the other.

Additional routine experimentation (e.g., peptide mutation and binding analyses) can then be carried out to confirm whether the observed lack of binding of the test antibody is in fact due to binding to the same epitope as the reference antibody or if steric blocking (or another phenomenon) is responsible for the lack of observed binding. Experiments of this sort can be performed using ELISA, RIA, surface plasmon resonance, flow cytometry or any other quantitative or qualitative antibody-binding assay available in the art. Structural studies with EM or crystallography also can demonstrate whether or not two antibodies that compete for binding recognize the same epitope.

In another aspect, there are provided monoclonal antibodies having clone-paired CDRs from the heavy and light chains as illustrated in Tables 3 and 4, respectively. Such antibodies may be produced by the clones discussed below in the Examples section using methods described herein.

In another aspect, the antibodies may be defined by their variable sequence, which include additional "framework" regions. These are provided in Tables 1 and 2 that encode or represent full variable regions. Furthermore, the antibodies sequences may vary from these sequences, optionally using methods discussed in greater detail below. For example, nucleic acid sequences may vary from those set out above in that (a) the variable regions may be segregated away from the constant domains of the light and heavy chains, (b) the nucleic acids may vary from those set out above while not affecting the residues encoded thereby, (c) the nucleic acids may vary from those set out above by a given percentage, e.g., 70%, 75%, 80%, 85%, 90%, 91%, 92%, 93%, 94%, 95%, 96%, 97%, 98% or 99% homology, (d) the nucleic acids may vary from those set out above by virtue of the ability to hybridize under high stringency conditions, as exemplified by low salt and/or high temperature conditions, such as provided by about 0.02 M to about 0.15 M NaCl at temperatures of about 50° C. to about 70° C., (e) the amino acids may vary from those set out above by a given percentage, e.g., 80%, 85%, 90%, 91%, 92%, 93%, 94%, 95%, 96%, 97%, 98% or 99% homology, or (f) the amino acids may vary from those set out above by permitting conservative substitutions (discussed below). Each of the foregoing applies to the nucleic acid sequences set forth as Table 1 and the amino acid sequences of Table 2.

When comparing polynucleotide and polypeptide sequences, two sequences are said to be "identical" if the sequence of nucleotides or amino acids in the two sequences is the same when aligned for maximum correspondence, as described below. Comparisons between two sequences are typically performed by comparing the sequences over a comparison window to identify and compare local regions of sequence similarity. A "comparison window" as used herein, refers to a segment of at least about 20 contiguous positions, usually 30 to about 75, 40 to about 50, in which a sequence may be compared to a reference sequence of the same number of contiguous positions after the two sequences are optimally aligned.

Optimal alignment of sequences for comparison may be conducted using the Megalign program in the Lasergene suite of bioinformatics software (DNASTAR, Inc., Madison, Wis.), using default parameters. This program embodies several alignment schemes described in the following references: Dayhoff, M. O. (1978) A model of evolutionary change in proteins—Matrices for detecting distant relationships. In Dayhoff, M. O. (ed.) Atlas of Protein Sequence and Structure. National Biomedical Research Foundation, Washington D.C. Vol. 5, Suppl. 3, pp. 345-358; Hein J. (1990) Unified Approach to Alignment and Phylogeny pp. 626-645 Methods in Enzymology vol. 183, Academic Press, Inc., San Diego, Calif.; Higgins, D. G. and Sharp, P. M. (1989) CABIOS 5:151-153; Myers, E. W. and Muller W. (1988) CABIOS 4:11-17; Robinson, E. D. (1971) Comb. Theor 11:105; Santou, N. Nes, M. (1987) Mol. Biol. Evol. 4:406-425; Sneath, P. H. A. and Sokal, R. R. (1973) Numerical Taxonomy—the Principles and Practice of Numerical Taxonomy, Freeman Press, San Francisco, Calif.; Wilbur, W. J. and Lipman, D. J. (1983) Proc. Natl. Acad., Sci. USA 80:726-730.

Alternatively, optimal alignment of sequences for comparison may be conducted by the local identity algorithm of Smith and Waterman (1981) Add. APL. Math 2:482, by the identity alignment algorithm of Needleman and Wunsch (1970) J. Mol. Biol. 48:443, by the search for similarity methods of Pearson and Lipman (1988) Proc. Natl. Acad. Sci. USA 85: 2444, by computerized implementations of these algorithms (GAP, BESTFIT, BLAST, FASTA, and TFASTA in the Wisconsin Genetics Software Package, Genetics Computer Group (GCG), 575 Science Dr., Madison, Wis.), or by inspection.

One particular example of algorithms that are suitable for determining percent sequence identity and sequence similarity are the BLAST and BLAST 2.0 algorithms, which are described in Altschul et al. (1977) Nucl. Acids Res. 25:3389-3402 and Altschul et al. (1990) J. Mol. Biol. 215:403-410, respectively. BLAST and BLAST 2.0 can be used, for example, with the parameters described herein, to determine percent sequence identity for the polynucleotides and polypeptides of the disclosure. Software for performing BLAST analyses is publicly available through the National Center for Biotechnology Information. The rearranged nature of an antibody sequence and the variable length of each gene requires multiple rounds of BLAST searches for a single antibody sequence. Also, manual assembly of different genes is difficult and error-prone. The sequence analysis tool IgBLAST (world-wide-web at ncbi.nlm.nih.gov/igblast/) identifies matches to the germline V, D and J genes, details at rearrangement junctions, the delineation of Ig V domain framework regions and complementarity determining regions. IgBLAST can analyze nucleotide or protein sequences and can process sequences in batches and allows searches against the germline gene databases and other sequence databases simultaneously to minimize the chance of missing possibly the best matching germline V gene.

In one illustrative example, cumulative scores can be calculated using, for nucleotide sequences, the parameters M (reward score for a pair of matching residues; always >0) and N (penalty score for mismatching residues; always <0). Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T and X determine the sensitivity and speed of the alignment. The BLASTN program (for nucleotide sequences) uses as defaults a wordlength (W) of 11, and expectation (E) of 10, and the BLOSUM62 scoring matrix (see Henikoff and Henikoff (1989) Proc. Natl. Acad. Sci. USA 89:10915) alignments, (B) of 50, expectation (E) of 10, M=5, N=−4 and a comparison of both strands.

For amino acid sequences, a scoring matrix can be used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T and X determine the sensitivity and speed of the alignment.

In one approach, the "percentage of sequence identity" is determined by comparing two optimally aligned sequences over a window of comparison of at least 20 positions, wherein the portion of the polynucleotide or polypeptide sequence in the comparison window may comprise additions or deletions (i.e., gaps) of 20 percent or less, usually 5 to 15 percent, or 10 to 12 percent, as compared to the reference sequences (which does not comprise additions or deletions) for optimal alignment of the two sequences. The percentage is calculated by determining the number of positions at which the identical nucleic acid bases or amino acid residues occur in both sequences to yield the number of matched positions, dividing the number of matched positions by the total number of positions in the reference sequence (i.e., the window size) and multiplying the results by 100 to yield the percentage of sequence identity.

Yet another way of defining an antibody is as a "derivative" of any of the below-described antibodies and their antigen-binding fragments. The term "derivative" refers to an antibody or antigen-binding fragment thereof that immunospecifically binds to an antigen but which comprises, one, two, three, four, five or more amino acid substitutions, additions, deletions or modifications relative to a "parental" (or wild-type) molecule. Such amino acid substitutions or additions may introduce naturally occurring (i.e., DNA-encoded) or non-naturally occurring amino acid residues. The term "derivative" encompasses, for example, as variants having altered CH1, hinge, CH2, CH3 or CH4 regions, so as to form, for example, antibodies, etc., having variant Fc regions that exhibit enhanced or impaired effector or binding characteristics. The term "derivative" additionally encompasses non-amino acid modifications, for example, amino acids that may be glycosylated (e.g., have altered mannose, 2-N-acetylglucosamine, galactose, fucose, glucose, sialic acid, 5-N-acetylneuraminic acid, 5-glycolneuraminic acid, etc. content), acetylated, pegylated, phosphorylated, amidated, derivatized by known protecting/blocking groups, proteolytic cleavage, linked to a cellular ligand or other protein, etc. In some embodiments, the altered carbohydrate modifications modulate one or more of the following: solubilization of the antibody, facilitation of subcellular transport and secretion of the antibody, promotion of antibody assembly, conformational integrity, and antibody-mediated effector function. In a specific embodiment, the altered carbohydrate modifications enhance antibody mediated effector function relative to the antibody lacking the carbohydrate modification. Carbohydrate modifications that lead to altered antibody mediated effector function are well known in the art (for example, see Shields, R. L. et al. (2002), J. Biol. Chem. 277(30): 26733-26740; Davies J. et al. (2001), Biotechnology & Bioengineering 74(4): 288-294). Methods of altering carbohydrate contents are known to those skilled in the art, see, e.g., Wallick, S. C. et al. (1988), J. Exp. Med. 168(3): 1099-1109; Tao, M. H. et al. (1989), J. Immunol. 143(8): 2595-2601; Routledge, E. G. et al. (1995), Transplantation 60(8):847-53; Elliott, S. et al. (2003), Nature Biotechnol. 21:414-21; Shields, R. L. et al. (2002), J. Biol. Chem. 277(30): 26733-26740).

A derivative antibody or antibody fragment can be generated with an engineered sequence or glycosylation state to confer preferred levels of activity in antibody dependent cellular cytotoxicity (ADCC), antibody-dependent cellular phagocytosis (ADCP), antibody-dependent neutrophil phagocytosis (ADNP), or antibody-dependent complement deposition (ADCD) functions as measured by bead-based or cell-based assays or in vivo studies in animal models.

A derivative antibody or antibody fragment may be modified by chemical modifications using techniques known to those of skill in the art, including, but not limited to, specific chemical cleavage, acetylation, formulation, metabolic synthesis of tunicamycin, etc. In one embodiment, an antibody derivative will possess a similar or identical function as the parental antibody. In another embodiment, an antibody derivative will exhibit an altered activity relative to the parental antibody. For example, a derivative antibody (or fragment thereof) can bind to its epitope more tightly or be more resistant to proteolysis than the parental antibody.

C. Engineering of Antibody Sequences

In various embodiments, one may choose to engineer sequences of the identified antibodies for a variety of reasons, such as improved expression, improved cross-reactivity or diminished off-target binding. Modified antibodies may be made by any technique known to those of skill in the art, including expression through standard molecular biological techniques, or the chemical synthesis of polypeptides. Methods for recombinant expression are addressed elsewhere in this document. The following is a general discussion of relevant goals techniques for antibody engineering.

Hybridomas may be cultured, then cells lysed, and total RNA extracted. Random hexamers may be used with RT to generate cDNA copies of RNA, and then PCR performed using a multiplex mixture of PCR primers expected to amplify all human variable gene sequences. PCR product can be cloned into pGEM-T Easy vector, then sequenced by automated DNA sequencing using standard vector primers. Assay of binding and neutralization may be performed using antibodies collected from hybridoma supernatants and purified by FPLC, using Protein G columns.

Recombinant full-length IgG antibodies can be generated by subcloning heavy and light chain Fv DNAs from the cloning vector into an IgG plasmid vector, transfected into 293 (e.g., Freestyle) cells or CHO cells, and antibodies can be collected and purified from the 293 or CHO cell supernatant. Other appropriate host cells systems include bacteria, such as *E. coli*, insect cells (S2, Sf9, Sf29, High Five), plant cells (e.g., tobacco, with or without engineering for human-like glycans), algae, or in a variety of non-human transgenic contexts, such as mice, rats, goats or cows.

Expression of nucleic acids encoding antibodies, both for the purpose of subsequent antibody purification, and for immunization of a host, is also contemplated. Antibody coding sequences can be RNA, such as native RNA or modified RNA. Modified RNA contemplates certain chemical modifications that confer increased stability and low immunogenicity to mRNAs, thereby facilitating expression of therapeutically important proteins. For instance, N1-methyl-pseudouridine (N1mΨ) outperforms several other nucleoside modifications and their combinations in terms of translation capacity. In addition to turning off the immune/eIF2α phosphorylation-dependent inhibition of translation, incorporated N1mΨ nucleotides dramatically alter the dynamics of the translation process by increasing ribosome pausing and density on the mRNA. Increased ribosome loading of modified mRNAs renders them more permissive for initiation by favoring either ribosome recycling on the same mRNA or de novo ribosome recruitment. Such modifications could be used to enhance antibody expression in vivo following inoculation with RNA. The RNA, whether native or modified, may be delivered as naked RNA or in a delivery vehicle, such as a lipid nanoparticle.

Alternatively, DNA encoding the antibody may be employed for the same purposes. The DNA is included in an expression cassette comprising a promoter active in the host cell for which it is designed. The expression cassette is advantageously included in a replicable vector, such as a conventional plasmid or minivector. Vectors include viral vectors, such as poxviruses, adenoviruses, herpesviruses, adeno-associated viruses, and lentiviruses are contemplated. Replicons encoding antibody genes such as alphavirus replicons based on VEE virus or Sindbis virus are also contemplated. Delivery of such vectors can be performed by needle through intramuscular, subcutaneous, or intradermal routes, or by transcutaneous electroporation when in vivo expression is desired.

The rapid availability of antibody produced in the same host cell and cell culture process as the final cGMP manufacturing process has the potential to reduce the duration of process development programs. Lonza has developed a generic method using pooled transfectants grown in CDACF medium, for the rapid production of small quantities (up to 50 g) of antibodies in CHO cells. Although slightly slower than a true transient system, the advantages include a higher product concentration and use of the same host and process as the production cell line. Example of growth and productivity of GS-CHO pools, expressing a model antibody, in a disposable bioreactor: in a disposable bag bioreactor culture (5 L working volume) operated in fed-batch mode, a harvest antibody concentration of 2 g/L was achieved within 9 weeks of transfection.

Antibody molecules will comprise fragments (such as F(ab'), F(ab')$_2$) that are produced, for example, by the proteolytic cleavage of the mAbs, or single-chain immunoglobulins producible, for example, via recombinant means. F(ab') antibody derivatives are monovalent, while F(ab')$_2$ antibody derivatives are bivalent. In one embodiment, such fragments can be combined with one another, or with other antibody fragments or receptor ligands to form "chimeric" binding molecules. Significantly, such chimeric molecules may contain substituents capable of binding to different epitopes of the same molecule.

In related embodiments, the antibody is a derivative of the disclosed antibodies, e.g., an antibody comprising the CDR sequences identical to those in the disclosed antibodies (e.g., a chimeric, or CDR-grafted antibody). Alternatively, one may wish to make modifications, such as introducing conservative changes into an antibody molecule. In making such changes, the hydropathic index of amino acids may be considered. The importance of the hydropathic amino acid index in conferring interactive biologic function on a protein is generally understood in the art (Kyte and Doolittle, 1982). It is accepted that the relative hydropathic character of the amino acid contributes to the secondary structure of the resultant protein, which in turn defines the interaction of the protein with other molecules, for example, enzymes, substrates, receptors, DNA, antibodies, antigens, and the like.

It also is understood in the art that the substitution of like amino acids can be made effectively on the basis of hydrophilicity. U.S. Pat. No. 4,554,101, incorporated herein by reference, states that the greatest local average hydrophilicity of a protein, as governed by the hydrophilicity of its adjacent amino acids, correlates with a biological property of the protein. As detailed in U.S. Pat. No. 4,554,101, the following hydrophilicity values have been assigned to amino acid residues: basic amino acids: arginine (+3.0), lysine (+3.0), and histidine (−0.5); acidic amino acids: aspartate (+3.0±1), glutamate (+3.0±1), asparagine (+0.2), and glutamine (+0.2); hydrophilic, nonionic amino acids: serine (+0.3), asparagine (+0.2), glutamine (+0.2), and threonine (−0.4), sulfur containing amino acids: cysteine (−1.0) and methionine (−1.3); hydrophobic, nonaromatic amino acids: valine (−1.5), leucine (−1.8), isoleucine (−1.8), proline (−0.5±1), alanine (−0.5), and glycine (0); hydrophobic, aromatic amino acids: tryptophan (−3.4), phenylalanine (−2.5), and tyrosine (−2.3).

It is understood that an amino acid can be substituted for another having a similar hydrophilicity and produce a biologically or immunologically modified protein. In such changes, the substitution of amino acids whose hydrophilicity values are within ±2 is preferred, those that are within ±1 are particularly preferred, and those within ±0.5 are even more particularly preferred.

As outlined above, amino acid substitutions generally are based on the relative similarity of the amino acid side-chain substituents, for example, their hydrophobicity, hydrophilicity, charge, size, and the like. Exemplary substitutions that take into consideration the various foregoing characteristics are well known to those of skill in the art and include: arginine and lysine; glutamate and aspartate; serine and threonine; glutamine and asparagine; and valine, leucine and isoleucine.

The present disclosure also contemplates isotype modification. By modifying the Fc region to have a different isotype, different functionalities can be achieved. For example, changing to IgG$_1$ can increase antibody dependent cell cytotoxicity, switching to class A can improve tissue distribution, and switching to class M can improve valency.

Alternatively or additionally, it may be useful to combine amino acid modifications with one or more further amino acid modifications that alter C1q binding and/or the complement dependent cytotoxicity (CDC) function of the Fc region of an IL-23p19 binding molecule. The binding polypeptide of particular interest may be one that binds to C1q and displays complement dependent cytotoxicity. Polypeptides with pre-existing C1q binding activity, optionally further having the ability to mediate CDC may be modified such that one or both of these activities are enhanced. Amino acid modifications that alter C1q and/or modify its complement dependent cytotoxicity function are described, for example, in WO/0042072, which is hereby incorporated by reference.

One can design an Fc region of an antibody with altered effector function, e.g., by modifying C1q binding and/or FcγR binding and thereby changing CDC activity and/or ADCC activity. "Effector functions" are responsible for activating or diminishing a biological activity (e.g., in a subject). Examples of effector functions include, but are not limited to: C1q binding; complement dependent cytotoxicity (CDC); Fc receptor binding; antibody-dependent cell-mediated cytotoxicity (ADCC); phagocytosis; down regulation of cell surface receptors (e.g., B cell receptor; BCR), etc. Such effector functions may require the Fc region to be combined with a binding domain (e.g., an antibody variable domain) and can be assessed using various assays (e.g., Fc binding assays, ADCC assays, CDC assays, etc.).

For example, one can generate a variant Fc region of an antibody with improved C1q binding and improved FcγRIII binding (e.g., having both improved ADCC activity and improved CDC activity). Alternatively, if it is desired that effector function be reduced or ablated, a variant Fc region can be engineered with reduced CDC activity and/or reduced ADCC activity. In other embodiments, only one of these activities may be increased, and, optionally, also the other activity reduced (e.g., to generate an Fc region variant with improved ADCC activity, but reduced CDC activity and vice versa).

FcRn binding. Fc mutations can also be introduced and engineered to alter their interaction with the neonatal Fc receptor (FcRn) and improve their pharmacokinetic properties. A collection of human Fc variants with improved binding to the FcRn have been described (Shields et al., (2001). High resolution mapping of the binding site on human IgG1 for FcγRI, FcγRII, FcγRIII, and FcRn and design of IgG1 variants with improved binding to the FcγR, (J. Biol. Chem. 276:6591-6604). A number of methods are known that can result in increased half-life (Kuo and Aveson, (2011)), including amino acid modifications may be generated through techniques including alanine scanning mutagenesis, random mutagenesis and screening to assess the binding to the neonatal Fc receptor (FcRn) and/or the in vivo behavior. Computational strategies followed by mutagenesis may also be used to select one of amino acid mutations to mutate.

The present disclosure therefore provides a variant of an antigen binding protein with optimized binding to FcRn. In a particular embodiment, the said variant of an antigen binding protein comprises at least one amino acid modification in the Fc region of said antigen binding protein, wherein said modification is selected from the group consisting of 226, 227, 228, 230, 231, 233, 234, 239, 241, 243, 246, 250, 252, 256, 259, 264, 265, 267, 269, 270, 276, 284, 285, 288, 289, 290, 291, 292, 294, 297, 298, 299, 301, 302, 303, 305, 307, 308, 309, 311, 315, 317, 320, 322, 325, 327, 330, 332, 334, 335, 338, 340, 342, 343, 345, 347, 350, 352, 354, 355, 356, 359, 360, 361, 362, 369, 370, 371, 375, 378, 380, 382, 384, 385, 386, 387, 389, 390, 392, 393, 394, 395, 396, 397, 398, 399, 400, 401403, 404, 408, 411, 412, 414, 415, 416, 418, 419, 420, 421, 422, 424, 426, 428, 433, 434, 438, 439, 440, 443, 444, 445, 446 and 447 of the Fc region as compared to said parent polypeptide, wherein the numbering of the amino acids in the Fc region is that of the EU index in Kabat. In a further aspect of the disclosure the modifications are M252Y/S254T/T256E.

Additionally, various publications describe methods for obtaining physiologically active molecules whose half-lives are modified, see for example Kontermann (2009) either by introducing an FcRn-binding polypeptide into the molecules or by fusing the molecules with antibodies whose FcRn-binding affinities are preserved but affinities for other Fc receptors have been greatly reduced or fusing with FcRn binding domains of antibodies.

Derivatized antibodies may be used to alter the half-lives (e.g., serum half-lives) of parental antibodies in a mammal, particularly a human. Such alterations may result in a half-life of greater than 15 days, preferably greater than 20 days, greater than 25 days, greater than 30 days, greater than 35 days, greater than 40 days, greater than 45 days, greater than 2 months, greater than 3 months, greater than 4 months, or greater than 5 months. The increased half-lives of the antibodies of the present disclosure or fragments thereof in a mammal, preferably a human, results in a higher serum titer of said antibodies or antibody fragments in the mammal, and thus reduces the frequency of the administration of said antibodies or antibody fragments and/or reduces the concentration of said antibodies or antibody fragments to be administered. Antibodies or fragments thereof having increased in vivo half-lives can be generated by techniques known to those of skill in the art. For example, antibodies or fragments thereof with increased in vivo half-lives can be generated by modifying (e.g., substituting, deleting or adding) amino acid residues identified as involved in the interaction between the Fc domain and the FcRn receptor.

Beltramello et al. (2010) previously reported the modification of neutralizing mAbs, due to their tendency to enhance dengue virus infection, by generating in which leucine residues at positions 1.3 and 1.2 of CH2 domain (according to the IMGT unique numbering for C-domain) were substituted with alanine residues. This modification, also known as "LALA" mutation, abolishes antibody binding to FcγRI, FcγRII and FcγRIIIa, as described by Hessell et al. (2007). The variant and unmodified recombinant mAbs were compared for their capacity to neutralize and enhance infection by the four dengue virus serotypes. LALA variants retained the same neutralizing activity as unmodified mAb but were completely devoid of enhancing activity. LALA mutations of this nature are therefore contemplated in the context of the presently disclosed antibodies.

Altered Glycosylation. A particular embodiment of the present disclosure is an isolated monoclonal antibody, or antigen binding fragment thereof, containing a substantially homogeneous glycan without sialic acid, galactose, or fucose. The monoclonal antibody comprises a heavy chain variable region and a light chain variable region, both of which may be attached to heavy chain or light chain constant regions respectively. The aforementioned substantially homogeneous glycan may be covalently attached to the heavy chain constant region.

Another embodiment of the present disclosure comprises a mAb with a novel Fc glycosylation pattern. The isolated monoclonal antibody, or antigen binding fragment thereof, is present in a substantially homogenous composition represented by the GNGN or G1/G2 glycoform. Fc glycosylation plays a significant role in anti-viral and anti-cancer properties of therapeutic mAbs. The disclosure is in line with a recent study that shows increased anti-lentivirus cell-mediated viral inhibition of a fucose free anti-HIV mAb in vitro. This embodiment of the present disclosure with homogenous glycans lacking a core fucose, showed increased protection against specific vinises by a factor greater than two-fold. Elimination of core fucose dramatically improves the ADCC activity of mAbs mediated by natural killer (NK) cells but appears to have the opposite effect on the ADCC activity of polymorphonuclear cells (PMNs).

The isolated monoclonal antibody, or antigen binding fragment thereof, comprising a substantially homogenous composition represented by the GNGN or G1/G2 glycoform exhibits increased binding affinity for Fc gamma RI and Fc gamma RIII compared to the same antibody without the substantially homogeneous GNGN glycoform and with G0, G1F, G2F, GNF, GNGNF or GNGNFX containing glycoforms. In one embodiment of the present disclosure, the antibody dissociates from Fc gamma RI with a Kd of $1 \times 10^{-8}$ M or less and from Fc gamma RIII with a Kd of $1 \times 10^{-7}$ M or less.

Glycosylation of an Fc region is typically either N-linked or O-linked. N-linked refers to the attachment of the carbohydrate moiety to the side chain of an asparagine residue. O-linked glycosylation refers to the attachment of one of the sugars N-acetylgalactosamine, galactose, or xylose to a hydroxyamino acid, most commonly serine or threonine, although 5-hydroxyproline or 5-hydroxylysine may also be used. The recognition sequences for enzymatic attachment of the carbohydrate moiety to the asparagine side chain peptide sequences are asparagine-X-serine and asparagine-X-threonine, where X is any amino acid except proline.

Thus, the presence of either of these peptide sequences in a polypeptide creates a potential glycosylation site.

The glycosylation pattern may be altered, for example, by deleting one or more glycosylation site(s) found in the polypeptide, and/or adding one or more glycosylation site(s) that are not present in the polypeptide. Addition of glycosylation sites to the Fc region of an antibody is conveniently accomplished by altering the amino acid sequence such that it contains one or more of the above-described tripeptide sequences (for N-linked glycosylation sites). An exemplary glycosylation variant has an amino acid substitution of residue Asn 297 of the heavy chain. The alteration may also be made by the addition of, or substitution by, one or more serine or threonine residues to the sequence of the original polypeptide (for O-linked glycosylation sites). Additionally, a change of Asn 297 to Ala can remove one of the glycosylation sites.

In certain embodiments, the antibody is expressed in cells that express beta (1,4)-N-acetylglucosaminyltransferase III (GnT III), such that GnT III adds GlcNAc to the IL-23p19 antibody. Methods for producing antibodies in such a fashion are provided in WO/9954342, WO/03011878, patent publication 20030003097A1, and Umana et al., Nature Biotechnology, 17:176-180, February 1999. Cell lines can be altered to enhance or reduce or eliminate certain post-translational modifications, such as glycosylation, using genome editing technology such as Clustered Regularly Interspaced Short Palindromic Repeats (CRISPR). For example, CRISPR technology can be used to eliminate genes encoding glycosylating enzymes in 293 or CHO cells used to express recombinant monoclonal antibodies.

Elimination of monoclonal antibody protein sequence liabilities. It is possible to engineer the antibody variable gene sequences obtained from human B cells to enhance their manufacturability and safety. Potential protein sequence liabilities can be identified by searching for sequence motifs associated with sites containing:
1) Unpaired Cys residues,
2) N-linked glycosylation,
3) Asn deamidation,
4) Asp isomerization,
5) SYE truncation,
6) Met oxidation,
7) Trp oxidation,
8) N-terminal glutamate,
9) Integrin binding,
10) CD11c/CD18 binding, or
11) Fragmentation Such motifs can be eliminated by altering the synthetic gene for the cDNA encoding recombinant antibodies.

Protein engineering efforts in the field of development of therapeutic antibodies clearly reveal that certain sequences or residues are associated with solubility differences (Fernandez-Escamilla et al., *Nature Biotech.*, 22 (10), 1302-1306, 2004; Chennamsetty et al., *PNAS*, 106 (29), 11937-11942, 2009; Voynov et al., *Biocon. Chem.*, 21(2), 385-392, 2010) Evidence from solubility-altering mutations in the literature indicate that some hydrophilic residues such as aspartic acid, glutamic acid, and serine contribute significantly more favorably to protein solubility than other hydrophilic residues, such as asparagine, glutamine, threonine, lysine, and arginine.

Stability. Antibodies can be engineered for enhanced biophysical properties. One can use elevated temperature to unfold antibodies to determine relative stability, using average apparent melting temperatures. Differential Scanning Calorimetry (DSC) measures the heat capacity, $C_p$, of a molecule (the heat required to warm it, per degree) as a function of temperature. One can use DSC to study the thermal stability of antibodies. DSC data for mAbs is particularly interesting because it sometimes resolves the unfolding of individual domains within the mAb structure, producing up to three peaks in the thermogram (from unfolding of the Fab, $C_H2$, and $C_H3$ domains). Typically unfolding of the Fab domain produces the strongest peak. The DSC profiles and relative stability of the Fc portion show characteristic differences for the human $IgG_1$, $IgG_2$, $IgG_3$, and $IgG_4$ subclasses (Garber and Demarest, *Biochem. Biophys. Res. Commun.* 355, 751-757, 2007). One also can determine average apparent melting temperature using circular dichroism (CD), performed with a CD spectrometer. Far-UV CD spectra will be measured for antibodies in the range of 200 to 260 nm at increments of 0.5 nm. The final spectra can be determined as averages of 20 accumulations. Residue ellipticity values can be calculated after background subtraction. Thermal unfolding of antibodies (0.1 mg/mL) can be monitored at 235 nm from 25-95° C. and a heating rate of 1° C./min. One can use dynamic light scattering (DLS) to assess for propensity for aggregation. DLS is used to characterize size of various particles including proteins. If the system is not disperse in size, the mean effective diameter of the particles can be determined. This measurement depends on the size of the particle core, the size of surface structures, and particle concentration. Since DLS essentially measures fluctuations in scattered light intensity due to particles, the diffusion coefficient of the particles can be determined. DLS software in commercial DLA instruments displays the particle population at different diameters. Stability studies can be done conveniently using DLS. DLS measurements of a sample can show whether the particles aggregate over time or with temperature variation by determining whether the hydrodynamic radius of the particle increases. If particles aggregate, one can see a larger population of particles with a larger radius. Stability depending on temperature can be analyzed by controlling the temperature in situ. Capillary electrophoresis (CE) techniques include proven methodologies for determining features of antibody stability. One can use an iCE approach to resolve antibody protein charge variants due to deamidation, C-terminal lysines, sialylation, oxidation, glycosylation, and any other change to the protein that can result in a change in pI of the protein. Each of the expressed antibody proteins can be evaluated by high throughput, free solution isoelectric focusing (IEF) in a capillary column (cIEF), using a Protein Simple Maurice instrument. Whole-column UV absorption detection can be performed every 30 seconds for real time monitoring of molecules focusing at the isoelectric points (pIs). This approach combines the high resolution of traditional gel IEF with the advantages of quantitation and automation found in column-based separations while eliminating the need for a mobilization step. The technique yields reproducible, quantitative analysis of identity, purity, and heterogeneity profiles for the expressed antibodies. The results identify charge heterogeneity and molecular sizing on the antibodies, with both absorbance and native fluorescence detection modes and with sensitivity of detection down to 0.7 μg/mL.

Solubility. One can determine the intrinsic solubility score of antibody sequences. The intrinsic solubility scores can be calculated using CamSol Intrinsic (Sormanni et al., *J Mol Biol* 427, 478-490, 2015). The amino acid sequences for residues 95-102 (Kabat numbering) in HCDR3 of each antibody fragment such as a scFv can be evaluated via the online program to calculate the solubility scores. One also can determine solubility using laboratory techniques. Various techniques exist, including addition of lyophilized protein to a solution until the solution becomes saturated and the solubility limit is reached, or concentration by ultrafiltration in a microconcentrator with a suitable molecular weight cut-off. The most straightforward method is induction of amorphous precipitation, which measures protein solubility using a method involving protein precipitation using ammonium sulfate (Trevino et al., J Mol Biol, 366: 449-460, 2007). Ammonium sulfate precipitation gives quick and accurate information on relative solubility values. Ammonium sulfate precipitation produces precipitated solutions with well-defined aqueous and solid phases and requires relatively small amounts of protein. Solubility measurements performed using induction of amorphous precipitation by ammonium sulfate also can be done easily at different pH values. Protein solubility is highly pH dependent, and pH is considered the most important extrinsic factor that affects solubility.

Autoreactivity. Generally, it is thought that autoreactive clones should be eliminated during ontogeny by negative selection, however it has become clear that many human naturally occurring antibodies with autoreactive properties persist in adult mature repertoires, and the autoreactivity may enhance the antiviral function of many antibodies to pathogens. It has been noted that HCDR3 loops in antibodies during early B cell development are often rich in positive charge and exhibit autoreactive patterns (Wardemann et al., Science 301, 1374-1377, 2003). One can test a given antibody for autoreactivity by assessing the level of binding to human origin cells in microscopy (using adherent HeLa or HEp-2 epithelial cells) and flow cytometric cell surface staining (using suspension Jurkat T cells and 293S human embryonic kidney cells). Autoreactivity also can be surveyed using assessment of binding to tissues in tissue arrays.

Preferred residues ("Human Likeness"). B cell repertoire deep sequencing of human B cells from blood donors is being performed on a wide scale in many recent studies. Sequence information about a significant portion of the human antibody repertoire facilitates statistical assessment of antibody sequence features common in healthy humans. With knowledge about the antibody sequence features in a human recombined antibody variable gene reference database, the position specific degree of "Human Likeness" (HL) of an antibody sequence can be estimated. HL has been shown to be useful for the development of antibodies in clinical use, like therapeutic antibodies or antibodies as vaccines. The goal is to increase the human likeness of antibodies to reduce potential adverse effects and anti-antibody immune responses that will lead to significantly decreased efficacy of the antibody drug or can induce serious health implications. One can assess antibody characteristics of the combined antibody repertoire of three healthy human blood donors of about 400 million sequences in total and created a novel "relative Human Likeness" (rHL) score that focuses on the hypervariable region of the antibody. The rHL score allows one to easily distinguish between human (positive score) and non-human sequences (negative score). Antibodies can be engineered to eliminate residues that are not common in human repertoires.

D. Single Chain Antibodies

A single chain variable fragment (scFv) is a fusion of the variable regions of the heavy and light chains of immunoglobulins, linked together with a short (usually serine, glycine) linker. This chimeric molecule retains the specificity of the original immunoglobulin, despite removal of the constant regions and the introduction of a linker peptide. This modification usually leaves the specificity unaltered. These molecules were created historically to facilitate phage display where it is highly convenient to express the antigen binding domain as a single peptide. Alternatively, scFv can be created directly from subcloned heavy and light chains derived from a hybridoma or B cell. Single chain variable fragments lack the constant Fc region found in complete antibody molecules, and thus, the common binding sites (e.g., protein A/G) used to purify antibodies. These fragments can often be purified/immobilized using Protein L since Protein L interacts with the variable region of kappa light chains.

Flexible linkers generally are comprised of helix- and turn-promoting amino acid residues such as alanine, serine and glycine. However, other residues can function as well. Tang et al. (1996) used phage display as a means of rapidly selecting tailored linkers for single-chain antibodies (scFvs) from protein linker libraries. A random linker library was constructed in which the genes for the heavy and light chain variable domains were linked by a segment encoding an 18-amino acid polypeptide of variable composition. The scFv repertoire (approx. $5 \times 10^6$ different members) was displayed on filamentous phage and subjected to affinity selection with hapten. The population of selected variants exhibited significant increases in binding activity but retained considerable sequence diversity. Screening 1054 individual variants subsequently yielded a catalytically active scFv that was produced efficiently in soluble form. Sequence analysis revealed a conserved proline in the linker two residues after the $V_H$ C terminus and an abundance of arginines and prolines at other positions as the only common features of the selected tethers.

The recombinant antibodies of the present disclosure may also involve sequences or moieties that permit dimerization or multimerization of the receptors. Such sequences include those derived from IgA, which permit formation of multimers in conjunction with the J-chain. Another multimerization domain is the Gal4 dimerization domain. In other embodiments, the chains may be modified with agents such as biotin/avidin, which permit the combination of two antibodies.

In a separate embodiment, a single-chain antibody can be created by joining receptor light and heavy chains using a non-peptide linker or chemical unit. Generally, the light and heavy chains will be produced in distinct cells, purified, and subsequently linked together in an appropriate fashion (i.e., the N-terminus of the heavy chain being attached to the C-terminus of the light chain via an appropriate chemical bridge).

Cross-linking reagents are used to form molecular bridges that tie functional groups of two different molecules, e.g., a stabilizing and coagulating agent. However, it is contemplated that dimers or multimers of the same analog or heteromeric complexes comprised of different analogs can be created. To link two different compounds in a step-wise manner, hetero-bifunctional cross-linkers can be used that eliminate unwanted homopolymer formation.

An exemplary hetero-bifunctional cross-linker contains two reactive groups: one reacting with primary amine group (e.g., N-hydroxy succinimide) and the other reacting with a thiol group (e.g., pyridyl disulfide, maleimides, halogens, etc.). Through the primary amine reactive group, the cross-linker may react with the lysine residue(s) of one protein (e.g., the selected antibody or fragment) and through the thiol reactive group, the cross-linker, already tied up to the first protein, reacts with the cysteine residue (free sulfhydryl group) of the other protein (e.g., the selective agent).

It is preferred that a cross-linker having reasonable stability in blood will be employed. Numerous types of disulfide-bond containing linkers are known that can be successfully employed to conjugate targeting and therapeutic/preventative agents. Linkers that contain a disulfide bond that is sterically hindered may prove to give greater stability in vivo, preventing release of the targeting peptide prior to reaching the site of action. These linkers are thus one group of linking agents.

Another cross-linking reagent is SMPT, which is a bifunctional cross-linker containing a disulfide bond that is "sterically hindered" by an adjacent benzene ring and methyl groups. It is believed that steric hindrance of the disulfide bond serves a function of protecting the bond from attack by thiolate anions such as glutathione which can be present in tissues and blood, and thereby help in preventing decoupling of the conjugate prior to the delivery of the attached agent to the target site.

The SMPT cross-linking reagent, as with many other known cross-linking reagents, lends the ability to cross-link functional groups such as the SH of cysteine or primary amines (e.g., the epsilon amino group of lysine). Another possible type of cross-linker includes the hetero-bifunctional photoreactive phenylazides containing a cleavable disulfide bond such as sulfosuccinimidyl-2-(p-azido salicylamido) ethyl-1,3'-dithiopropionate. The N-hydroxy-succinimidyl group reacts with primary amino groups and the phenylazide (upon photolysis) reacts non-selectively with any amino acid residue.

In addition to hindered cross-linkers, non-hindered linkers also can be employed in accordance herewith. Other useful cross-linkers, not considered to contain or generate a protected disulfide, include SATA, SPDP and 2-iminothiolane (Wawrzynczak & Thorpe, 1987). The use of such cross-linkers is well understood in the art. Another embodiment involves the use of flexible linkers.

U.S. Pat. No. 4,680,338, describes bifunctional linkers useful for producing conjugates of ligands with amine-containing polymers and/or proteins, especially for forming antibody conjugates with chelators, drugs, enzymes, detectable labels and the like. U.S. Pat. Nos. 5,141,648 and 5,563,250 disclose cleavable conjugates containing a labile bond that is cleavable under a variety of mild conditions. This linker is particularly useful in that the agent of interest may be bonded directly to the linker, with cleavage resulting in release of the active agent. Particular uses include adding a free amino or free sulfhydryl group to a protein, such as an antibody, or a drug.

U.S. Pat. No. 5,856,456 provides peptide linkers for use in connecting polypeptide constituents to make fusion proteins, e.g., single chain antibodies. The linker is up to about 50 amino acids in length, contains at least one occurrence of a charged amino acid (preferably arginine or lysine) followed by a proline, and is characterized by greater stability and reduced aggregation. U.S. Pat. No. 5,880,270 discloses aminooxy-containing linkers useful in a variety of immunodiagnostic and separative techniques.

E. Multispecific Antibodies

In certain embodiments, antibodies of the present disclosure are bispecific or multispecific. Bispecific antibodies are antibodies that have binding specificities for at least two different epitopes. Exemplary bispecific antibodies may bind to two different epitopes of a single antigen. Other such antibodies may combine a first antigen binding site with a binding site for a second antigen. Alternatively, an anti-pathogen arm may be combined with an arm that binds to a triggering molecule on a leukocyte, such as a T-cell receptor molecule (e.g., CD3), or Fc receptors for IgG (FcγR), such as FcγRI (CD64), FcγRII (CD32) and Fc gamma RIII (CD16), so as to focus and localize cellular defense mechanisms to the infected cell. Bispecific antibodies may also be used to localize cytotoxic agents to infected cells. These antibodies possess a pathogen-binding arm and an arm that binds the cytotoxic agent (e.g., saporin, anti-interferon-α, vinca alkaloid, ricin A chain, methotrexate or radioactive isotope hapten). Bispecific antibodies can be prepared as full-length antibodies or antibody fragments (e.g., F(ab')$_2$ bispecific antibodies). WO 96/16673 describes a bispecific anti-ErbB2/anti-Fc gamma RIII antibody and U.S. Pat. No. 5,837,234 discloses a bispecific anti-ErbB2/anti-Fc gamma RI antibody. A bispecific anti-ErbB2/Fc alpha antibody is shown in WO98/02463. U.S. Pat. No. 5,821,337 teaches a bispecific anti-ErbB2/anti-CD3 antibody.

Methods for making bispecific antibodies are known in the art. Traditional production of full-length bispecific antibodies is based on the co-expression of two immunoglobulin heavy chain-light chain pairs, where the two chains have different specificities (Millstein et al., Nature, 305:537-539 (1983)). Because of the random assortment of immunoglobulin heavy and light chains, these hybridomas (quadromas) produce a potential mixture of ten different antibody molecules, of which only one has the correct bispecific structure. Purification of the correct molecule, which is usually done by affinity chromatography steps, is rather cumbersome, and the product yields are low. Similar procedures are disclosed in WO 93/08829, and in Traunecker et al., EMBO J., 10:3655-3659 (1991).

According to a different approach, antibody variable regions with the desired binding specificities (antibody-antigen combining sites) are fused to immunoglobulin constant domain sequences. Preferably, the fusion is with an Ig heavy chain constant domain, comprising at least part of the hinge, $C_{H2}$, and $C_{H3}$ regions. It is preferred to have the first heavy-chain constant region ($C_{H1}$) containing the site necessary for light chain bonding, present in at least one of the fusions. DNAs encoding the immunoglobulin heavy chain fusions and, if desired, the immunoglobulin light chain, are inserted into separate expression vectors, and are co-transfected into a suitable host cell. This provides for greater flexibility in adjusting the mutual proportions of the three polypeptide fragments in embodiments when unequal ratios of the three polypeptide chains used in the construction provide the optimum yield of the desired bispecific antibody. It is, however, possible to insert the coding sequences for two or all three polypeptide chains into a single expression vector when the expression of at least two polypeptide chains in equal ratios results in high yields or when the ratios have no significant effect on the yield of the desired chain combination.

In a particular embodiment of this approach, the bispecific antibodies are composed of a hybrid immunoglobulin heavy chain with a first binding specificity in one arm, and a hybrid immunoglobulin heavy chain-light chain pair (providing a second binding specificity) in the other arm. It was found that this asymmetric structure facilitates the separation of the desired bispecific compound from unwanted immunoglobulin chain combinations, as the presence of an immunoglobulin light chain in only one half of the bispecific molecule provides for a facile way of separation. This approach is disclosed in WO 94/04690. For further details of generating bispecific antibodies see, for example, Suresh et al., Methods in Enzymology, 121:210 (1986).

According to another approach described in U.S. Pat. No. 5,731,168, the interface between a pair of antibody molecules can be engineered to maximize the percentage of heterodimers that are recovered from recombinant cell culture. The preferred interface comprises at least a part of the $C_{H3}$ domain. In this method, one or more small amino acid side chains from the interface of the first antibody molecule are replaced with larger side chains (e.g., tyrosine or tryptophan). Compensatory "cavities" of identical or similar size to the large side chain(s) are created on the interface of the second antibody molecule by replacing large amino acid side chains with smaller ones (e.g., alanine or threonine). This provides a mechanism for increasing the yield of the heterodimer over other unwanted end-products such as homodimers.

Bispecific antibodies include cross-linked or "heteroconjugate" antibodies. For example, one of the antibodies in the heteroconjugate can be coupled to avidin, the other to biotin. Such antibodies have, for example, been proposed to target immune system cells to unwanted cells (U.S. Pat. No. 4,676,980), and for treatment of HIV infection (WO 91/00360, WO 92/200373, and EP 03089). Heteroconjugate antibodies may be made using any convenient cross-linking methods. Suitable cross-linking agents are well known in the art, and are disclosed in U.S. Pat. No. 4,676,980, along with a number of cross-linking techniques.

Techniques for generating bispecific antibodies from antibody fragments have also been described in the literature. For example, bispecific antibodies can be prepared using chemical linkage. Brennan et al., Science, 229: 81 (1985) describe a procedure wherein intact antibodies are proteolytically cleaved to generate F(ab')$_2$ fragments. These fragments are reduced in the presence of the dithiol complexing agent, sodium arsenite, to stabilize vicinal dithiols and prevent intermolecular disulfide formation. The Fab' fragments generated are then converted to thionitrobenzoate (TNB) derivatives. One of the Fab'-TNB derivatives is then reconverted to the Fab'-thiol by reduction with mercaptoethylamine and is mixed with an equimolar amount of the other Fab'-TNB derivative to form the bispecific antibody. The bispecific antibodies produced can be used as agents for the selective immobilization of enzymes.

Techniques exist that facilitate the direct recovery of Fab'-SH fragments from *E. coli*, which can be chemically coupled to form bispecific antibodies. Shalaby et al., J. Exp. Med., 175: 217-225 (1992) describe the production of a humanized bispecific antibody F(ab')$_2$ molecule. Each Fab' fragment was separately secreted from *E. coli* and subjected to directed chemical coupling in vitro to form the bispecific antibody. The bispecific antibody thus formed was able to bind to cells overexpressing the ErbB2 receptor and normal human T cells, as well as trigger the lytic activity of human cytotoxic lymphocytes against human breast tumor targets.

Various techniques for making and isolating bispecific antibody fragments directly from recombinant cell culture have also been described (Merchant et al., *Nat. Biotechnol.* 16, 677-4681 (1998). doi:10.1038/nbt0798-677pmid: 9661204). For example, bispecific antibodies have been produced using leucine zippers (Kostelny et al., J. Immunol., 148(5):1547-1553, 1992). The leucine zipper peptides from the Fos and Jun proteins were linked to the Fab' portions of two different antibodies by gene fusion. The antibody homodimers were reduced at the hinge region to form monomers and then re-oxidized to form the antibody heterodimers. This method can also be utilized for the production of antibody homodimers. The "diabody" technology described by Hollinger et al., Proc. Natl. Acad. Sci. USA, 90:6444-6448 (1993) has provided an alternative mechanism for making bispecific antibody fragments. The fragments comprise a $V_H$ connected to a $V_L$ by a linker that is too short to allow pairing between the two domains on the same chain. Accordingly, the $V_H$ and $V_L$ domains of one fragment are forced to pair with the complementary $V_L$ and $V_H$ domains of another fragment, thereby forming two antigen-binding sites. Another strategy for making bispecific antibody fragments by the use of single-chain Fv (sFv) dimers has also been reported. See Gruber et al., J. Immunol., 152:5368 (1994).

In a particular embodiment, a bispecific or multispecific antibody may be formed as a DOCK-AND-LOCK™ (DNL™) complex (see, e.g., U.S. Pat. Nos. 7,521,056; 7,527,787; 7,534,866; 7,550,143 and 7,666,400, the Examples section of each of which is incorporated herein by reference.) Generally, the technique takes advantage of the specific and high-affinity binding interactions that occur between a dimerization and docking domain (DDD) sequence of the regulatory (R) subunits of cAMP-dependent protein kinase (PKA) and an anchor domain (AD) sequence derived from any of a variety of AKAP proteins (Baillie et al., *FEBS Letters.* 2005; 579: 3264; Wong and Scott, *Nat. Rev. Mol. Cell Biol.* 2004; 5: 959). The DDD and AD peptides may be attached to any protein, peptide or other molecule. Because the DDD sequences spontaneously dimerize and bind to the AD sequence, the technique allows the formation of complexes between any selected molecules that may be attached to DDD or AD sequences.

Antibodies with more than two valencies are contemplated. For example, trispecific antibodies can be prepared (Tutt et al., J. Immunol. 147: 60, 1991; Xu et al., Science, 358(6359):85-90, 2017). A multivalent antibody may be internalized (and/or catabolized) faster than a bivalent antibody by a cell expressing an antigen to which the antibodies bind. The antibodies of the present disclosure can be multivalent antibodies with three or more antigen binding sites (e.g., tetravalent antibodies), which can be readily produced by recombinant expression of nucleic acid encoding the polypeptide chains of the antibody. The multivalent antibody can comprise a dimerization domain and three or more antigen binding sites. The preferred dimerization domain comprises (or consists of) an Fc region or a hinge region. In this scenario, the antibody will comprise an Fc region and three or more antigen binding sites amino-terminal to the Fc region. The preferred multivalent antibody herein comprises (or consists of) three to about eight, but preferably four, antigen binding sites. The multivalent antibody comprises at least one polypeptide chain (and preferably two polypeptide chains), wherein the polypeptide chain(s) comprise two or more variable regions. For instance, the polypeptide chain(s) may comprise VD1-(X1)$_n$-VD2-(X2)$_n$-Fc, wherein VD1 is a first variable region, VD2 is a second variable region, Fc is one polypeptide chain of an Fc region, X1 and X2 represent an amino acid or polypeptide, and n is 0 or 1. For instance, the polypeptide chain(s) may comprise: VH-CH1-flexible linker-VH-CH1-Fc region chain; or VH-CH1-VH-CH1-Fc region chain. The multivalent antibody herein preferably further comprises at least two (and preferably four) light chain variable region polypeptides. The multivalent antibody herein may, for instance, comprise from about two to about eight light chain variable region polypeptides. The light chain variable region polypeptides contemplated here comprise a light chain variable region and, optionally, further comprise a C domain.

Charge modifications are particularly useful in the context of a multispecific antibody, where amino acid substitutions in Fab molecules result in reducing the mispairing of light chains with non-matching heavy chains (Bence-Jones-type side products), which can occur in the production of Fab-based bi-/multispecific antigen binding molecules with a VH/VL exchange in one (or more, in case of molecules comprising more than two antigen-binding Fab molecules) of their binding arms (see also PCT publication no. WO 2015/150447, particularly the examples therein, incorporated herein by reference in its entirety).

Accordingly, in particular embodiments, an antibody comprised in the therapeutic agent comprises
(a) a first Fab molecule which specifically binds to a first antigen
(b) a second Fab molecule which specifically binds to a second antigen, and wherein the variable domains VL and VH of the Fab light chain and the Fab heavy chain are replaced by each other,
wherein the first antigen is an activating T cell antigen and the second antigen is a target cell antigen, or the first antigen is a target cell antigen and the second antigen is an activating T cell antigen; and wherein
i) in the constant domain CL of the first Fab molecule under a) the amino acid at position 124 is substituted by a positively charged amino acid (numbering according to Kabat), and wherein in the constant domain CH1 of the first Fab molecule under a) the amino acid at position 147 or the amino acid at position 213 is substituted by a negatively charged amino acid (numbering according to Kabat EU index); or
ii) in the constant domain CL of the second Fab molecule under b) the amino acid at position 124 is substituted by a positively charged amino acid (numbering according to Kabat), and wherein in the constant domain CH1 of the second Fab molecule under b) the amino acid at position 147 or the amino acid at position 213 is substituted by a negatively charged amino acid (numbering according to Kabat EU index).

The antibody may not comprise both modifications mentioned under i) and ii). The constant domains CL and CH1 of the second Fab molecule are not replaced by each other (i.e., remain unexchanged).

In another embodiment of the antibody, in the constant domain CL of the first Fab molecule under a) the amino acid at position 124 is substituted independently by lysine (K), arginine (R) or histidine (H) (numbering according to Kabat) (in one preferred embodiment independently by lysine (K) or arginine (R)), and in the constant domain CH1 of the first Fab molecule under a) the amino acid at position 147 or the amino acid at position 213 is substituted independently by glutamic acid (E), or aspartic acid (D) (numbering according to Kabat EU index).

In a further embodiment, in the constant domain CL of the first Fab molecule under a) the amino acid at position 124 is substituted independently by lysine (K), arginine (R) or histidine (H) (numbering according to Kabat), and in the constant domain CH1 of the first Fab molecule under a) the amino acid at position 147 is substituted independently by glutamic acid (E), or aspartic acid (D) (numbering according to Kabat EU index).

In a particular embodiment, in the constant domain CL of the first Fab molecule under a) the amino acid at position 124 is substituted independently by lysine (K), arginine (R) or histidine (H) (numbering according to Kabat) (in one preferred embodiment independently by lysine (K) or arginine (R)) and the amino acid at position 123 is substituted independently by lysine (K), arginine (R) or histidine (H) (numbering according to Kabat) (in one preferred embodiment independently by lysine (K) or arginine (R)), and in the constant domain CH1 of the first Fab molecule under a) the amino acid at position 147 is substituted independently by glutamic acid (E), or aspartic acid (D) (numbering according to Kabat EU index) and the amino acid at position 213 is substituted independently by glutamic acid (E), or aspartic acid (D) (numbering according to Kabat EU index).

In a more particular embodiment, in the constant domain CL of the first Fab molecule under a) the amino acid at position 124 is substituted by lysine (K) (numbering according to Kabat) and the amino acid at position 123 is substituted by lysine (K) or arginine (R) (numbering according to Kabat), and in the constant domain CH1 of the first Fab molecule under a) the amino acid at position 147 is substituted by glutamic acid (E) (numbering according to Kabat EU index) and the amino acid at position 213 is substituted by glutamic acid (E) (numbering according to Kabat EU index).

In an even more particular embodiment, in the constant domain CL of the first Fab molecule under a) the amino acid at position 124 is substituted by lysine (K) (numbering according to Kabat) and the amino acid at position 123 is substituted by arginine (R) (numbering according to Kabat), and in the constant domain CH1 of the first Fab molecule under a) the amino acid at position 147 is substituted by glutamic acid (E) (numbering according to Kabat EU index) and the amino acid at position 213 is substituted by glutamic acid (E) (numbering according to Kabat EU index).

F. Chimeric Antigen Receptors

Artificial T cell receptors (also known as chimeric T cell receptors, chimeric immunoreceptors, chimeric antigen receptors (CARs)) are engineered receptors, which graft an arbitrary specificity onto an immune effector cell. Typically, these receptors are used to graft the specificity of a monoclonal antibody onto a T cell, with transfer of their coding sequence facilitated by retroviral vectors. In this way, a large number of target-specific T cells can be generated for adoptive cell transfer. Phase I clinical studies of this approach show efficacy.

The most common form of these molecules are fusions of single-chain variable fragments (scFv) derived from monoclonal antibodies, fused to CD3-zeta transmembrane and endodomain. Such molecules result in the transmission of a zeta signal in response to recognition by the scFv of its target. An example of such a construct is 14g2a-Zeta, which is a fusion of a scFv derived from hybridoma 14g2a (which recognizes disialoganglioside GD2). When T cells express this molecule (usually achieved by oncoretroviral vector transduction), they recognize and kill target cells that express GD2 (e.g., neuroblastoma cells). To target malignant B cells, investigators have redirected the specificity of T cells using a chimeric immunoreceptor specific for the B-lineage molecule, CD19.

The variable portions of an immunoglobulin heavy and light chain are fused by a flexible linker to form a scFv. This scFv is preceded by a signal peptide to direct the nascent protein to the endoplasmic reticulum and subsequent surface expression (this is cleaved). A flexible spacer allows to the scFv to orient in different directions to enable antigen binding. The transmembrane domain is a typical hydrophobic alpha helix usually derived from the original molecule of the signaling endodomain which protrudes into the cell and transmits the desired signal.

Type I proteins are in fact two protein domains linked by a transmembrane alpha helix in between. The cell membrane lipid bilayer, through which the transmembrane domain passes, acts to isolate the inside portion (endodomain) from the external portion (ectodomain). It is not so surprising that attaching an ectodomain from one protein to an endodomain of another protein results in a molecule that combines the recognition of the former to the signal of the latter.

Ectodomain. A signal peptide directs the nascent protein into the endoplasmic reticulum. This is essential if the receptor is to be glycosylated and anchored in the cell membrane. Any eukaryotic signal peptide sequence usually works fine. Generally, the signal peptide natively attached to the amino-terminal most component is used (e.g., in a scFv with orientation light chain—linker—heavy chain, the native signal of the light-chain is used The antigen recognition domain is usually an scFv. There are however many alternatives. An antigen recognition domain from native T-cell receptor (TCR) alpha and beta single chains have been described, as have simple ectodomains (e.g., CD4 ectodomain to recognize HIV infected cells) and more exotic recognition components such as a linked cytokine (which leads to recognition of cells bearing the cytokine receptor). In fact, almost anything that binds a given target with high affinity can be used as an antigen recognition region.

A spacer region links the antigen binding domain to the transmembrane domain. It should be flexible enough to allow the antigen binding domain to orient in different directions to facilitate antigen recognition. The simplest form is the hinge region from IgG1. Alternatives include the $CH_2CH_3$ region of immunoglobulin and portions of CD3. For most scFv based constructs, the IgG1 hinge suffices. However, the best spacer often has to be determined empirically.

Transmembrane domain. The transmembrane domain is a hydrophobic alpha helix that spans the membrane. Generally, the transmembrane domain from the most membrane proximal component of the endodomain is used. Interestingly, using the CD3-zeta transmembrane domain may result in incorporation of the artificial TCR into the native TCR a factor that is dependent on the presence of the native CD3-zeta transmembrane charged aspartic acid residue. Different transmembrane domains result in different receptor stability. The CD28 transmembrane domain results in a brightly expressed, stable receptor.

Endodomain. This is the "business-end" of the receptor. After antigen recognition, receptors cluster and a signal is transmitted to the cell. The most commonly used endodomain component is CD3-zeta which contains 3 ITAMs. This transmits an activation signal to the T cell after antigen is bound. CD3-zeta may not provide a fully competent activation signal and additional co-stimulatory signaling is needed.

"First-generation" CARs typically had the intracellular domain from the CD3 ξ-chain, which is the primary transmitter of signals from endogenous TCRs. "Second-generation" CARs add intracellular signaling domains from various costimulatory protein receptors (e.g., CD28, 41BB, ICOS) to the cytoplasmic tail of the CAR to provide additional signals to the T cell. Preclinical studies have indicated that the second generation of CAR designs improves the antitumor activity of T cells. More recent, "third-generation" CARs combine multiple signaling domains, such as CD3z-CD28-41BB or CD3z-CD28-OX40, to further augment potency.

G. ADCs

Antibody Drug Conjugates or ADCs are a new class of highly potent biopharmaceutical drugs designed as a targeted therapy for the treatment of people with infectious disease. ADCs are complex molecules composed of an antibody (a whole mAb or an antibody fragment such as a single-chain variable fragment, or scFv) linked, via a stable chemical linker with labile bonds, to a biological active cytotoxic/anti-viral payload or drug. Antibody Drug Conjugates are examples of bioconjugates and immunoconjugates.

By combining the unique targeting capabilities of monoclonal antibodies with the cancer-killing ability of cytotoxic drugs, antibody-drug conjugates allow sensitive discrimination between healthy and diseased tissue. This means that, in contrast to traditional systemic approaches, antibody-drug conjugates target and attack the infected cell so that healthy cells are less severely affected.

In the development ADC-based anti-tumor therapies, an anticancer drug (e.g., a cell toxin or cytotoxin) is coupled to an antibody that specifically targets a certain cell marker (e.g., a protein that, ideally, is only to be found in or on infected cells). Antibodies track these proteins down in the body and attach themselves to the surface of cancer cells. The biochemical reaction between the antibody and the target protein (antigen) triggers a signal in the tumor cell, which then absorbs or internalizes the antibody together with the cytotoxin. After the ADC is internalized, the cytotoxic drug is released and kills the cell or impairs viral replication. Due to this targeting, ideally the drug has lower side effects and gives a wider therapeutic window than other agents.

A stable link between the antibody and cytotoxic/antiviral agent is a crucial aspect of an ADC. Linkers are based on chemical motifs including disulfides, hydrazones or peptides (cleavable), or thioethers (noncleavable) and control the distribution and delivery of the cytotoxic agent to the target cell. Cleavable and noncleavable types of linkers have been proven to be safe in preclinical and clinical trials. Brentuximab vedotin includes an enzyme-sensitive cleavable linker that delivers the potent and highly toxic antimicrotubule agent Monomethyl auristatin E or MMAE, a synthetic antineoplastic agent, to human specific CD30-positive malignant cells. Because of its high toxicity MMAE, which inhibits cell division by blocking the polymerization of tubulin, cannot be used as a single-agent chemotherapeutic drug. However, the combination of MMAE linked to an anti-CD30 monoclonal antibody (cAC10, a cell membrane protein of the tumor necrosis factor or TNF receptor) proved to be stable in extracellular fluid, cleavable by cathepsin and safe for therapy. Trastuzumab emtansine, the other approved ADC, is a combination of the microtubule-formation inhibitor mertansine (DM-1), a derivative of the Maytansine, and antibody trastuzumab (Herceptin®/Genentech/Roche) attached by a stable, non-cleavable linker.

The availability of better and more stable linkers has changed the function of the chemical bond. The type of linker, cleavable or noncleavable, lends specific properties to the cytotoxic (anti-cancer) drug. For example, a non-cleavable linker keeps the drug within the cell. As a result, the entire antibody, linker and cytotoxic agent enter the targeted cancer cell where the antibody is degraded to the level of an amino acid. The resulting complex—amino acid, linker and cytotoxic agent—now becomes the active drug. In contrast, cleavable linkers are catalyzed by enzymes in the host cell where it releases the cytotoxic agent.

Another type of cleavable linker, currently in development, adds an extra molecule between the cytotoxic/antiviral drug and the cleavage site. This linker technology allows researchers to create ADCs with more flexibility without worrying about changing cleavage kinetics. Researchers are also developing a new method of peptide cleavage based on Edman degradation, a method of sequencing amino acids in a peptide. Future direction in the development of ADCs also include the development of site-specific conjugation (TDCs) to further improve stability and therapeutic index and a emitting immunoconjugates and antibody-conjugated nanoparticles.

H. BiTES

Bi-specific T-cell engagers (BiTEs) are a class of artificial bispecific monoclonal antibodies that are investigated for the use as anti-cancer drugs. They direct a host's immune system, more specifically the T cells' cytotoxic activity, against infected cells. BiTE is a registered trademark of Micromet AG.

BiTEs are fusion proteins consisting of two single-chain variable fragments (scFvs) of different antibodies, or amino acid sequences from four different genes, on a single peptide chain of about 55 kilodaltons. One of the scFvs binds to T cells via the CD3 receptor, and the other to an infected cell via a specific molecule.

Like other bispecific antibodies, and unlike ordinary monoclonal antibodies, BiTEs form a link between T cells and target cells. This causes T cells to exert cytotoxic/antiviral activity on infected cells by producing proteins like perforin and granzymes, independently of the presence of MHC I or co-stimulatory molecules. These proteins enter infected cells and initiate the cell's apoptosis. This action mimics physiological processes observed during T cell attacks against infected cells.

I. Intrabodies

In a particular embodiment, the antibody is a recombinant antibody that is suitable for action inside of a cell—such antibodies are known as "intrabodies." These antibodies may interfere with target function by a variety of mechanism, such as by altering intracellular protein trafficking, interfering with enzymatic function, and blocking protein-protein or protein-DNA interactions. In many ways, their structures mimic or parallel those of single chain and single domain antibodies, discussed above. Indeed, single-transcript/single-chain is an important feature that permits intracellular expression in a target cell, and also makes protein transit across cell membranes more feasible. However, additional features are required.

The two major issues impacting the implementation of intrabody therapeutic are delivery, including cell/tissue targeting, and stability. With respect to delivery, a variety of approaches have been employed, such as tissue-directed delivery, use of cell-type specific promoters, viral-based delivery and use of cell-permeability/membrane translocating peptides. With respect to the stability, the approach is generally to either screen by brute force, including methods that involve phage display and may include sequence maturation or development of consensus sequences, or more directed modifications such as insertion stabilizing sequences (e.g., Fc regions, chaperone protein sequences, leucine zippers) and disulfide replacement/modification.

An additional feature that intrabodies may require is a signal for intracellular targeting. Vectors that can target intrabodies (or other proteins) to subcellular regions such as the cytoplasm, nucleus, mitochondria and ER have been designed and are commercially available (Invitrogen Corp.; Persic et al., 1997).

By virtue of their ability to enter cells, intrabodies have additional uses that other types of antibodies may not achieve. In the case of the present antibodies, the ability to interact with the MUC1 cytoplasmic domain in a living cell may interfere with functions associated with the MUC1 CD, such as signaling functions (binding to other molecules) or oligomer formation. In particular, it is contemplated that such antibodies can be used to inhibit MUC1 dimer formation.

J. Purification

In certain embodiments, the antibodies of the present disclosure may be purified. The term "purified," as used herein, is intended to refer to a composition, isolatable from other components, wherein the protein is purified to any degree relative to its naturally-obtainable state. A purified protein therefore also refers to a protein, free from the environment in which it may naturally occur. Where the term "substantially purified" is used, this designation will refer to a composition in which the protein or peptide forms the major component of the composition, such as constituting about 50%, about 60%, about 70%, about 80%, about 90%, about 95% or more of the proteins in the composition.

Protein purification techniques are well known to those of skill in the art. These techniques involve, at one level, the crude fractionation of the cellular milieu to polypeptide and non-polypeptide fractions. Having separated the polypeptide from other proteins, the polypeptide of interest may be further purified using chromatographic and electrophoretic techniques to achieve partial or complete purification (or purification to homogeneity). Analytical methods particularly suited to the preparation of a pure peptide are ion-exchange chromatography, exclusion chromatography; polyacrylamide gel electrophoresis; isoelectric focusing. Other methods for protein purification include, precipitation with ammonium sulfate, PEG, antibodies and the like or by heat denaturation, followed by centrifugation; gel filtration, reverse phase, hydroxylapatite and affinity chromatography; and combinations of such and other techniques.

In purifying an antibody of the present disclosure, it may be desirable to express the polypeptide in a prokaryotic or eukaryotic expression system and extract the protein using denaturing conditions. The polypeptide may be purified from other cellular components using an affinity column, which binds to a tagged portion of the polypeptide. As is generally known in the art, it is believed that the order of conducting the various purification steps may be changed, or that certain steps may be omitted, and still result in a suitable method for the preparation of a substantially purified protein or peptide.

Commonly, complete antibodies are fractionated utilizing agents (i.e., protein A) that bind the Fc portion of the antibody. Alternatively, antigens may be used to simultaneously purify and select appropriate antibodies. Such methods often utilize the selection agent bound to a support, such as a column, filter or bead. The antibodies are bound to a support, contaminants removed (e.g., washed away), and the antibodies released by applying conditions (salt, heat, etc.).

Various methods for quantifying the degree of purification of the protein or peptide will be known to those of skill in the art in light of the present disclosure. These include, for example, determining the specific activity of an active fraction, or assessing the amount of polypeptides within a fraction by SDS/PAGE analysis. Another method for assessing the purity of a fraction is to calculate the specific activity of the fraction, to compare it to the specific activity of the initial extract, and to thus calculate the degree of purity. The actual units used to represent the amount of activity will, of course, be dependent upon the particular assay technique chosen to follow the purification and whether or not the expressed protein or peptide exhibits a detectable activity.

It is known that the migration of a polypeptide can vary, sometimes significantly, with different conditions of SDS/PAGE (Capaldi et al., 1977). It will therefore be appreciated that under differing electrophoresis conditions, the apparent molecular weights of purified or partially purified expression products may vary.

III. ACTIVE/PASSIVE IMMUNIZATION AND TREATMENT/PREVENTION OF HANTAVIRUS INFECTION

A. Formulation and Administration

The present disclosure provides pharmaceutical compositions comprising anti-hantavirus antibodies and antigens for generating the same. Such compositions comprise a prophylactically or therapeutically effective amount of an antibody or a fragment thereof, or a peptide immunogen, and a pharmaceutically acceptable carrier. In a specific embodiment, the term "pharmaceutically acceptable" means approved by a regulatory agency of the Federal or a state government or listed in the U.S. Pharmacopeia or other generally recognized pharmacopeia for use in animals, and more particularly in humans. The term "carrier" refers to a diluent, excipient, or vehicle with which the therapeutic is administered. Such pharmaceutical carriers can be sterile liquids, such as water and oils, including those of petroleum, animal, vegetable or synthetic origin, such as peanut oil, soybean oil, mineral oil, sesame oil and the like. Water is a particular carrier when the pharmaceutical composition is administered intravenously. Saline solutions and aqueous dextrose and glycerol solutions can also be employed as liquid carriers, particularly for injectable solutions. Other suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like.

The composition, if desired, can also contain minor amounts of wetting or emulsifying agents, or pH buffering agents. These compositions can take the form of solutions, suspensions, emulsion, tablets, pills, capsules, powders, sustained-release formulations and the like. Oral formulations can include standard carriers such as pharmaceutical grades of mannitol, lactose, starch, magnesium stearate, sodium saccharine, cellulose, magnesium carbonate, etc. Examples of suitable pharmaceutical agents are described in "Remington's Pharmaceutical Sciences." Such compositions will contain a prophylactically or therapeutically effective amount of the antibody or fragment thereof, preferably in purified form, together with a suitable amount of carrier so as to provide the form for proper administration to the patient. The formulation should suit the mode of administration, which can be oral, intravenous, intraarterial, intrabuccal, intranasal, nebulized, bronchial inhalation, intrarectal, vaginal, topical or delivered by mechanical ventilation.

Active vaccines are also envisioned where antibodies like those disclosed are produced in vivo in a subject at risk of hantavirus infection. Such vaccines can be formulated for parenteral administration, e.g., formulated for injection via the intradermal, intravenous, intramuscular, subcutaneous, or even intraperitoneal routes. Administration by intradermal and intramuscular routes are contemplated. The vaccine could alternatively be administered by a topical route directly to the mucosa, for example, by nasal drops, inhalation, by nebulizer, or via intrarectal or vaginal delivery. Pharmaceutically acceptable salts include the acid salts and those which are formed with inorganic acids such as, for example, hydrochloric or phosphoric acids, or such organic acids as acetic, oxalic, tartaric, mandelic, and the like. Salts formed with the free carboxyl groups may also be derived from inorganic bases such as, for example, sodium, potassium, ammonium, calcium, or ferric hydroxides, and such organic bases as isopropylamine, trimethylamine, 2-ethylamino ethanol, histidine, procaine, and the like.

Passive transfer of antibodies, known as artificially acquired passive immunity, generally will involve the use of intravenous or intramuscular injections. The forms of antibody can be human or animal blood plasma or serum, as pooled human immunoglobulin for intravenous (IVIG) or intramuscular (IG) use, as high-titer human IVIG or IG from immunized or from donors recovering from disease, and as monoclonal antibodies (MAb). Such immunity generally lasts for only a short period of time, and there is also a potential risk for hypersensitivity reactions, and serum sickness, especially from gamma globulin of non-human origin. However, passive immunity provides immediate protection. The antibodies will be formulated in a carrier suitable for injection, i.e., sterile and syringeable.

Generally, the ingredients of compositions of the disclosure are supplied either separately or mixed together in unit dosage form, for example, as a dry lyophilized powder or water-free concentrate in a hermetically sealed container such as an ampoule or sachette indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration.

The compositions of the disclosure can be formulated as neutral or salt forms. Pharmaceutically acceptable salts include those formed with anions such as those derived from hydrochloric, phosphoric, acetic, oxalic, tartaric acids, etc., and those formed with cations such as those derived from sodium, potassium, ammonium, calcium, ferric hydroxides, isopropylamine, triethylamine, 2-ethylamino ethanol, histidine, procaine, etc.

2. ADCC

Antibody-dependent cell-mediated cytotoxicity (ADCC) is an immune mechanism leading to the lysis of antibody-coated target cells by immune effector cells. The target cells are cells to which antibodies or fragments thereof comprising an Fc region specifically bind, generally via the protein part that is N-terminal to the Fc region. By "antibody having increased/reduced antibody dependent cell-mediated cytotoxicity (ADCC)" is meant an antibody having increased/reduced ADCC as determined by any suitable method known to those of ordinary skill in the art.

As used herein, the term "increased/reduced ADCC" is defined as either an increase/reduction in the number of target cells that are lysed in a given time, at a given concentration of antibody in the medium surrounding the target cells, by the mechanism of ADCC defined above, and/or a reduction/increase in the concentration of antibody, in the medium surrounding the target cells, required to achieve the lysis of a given number of target cells in a given time, by the mechanism of ADCC. The increase/reduction in ADCC is relative to the ADCC mediated by the same antibody produced by the same type of host cells, using the same standard production, purification, formulation and storage methods (which are known to those skilled in the art), but that has not been engineered. For example, the increase in ADCC mediated by an antibody produced by host cells engineered to have an altered pattern of glycosylation (e.g., to express the glycosyltransferase, GnTIII, or other glycosyltransferases) by the methods described herein, is relative to the ADCC mediated by the same antibody produced by the same type of non-engineered host cells.

3. CDC

Complement-dependent cytotoxicity (CDC) is a function of the complement system. It is the processes in the immune system that kill pathogens by damaging their membranes without the involvement of antibodies or cells of the immune system. There are three main processes. All three insert one or more membrane attack complexes (MAC) into the pathogen which cause lethal colloid-osmotic swelling, i.e., CDC. It is one of the mechanisms by which antibodies or antibody fragments have an anti-viral effect.

IV. ANTIBODY CONJUGATES

Antibodies of the present disclosure may be linked to at least one agent to form an antibody conjugate. In order to increase the efficacy of antibody molecules as diagnostic or therapeutic agents, it is conventional to link or covalently bind or complex at least one desired molecule or moiety. Such a molecule or moiety may be, but is not limited to, at least one effector or reporter molecule. Effector molecules comprise molecules having a desired activity, e.g., cytotoxic activity. Non-limiting examples of effector molecules which have been attached to antibodies include toxins, anti-tumor agents, therapeutic enzymes, radionuclides, antiviral agents, chelating agents, cytokines, growth factors, and oligo- or polynucleotides. By contrast, a reporter molecule is defined as any moiety which may be detected using an assay. Non-limiting examples of reporter molecules which have been conjugated to antibodies include enzymes, radiolabels, haptens, fluorescent labels, phosphorescent molecules, chemiluminescent molecules, chromophores, photoaffinity molecules, colored particles or ligands, such as biotin.

Antibody conjugates are generally preferred for use as diagnostic agents. Antibody diagnostics generally fall within two classes, those for use in in vitro diagnostics, such as in a variety of immunoassays, and those for use in vivo diagnostic protocols, generally known as "antibody-directed imaging." Many appropriate imaging agents are known in the art, as are methods for their attachment to antibodies (see, for e.g., U.S. Pat. Nos. 5,021,236, 4,938,948, and 4,472,509). The imaging moieties used can be paramagnetic ions, radioactive isotopes, fluorochromes, NMR-detectable substances, and X-ray imaging agents.

In the case of paramagnetic ions, one might mention by way of example ions such as chromium (III), manganese (II), iron (II), iron (II), cobalt (II), nickel (II), copper (I), neodymium (III), samarium (II), ytterbium (III), gadolinium (III), vanadium (II), terbium (III), dysprosium (III) holmium (II) and/or erbium (III), with gadolinium being particularly preferred. Ions useful in other contexts, such as X-ray imaging, include but are not limited to lanthanum (III), gold (III), lead (II), and especially bismuth (II).

In the case of radioactive isotopes for therapeutic and/or diagnostic application, one might mention astatine$^{211}$, $^{14}$carbon, $^{51}$chromium, $^{36}$chlorine, $^{57}$cobalt, $^{58}$cobalt, copper$^{67}$, $^{152}$Eu, gallium$^{67}$, $^{3}$hydrogen, iodine$^{123}$, iodine$^{125}$, iodine$^{131}$, indium$^{111}$, $^{59}$iron, $^{32}$phosphorus, rhenium$^{186}$, rhenium$^{188}$, $^{75}$selenium, $^{35}$sulphur, technicium$^{99m}$ and/or yttrium$^{90}$. $^{125}$I is often being preferred for use in certain embodiments, and technicium$^{99m}$ and/or indium$^{111}$ are also often preferred due to their low energy and suitability for long range detection. Radioactively labeled monoclonal antibodies of the present disclosure may be produced according to well-known methods in the art. For instance, monoclonal antibodies can be iodinated by contact with sodium and/or potassium iodide and a chemical oxidizing agent such as sodium hypochlorite, or an enzymatic oxidizing agent, such as lactoperoxidase. Monoclonal antibodies according to the disclosure may be labeled with technetium$^{99m}$ by ligand exchange process, for example, by reducing pertechnetate with stannous solution, chelating the reduced technetium onto a Sephadex column and applying the antibody to this column. Alternatively, direct labeling techniques may be used, e.g., by incubating pertechnetate, a reducing agent such as SNCl$_2$, a buffer solution such as sodium-potassium phthalate solution, and the antibody. Intermediary functional groups which are often used to bind radioisotopes which exist as metallic ions to antibody are diethylenetriaminepentaacetic acid (DTPA) or ethylene diaminetetraacetic acid (EDTA).

Among the fluorescent labels contemplated for use as conjugates include Alexa 350, Alexa 430, AMCA, BODIPY 630/650, BODIPY 650/665, BODIPY-FL, BODIPY-R6G, BODIPY-TMR, BODIPY-TRX, Cascade Blue, Cy3, Cy5,6-FAM, Fluorescein Isothiocyanate, HEX, 6-JOE, Oregon Green 488, Oregon Green 500, Oregon Green 514, Pacific Blue, REG, Rhodamine Green, Rhodamine Red, Renographin, ROX, TAMRA, TET, Tetramethylrhodamine, and/or Texas Red.

Additional types of antibodies contemplated in the present disclosure are those intended primarily for use in vitro, where the antibody is linked to a secondary binding ligand and/or to an enzyme (an enzyme tag) that will generate a colored product upon contact with a chromogenic substrate. Examples of suitable enzymes include urease, alkaline phosphatase, (horseradish) hydrogen peroxidase or glucose oxidase. Preferred secondary binding ligands are biotin and avidin and streptavidin compounds. The use of such labels is well known to those of skill in the art and are described, for example, in U.S. Pat. Nos. 3,817,837, 3,850,752, 3,939, 350, 3,996,345, 4,277,437, 4,275,149 and 4,366,241.

Yet another known method of site-specific attachment of molecules to antibodies comprises the reaction of antibodies with hapten-based affinity labels. Essentially, hapten-based affinity labels react with amino acids in the antigen binding site, thereby destroying this site and blocking specific antigen reaction. However, this may not be advantageous since it results in loss of antigen binding by the antibody conjugate.

Molecules containing azido groups may also be used to form covalent bonds to proteins through reactive nitrene intermediates that are generated by low intensity ultraviolet light (Potter and Haley, 1983). In particular, 2- and 8-azido analogues of purine nucleotides have been used as site-directed photoprobes to identify nucleotide binding proteins in crude cell extracts (Owens & Haley, 1987; Atherton et al., 1985). The 2- and 8-azido nucleotides have also been used to map nucleotide binding domains of purified proteins (Khatoon et al., 1989; King et al., 1989; Dholakia et al., 1989) and may be used as antibody binding agents.

Several methods are known in the art for the attachment or conjugation of an antibody to its conjugate moiety. Some attachment methods involve the use of a metal chelate complex employing, for example, an organic chelating agent such a diethylenetriaminepentaacetic acid anhydride (DTPA); ethylenetriaminetetraacetic acid; N-chloro-p-toluenesulfonamide; and/or tetrachloro-3α-6α-diphenylglycouril-3 attached to the antibody (U.S. Pat. Nos. 4,472,509 and 4,938,948). Monoclonal antibodies may also be reacted with an enzyme in the presence of a coupling agent such as glutaraldehyde or periodate. Conjugates with fluorescein markers are prepared in the presence of these coupling agents or by reaction with an isothiocyanate. In U.S. Pat. No.

4,938,948, imaging of breast tumors is achieved using monoclonal antibodies and the detectable imaging moieties are bound to the antibody using linkers such as methyl-p-hydroxybenzimidate or N-succinimidyl-3-(4-hydroxyphenyl)propionate.

In other embodiments, derivatization of immunoglobulins by selectively introducing sulfhydryl groups in the Fc region of an immunoglobulin, using reaction conditions that do not alter the antibody combining site are contemplated. Antibody conjugates produced according to this methodology are disclosed to exhibit improved longevity, specificity and sensitivity (U.S. Pat. No. 5,196,066, incorporated herein by reference). Site-specific attachment of effector or reporter molecules, wherein the reporter or effector molecule is conjugated to a carbohydrate residue in the Fc region have also been disclosed in the literature (O'Shannessy et al., 1987). This approach has been reported to produce diagnostically and therapeutically promising antibodies which are currently in clinical evaluation.

V. IMMUNODETECTION METHODS

In still further embodiments, the present disclosure concerns immunodetection methods for binding, purifying, removing, quantifying and otherwise generally detecting hantavirus and its associated antigens. While such methods can be applied in a traditional sense, another use will be in quality control and monitoring of vaccine and other virus stocks, where antibodies according to the present disclosure can be used to assess the amount or integrity (i.e., long term stability) of antigens in viruses. Alternatively, the methods may be used to screen various antibodies for appropriate/desired reactivity profiles.

Other immunodetection methods include specific assays for determining the presence of hantavirus in a subject. A wide variety of assay formats are contemplated, but specifically those that would be used to detect hantavirus in a fluid obtained from a subject, such as saliva, blood, plasma, sputum, semen or urine. In particular, semen has been demonstrated as a viable sample for detecting hantavirus (Purpura et al., 2016; Mansuy et al., 2016; Barzon et al., 2016; Gornet et al., 2016; Duffy et al., 2009; CDC, 2016; Halfon et al., 2010; Elder et al. 2005). The assays may be advantageously formatted for non-healthcare (home) use, including lateral flow assays (see below) analogous to home pregnancy tests. These assays may be packaged in the form of a kit with appropriate reagents and instructions to permit use by the subject of a family member.

Some immunodetection methods include enzyme linked immunosorbent assay (ELISA), radioimmunoassay (RIA), immunoradiometric assay, fluoroimmunoassay, chemiluminescent assay, bioluminescent assay, and Western blot to mention a few. In particular, a competitive assay for the detection and quantitation of hantavirus antibodies directed to specific parasite epitopes in samples also is provided. The steps of various useful immunodetection methods have been described in the scientific literature, such as, e.g., Doolittle and Ben-Zeev (1999), Gulbis and Galand (1993), De Jager et al. (1993), and Nakamura et al. (1987). In general, the immunobinding methods include obtaining a sample suspected of containing hantavirus and contacting the sample with a first antibody in accordance with the present disclosure, as the case may be, under conditions effective to allow the formation of immunocomplexes.

These methods include methods for purifying hantavirus or related antigens from a sample. The antibody will preferably be linked to a solid support, such as in the form of a column matrix, and the sample suspected of containing the hantavirus or antigenic component will be applied to the immobilized antibody. The unwanted components will be washed from the column, leaving the hantavirus antigen immunocomplexed to the immobilized antibody, which is then collected by removing the organism or antigen from the column.

The immunobinding methods also include methods for detecting and quantifying the amount of hantavirus or related components in a sample and the detection and quantification of any immune complexes formed during the binding process. Here, one would obtain a sample suspected of containing hantavirus or its antigens and contact the sample with an antibody that binds hantavirus or components thereof, followed by detecting and quantifying the amount of immune complexes formed under the specific conditions. In terms of antigen detection, the biological sample analyzed may be any sample that is suspected of containing hantavirus or hantavirus antigen, such as a tissue section or specimen, a homogenized tissue extract, a biological fluid, including blood and serum, or a secretion, such as feces or urine.

Contacting the chosen biological sample with the antibody under effective conditions and for a period of time sufficient to allow the formation of immune complexes (primary immune complexes) is generally a matter of simply adding the antibody composition to the sample and incubating the mixture for a period of time long enough for the antibodies to form immune complexes with, i.e., to bind to hantavirus or antigens present. After this time, the sample-antibody composition, such as a tissue section, ELISA plate, dot blot or Western blot, will generally be washed to remove any non-specifically bound antibody species, allowing only those antibodies specifically bound within the primary immune complexes to be detected.

In general, the detection of immunocomplex formation is well known in the art and may be achieved through the application of numerous approaches. These methods are generally based upon the detection of a label or marker, such as any of those radioactive, fluorescent, biological and enzymatic tags. Patents concerning the use of such labels include U.S. Pat. Nos. 3,817,837, 3,850,752, 3,939,350, 3,996,345, 4,277,437, 4,275,149 and 4,366,241. Of course, one may find additional advantages through the use of a secondary binding ligand such as a second antibody and/or a biotin/avidin ligand binding arrangement, as is known in the art.

The antibody employed in the detection may itself be linked to a detectable label, wherein one would then simply detect this label, thereby allowing the amount of the primary immune complexes in the composition to be determined. Alternatively, the first antibody that becomes bound within the primary immune complexes may be detected by means of a second binding ligand that has binding affinity for the antibody. In these cases, the second binding ligand may be linked to a detectable label. The second binding ligand is itself often an antibody, which may thus be termed a "secondary" antibody. The primary immune complexes are contacted with the labeled, secondary binding ligand, or antibody, under effective conditions and for a period of time sufficient to allow the formation of secondary immune complexes. The secondary immune complexes are then generally washed to remove any non-specifically bound labeled secondary antibodies or ligands, and the remaining label in the secondary immune complexes is then detected.

Further methods include the detection of primary immune complexes by a two-step approach. A second binding ligand, such as an antibody that has binding affinity for the antibody, is used to form secondary immune complexes, as described above. After washing, the secondary immune complexes are contacted with a third binding ligand or antibody that has binding affinity for the second antibody, again under effective conditions and for a period of time sufficient to allow the formation of immune complexes (tertiary immune complexes). The third ligand or antibody is linked to a detectable label, allowing detection of the tertiary immune complexes thus formed. This system may provide for signal amplification if this is desired.

One method of immunodetection uses two different antibodies. A first biotinylated antibody is used to detect the target antigen, and a second antibody is then used to detect the biotin attached to the complexed biotin. In that method, the sample to be tested is first incubated in a solution containing the first step antibody. If the target antigen is present, some of the antibody binds to the antigen to form a biotinylated antibody/antigen complex. The antibody/antigen complex is then amplified by incubation in successive solutions of streptavidin (or avidin), biotinylated DNA, and/or complementary biotinylated DNA, with each step adding additional biotin sites to the antibody/antigen complex. The amplification steps are repeated until a suitable level of amplification is achieved, at which point the sample is incubated in a solution containing the second step antibody against biotin. This second step antibody is labeled, for example, with an enzyme that can be used to detect the presence of the antibody/antigen complex by histoenzymology using a chromogen substrate. With suitable amplification, a conjugate can be produced which is macroscopically visible.

Another known method of immunodetection takes advantage of the immuno-PCR (Polymerase Chain Reaction) methodology. The PCR method is similar to the Cantor method up to the incubation with biotinylated DNA, however, instead of using multiple rounds of streptavidin and biotinylated DNA incubation, the DNA/biotin/streptavidin/antibody complex is washed out with a low pH or high salt buffer that releases the antibody. The resulting wash solution is then used to carry out a PCR reaction with suitable primers with appropriate controls. At least in theory, the enormous amplification capability and specificity of PCR can be utilized to detect a single antigen molecule.

A. ELISAs

Immunoassays, in their most simple and direct sense, are binding assays. Certain preferred immunoassays are the various types of enzyme linked immunosorbent assays (ELISAs) and radioimmunoassays (RIA) known in the art. Immunohistochemical detection using tissue sections is also particularly useful. However, it will be readily appreciated that detection is not limited to such techniques, and western blotting, dot blotting, FACS analyses, and the like may also be used.

In one exemplary ELISA, the antibodies of the disclosure are immobilized onto a selected surface exhibiting protein affinity, such as a well in a polystyrene microtiter plate. Then, a test composition suspected of containing the hantavirus or hantavirus antigen is added to the wells. After binding and washing to remove non-specifically bound immune complexes, the bound antigen may be detected. Detection may be achieved by the addition of another anti-hantavirus antibody that is linked to a detectable label. This type of ELISA is a simple "sandwich ELISA." Detection may also be achieved by the addition of a second anti-hantavirus antibody, followed by the addition of a third antibody that has binding affinity for the second antibody, with the third antibody being linked to a detectable label.

In another exemplary ELISA, the samples suspected of containing the hantavirus or hantavirus antigen are immobilized onto the well surface and then contacted with the anti-hantavirus antibodies of the disclosure. After binding and washing to remove non-specifically bound immune complexes, the bound anti-hantavirus antibodies are detected. Where the initial anti-hantavirus antibodies are linked to a detectable label, the immune complexes may be detected directly. Again, the immune complexes may be detected using a second antibody that has binding affinity for the first anti-hantavirus antibody, with the second antibody being linked to a detectable label.

Irrespective of the format employed, ELISAs have certain features in common, such as coating, incubating and binding, washing to remove non-specifically bound species, and detecting the bound immune complexes. These are described below.

In coating a plate with either antigen or antibody, one will generally incubate the wells of the plate with a solution of the antigen or antibody, either overnight or for a specified period of hours. The wells of the plate will then be washed to remove incompletely adsorbed material. Any remaining available surfaces of the wells are then "coated" with a nonspecific protein that is antigenically neutral with regard to the test antisera. These include bovine serum albumin (BSA), casein or solutions of milk powder. The coating allows for blocking of nonspecific adsorption sites on the immobilizing surface and thus reduces the background caused by nonspecific binding of antisera onto the surface.

In ELISAs, it is probably more customary to use a secondary or tertiary detection means rather than a direct procedure. Thus, after binding of a protein or antibody to the well, coating with a non-reactive material to reduce background, and washing to remove unbound material, the immobilizing surface is contacted with the biological sample to be tested under conditions effective to allow immune complex (antigen/antibody) formation. Detection of the immune complex then requires a labeled secondary binding ligand or antibody, and a secondary binding ligand or antibody in conjunction with a labeled tertiary antibody or a third binding ligand.

"Under conditions effective to allow immune complex (antigen/antibody) formation" means that the conditions preferably include diluting the antigens and/or antibodies with solutions such as BSA, bovine gamma globulin (BGG) or phosphate buffered saline (PBS)/Tween. These added agents also tend to assist in the reduction of nonspecific background.

The "suitable" conditions also mean that the incubation is at a temperature or for a period of time sufficient to allow effective binding. Incubation steps are typically from about 1 to 2 to 4 hours or so, at temperatures preferably on the order of 25° C. to 27° C., or may be overnight at about 4° C. or so.

Following all incubation steps in an ELISA, the contacted surface is washed so as to remove non-complexed material. A preferred washing procedure includes washing with a solution such as PBS/Tween, or borate buffer. Following the formation of specific immune complexes between the test sample and the originally bound material, and subsequent washing, the occurrence of even minute amounts of immune complexes may be determined.

To provide a detecting means, the second or third antibody will have an associated label to allow detection. Preferably, this will be an enzyme that will generate color development upon incubating with an appropriate chromogenic substrate. Thus, for example, one will desire to contact or incubate the first and second immune complex with a urease, glucose oxidase, alkaline phosphatase or hydrogen peroxidase-conjugated antibody for a period of time and under conditions that favor the development of further immune complex formation (e.g., incubation for 2 hours at room temperature in a PBS-containing solution such as PBS-Tween).

After incubation with the labeled antibody, and subsequent to washing to remove unbound material, the amount of label is quantified, e.g., by incubation with a chromogenic substrate such as urea, or bromocresol purple, or 2,2'-azino-di-(3-ethyl-benzthiazoline-6-sulfonic acid (ABTS), or $H_2O_2$, in the case of peroxidase as the enzyme label. Quantification is then achieved by measuring the degree of color generated, e.g., using a visible spectra spectrophotometer.

In another embodiment, the present disclosure contemplates the use of competitive formats. This is particularly useful in the detection of hantavirus antibodies in sample. In competition-based assays, an unknown amount of analyte or antibody is determined by its ability to displace a known amount of labeled antibody or analyte. Thus, the quantifiable loss of a signal is an indication of the amount of unknown antibody or analyte in a sample.

Here, the inventor proposes the use of labeled hantavirus monoclonal antibodies to determine the amount of hantavirus antibodies in a sample. The basic format would include contacting a known amount of hantavirus monoclonal antibody (linked to a detectable label) with hantavirus antigen or particle. The hantavirus antigen or organism is preferably attached to a support. After binding of the labeled monoclonal antibody to the support, the sample is added and incubated under conditions permitting any unlabeled antibody in the sample to compete with, and hence displace, the labeled monoclonal antibody. By measuring either the lost label or the label remaining (and subtracting that from the original amount of bound label), one can determine how much non-labeled antibody is bound to the support, and thus how much antibody was present in the sample.

B. Western Blot

The Western blot (alternatively, protein immunoblot) is an analytical technique used to detect specific proteins in a given sample of tissue homogenate or extract. It uses gel electrophoresis to separate native or denatured proteins by the length of the polypeptide (denaturing conditions) or by the 3-D structure of the protein (native/non-denaturing conditions). The proteins are then transferred to a membrane (typically nitrocellulose or PVDF), where they are probed (detected) using antibodies specific to the target protein.

Samples may be taken from whole tissue or from cell culture. In most cases, solid tissues are first broken down mechanically using a blender (for larger sample volumes), using a homogenizer (smaller volumes), or by sonication. Cells may also be broken open by one of the above mechanical methods. However, it should be noted that bacteria, virus or environmental samples can be the source of protein and thus Western blotting is not restricted to cellular studies only. Assorted detergents, salts, and buffers may be employed to encourage lysis of cells and to solubilize proteins. Protease and phosphatase inhibitors are often added to prevent the digestion of the sample by its own enzymes. Tissue preparation is often done at cold temperatures to avoid protein denaturing.

The proteins of the sample are separated using gel electrophoresis. Separation of proteins may be by isoelectric point (pI), molecular weight, electric charge, or a combination of these factors. The nature of the separation depends on the treatment of the sample and the nature of the gel. This is a very useful way to determine a protein. It is also possible to use a two-dimensional (2-D) gel which spreads the proteins from a single sample out in two dimensions. Proteins are separated according to isoelectric point (pH at which they have neutral net charge) in the first dimension, and according to their molecular weight in the second dimension.

In order to make the proteins accessible to antibody detection, they are moved from within the gel onto a membrane made of nitrocellulose or polyvinylidene difluoride (PVDF). The membrane is placed on top of the gel, and a stack of filter papers placed on top of that. The entire stack is placed in a buffer solution which moves up the paper by capillary action, bringing the proteins with it. Another method for transferring the proteins is called electroblotting and uses an electric current to pull proteins from the gel into the PVDF or nitrocellulose membrane. The proteins move from within the gel onto the membrane while maintaining the organization they had within the gel. As a result of this blotting process, the proteins are exposed on a thin surface layer for detection (see below). Both varieties of membrane are chosen for their non-specific protein binding properties (i.e., binds all proteins equally well). Protein binding is based upon hydrophobic interactions, as well as charged interactions between the membrane and protein. Nitrocellulose membranes are cheaper than PVDF but are far more fragile and do not stand up well to repeated probings. The uniformity and overall effectiveness of transfer of protein from the gel to the membrane can be checked by staining the membrane with Coomassie Brilliant Blue or Ponceau S dyes. Once transferred, proteins are detected using labeled primary antibodies, or unlabeled primary antibodies followed by indirect detection using labeled protein A or secondary labeled antibodies binding to the Fc region of the primary antibodies.

C. Lateral Flow Assays

Lateral flow assays, also known as lateral flow immunochromatographic assays, are simple devices intended to detect the presence (or absence) of a target analyte in sample (matrix) without the need for specialized and costly equipment, though many laboratory-based applications exist that are supported by reading equipment. Typically, these tests are used as low resources medical diagnostics, either for home testing, point of care testing, or laboratory use. A widely spread and well-known application is the home pregnancy test.

The technology is based on a series of capillary beds, such as pieces of porous paper or sintered polymer. Each of these elements has the capacity to transport fluid (e.g., urine) spontaneously. The first element (the sample pad) acts as a sponge and holds an excess of sample fluid. Once soaked, the fluid migrates to the second element (conjugate pad) in which the manufacturer has stored the so-called conjugate, a dried format of bio-active particles (see below) in a salt-sugar matrix that contains everything to guarantee an optimized chemical reaction between the target molecule (e.g., an antigen) and its chemical partner (e.g., antibody) that has been immobilized on the particle's surface. While the sample fluid dissolves the salt-sugar matrix, it also dissolves the particles and in one combined transport action the sample and conjugate mix while flowing through the porous structure. In this way, the analyte binds to the particles while migrating further through the third capillary bed. This material has one or more areas (often called stripes) where a third molecule has been immobilized by the manufacturer. By the time the sample-conjugate mix reaches these strips, analyte has been bound on the particle and the third 'capture' molecule binds the complex. After a while, when more and more fluid has passed the stripes, particles accumulate and the stripe-area changes color. Typically there are at least two stripes: one (the control) that captures any particle and thereby shows that reaction conditions and technology worked fine, the second contains a specific capture molecule and only captures those particles onto which an analyte molecule has been immobilized. After passing these reaction zones, the fluid enters the final porous material—the wick—that simply acts as a waste container. Lateral Flow Tests can operate as either competitive or sandwich assays. Lateral flow assays are disclosed in U.S. Pat. No. 6,485,982.

D. Immunohistochemistry

The antibodies of the present disclosure may also be used in conjunction with both fresh-frozen and/or formalin-fixed, paraffin-embedded tissue blocks prepared for study by immunohistochemistry (IHC). The method of preparing tissue blocks from these particulate specimens has been successfully used in previous IHC studies of various prognostic factors and is well known to those of skill in the art (Brown et al., 1990; Abbondanzo et al., 1990; Allred et al., 1990).

Briefly, frozen-sections may be prepared by rehydrating 50 ng of frozen "pulverized" tissue at room temperature in phosphate buffered saline (PBS) in small plastic capsules; pelleting the particles by centrifugation; resuspending them in a viscous embedding medium (OCT); inverting the capsule and/or pelleting again by centrifugation; snap-freezing in −70° C. isopentane; cutting the plastic capsule and/or removing the frozen cylinder of tissue; securing the tissue cylinder on a cryostat microtome chuck; and/or cutting 25-50 serial sections from the capsule. Alternatively, whole frozen tissue samples may be used for serial section cuttings.

Permanent-sections may be prepared by a similar method involving rehydration of the 50 mg sample in a plastic microfuge tube; pelleting; resuspending in 10% formalin for 4 hours fixation; washing/pelleting; resuspending in warm 2.5% agar, pelleting; cooling in ice water to harden the agar; removing the tissue/agar block from the tube; infiltrating and/or embedding the block in paraffin; and/or cutting up to 50 serial permanent sections. Again, whole tissue samples may be substituted.

E. Immunodetection Kits

In still further embodiments, the present disclosure concerns immunodetection kits for use with the immunodetection methods described above. As the antibodies may be used to detect hantavirus or hantavirus antigens, the antibodies may be included in the kit. The immunodetection kits will thus comprise, in suitable container means, a first antibody that binds to hantavirus or hantavirus antigen, and optionally an immunodetection reagent.

In certain embodiments, the hantavirus antibody may be pre-bound to a solid support, such as a column matrix and/or well of a microtiter plate. The immunodetection reagents of the kit may take any one of a variety of forms, including those detectable labels that are associated with or linked to the given antibody. Detectable labels that are associated with or attached to a secondary binding ligand are also contemplated. Exemplary secondary ligands are those secondary antibodies that have binding affinity for the first antibody.

Further suitable immunodetection reagents for use in the present kits include the two-component reagent that comprises a secondary antibody that has binding affinity for the first antibody, along with a third antibody that has binding affinity for the second antibody, the third antibody being linked to a detectable label. As noted above, a number of exemplary labels are known in the art and all such labels may be employed in connection with the present disclosure.

The kits may further comprise a suitably aliquoted composition of the hantavirus or hantavirus antigens, whether labeled or unlabeled, as may be used to prepare a standard curve for a detection assay. The kits may contain antibody-label conjugates either in fully conjugated form, in the form of intermediates, or as separate moieties to be conjugated by the user of the kit. The components of the kits may be packaged either in aqueous media or in lyophilized form.

The container means of the kits will generally include at least one vial, test tube, flask, bottle, syringe or other container means, into which the antibody may be placed, or preferably, suitably aliquoted. The kits of the present disclosure will also typically include a means for containing the antibody, antigen, and any other reagent containers in close confinement for commercial sale. Such containers may include injection or blow-molded plastic containers into which the desired vials are retained.

F. Vaccine and Antigen Quality Control Assays

The present disclosure also contemplates the use of antibodies and antibody fragments as described herein for use in assessing the antigenic integrity of a viral antigen in a sample. Biological medicinal products like vaccines differ from chemical drugs in that they cannot normally be characterized molecularly; antibodies are large molecules of significant complexity and have the capacity to vary widely from preparation to preparation. They are also administered to healthy individuals, including children at the start of their lives, and thus a strong emphasis must be placed on their quality to ensure, to the greatest extent possible, that they are efficacious in preventing or treating life-threatening disease, without themselves causing harm.

The increasing globalization in the production and distribution of vaccines has opened new possibilities to better manage public health concerns but has also raised questions about the equivalence and interchangeability of vaccines procured across a variety of sources. International standardization of starting materials, of production and quality control testing, and the setting of high expectations for regulatory oversight on the way these products are manufactured and used, have thus been the cornerstone for continued success. But it remains a field in constant change, and continuous technical advances in the field offer a promise of developing potent new weapons against the oldest public health threats, as well as new ones—malaria, pandemic influenza, and HIV, to name a few—but also put a great pressure on manufacturers, regulatory authorities, and the wider medical community to ensure that products continue to meet the highest standards of quality attainable.

Thus, one may obtain an antigen or vaccine from any source or at any point during a manufacturing process. The quality control processes may therefore begin with preparing a sample for an immunoassay that identifies binding of an antibody or fragment disclosed herein to a viral antigen. Such immunoassays are disclosed elsewhere in this document, and any of these may be used to assess the structural/antigenic integrity of the antigen. Standards for finding the sample to contain acceptable amounts of antigenically correct and intact antigen may be established by regulatory agencies.

Another important embodiment where antigen integrity is assessed is in determining shelf-life and storage stability. Most medicines, including vaccines, can deteriorate over time. Therefore, it is critical to determine whether, over time, the degree to which an antigen, such as in a vaccine, degrades or destabilizes such that is it no longer antigenic and/or capable of generating an immune response when administered to a subject. Again, standards for finding the sample to contain acceptable amounts of antigenically intact antigen may be established by regulatory agencies.

In certain embodiments, viral antigens may contain more than one protective epitope. In these cases, it may prove useful to employ assays that look at the binding of more than one antibody, such as 2, 3, 4, 5 or even more antibodies. These antibodies bind to closely related epitopes, such that they are adjacent or even overlap each other. On the other hand, they may represent distinct epitopes from disparate parts of the antigen. By examining the integrity of multiple epitopes, a more complete picture of the antigen's overall integrity, and hence ability to generate a protective immune response, may be determined.

Antibodies and fragments thereof as described in the present disclosure may also be used in a kit for monitoring the efficacy of vaccination procedures by detecting the presence of protective hantavirus antibodies. Antibodies, antibody fragment, or variants and derivatives thereof, as described in the present disclosure may also be used in a kit for monitoring vaccine manufacture with the desired immunogenicity.

VI. EXAMPLES

The following examples are included to demonstrate preferred embodiments. It should be appreciated by those of skill in the art that the techniques disclosed in the examples that follow represent techniques discovered by the inventor to function well in the practice of embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1—Materials and Methods

Cell lines. All cell lines were tested for mycoplasma monthly, and all samples were negative. Expi293F cells (ATCC, female) were cultured in suspension at 37° C. in 8.0% $CO_2$ at 125 RPM in Freestyle F17 Expression Medium (Gibco) supplemented with 10% Pluronic F-68 and 200 mM of L-glutamine. ExpiCHO cells (ATCC, female) were cultured in suspension at 37° C. in 8.0% $CO_2$ at 125 RPM in ExpiCHO Expression Medium (Thermo Fisher). B95.8 cells (ATCC® CRL-1612, female) producing Epstein-Barr virus and the non-secreting myeloma HMMA2.5 heteromyeloma cell line (kindly provided by Lisa Cavacini, female human and female mice elements) used as the fusion partner for human B cell hybridoma formation each were cultured at 37° C. in 8% $CO_2$ in ClonaCell-HY medium A. BHK-21 (WI-2) cell lines (Kerafast, Syrian golden hamster, sex unspecified) and Vero E6 cell lines (ATCC, CCL-81, African green monkey, sex unspecified) were cultured at 37° C. in 8% $CO_2$ in DMEM supplemented with 10% fetal bovine serum. Human primary umbilical vein endothelial cells (HUVEC, ATCC, pooled, sex batch-specific) were cultured at 37° C. in 5% $CO_2$ in Vascular Basal Medium supplemented with the Endothelial Cell Growth Kit-VEGF (ATCC). PBMCs (obtained from leukofiltration filters, Nashville Red Cross, male) were irradiated and cryopreserved in Medium A containing 10% DMSO.

Human subjects. SNV-immune subject (Donor ID #1486) was a 57-year old male from Utah diagnosed with hantavirus infection on Jun. 6, 2017. Peripheral blood was obtained from this subject in the U.S. on Jun. 20, 2018 (1 year after infection). SNV-immune subject (Donor ID #1487) was a 36-year old female from Kansas diagnosed with hantavirus infection in December 2010. Peripheral blood was obtained from this subject in the U.S. on Jul. 20, 2018 (8 years after infection). SNV-immune subject (Donor ID #1513) was a 41-year old male from Texas diagnosed with hantavirus infection on an unknown date. Peripheral blood was obtained from this subject in the U.S. on Apr. 3, 2018. Written informed consent with approval from the Vanderbilt University Medical Center Institutional Review Board was given by all human subjects. Peripheral blood mononuclear cells (PBMCs) were isolated using density gradient centrifugation on Ficoll and were cryopreserved in liquid nitrogen until used in the experiments. PBMCs from a ANDV-immune individuals (donor ID #1685) were collected in 2015 at the Universidad Del Desarrollo, Chile. The studies were approved by the Institutional Review Boards of the Universidad Del Desarrollo and Vanderbilt University Medical Center. PBMCs were transferred to Vanderbilt using a liquid nitrogen dry shipper in 2015.

Viruses. Andes virus strain Chile-9717869 (Chile R123) and Sin Nombre virus strain SN77734 were obtained from the World Reference Center for Emerging Viruses and Arboviruses at UTMB.

Animal model. Eight-week-old female Golden Syrian hamsters, strain HsdHan®:AURA, were used for survival studies. All animal experiments and procedures were carried out in accordance with the recommendations in the Guide for the Care and Use of Laboratory Animals of the National Institutes of Health. The protocols were approved by the Institutional Animal Care and Use Committee at the University of Texas Medical Branch (IACUC 2004049). Injections were performed under anesthesia that was induced and maintained with ketamine hydrochloride and xylazine, and all efforts were made to minimize animal suffering.

Generation of cell-surface expressed antigens. Plasmids containing a cDNA encoding the full-length M segment from various hantavirus species (pWRG/SN-M(opt)(Hooper et al., 2013), pWRG/AND-M(opt2)(Hooper et al., 2014a), pWRG/PUU-M(s2)(Brocato et al., 2013), pWRG/DOB-M (opt), pWRG/HTN-M(co)(Hooper et al., 2001a), and pWRG/SEO-M(opt2)(Hooper et al., 2001a)) (kindly provided by Dr. Jay Hooper, United States Army Medical Research Institute of Infectious Diseases (USAMRIID) were used to produce cell-surface displayed hantavirus antigens. Expi293F cells were cultured in Freestyle F17 expression medium (Gibco) containing 10% Pluronic F-68 and 200 mM L-glutamine, and transiently transfected with plasmid DNA using the Expifectamine 293 transfection kit (Thermo Fisher). Expi293F cells were harvested 48 hours after transfection and cryopreserved for use in flow cytometry assays.

Screening and binding of NWH-reactive antibodies. A flow cytometric assay was used to screen for, and quantify binding of, NWH-reactive antibodies. Expi293F cells transfected with the full-length M segment as described above were thawed, strained through a 40 µm cell strainer, and plated into 96-well V-bottom plates at 50,000 cells/well in FACS buffer (2% ultra-low IgG FBS, 1 mM EDTA, D-PBS). Cells were incubated with purified mAb or cell supernatant for 1 hour at 4° C., washed twice with FACS buffer, and stained with a 1:1,000 solution of goat anti-human IgG antibodies conjugated to phycoerythrin (PE) (Southern Biotech,) at 4° C. for 30 minutes. Cells then were washed twice with FACS buffer and stained for 5 minutes at 4° C. with 5 μg/mL of 4',6-diamidino-2-phenylindole (DAPI) (Thermo Fisher). PE and DAPI staining were measured with an iQue Screener Plus flow cytometer (Intellicyt) and quantified using the manufacturer's ForeCyt software. A value for percent PE-positive cells was determined by gating based on the relative fluorescence intensity of Expi293F cells stained only with secondary antibody.

Isolation of human hybridomas and purification of monoclonal antibodies. Peripheral blood mononuclear cells (PBMCs) were isolated from immune subject blood samples using Ficoll-Histopaque (Sigma-Aldrich) density gradient centrifugation and cryopreserved in the vapor phase of liquid nitrogen until use. PBMCs were thawed and 6 million cells were transformed with 4.5 mL of filtered supernatant containing Epstein-Barr virus (in the collected supernatant from cultured B95.8 cells) and plated in medium containing 2.5 μg/mL CpG (phosphorothioate-modified oligodeoxynucleotide ZOEZOEZZZZZOEEZOEZZZT (SEQ ID NO: 453), Invitrogen), 10 μM Chk2 inhibitor (Sigma-Aldrich, Cat. No. C3742), and 10 μg/mL cyclosporine A (Sigma-Aldrich, Cat. No. C1832) and plated in a 384-well plate. After 7 days, lymphoblastoid cell lines (LCLs) were expanded on feeder layers containing irradiated PBMCs (obtained from leukofiltration filters, Nashville Red Cross) in 96-well plates. LCL supernatant was collected and screened in a flow cytometric assay using Expi293F-SNV-M cells, Expi293F-ANDV-M cells, or mock-transfected Expi293F cells. An anti-human IgG secondary conjugated PE antibody (Southern Biotech) was used for detection. Cell lines secreting NWH-reactive antibodies were identified by gating based on mock-transfected Expi293F cells. LCLs in antigen-reactive wells then were fused with HMMA2.5 cells by electrofusion to produce hybridomas and plated in medium containing 100 μM hypoxanthine, 0.4 μM aminopterin, 16 μM thymidine, and 7 μg/mL ouabain. Hybridomas were cultured for 3 weeks and then screened again in a flow cytometric binding assay using Expi293F-SNV-M or Expi293F-ANDV-M to identify cells secreting SNV and ANDV-reactive antibodies. Positive wells were single-cell sorted into 384-well plates on a SH800S Cell Sorter (Sony™). Single cells then were incubated for 3-4 weeks and screened against Expi293F-SNV-M or Expi293F-ANDV-M cells by flow cytometry to identify positive clones. Hybridoma clones secreting antibodies that reacted with Expi293F-SNV-M or Expi293F-ANDV-M cells then were expanded to G-Rex 6-well plates (Wilson Wolf) and grown in Hybridoma Serum Free Medium (Gibco) for 2-4 weeks. Supernatant was harvested from G-Rex plates and filtered with 0.45-μm pore size filter flasks. HiTrap MabSelectSure columns (GE Healthcare Life Sciences) then were used to affinity purify mAbs from hybridoma supernatant using an AKTA pure protein purification system (GE Healthcare Life Sciences).

Antibody gene sequence analysis. RNA was extracted and amplified from cloned hybridoma cell pellets based on a modified 5' Rapid Amplification of cDNA Ends (5' RACE) as previously described (Turchaninova et al., 2016). Prepped amplicon libraries were then sequenced using a Sequel Platform (Pacific Biosciences). Isotype and subclass was determined through sequence of constant regions Sequence analysis to determine the antibody gene segments, complementarity determining regions (CDRs), and % mutation from germline was performed using imMunoGeneTics (IMGT) V-QUEST tool (Giudicelli et al., 2011).

Generation of pseudotyped VSVs. All pseudotyped viruses were generated based on a previously published protocol (Whitt, 2010) using plasmids pWRG/SN-M(opt), pWRG/AND-M(opt2), pWRG/PUU-M(s2), pWRG/DOB-M(opt), pWRG/HTN-M(co), pWRG/SEO-M(opt2), and pCAGGS-G-Kan (Kerafast, kindly provided by Dr. Michael A. Whitt). BHK-21(WI-2) cells were plated in a 6-well plate at a density of 100,000 cells/well. 24 hours later, cells were transfected with 10 μL of Lipofectamine 3000 and P300 reagent (Thermo Fisher) and 2.5 μg of plasmid DNA, and medium was removed and replaced with normal growth medium 4 hours later. 48 hours after transfection, cells were inoculated with G*ΔG-GFP rVSV (Kerafast, kindly provided by Dr. Michael A. Whitt) at a multiplicity of ~0.02 in serum-free DMEM, and 3 hours later cells were washed twice with PBS, and normal growth medium was added to cells. Cells were incubated at 32° C. Supernatants containing pVSV/ANDV, pVSV/DOBV, or pVSV/VSV-G were collected 24 hours after infection, and supernatants containing pVSV/SNV, pVSV/HTNV, pVSV/SEOV, or pVSV/PUUV was collected 48 hours after infection. Supernatants were clarified by cenuifugation and stored at −80° C. until use.

Pseudotype virus neutralization assay. The constructs pVSV/ANDV, pVSV/DOBV, pVSV/SNV, pVSV/HTNV, pVSV/SEOV, and pVSV/PUUV were used in neutralization assays. BHK-21 cells were plated at 5,000 cells/well in a 96-well plate. Antibodies were diluted serially in full growth medium and then incubated with virus for 1 hour at 37° C. Medium containing antibody and virus was added to cells and incubated for 1 hour at 37° C. to allow viral attachment. Cells then were washed, and the antibody and virus mixture were removed and replaced with full growth medium. After 24 hours, the medium was removed, the cells were imaged on an CTL ImmunoSpot® S6 Analyzer (CTL), and GFP-positive cells were counted in each well. Percent relative infectivity was calculated by dividing the number of GFP-positive cells in the wells containing antibody, normalized to the average number of GFP-positive cells in wells with only virus.

Receptor blocking assay. A soluble extracellular cadherin repeat 1 (sEC1, GenBank accession number NM_002587, residues 1 to 172) construct was synthesized and cloned into the pCDNA3.1(+) mammalian cell expression vector by GenScript with a C-terminal GSG linker and decahistidine tag. sEC1 was expressed in ExpiCHO cells and purified through a HisTrap Excel column (GE Healthcare Life Sciences) using anAKTA pure protein purification system (GE Healthcare Life Sciences), and then labeled with Alexa Fluor 647 (Thermo Fisher). Expi293F cells transfected with a plasmid encoding full-length ANDV M segment, as described previously, were incubated with 10 μg/mL of each mAb for 1 hour at 4° C. A control mAb, DENV 2D22 directed to dengue virus envelope protein, was added as a negative control, and unlabeled sEC1 was added at 50 μg/mL as a positive control. Labeled sEC1 was added directly to the cell suspension and first mAb at a final concentration of 200 ng/mL and incubated for an additional hour at 4° C. Cells then were washed with flow cytometry buffer and stained with 0.5 μg/mL of 4',6-diamidino-2-phenylindole (DAPI). Alexa Fluor 647 and DAPI staining were measured with an iQue Screener Plus flow cytometer (Intellicyt) and quantified using the manufacturer's ForeCyt software. Binding in the presence of antibody was divided by the maximal binding signal of labeled sEC1 alone to determine the % receptor blocking.

Fusion inhibition assay. Cell to cell fusion inhibition assay was adapted from previously published methods (Willensky et al., 2016). Vero cells were plated at 7,500 cells/well in a 96-well plate (Greiner Bio-One). 24 hours later, cells were transfected with 0.2 μL/well of Lipofectamine 3000 and P300 reagent (Thermo Fisher) and 100 ng/well of plasmid pWRG/SN-M (opt) or 75 ng/well of plasmid pWRG/AND-M. 48 hours post transfection, 10 μg/mL of each mAb was incubated for 1 hour on transfected cells at 37° C. Medium containing mAbs was removed and replaced with MES-buffered D-MEM (pH 5.5) and incubated for 5 minutes at 37° C. Cells were washed twice with D-PBS and medium was replaced with normal growth medium (D-MEM, pH 7.4). Cells were incubated for 3 hours at 37° C., and then incubated for an additional hour at 37° C. in D-MEM containing 1 μM 5-chloromethylfluorescein diacetate (Cell Tracker CMFDA, Molecular Probes) to stain cytoplasm. Cells were then fixed with 4% (w/v) paraformaldehyde for 20 minutes at room temperature and permeabilized with 0.1% Triton X-100. To stain hantavirus glycoproteins, cells were incubated with a combination of SNV-27 and ANDV-44 (0.5 μg/mL of each in 0.1% BSA) for 1 hour at room temperature, shaking, and then washed twice with PBS-T. Cells were then incubated for 45 minutes (shaking) with Goat anti-human IgG Alexa Fluor 568 (1 μg/mL in 0.1% BSA), washed twice with PBS-T, and then D-PBS containing 0.1 μg/mL of DAPI was added to stain nuclei. Four images per well channel were captured using an Image Xpress (Molecular Devices) fluorescent imager. Fusion index was measured using the MetaXpress software (Molecular Devices) Micronuclei application module. Four images per well were used to count the % of multinucleated cells, and then averaged values were normalized to a control well that was not treated with mAb (representing maximum multinucleated cell formation) to calculate a fusion index (%) for each mAb.

Competition-binding assay. Expi293F cells transfected with ANDV or SNV full-length M segment, as described previously, were incubated with 10 μg/mL of the first, unlabeled mAb for 1 hour at 4° C. A second mAb labeled with Alexa Fluor 647 (Thermo Fisher) was added directly to the cell suspension and first mAb at a final concentration of 0.5 μg/mL and incubated for an additional hour at 4° C. Cells then were washed with FACS buffer and stained with 0.1 μg/mL of 4',6-diamidino-2-phenylindole (DAPI). Alexa Fluor 647 and DAPI staining were measured with an iQue Screener Plus flow cytometer (Intellicyt) and quantified using the manufacturer's ForeCyt software. Binding in the presence of the first antibody was normalized to the maximal binding signal of the labeled antibody alone to determine the % competition values.

Syrian hamster Andes virus challenge study. Animal challenge studies were conducted in the ABSL-4 facility of the Galveston National Laboratory. The animal protocol for testing of mAbs in mice was approved by the Institutional Animal Care and Use Committee (IACUC) of the University of Texas Medical Branch at Galveston (UTMB). 8-week-old female Syrian golden hamsters (Mesocricetus auratus) (Envigo) were inoculated with 200 PFU of Andes hantavirus (strain Chile-9717869) by the intramuscular (i.m.) route on day 0. Animals (n=6 per group) were treated with 5 mg/kg of SNV-24, SNV-30, SNV-53, ANDV-5, ANDV-44 or DENV 2D22 (a negative control dengue virus antibody) by the intraperitoneal (i.p.) route on days 3 and 8 after virus inoculation and monitored for disease. Animals were weighed and monitored daily over a 26-day period after challenge. Once animals were symptomatic, they were examined twice per day. The disease was scored using the following parameters: breathing abnormalities, hunched posture, ruffed fur, rapid shallow breathes, paucity of movements and weight loss.

Moribund animals were euthanized as specified by the IACUC protocol. Blood was collected on days 8 and 11 of the study, and all animals were euthanized 32 days after infection when terminal bleeding and organs collection (lungs and liver) were performed.

Focus reduction neutralization assay with authentic SNV and authentic ANDV. For foci-based neutralization assays, 100 PFU of Andes virus (ANDV) Chile-9717869 (GenBank reference #AF291702-04) or Sin Nombre (SNV), SN 77734 (GenBank reference #AF281850-52) from UTMB Arbovirus Reference Collection were preincubated with various concentrations of MAbs in a 100-μL volume for 1 h at 37° C. in triplicate and placed on monolayers of Vero-E6 cells in 96-well plates. After adsorption of the virus for 1 h at 37° C., the virus-antibodies mixture was replaced with 100 μLs of 0.9% methylcellulose in minimal essential medium (MEM) containing 10% fetal bovine serum (Quality Biologicals) and 0.1% gentamicin sulfate (Mediatech), followed by incubation at 37° C. Plates were fixed with 10% buffered formalin (Thermo Fisher) with following removing of the biocontainment laboratories. Foci were visualized by staining monolayers with the mixture of ANDV or SNV monoclonal antibodies respectively on day 6-7 or 10-11 after infection. KPL Affinity Purified Peroxidase Labeled Goat Anti-human IgG (SeraCare) were used as secondary antibodies and AEC Substrate Kit (Abeam) as substrate for HRP. Foci were counted, and neutralization curves were plotted as percentages of reduction of foci numbers compared to mock-neutralized virus.

Histopathology. During necropsy, gross lesions were noted and representative lung tissues from the left lobe were collected in 10% formalin. After a 24-hour initial fixation at 4 C, the lung tissues were transferred to fresh 10% formalin for an additional 48-hour fixation, prior to removal from containment. Formalin-fixed tissues were processed by standard histological procedures by the UTMB Anatomic Pathology Core. About 4 μm-thick sections were cut and stained with hematoxylin and eosin (HE). Sections of lungs were examined for the extent of inflammation, type of inflammatory foci, and changes in alveoli/alveolar septa/airways/blood vessels in parallel with sections from uninfected or control animals. The blinded tissue sections were semi-quantitatively scored for pathological lesions using the criteria described (Table S3).

Statistical analysis for each experiment is described in Methods and/or in the figure legends. All statistical analysis was done in Prism v7 (GraphPad) or RStudio v1.3.1073.

Binding and neutralization curves. $EC_{50}$ values for mAb binding were calculated through a log transformation of antibody concentration using four-parameter dose-response nonlinear regression analysis with a bottom constraint value of zero. $IC_{50}$ values for mAb-mediated neutralization were calculated through a log transformation of antibody concentration using four-parameter dose-response nonlinear regression analysis with a bottom constraint value of zero and a top constraint value of 100. $IC_{90}$ values were calculated in the same way as $IC_{50}$ values, but the F constant was set to ten. $EC_{50}$, $IC_{50}$, and $IC_{90}$ values were generated from 2 to 3 independent experiments and reported as an average value.

Competition-binding analysis. Binding values for mAb-treated samples were normalized to a maximal binding control to determine the residual binding % of each mAb, and values from 3 independent experiments were averaged.

Correlation coefficients were determined through Pearson method on RStudio using the "rcorr" function. The mAbs were reordered according to the correlation coefficient using "hclust" method.

Lethal challenge in Syrian hamsters. Studies were done with 6 hamsters per antibody treatment group. Survival curves were created through Kaplan-Meier analysis, and a log-rank (Mantel-Cox) test was used to compare each mAb treatment group to the isotype control (DENV 2D22) (*p<0.05, p<0.01, *p<0.001)

Example 2—Results

Isolation and breadth of New World-reactive mAbs. The inventor isolated a panel of 20 SNV-reactive mAbs from the peripheral blood mononuclear cells (PBMCs) of three otherwise healthy human individuals who previously had suffered symptomatic laboratory-confirmed infection with SNV. Individual 1 was infected in December 2010 and samples were collected in July 2018; individual 2 was infected in June 2017 and samples were collected in June 2018; individual 3 was infected at an unknown date and samples were collected in April 2018. The inventor also isolated a panel of 16 ANDV-reactive mAbs from a donor previously infected with ANDV. The ANDVimmune sample was collected in Chile, and was de-identified prior to study. All mAbs were generated through a B cell hybridoma method, as described previously (Alvarado and Crowe, 2016; Powell et al., 2020a; Smith and Crowe, 2015; Yu et al., 2008). The inventor identified B cells expressing ANDV- or SNV-reactive mAbs by screening for binding to ANDV or SNV glycoproteins expressed on the surface of Expi293F cells and detecting NWH-reactive antibodies through flow cytometry on the IQue Screener Plus (Intellicyt). RNA encoding antibody genes were reverse-transcribed, amplified, and sequenced from cloned hybridoma cell lines to identify antibody variable genes for each clone (Table S1 and S2). Most of the antibodies were of the IgG1 isotype, except for SNV-57 which was IgG2 isotype.

Binding and neutralization potency of NWH-reactive mAbs. The inventor next sought to characterize the ability of the inventor's panel of NWH-reactive mAbs to bind and neutralize NWH strains. To do this, the inventor tested the cross-neutralizing and binding activity of the human mAbs using VSVs (pVSV/ANDV and pVSV/SNV) pseudotyped with the ANDV or SNV glycoproteins, or using authentic wild-type (wt) ANDV or SNV under BSL3 conditions (FIGS. 1A-B). Most hantavirus species are CDC Risk Group 3 pathogens, which require BSL3 procedures for manipulating authentic viruses. To screen the members of the panel for neutralizing activity in a BSL2 environment, the inventor used a well-characterized virus pseudotyping system based on VSV (Higa et al., 2012; Ray et al., 2010; Schnell et al., 1996; Whitt, 2010). In this system, the gene encoding the VSV glycoprotein is removed from the viral genome, and virions are pseudotyped with NWH glycoproteins Gn and Gc, to produce replication-incompetent virus particles. All mAbs that showed neutralizing activity against pVSV/SNV or pVSV/ANDV then were tested for neutralization of SNV strain SN77734 (wt SNV) or ANDV strain Chile-9717869 (wt ANDV) in a focus reduction neutralization test (FRNT). MAbs were grouped based on neutralization potency for the homologous hantavirus species in FRNT assays (FIGS. 1A-B). Group 1 mAbs showed ultra-potent neutralizing activity ($IC_{50}$<10 ng/mL), group 2 mAbs showed potent neutralizing activity ($IC_{50}$ 10-100 ng/mL), group 3 mAbs showed neutralizing activity ($IC_{50}$ 100-10,000) ng/mL, and group 4 mAb lacked detectable neutralizing activity.

Figure 5:
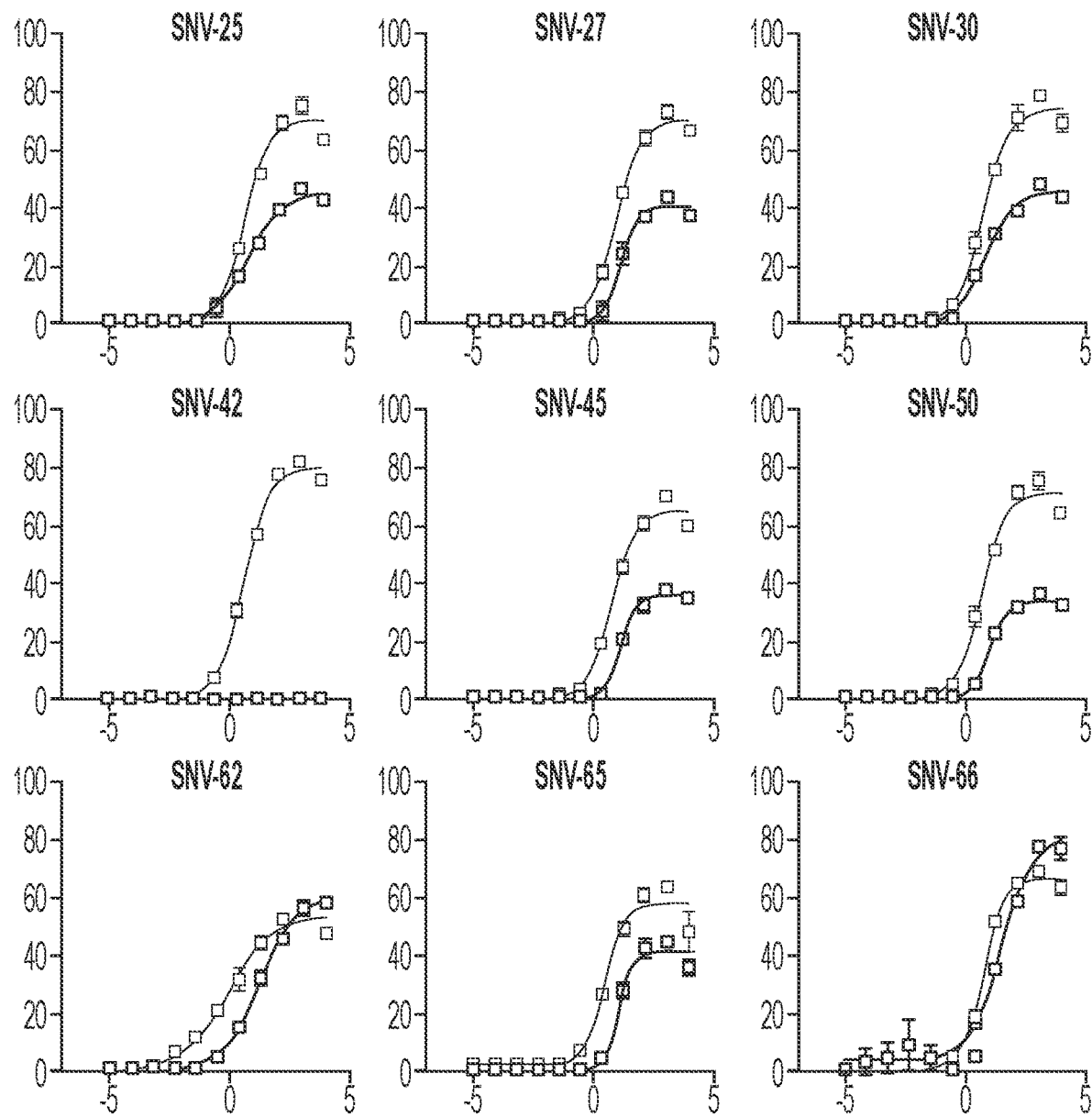
FIG. 5, Related to FIGS. 1A-C. Representative binding curves for all New World reactive mAbs to Expi293F cells transfected with ANDV or SNV Gn and Gc. Data shown are average values for technical replicates±S.D. The experiment was performed 3 times independently with similar results; one experiment is shown. $EC_{50}$ values indicated in FIGS. 1A-C for each mAb are the average of the $EC_{50}$ values from all three experiments.
Figure 5:
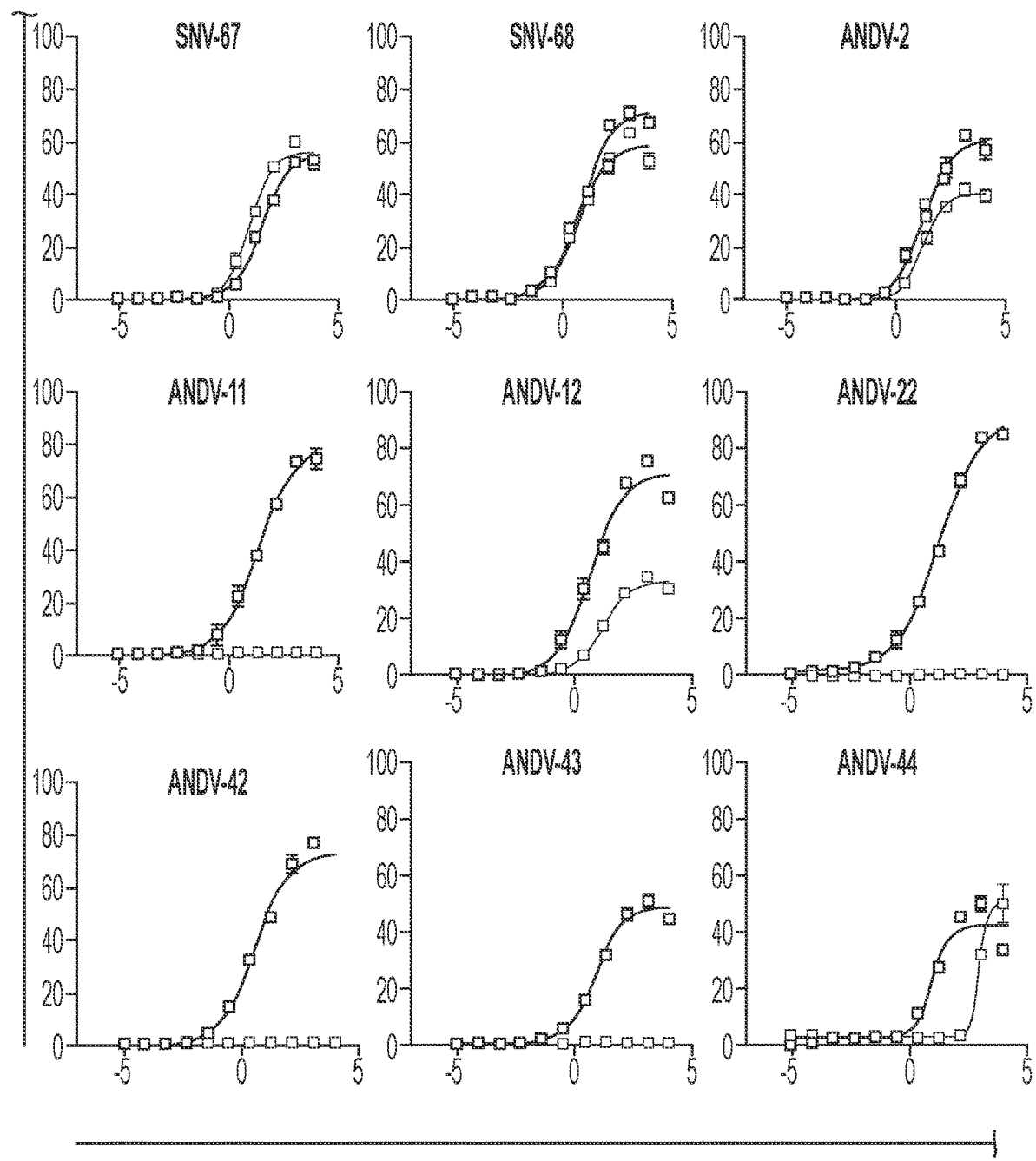
Figure 6:
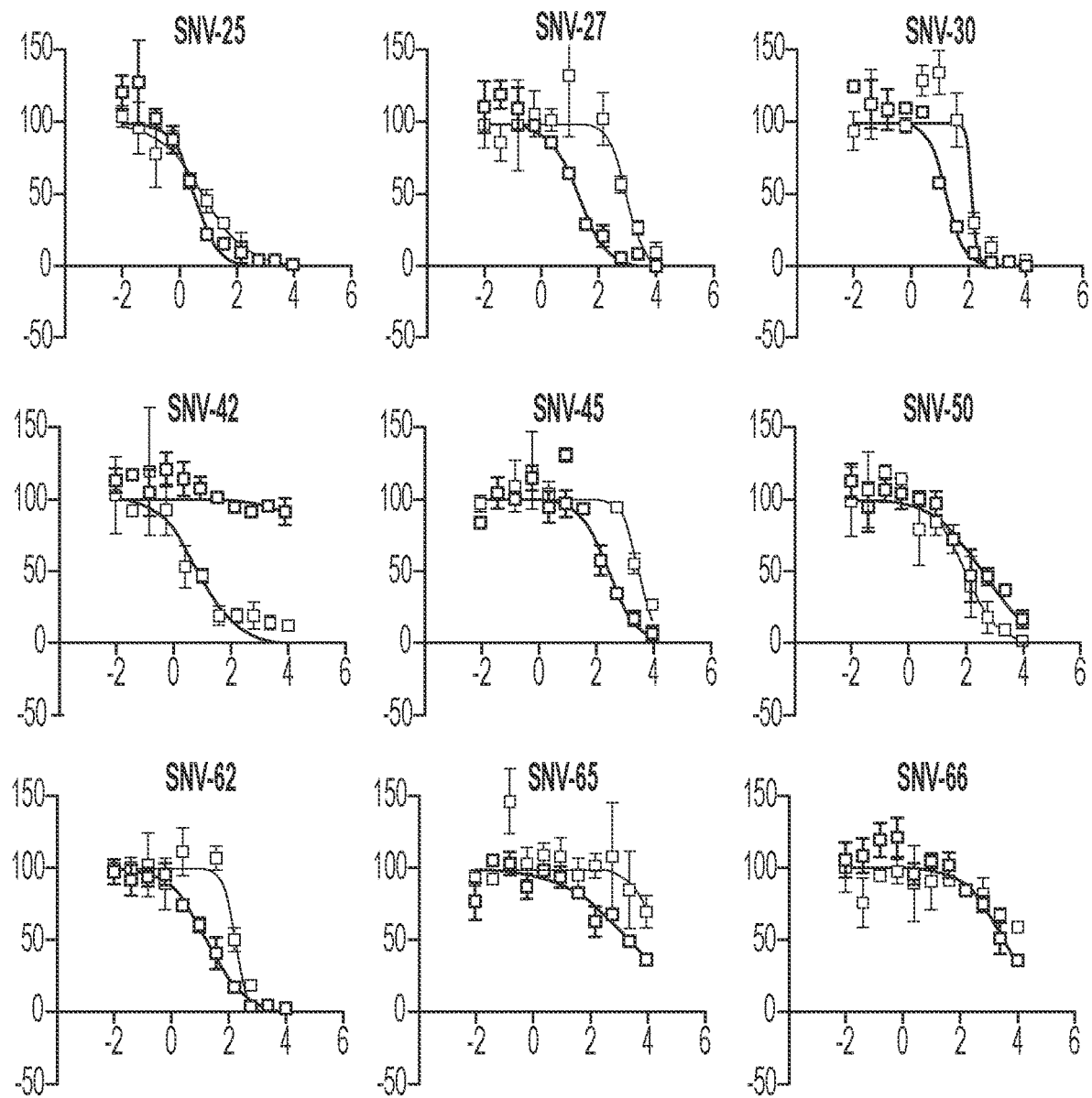
FIG. 6, Related to FIGS. 1A-C. Representative neutralization curves for all New World reactive mAbs to VSVs pseudotyped with ANDV or SNV Gn and Gc. Data shown are average values for technical replicates±S.D. The experiment was performed 3 times independently with similar results; one experiment is shown. $IC_{50}$ values indicated in FIGS. 1A-C for each mAb are the average of the $IC_{50}$ values from all three experiments.
Figure 6:
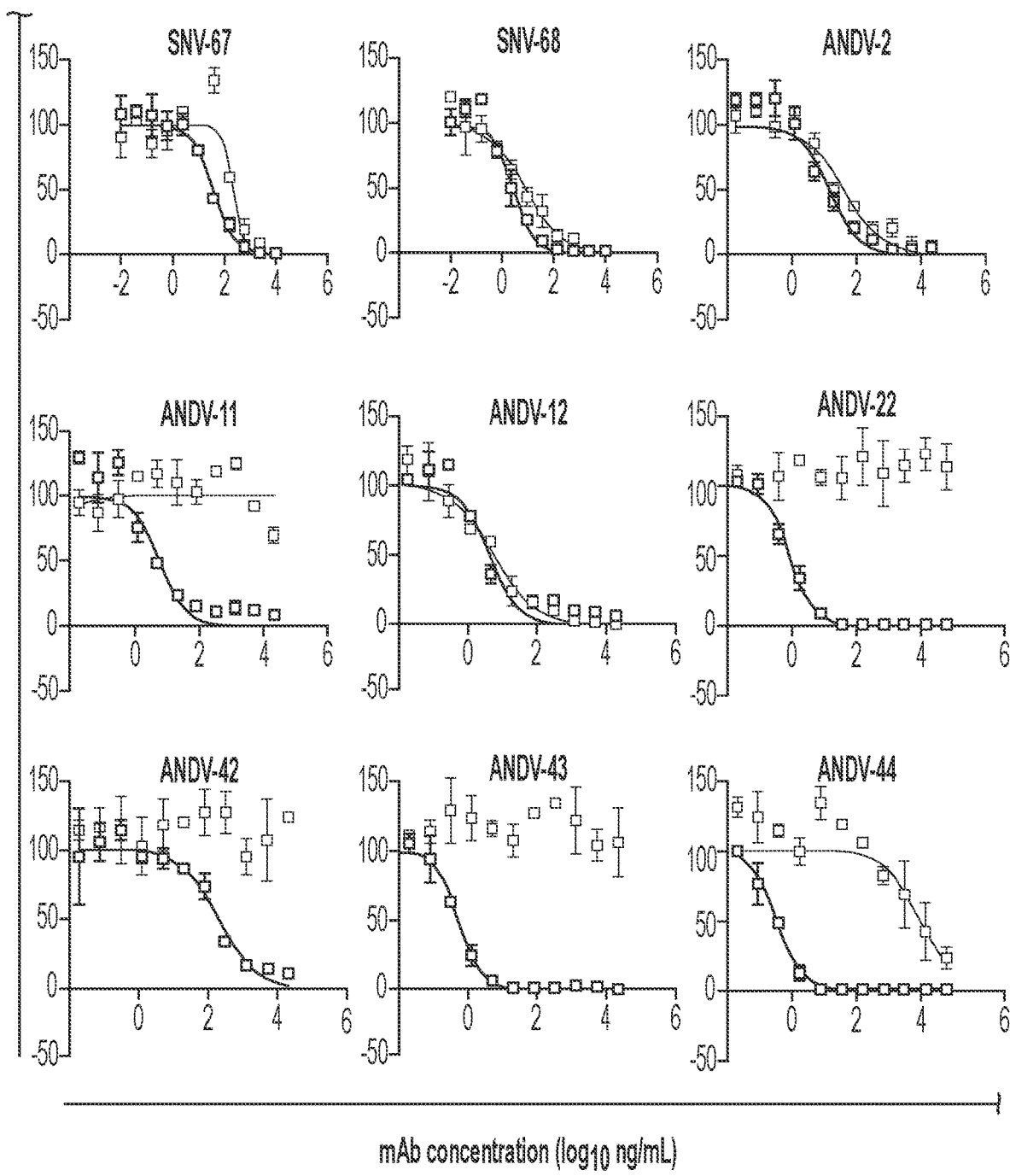

Only one SNV-reactive mAb (SNV-42) had ultra-potent neutralizing activity, and one mAb (SNV-53) had potent neutralizing activity to wt SNV (FIGS. 1A-B). Four additional mAbs in the SNV-reactive panel also neutralized wt SNV, while the rest of the mAbs had no detectable neutralizing activity. The inventor also tested binding to the heterologous glycoproteins from ANDV virus and found that most of the mAbs isolated from SNV-immune individuals also reacted to ANDV glycoproteins and neutralized pVSV/ANDV (FIG. 1A, FIG. 5, FIG. 6). All mAbs that showed cross-reactivity and cross neutralization of pVSV/ANDV were tested for neutralization of wt ANDV in a FRNT, and seven of the SNV-reactive mAbs showed neutralizing activity for wt ANDV. All assays with wt viruses were tested using Vero cells, and all assays using pVSVs were tested using BHK-21 cells, but mAbs also showed similar potency in neutralization assays using human umbilical vein endothelial cells (HUVECs) (FIGS. 7A-B).

ANDV-reactive mAbs isolated from ANDV-immune individuals showed limited cross-neutralizing activity, in contrast to the cross-reactive phenotype observed for SNV-reactive mAbs (FIG. 1B, FIG. 5, FIG. 6). Most of the ANDV-reactive antibodies showed similar neutralization activity in the pVSV/ANDV and wt ANDV assays, with six mAbs showing ultra-potent neutralizing activity, three mAbs showing potent neutralizing activity, and four mAbs showing neutralizing activity. Only one mAb tested, ANDV-44, showed neutralizing activity for wt SNV. Cross-reactivity to SNV Gn and Gc proteins also was limited to five mAbs (ANDV-44, -12, -59, -2, and -54).

We noted two distinct functional patterns, complete or incomplete neutralization, for mAbs that showed neutralizing activity to wt ANDV and wt SNV (FIG. 1C). Incompletely neutralizing mAbs left a residual viral fraction (>10% relative infectivity) at the highest concentrations tested. Only three mAbs (SNV-42, SNV-53 and ANDV-44) in groups 1 and 2 showed complete neutralizing activity for wt SNV (FIG. 1C, top left), while the remaining mAbs in group 3 did not show complete neutralization at the highest concentrations tested (FIG. 1C, bottom left). All group 1 and 2 ANDV-reactive mAbs and SNV-53, showed complete neutralization of wt ANDV (FIG. 1C, top right). MAbs in group 3 showed incomplete neutralization for wt ANDV at the highest concentrations tested (FIG. 1C, bottom right). In summary, most of the ANDV-reactive mAbs showed potent and species-specific neutralizing activity, while SNV-reactive mAbs demonstrated less potent neutralizing activity but greater breadth.

Mechanistic evaluation of NWH-reactive mAbs. To determine the mechanistic basis of neutralization, the inventor tested all mAbs for activity in two in vitro assays measuring receptor blocking and fusion inhibition. Protocadherin-1 (PDCH-1) was identified previously as a candidate receptor for NWHs, and extracellular cadherin repeat 1 (EC-1) showed direct binding interactions with ANDV or SNV glycoproteins (Jangra et al., 2018). Therefore, the inventor tested SNV-reactive and ANDV-reactive mAbs for blocking of NWH interactions through a competition-binding assay using soluble EC1 (sEC1) protein. Three of the SNV-reactive mAbs (SNV-30, -62, -67) showed partial receptor blocking activity (26 to 50% residual binding), while four of the ANDV-reactive mAbs (ANDV-3, -5, -38, -42) showed complete receptor blocking (≤25% residual binding) (FIGS. 1A-B). The inventor only detected binding of sEC1 to ANDV-transfected cells, thus SNV-specific mAbs (SNV-3 and SNV-42) were not tested for receptor-blocking activity.

Figure 8A:
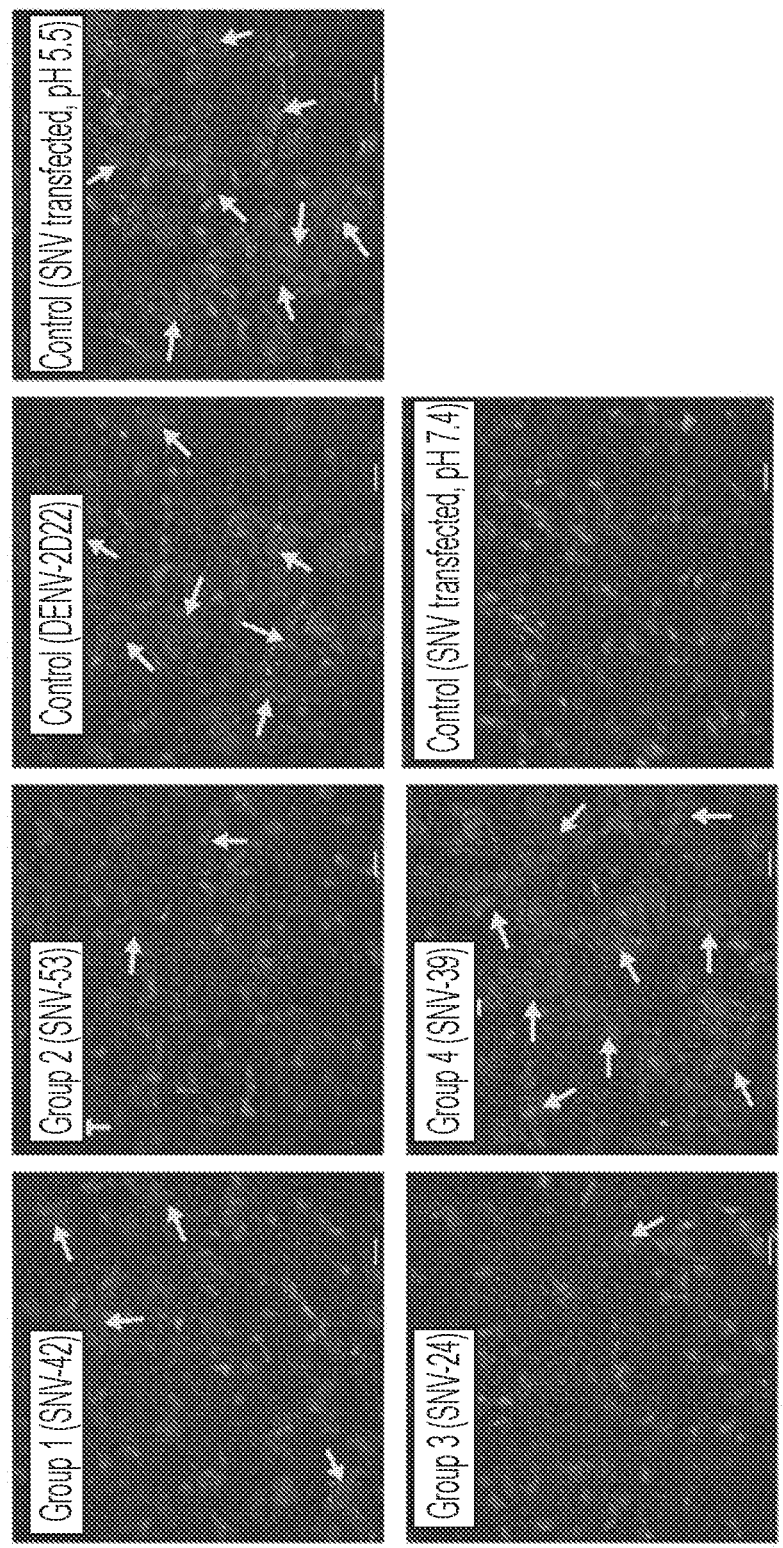
Figure 8B:
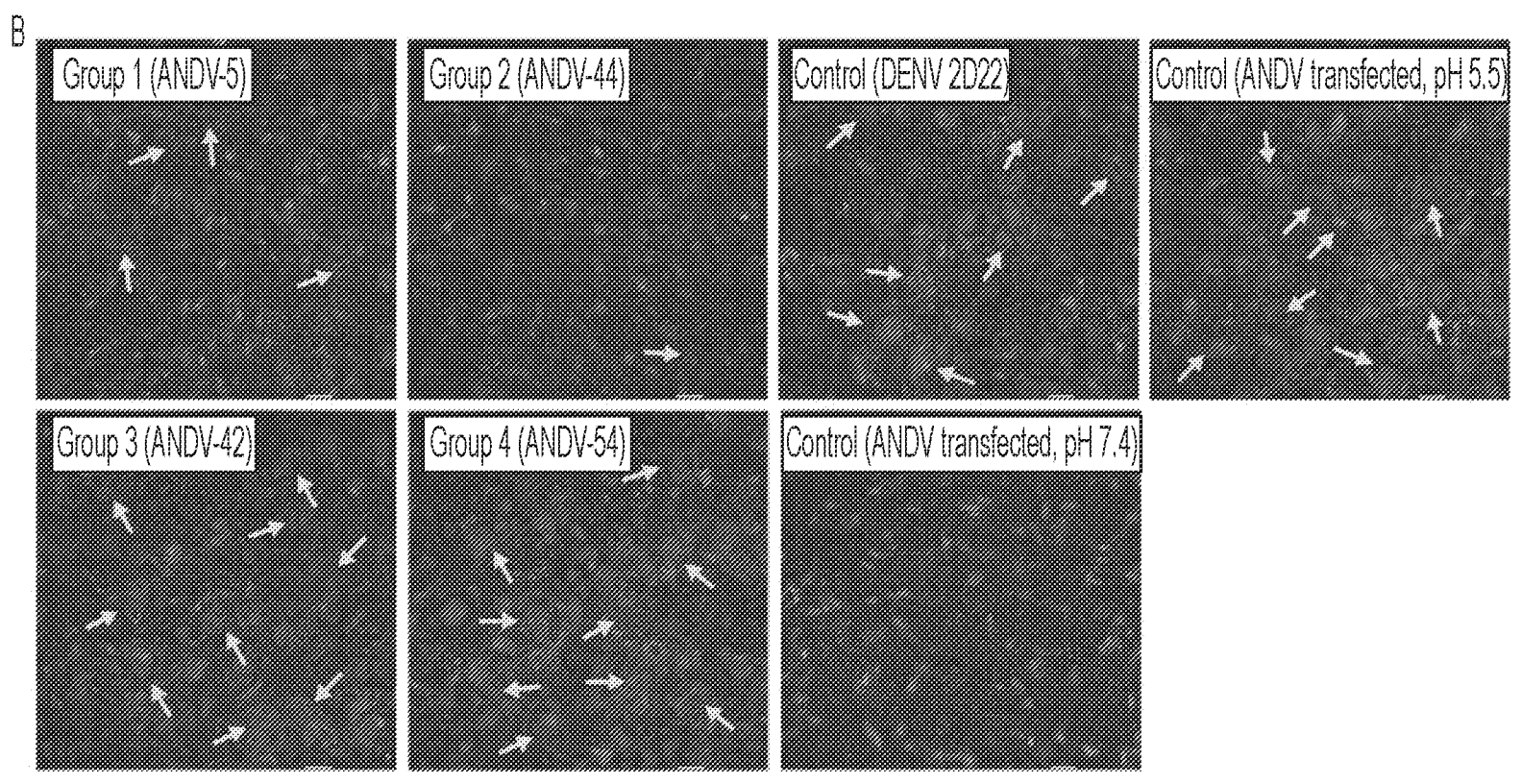

Vero cells expressing the ANDV or SNV surface proteins Gn/Gc undergo cell-to-cell fusion when exposed to low pH (pH 5.5) medium (Bignon et al., 2019; Guardado-Calvo et al., 2016). To test viral fusion in vitro, the inventor performed a fusion inhibition assay by adding 10 µg/mL of each mAb to cells prior to inducing cell-to-cell fusion. He then counted the % of multinucleated cells using MetaXpress software and normalized values to that for a control sample that was not treated with mAb, to quantify a fusion index (%) (FIGS. 8A-B). Through this assay, the inventor determined that each of the SNV-reactive mAbs that showed neutralizing activity in the pVSV neutralization assay also showed a reduction in cell-to-cell fusion (FIGS. 1A-B). Additionally, each of the ANDV-reactive mAbs in groups 1 and 2 also showed fusion-inhibiting activity. Thus, NWH mAbs showed a range of receptor-blocking and fusion-inhibiting activities in vitro, and most of the neutralizing antibodies also inhibited fusion.

Figure 2C:
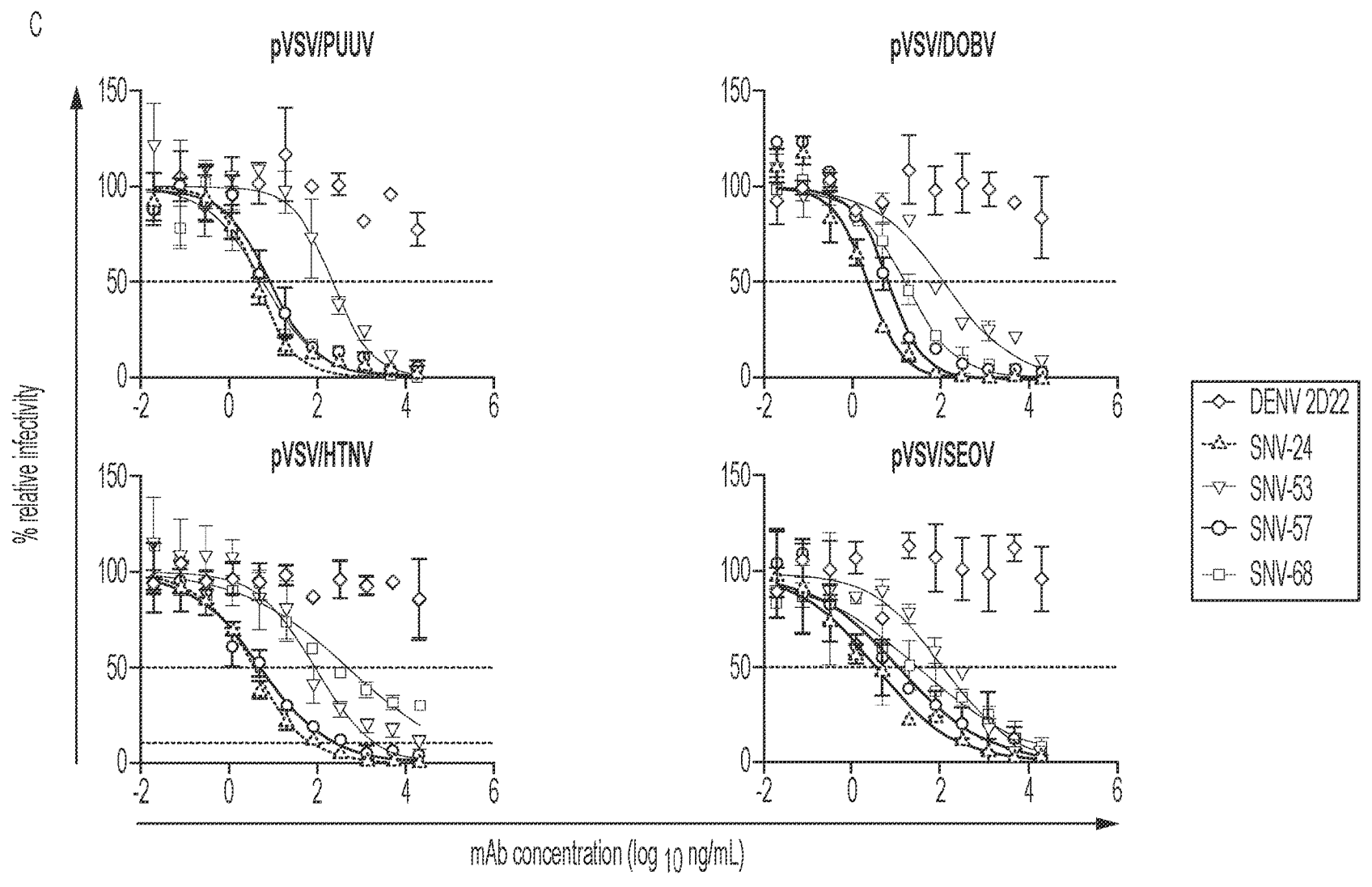
Figure 9:
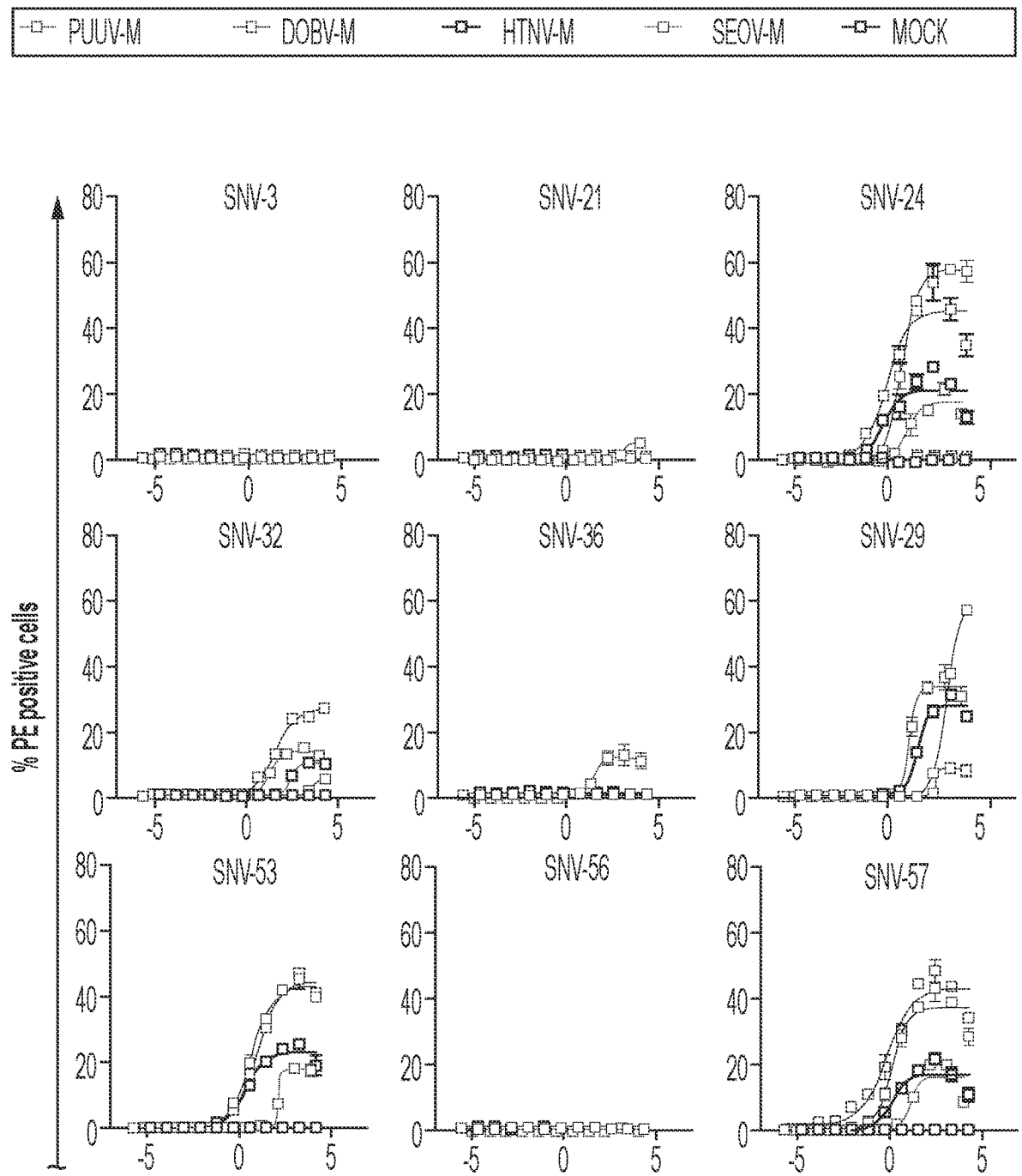
FIG. 9, Related to FIGS. 2A-C. Representative binding curves for all New World reactive mAbs to Expi293F cells transfected with PUUV, DOBV, HTNV, or SEOV Gn and Gc. Data shown are average values for technical replicates±S.D. The experiment was performed 3 times independently with similar results; one experiment is shown. $EC_{50}$ values indicated in FIGS. 2A-C for each mAb are the average of the $EC_{50}$ values from all three experiments.
Figure 9:
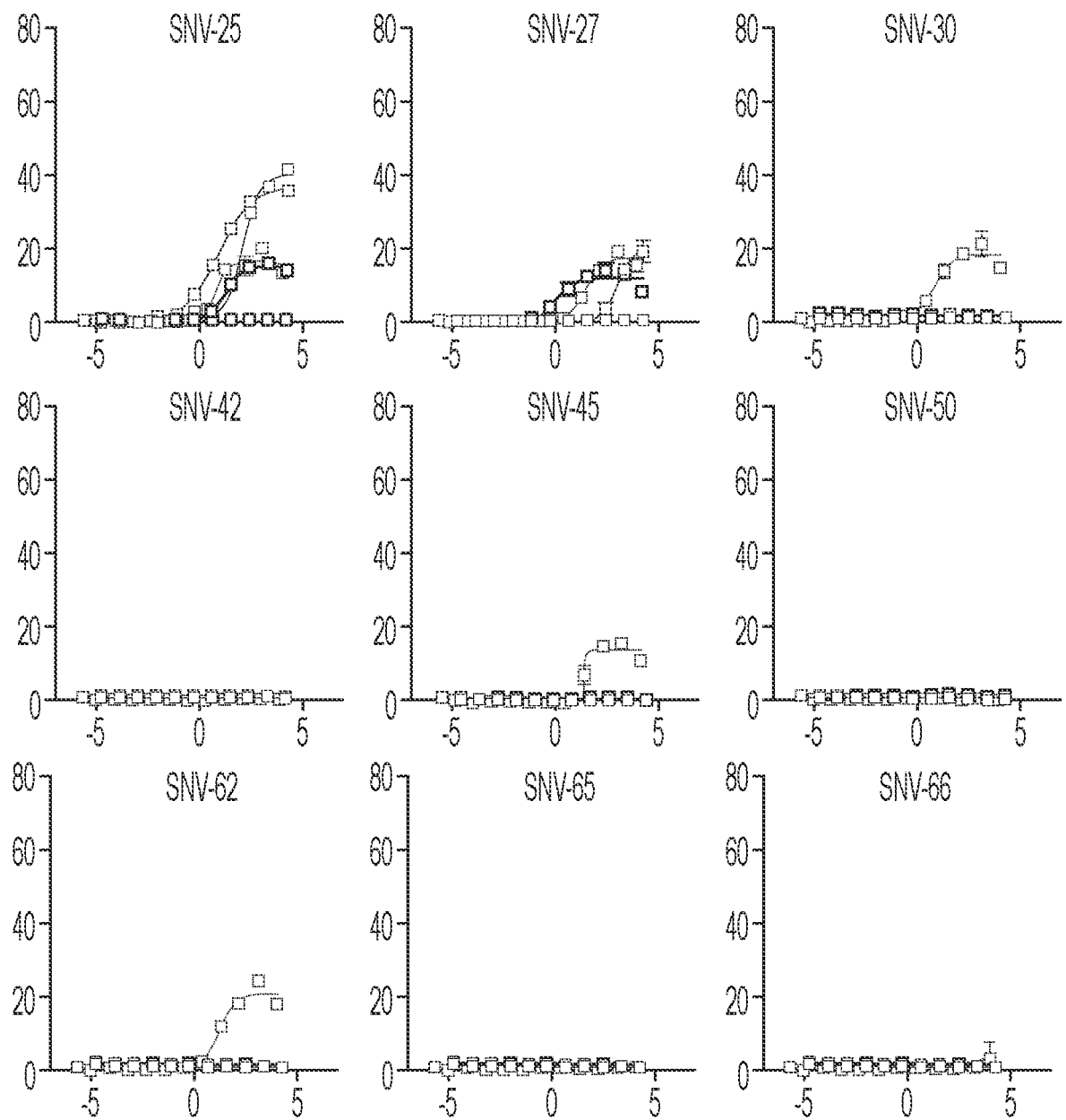
Figure 9:
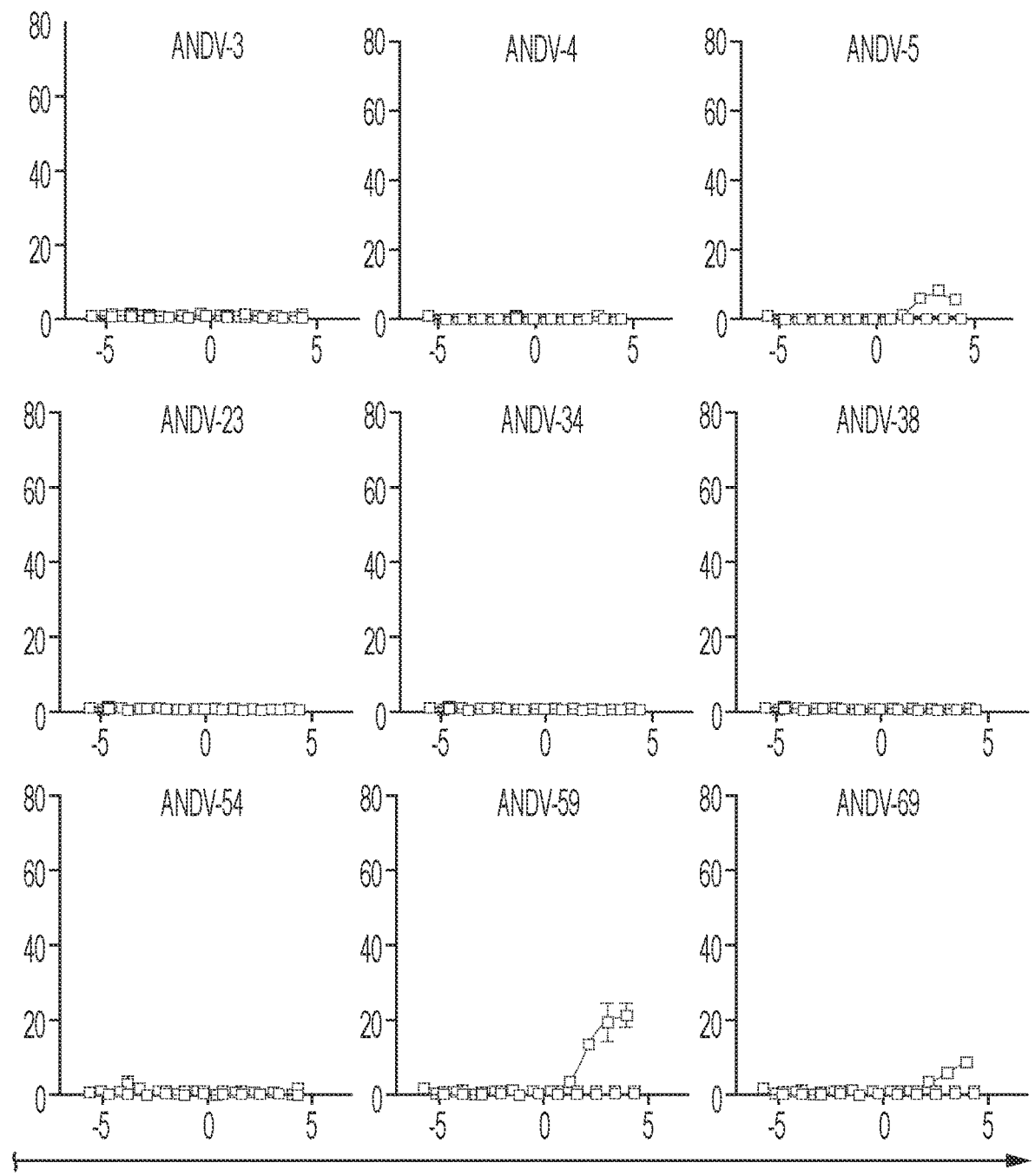
Figure 10:
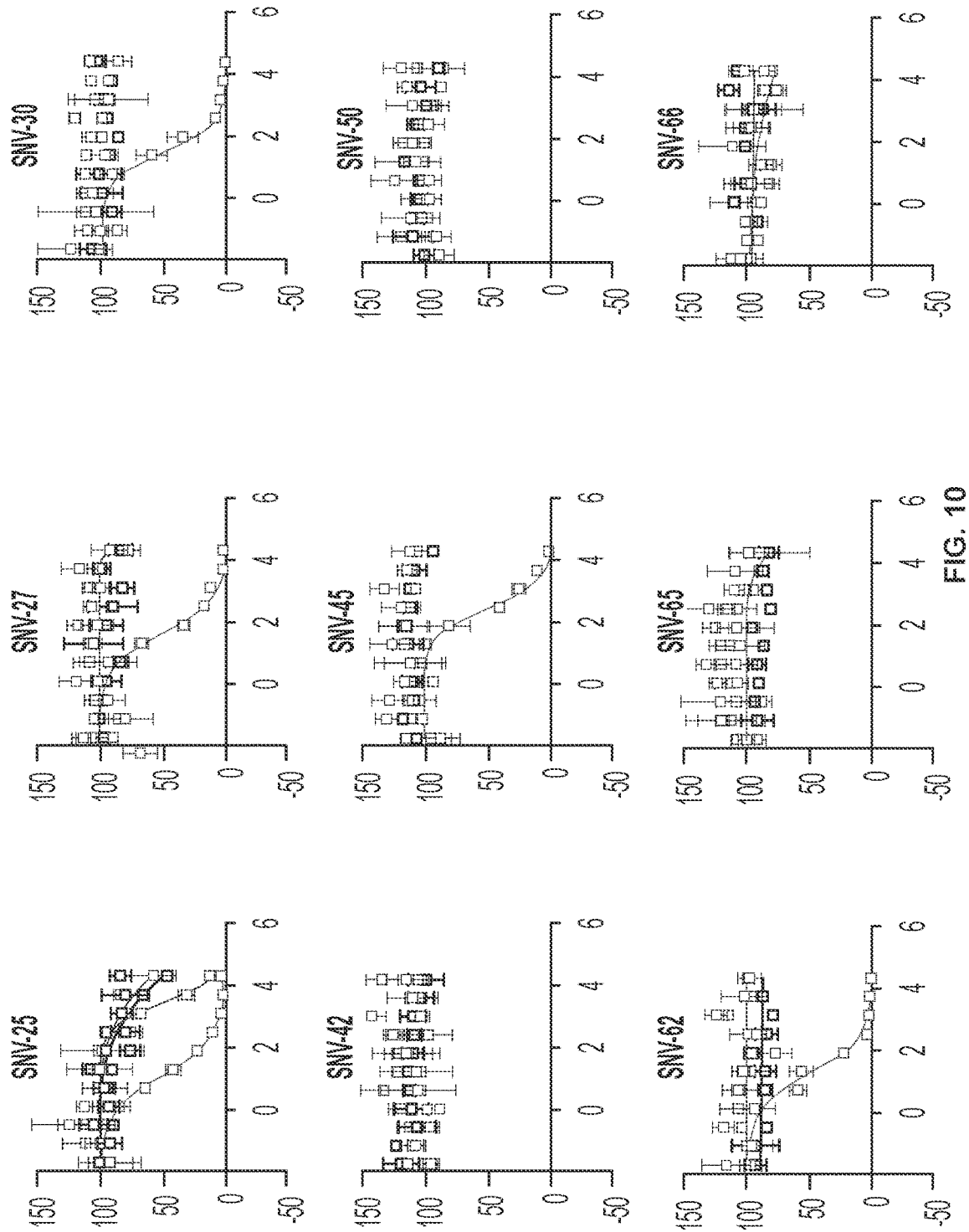
FIG. 10, Related to FIGS. 2A-C. Representative neutralization curves for all New World reactive mAbs to VSVs pseudotyped with Gn and Gc from PUUV, DOBV, HTNV, or SEOV. Data shown are average values for technical replicates±S.D. The experiment was performed 3 times independently with similar results; one experiment is shown. $IC_{50}$ values indicated in FIGS. 2A-C for each mAb are the average of the $IC_{50}$ values from all three experiments. VSVs pseudotyped with VSV-G was used as a control.
Figure 10:
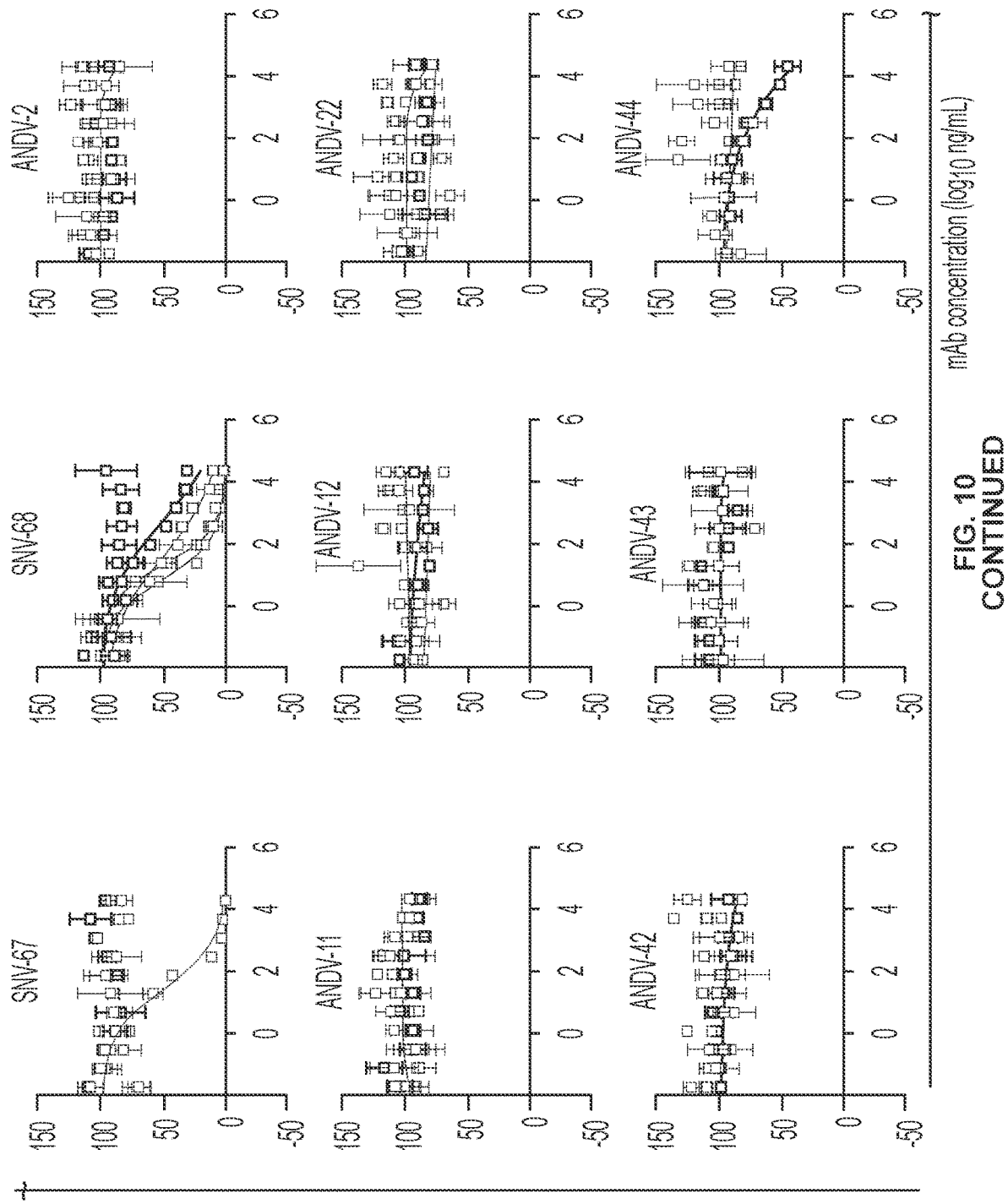
Figure 10:
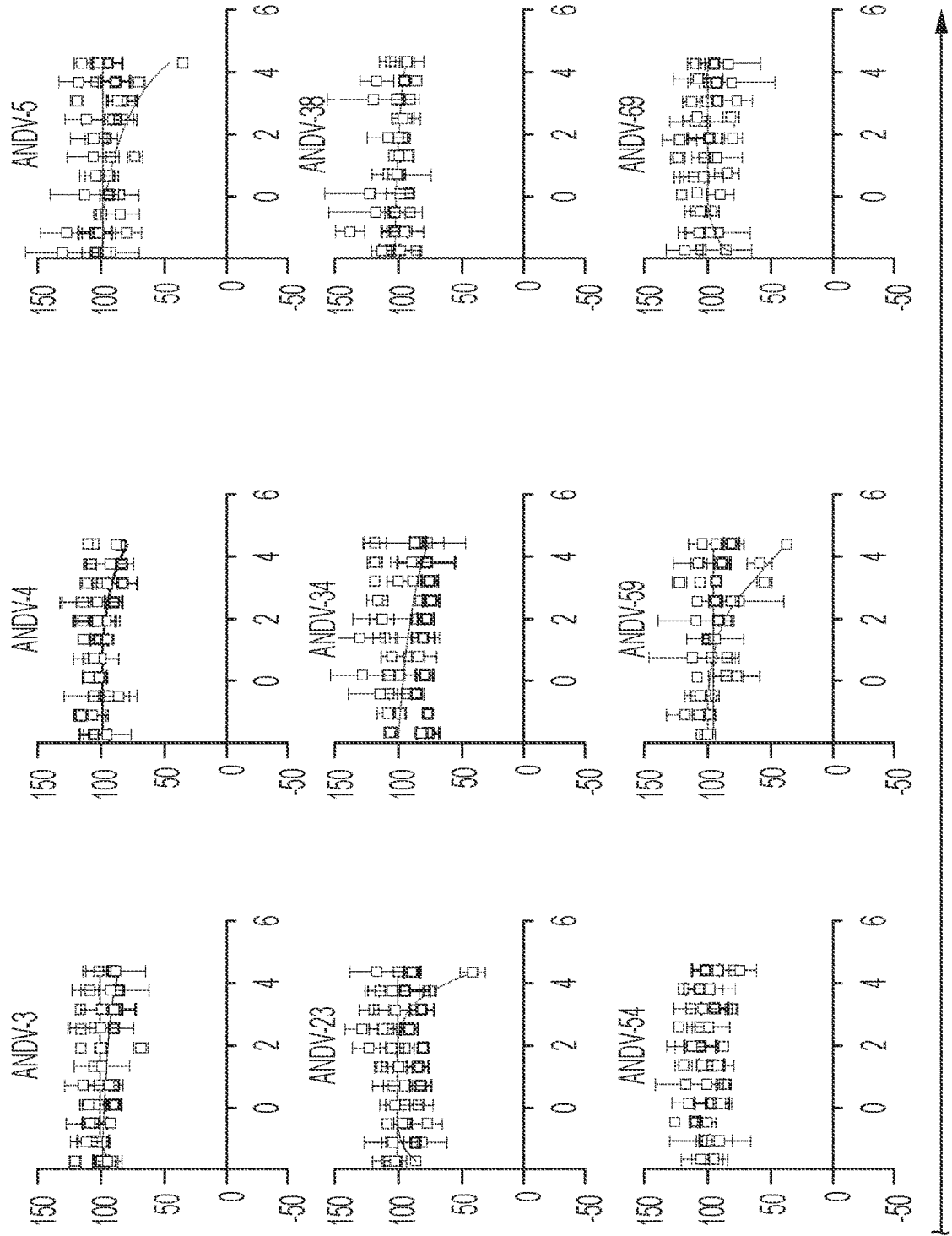

Breadth of neutralization and binding to diverse hantavirus species. Since many of the antibodies cross-reacted with SNV and ANDV, the inventor sought to determine the breadth of binding and neutralizing activity of the mAbs to OWH species. To test reactivity and neutralizing activity, he generated pVSVs bearing Gn and Gc from Puumala (pVSV/PUUV), Dobrava-Belgrade (pVSV/DOBV), Hantaan (pVSV/HTNV), and Seoul (pVSV/SEOV) viruses, as well as transiently transfected Expi293F cells to surface display the glycoproteins from PUUV, DOBV, HTNV, and SEOV (FIG. 2A, FIG. 9, FIG. 10). Six of the SNV-reactive mAbs showed reactivity to all four species tested, and four mAbs (SNV-24, -53, -57, and -68) showed reactivity and neutralizing activity of all four pVSVs tested (FIG. 2C). Interestingly, SNV-24 and SNV-57 were isolated from different human donors and had the same light chain variable gene usage (Table S1). Most (14 of 20) of the SNV-reactive mAbs demonstrated reactivity to PUUV, and many showed potent neutralization of PUUV in pVSV neutralization assays (FIG. 2A). Each of the broadly-reactive mAbs also was tested for, but did not demonstrate, detectable binding to mammalian cell-surface-displayed EEEV E1/E2 or RVFV Gn/Gc (data not shown), thus these are broadly-reactive hantavirus mAbs.

In contrast, most of the ANDV-reactive mAbs did not show detectable reactivity or neutralizing activity for OWH species (FIG. 2B). Only three mAbs (ANDV-5, -59, and -69) showed reactivity to PUUV, but these mAbs did not have any detectable neutralizing activity for pVSV/PUUV. ANDV-44 is the only mAb that showed detectable reactivity to HTNV, but this mAb also did not have any detectable neutralizing activity to pVSV/HTNV. Thus, the mAbs isolated from the ANDV-immune donor were largely ANDV-specific, while broadly reactive mAbs were isolated from donors previously infected with SNV. These results demonstrate that the SNV-reactive mAbs recovered show broad reactivity and neutralizing activity to OWH species, while ANDV-reactive mAbs the inventor isolated are generally species-specific.

Mapping of antigenic sites based on competition-binding analysis. The inventor next sought to determine the number of major antigenic sites recognized by human mAbs elicited during a NWH infection, especially the sites on Gn and Gc recognized by the potently neutralizing mAbs. To determine the patterns of binding, he used a flow cytometric-based competition-binding analysis on ANDV glycoproteins (FIG. 3). Black boxes indicate pairs of antibodies that competed for binding at the same site, grey boxes indicate antibodies that showed intermediate competition for binding, and white boxes indicate antibodies that did not compete for the same binding site. Antibodies were clustered based on competition with other mAbs, and thus mAbs binned together likely bind to a similar antigenic site. The data revealed that the mAbs in the two panels can be classified into different competition-binding sites, and there were eight different antigenic sites targeted by mAbs in the two panels. Over half of the SNV-reactive mAbs resided in one major group (designated site A1), mostly reflecting broad, potently neutralizing mAbs, while non-neutralizing SNV-reactive mAbs binned in a separate competition group (site E). Ultra-potently neutralizing ANDV-reactive mAbs binned into three distinct sites (site C1, D, and F). SNV-reactive and ANDV-reactive antibodies typically binned into separate competition-binding groups, however, there was overlap for two sites, A and C. Site C1 contained potently neutralizing and cross-reactive mAbs (SNV-53 and ANDV-44), while site C2 contained cross-reactive, but weakly neutralizing or non-neutralizing mAbs (SNV-21, ANDV-2, ANDV-12). Overlap also occurred between sites A1 and A2, in which non-neutralizing mAb SNV-50 competed with weakly neutralizing, cross-reactive mAb ANDV-59. SNV-reactive receptor-blocking mAbs competed with each other (site A1), and ANDV-reactive mAbs also competed with each other (site F), but these sites did not overlap. SNV-42 and SNV-3 did not have detectable binding to ANDV glycoproteins and thus were not competed against the ANDV-reactive mAbs. However, SNV-42 and SNV-3 bin into a distinct group when competed against the other SNV-reactive mAbs (FIG. 11). Based on the competition-binding groups, potently neutralizing and broadly reactive mAbs target multiple epitopes, and two cross-reactive sites exist for ANDV and SNV that are recognized by human B cells.

Figure 4A:
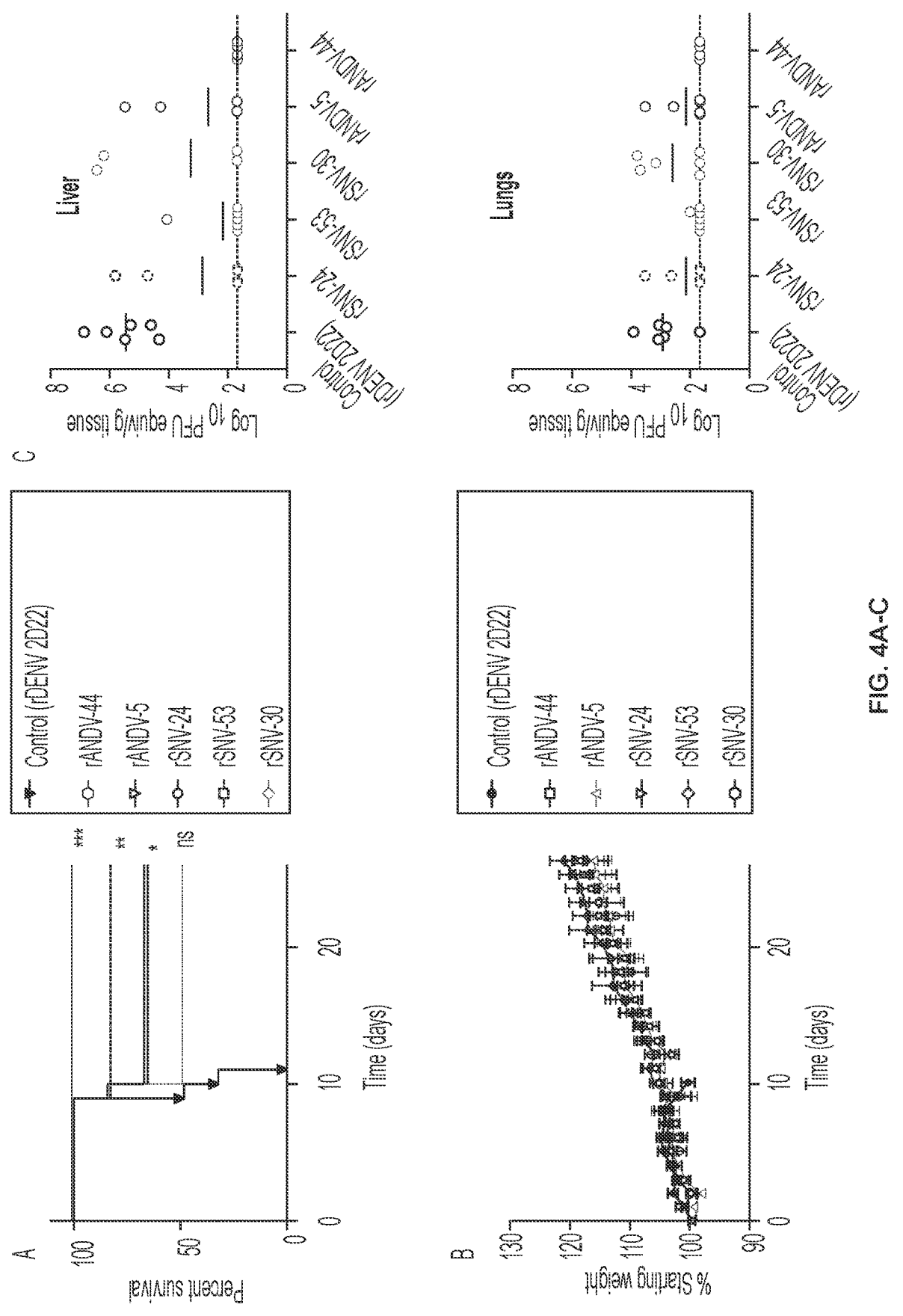
Figure 12:
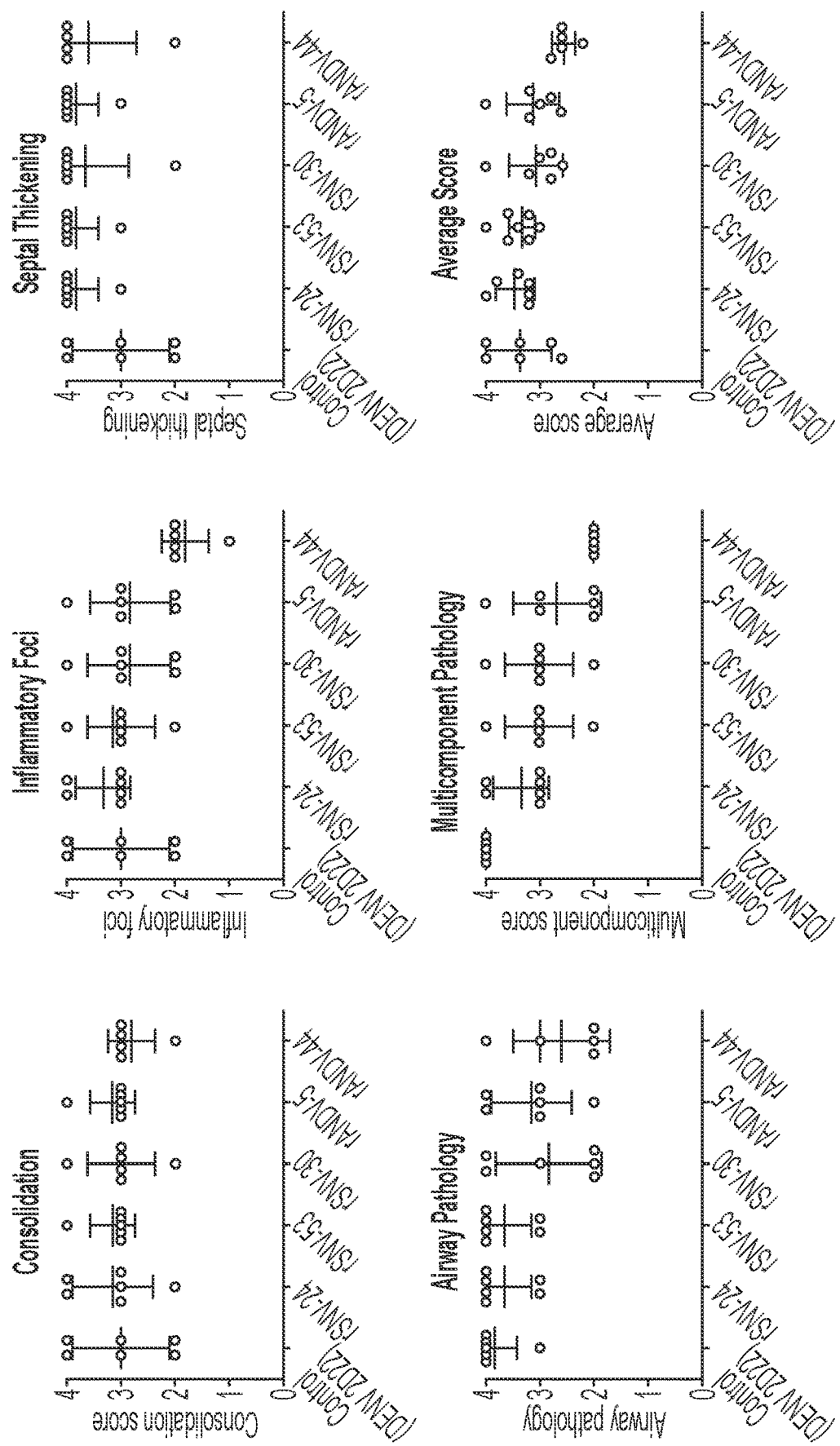
FIG. 12, Related to FIGS. 4A-C. Lung pathology scoring on animals treated with mAbs. Lungs were scored upon death or euthanasia.

Therapeutic efficacy in Syrian hamster model of infection. To determine if mAbs in the panel showed therapeutic efficacy in a post-exposure setting, the inventor tested five mAbs, three mAbs from the SNV-reactive panel and two mAbs from the ANDV-reactive panel, in a Syrian hamster model of ANDV pathogenesis. Syrian hamsters are the preferred model for hantavirus pathogenesis, and ANDV is the only NWH species that causes lethal respiratory failure in immunocompetent animals (Hooper et al., 2001 b). ANDV is lethal in Syrian hamsters and produces respiratory symptoms mimicking features of the pathogenesis during human infection, and thus is an appropriate model to test passive protection in a model of a post-exposure setting (Hooper et al., 2001 b; Wahl-Jensen et al., 2007). The inventor choose a subset of mAbs for animal protection studies based on their in vitro neutralizing characteristics, competition mapping, and breadth. One ANDV-specific mAb in group 1 (ANDV-5) and one cross-neutralizing mAb from group 2 (ANDV-44) were chosen from the ANDV-reactive panel. One cross-neutralizing mAb from group 2 (SNV-53), one cross-neutralizing mAb from group 3 (SNV-24), and one non-neutralizing mAb from group 4 (SNV-30) were chosen from the SNV-reactive panel. Syrian hamsters (n=6 per treatment group) were inoculated with 200 PFU of ANDV by the i.m. route, and then received 5 mg/kg of either rSNV-30, rSNV-24, rSNV-53, rANDV-5, rANDV-44 or a control antibody DENV 2D22 by the i.p. route on days 3 and 8 post-infection. All of the animals in the control group started displaying respiratory symptoms beginning on day 9, and all succumbed or were euthanized as required by IACUC protocol by day 11 post-infection. Three of the animals treated with SNV-30 succumbed or were euthanized by day 10 post-infection, two of the animals treated with SNV-24 or ANDV-were euthanized by day 11, and only one animal treated with SNV-53 succumbed at day 10 (FIG. 4A). All of the animals treated with ANDV-44 survived ANDV challenge, and showed a reduction in the multicomponent pathology in lungs (FIG. 12). Since the animals succumbed to disease very rapidly after the onset of symptoms, the inventor did could not measure significant weight loss between the control and treatment groups (FIG. 4B). He collected lungs and livers from moribund animals or animals upon the termination of the study, and measured the viral titer in tissues. Almost of the animals that succumbed between days 9 to 11 showed virus in the lungs and liver, while all of the animals that survived to the termination of the study lacked detectable virus in the lungs or liver (FIG. 4C).

Example 3—Discussion

Here, the inventor describes the isolation and characterization of NWH mAbs from the memory B cells of individuals who had recovered from previous ANDV or SNV infection. Most of the SNV-reactive mAbs reacted broadly with and neutralized multiple NWH and OWH species, but very few mAbs from SNV survivors showed potent neutralizing activity for wt SNV or wt ANDV. Conversely, most ANDV-reactive mAbs showed potent neutralizing activity for wt ANDV but were limited in breadth. The inventor demonstrated that the recognition sites for NWH-reactive mAbs map to at least eight distinct antigenic sites on the ANDV glycoprotein spike complex, and multiple sites of vulnerability for cross-reactive neutralization exist on Gn or Gc. Four NWH mAbs tested protected Syrian hamsters from ANDV infection in a very stringent lethal disease model.

The inventor used two different assays to test neutralization potency of the antibodies in the panel. The inventor performed neutralization assays with VSVs pseudotyped with hantavirus glycoproteins in BSL2 conditions, and with wt SNV or wt ANDV in BSL3 conditions. Previous work supports the conclusion that pVSV hantavirus neutralization assays provide results with comparable values to those obtained in FRNT assays using wt viruses (Higa et al., 2012; Hooper et al., 2014a; Perley et al., 2020). The $IC_{50}$ values for neutralization the inventor obtained were largely similar between the two assays conducted with ANDV-reactive mAbs, but many of the SNV-reactive mAbs that showed neutralizing activity in pVSV assays failed to neutralize wt SNV or wt ANDV. SNV-reactive mAbs were isolated based on binding to SNV Gn/Gc proteins from strain SNV CC107 displayed on transfected cell surfaces, while the wt SNV strain tested in neutralization was SN77734. Minor sequence variations might account for the differences seen in neutralization between the pVSV and wt SNV neutralization assays. Also, it is possible that the organization of the Gn/Gc complex expressed on mammalian cells or packaged in VSV particles differs significantly from the organization of those proteins on the surface of wt SNV virions.

The inventor observed incomplete neutralization and non-sigmoidal dose-response curves with antibody serial dilution for most of the mAbs in the panel to wt SNV. This result may stem from heterogeneity of virions particle in the suspensions used for neutralization, as hantavirus virions display a diverse range of particle morphologies (Parvate et al., 2019). Some HIV bnAbs also demonstrate distinctive non-sigmoidal neutralization curves and incomplete (<100%) neutralizing activity (McCoy et al., 2015; Webb et al., 2015). This feature is a characteristic of functional and epitope-specific classes of HIV bnAbs that target the glycan-rich gp41 membrane proximal external region, and may result from particle heterogeneity of glycosylation when HIV strains are produced in cell culture. Although it is not entirely clear what effect incomplete neutralization has on protective efficacy, as in the case of HIV, it is likely that bnAbs with neutralizing antibody activity slopes >1 show greater therapeutic potential (Webb et al., 2015). Diverse classes of hantavirus antibodies based on differing epitopes or mechanisms of action have not been described to date, and incomplete and non-sigmoidal neutralization may be a characteristic of hantavirus bnAbs. Recent evidence has supported the hypothesis that the hantavirus glycoprotein spike complex "breaths", exhibiting a movement in which the "open" form of the spike exposes the fusion loop for membrane insertion, but does not undergo the uncapping by Gn necessary to promote viral fusion (Bignon et al., 2019; Serris et al., 2020). This dynamic feature of the spike may expose decoy epitopes on Gc that are the target of weakly neutralizing mAbs. Such an epitope would be occluded in the "closed" form of the spike, and particle heterogeneity in terms of open or closed spike status could account for weak or incomplete neutralization demonstrated by mAbs in this study.

The inventor also tested NWH mAbs for receptor-blocking and fusion-inhibiting activity using in vitro assays and showed that the extent of fusion inhibition correlated with the potency of neutralizing activity for both SNV-reactive and ANDV-reactive mAbs. Only one ultra-potent neutralizing mAb, ANDV-5, blocked receptor binding. Therefore, blocking of PCDH-1 engagement may not be an essential feature of potent NWH neutralization. Receptor blocking is the major mechanism of neutralization for many viruses, however, blocking of PCDH-1 does not appear to predict the neutralization potency of the mAbs the inventor describes here. β3 integrins also have been shown to facilitate the entry of pathogenic hantaviruses into host cells, and mAbs may block interactions between Gn/Gc and integrin β3 to achieve potent neutralization (Gavrilovskaya et al., 1999; Gavrilovskaya et al., 2010; Gavrilovskaya et al., 1998). Further work may be required to determine if potently neutralizing mAbs block other receptor engagements, such as β3 integrins, or if there are other receptors or critical attachment factors that have yet to be identified.

Notably, the inventor observed asymmetric patterns of breadth of binding and neutralization for the mAbs isolated from SNV-immune donors compared with the mAbs isolated from the ANDV-immune donor. Many of the SNV mAbs bound to and neutralized heterologous hantavirus species, while most of the ANDV mAbs were specific to ANDV. Because the inventor isolated ANDV mAbs from a single recovered individual, it is possible that the ANDV-specific response he observed is a characteristic of this particular individual's response. However, he observed a diversity of antibody germline gene usage, antigenic site recognition, breadth, and neutralizing activity in the panel of mAbs obtained, suggesting this response of this ANDV-infected individual is likely species-specific. Little is known about the cross-reactivity of the human immune response to hantavirus infection, although cross-neutralizing activity to heterologous hantavirus species has been observed in sera from HFRS or HCPS patients (Chu et al., 1995). Previous work has shown that vaccination with cDNA encoding the SNV M gene segment failed to protect hamsters from lethal ANDV challenge, and failed to elicit cross-neutralizing antibodies in sera (Hooper et al., 2013). DNA vaccine strategies also have proceeded with a combination of HTNV/PUUV/ANDV/SNV M genes as an experimental candidate pan-hantavirus vaccine that protects against HFRS and HCPS species, however, this approach fails to induce neutralizing antibodies for SEOV or DOBV (Hooper et al., 2006; Hooper et al., 2013). The full-length M segment encoding Gn and Gc exhibits only ~50% amino acid sequence similarity between the most distantly related members of NWH versus OWH species (Guardado-Calvo et al., 2016; Li et al., 2016). Thus, it is notable that many of the antibodies isolated here cross-reacted broadly with the more distantly related hantavirus species. It is possible that most broadly reactive mAbs bind to the fusion protein Gc, which exhibits about 60% amino acid sequence identity across the hantavirus family (Guardado-Calvo et al., 2016). Gc is located proximal to the membrane and is shielded partially by Gn, and thus may be under less humoral immune pressure, especially in the region of the highly conserved fusion loop. Another recently published study by Duehr et al. also demonstrated that a candidate vaccine consisting of PUUV, HTNV, and ANDV antigens induced more Gc-reactive murine antibodies than candidate vaccines containing only ANDV antigens, further suggesting a critical role for antibodies to Gc in a broadly reactive humoral response (Duehr et al., 2020). A recent study described a co-crystal structure of the PUUV mAb 402 in complex with Gc that shows that the neutralizing mAb binds to a prefusion, monomeric form of Gc, further suggesting the importance of Gc in rational vaccine design for hantavirus species (Ilona Rissanen, 2020). Here, the inventors describes cross-reactive mAbs that show protection in heterologous hantavirus challenge studies. Four of the mAbs (SNV-24, -53, -57, and -68) showed neutralizing activity for all hantavirus species tested. Defining the sites targeted by these bnAbs can inform pan-hantavirus vaccine development, and these results suggest that SNV-based immunogens may be more effective in eliciting a cross-neutralizing antibody response.

The inventor mapped recognition sites for the NWH-reactive antibodies to eight distinct antigenic sites on the Gn/Gc spike through competition-binding assays using full-length IgG. Analyzing the patterns formed by competition-binding groups and the functional groups assigned by cross-neutralizing potency revealed that most of the ANDV and SNV-reactive mAbs segregated into separate groups. However, four ANDV-reactive mAbs that cross-reacted to SNV (ANDV-2, -12, -44, and -59) did compete for binding with SNV-reactive mAbs and clustered into overlapping competition-binding groups, indicating that there are cross-reactive sites on the NWH glycoprotein spike recognized by human B cells during infection. Two mAbs, SNV-53 and ANDV-44, which both showed potent and complete neutralizing activity for wt SNV and ANDV, competed for binding to a similar antigenic site on the glycoprotein spike. These findings indicate that NWH infections can elicit similar classes of potently neutralizing antibodies that target a cross-neutralizing site on NWH glycoproteins. Determining the critical antigenic sites targeted during ANDV and SNV infection will be essential for rational vaccine design and development of effective medical countermeasures against NWHs.

Two previous studies also tested passive transfer of ANDV neutralizing mAbs in hamster challenge studies and showed 100% protection in a less stringent model of infection (using 200 PFU delivered intranasally instead of by the more stringent i.m. route the inventor used here) and at a substantially higher dose of antibodies (25 or 50 mg/kg), respectively (Duehr et al. 2020; Garrido et al., 2018). In contrast, he showed efficacy of mAbs ANDV-44, ANDV-5, SNV-53 and SNV-24 in a low-dose antibody treatment (5 mg/kg) in a highly lethal (200 PFU i.m. challenge) model, which supports the potential for clinical use of these mAbs as therapeutic molecules to treat hantavirus infections. ANDV-44 showed complete protection in this model. These results suggest that mAbs described in this study are promising candidates for therapeutic treatment of hantavirus infection at lower doses than previously described.

As evidenced by the COVID-19 pandemic, newly emerging infectious diseases have the potential to impact the world profoundly, and disproportionately target the most vulnerable members of the society. Hantaviruses, in particular, thrive on social inequities due to the zoonotic transmission from rodents to humans in low-resource settings. Additionally, climate change has been linked to the spillover of hantaviruses from the rodent to the human population and will continue to be an issue as environmental destruction worsens globally (Prist et al., 2016). This work presents therapeutic candidates for the treatment of NWH-related disease and provides a foundation for further work characterizing the B cell response to NWH infection.

TABLE S1

Variable region and germline gene analysis of panel of human mAbs isolated from survivors of Sin Nombre infection.

| | | Heavy chain variable gene sequence | | | | | | | Light chain variable gene sequence | | | | | |
|---|---|---|---|---|---|---|---|---|---|---|---|---|---|---|
| mAb | Donor | V-gene and allele | V-region nucleotide homology to V-gene, % | D-gene and allele | J-gene and allele | CDR3 amino acids (aa) | CDR3 length (aa) | Isotype | V-gene and allele | V-region nucleotide homology to V gene, % | J gene, and allele | CDR3 amine acids (aa) | CDR3 length (aa) | Isotype |
| SNV-3 | 1487 | 6-1*01 | 99 | 1-1*01 | 6*02 | CARDRRKLEPPPFSYYYYGLDVW (SEQ D NO: 381) | 21 | IgG1 | 1-33*01 or 1D-33*01 | 99 | 4*01 | CQQYDNVPLTF (SEO ID NO. 401) | 9 | K |
| SNV-21 | 1486 | 3-33*01 or 3-33*06 | 97 | 3-22*01 | 6*03 | CARDGYYVSSGYHPLRYYYYMDVW (SEQ D NO: 382) | 23 | IgG1 | 4-1*01 | 98 | 4*01 | CQQYYSTPPLTF (SEQ ID NO: 402) | 19 | K |
| SNV-24 | | 3-23*01 or 3-23D*01 | 89 | 3-22*01 | 3*02 | CAKTMGPVSGQYAFDIW (SEQ ID NO. 383) | 15 | IgG1 | 3-1*01 | 95 | 3*02 | CQAWHSGSVF (SEQ ID NO: 403) | 8 | A |
| SNV-25 | | 4-4*02 | 98 | 6-19*01 | 4*02 | CARARGEWLAHFDYW (SEQ ID NO: 384) | 13 | IgG1 | 1-5*03 | 99 | 1*01 | CQQYNTDKTF (SEQ ID NO: 404) | 8 | K |
| SNV-27 | | 1-2*06 | 91 | 2-2*01 | 3*01 | CARKLGPLGDOSSSSCYSALDVW (SEQ ID NO: 385) | 21 | IgG1 | 1-5*03 | 98 | 1*01 | CQQYNTYSWTE (SEQ ID NO: 405) | 9 | K |
| SNV-30 | 1513 | 4-30-2*01 or 4-30-2*02 | 67 | 3-10*02 | 6*02 | DTAVYYCARAKPSNLNFYYYGMDVW (SEQ ID NO: 388) | 23 | IgG1 | 3-15*01 | 99 | 5*01 | CQQSDNWPPITF (SEQ ID NO: 406) | 10 | K |
| SNV-32 | | 1-69*01 or 1-690*01 | 95 | 3-16*01 | 5*02 | CARPSNLLNWFDPW (SEQ ID NO: 387) | 12 | IgG1 | 3-15*01 | 99 | 1*01 | CQQYDNRPOTF (SEQ ID NO: 407) | 9 | K |
| SNV-36 | | 3-33*01 or3-33*06 | 94 | 5-24*01 | 6*02 | CAFIPANGYSDYYYGMDVW (SEQ ID NO: 388) | 16 | IgG1 | 2-23*02 | 98 | 1*01 | CQSYADNRTPFLF (SEQ ID NO: 408) | 11 | A |
| SNV-39 | | 3-33*01 or 3-33*05 or 3-33*06 | 93 | 2-8*01 | 4*02 | CAFIGADNGLFTDSW (SEQ ID NO: 389) | 12 | IgG1 | 4-1*01 | 96 | 4*01 | CQQYSSIPLTF (SEQ ID NO: 409) | 9 | K |
| SNV-42 | | 3-48*03 | 97 | 5-12*01 | 4*02 | CARIPGGYTGYFDYW (SEQ ID NO: 390) | 13 | IgG1 | 1-40*01 | 99 | 3*02 | CQSYDSSLSGWVF (SEQ ID NO: 410) | 11 | A |
| SNV-45 | | 3-48*02 | 89 | 4-23*01 | 4*02 | CVRGRGQLATHFDYW (SEQ ID NO: 391) | 13 | IgG1 | 6-21*02 | 95 | 1*01 | CHQSNSLPWTS (SEQ ID NO: 411) | 9 | K |
| SNV-50 | 1487 | 3-23*01 or 3-230*01 | 95 | 1-26*01 | 3*01 | CAKGEIMRDTGVHDDAFDVW (SEQ ID NO. 392) | 18 | IgG1 | 1-9*01 | 97 | 2*03 | CQQVESYPYSF (SEQ ID NO: 412) | 9 | K |
| SNV-53 | | 5-51*01 | 97 | 2-2*01 | 4*02 | CVAVQGTMLDYW (SEQ ID NO: 393) | 10 | IgG1 | 1-40*01 | 95 | 3*02 | CQSYDISLSGWVF (SEQ ID NO: 413) | 11 | A |
| SNV-56 | | 3-21*01 | 95 | 12*01 | 6*02 | CARDPPLYSGYDLGYYYGMDVW (SEQ ID NO: 394) | 21 | IgG1 | 1-5*03 | 96 | 1*01 | CQQYNSYPWAF (SEC ID NO: 414) | 9 | K |

TABLE S1-continued

Variable region and germline gene analysis of panel of human mAbs isolated from survivors of Sin Nombre infection.

| | Heavy chain variable gene sequence | | | | | | | Light chain variable gene sequence | | | | |
|---|---|---|---|---|---|---|---|---|---|---|---|---|
| mAb Donor | V-

TABLE S2

Variable region and germline gene analysis of panel of human mAbs isolated from a survivor of Andes infection.

| mAb | Donor | Heavy chain variable gene sequence | | | | | | Light chain variable gene sequence | | | | |
|---|---|---|

TABLE S2-continued

Variable region and germline gene analysis of panel of human mAbs isolated from a survivor of Andes infection.

| | | Heavy chain variable gene sequence | | | | | | | Light chain variable gene sequence | | | | | |
|---|---|---|---|---|---|---|---|---|---|---|---|---|---|---|
| mAb | Donor | V-gene and allele | V-region nucleotide homology to V-gene, % | D-gene and allele | J-gene and allele | CDR3 amino acids (aa) | CDR3 length (aa) | Isotype | V-gene and allele | V-region nucleotide homology to V gene, % | J-gene and allele | CDR3 amino acids (aa) | CDR3 length (aa) | Isotype |
| ANDV-54 | | 3-33*01 or 3-33*06 | 97.22 | 18*01 | 4*02 | CARENTPTYNSGYYFDYW (SEO ID NO: 434) | 16 | IgG1 | 2-23*01 or2-23*03 | 98.96 | 3*02 | CCSYAGSSTWVF (SEQ ID NO: 460) | 10 | A |
| ANDV-59 | | 4-59*01 | 93.68 | 3-22*01 | 5*02 | CARVQGSDSSGYYHLKSDWFDPW (SEQ ID NO: 435) | 21 | IgG1 | 1-51*01 or 1-51*02 | 96.84 | 3*02 | CGTWDSSLSAPHWVF (SEQ ID NO: 451) | 13 | A |
| ANDV-69 | | 4-38-2*01 | 95.14 | 3-22*01 | 6*02 | CARAIYDSSGYSPFSGLDIW (SEO ID NO: 436) | 18 | IgG1 | 1-51*01 | 96.49 | 3*02 | CGTWDSSLNLWVF (SEQ ID NO: 452) | 11 | A |

TABLE S3

| | | Scores | | | | |
|---|---|---|---|---|---|---|
| | | 0 | 1 | 2 | 3 | 4 |
| A | Extent of inflammation (% tissue involved) | 0 | <10 | 10-30 | 30-60 | >60 |
| B | Inflammatory foci type | No inflammation | Patchy inflammatory foci, few (<2) | Patchy inflammatory foci, many (>2) | Large inflammatory foci, few (<2) | Large inflammatory foci, many (>2) |
| C | Inter-alveolar septa (IAS) | Thin and delicate | Thickened in <10% HPF | Thickened in <30% HPF | Thickened in <60% HPF | Thickened in >60% HPF |
| D | Air ways | Clear; no cells | Few cells in air way | Moderate cells in air way | More cells in air way; Epithelial hyperplasia | Occlusion of air way/ epithelial hyperplasia or desquamation |
| E | Alveoli/perivascular cuff/blood vessels/ pleuritis/cell types | Clear; no inflammatory cells | Few cells/Few PMN or MNC | Moderate cells/PVC/ mild congestion/mild pleuritis/mostly MNC | More cells/PVC/ more congestion and pleuritis/ more MNC and PMN | Abundant cells/large PVC/severe congestion or pleuritis/mixed cells |

*Adapted from Matute-Bello et al. (2011).

TABLE 1

NUCLEOTIDE SEQUENCES FOR ANTIBODY VARIABLE REGIONS

| Clone | SEQ ID NO: | Chain | Variable Sequence Region |
|---|---|---|---|
| SNV-24 | 1 | heavy | GAGGTGCAACTGTTGGAGTCTGGGGGAGGCTTGATACAGTCCGGGGGGTCGCTGAGACTCTCCTGTGTTGTCTCTGGAATCGATTTTAGCAACTATGCCATGACCTGGGTCCGCCACGCTCCAGGGAAGGGGCTGGAGTGGATCTCGACTATTAGTGGTAGTGGCGACACCACAAACTACGCAGACTCCGCGAAGGGCCGGTTCACCATCTCCAGAGACAATTCCAGGAACACACTGTTTGTGCGAATTAATAGCCTGAGAGCCGAGGACACGGCCATTTATTACTGTGCGAAAACTATGGACCAGTTTCTGGCCAATATGCTTTTGATATCTGGGGCCAAGGGACAAAGGTCACCGTCTCCTCA |
| | 2 | light | TCCTATGAGCTGACTCAGCCACCCTCAGTGTCCGTGTCCCCAGGACAGACAGCCACCATCACCTGTTCTGGAGATAATTTGGGGAATAAATTTGCTTCCTGGTATCAGCAGAAGCCAGGCCTGTCCCCTGTGTTGGTCATCTATCAAGATAAGAAGCGGCCCTCAGGAATCCCTGAGCGATTCTCTGGCTCCAACTCTGGGAACACAGCCACTCTGACCATCAGCGGGACCCAGGCTATGGATGAGGCTGACTATTTCTGTCAGGCGTGGCACAGCGGCTCGGTTTTCGGCGGAGGGACCAAGCTGACCGTCCTA |
| SNV-57 | 3 | heavy | CAGGTGCAGTTGGTGGAGTCTGGGGGAGGCGTGGTCCAGCCTGGGAGGTCCCTGAGACTCTCCTGTGCAGCCTCTGGATTCACCTTCAGTAGCTATGCCATGCACTGGGTCCGCCAGGCTCCAGGCAAGGGGCTGGAGTGGGTGGCACTTATATCACTTGATGGATTTAATACATACTATCCAGACTCCGTGAAGGGCCGATTCACCATCTCCAGAGACAGTTCCAAGAACACGCTGTTTCTGCAACTGAACAGTCTGAGAATTGAGGACACGGCTGTGTATTACTGTGTGAAAGATCGGGGTCCTACCGGTTCAGGGAGTTATGGGATGGACGTCTGGGGCCAAGGGACCACGGTCACCGTCTCCTCA |
| | 4 | light | TCCTATGAGTTGACTCAGCCACCCTCAGTGTCCGTGTCCCCAGGACAGACAGCCAGCATCACCTGCTCTGGAGATAAATTGGGGAATAAATTTGCTTGTTGGTATCAGCAGAAGCCAGGCCAGTCCCCTGTATTGGTCATCCATCAAGATAAGAAGCGGCCCTCAGGGATCCCTGAGCGATTCTCTGGCTCCAACTCTGGGAACACAGCCACTCTGACCATCAGCGGGACCCAGGCTGTGGATGAGGCTGACTATTACTGTCAGGCGTGGGACAGCAGCAATGTGGTCTTCGGCGGAGGGACCAAGCTGACCGTCCTA |
| SNV-68 | 5 | heavy | CAAGTGCAACTGCAAGAGTCGGGCCCAGGACTGGTGAAGCCTTCGGGGACCCTGTCCCTCACCTGCCTTGTGTCTGGTGGCTCCATCGGCAGCAGTCACTGGTGGAGTTGGGTCCGCCAGTCCCCAGGGAAGGGGCTGGAGTGGTTTGGAGAAATCCATCATACTGAGAGTACCAACTACAACCCGTCCCTCAAGAGTCGAGTCACCATAACTATGGACAAGTCCAAGAACCAATTCTACCTGAAGCTGACCTCTGTGACCGCCGCGGACACGGCCGTATATTATTGTGCGAGAGCAGGGGCGACCTTCGCGGAACCTTTTTCTTTGTGGGGCCAAGGGACAATGGTCACCGTCTCTCCA |
| | 6 | light | GACATCCAGATGACCCAGTCTCCTTCTACCCTGTCTGCATCTGTAGGAGACAGAGTCACCATCACTTGCCGGGCCGGTCAGAGTGTGACTAACTGGTTGGCCTGGTATCAGCAGAAACCAGGGAAAGCCCCTAAGCTCCTGATCTATAAGGCGTCTATTTTAGCAAGTGGAGTCCCTTCAAGGTTCAGCGGCAGTGGATCTGGGACAGAATTCACTCTCACCATCAGCAGTGTGCAGCCTGATGATTCTGCAGTTTATTACTGCCAACAGTATAAAAGTCACCGGACGTTCGGCCAGGGGACCAAGGTGGAAATCAAA |
| SNV-25 | 7 | heavy | CAGGTGCAGCTGCAGGAGTCGGGCCCAGGACTGGTGAAGCCTTCGGGGACCCTGTCCCTCACCTGCGCTGTCTCTGGTGGCTCCATCAGTAGTAGTAACTGGTGGAGTTGGGTCCGCCAGCCCCCAGGGAAGGGGCTGGAGTGGATTGGGGAAATCTATCATAGTGGGAGCACCAACTACAACCCGTCCCTCAAGAGTCGAGCCACCATATCAGTAGACAAGTCCAAGAACCAGTTCTCCCTGAAGTTGAGCTCTGTGACCGCCGCGGACACGGCCTTCTATTACTGTGCGAGAGCCAGGGGGGAGTGGCTGGCCCACTTTGACTACTGGGGCCAGGGAACCCTGGTCACCGTCTCCTCA |
| | 8 | light | GACATCCAGATGACCCAGTCTCCTTCCACTCTGTCTGCATCTGTAGGAGACAGAGTCACCATCACTTGCCGGGCCAGTCAGAGTATTAGTAGATGGTTGGCCTGGTATCAGCAGAAACCAGGGAAAGCCCCTAAGCTCCTGATCTATAAGGCGTCTAGTTTAGAAAGTGGGGTCCCATCAAGGTTCAGCGGCAGTGGATCTGGGACAGAATTCACTCTCACCATCAGCAGCCTGCAGCCTGATGATTTTGCAATTTATTACTGCCAACAGTATAATACTGATAAGACGTTCGGCCAAGGGACCAAGGTGGAAATCAAA |
| SNV-53 | 9 | heavy | GAGGTGCAGCTGGTGCAGTCTGGAGCAGAGGTGAAGACGCCCGGGGAGTCTCTGAAGATCTCCTGCAAGGGTTCTGGATACAGGTTTTACACCTACTGGATCGCCTGGGTGCGCCAGATGCCCGGGAAAGGCCTGGAGTGGATGGGCATCATCTATCCTGGTGACTCTGATCCCAGATACAGCCCGTCCTTCCAAGGCCAGGTCACCATCTCAGCCGACAAGTCCATCAGCACCGCCTACCTGCAGTGGAGCAGCCTGAAGGCCTCGGACACCGCCATGTATTACTGTGTGAGAGTACAAGGGACTATGTTGGACTACTGGGGCCAGGGAACCCTGGTCACCGTCTCCTCA |

TABLE 1-continued

NUCLEOTIDE SEQUENCES FOR ANTIBODY VARIABLE REGIONS

| Clone | SEQ ID NO: | Chain | Variable Sequence Region |
|---|---|---|---|
| | 10 | light | CAGTCTGTACTGACGCAGCCGCCCTCAGTGTCTGGGGCCCCAGGGCAGAGCGTCACCATCTCCTGTTCTGGGAGCAGC<br>TCCAACATCGGGGCAGGTTATGATGTACACTGGTACCAGCAGCTTCTAGGAAGAGCCCCAAACTCCTCATCCATGGT<br>AACAGCAATCGGCCCTCAGGGGTCCCGGACCGATTCTCTGGCTCCAAGTCTGGCACCTCAGGTTCCCTGGCCATCACTG<br>GGCTCCAGTCTGAGGATGAGGCTGATTATTACTGCCAGTCCTATGACATCTCTCTGAGTGGTTGGGTTTTCGGCGGAG<br>GGACCAAGCTGACCGTCCTG |
| SNV-32 | 11 | heavy | CAGGTGCAACTGGTGCAGTCTGGGGCTGAGGTGAAGAAGCCTGGGTCTTCGGTGAAGGTCTCCTGCAGGGCTTCTGG<br>AGGCACCTTCCGCAGCTATTCTATCAGCTGGGTGCGACAGGCCCCTGGACAAGGGCTTGAGTGGATGGGAGATATCA<br>TCCCCATCTTTAGTACAACAAACTACGCACAGAAGTTCCAGGGCAGAGTCACGATTACCGCGGACGAAGCCACGAGCA<br>CAGCCTACATGGAGCTGAGCAGCCTGAGATCTGACGACACGGCCGTATATTACTGTGCGAGACCGTCAAATTTACTTA<br>ATTGGTTCGACCCCTGGGGCCAGGGAACCCTGGTCACCGTCTCCTCA |
| | 12 | light | GAAATAGTGATGACGCAGTCTCCAGCCACCCTGTCTGTGTCTCCAGGGGAAAGAGCCACCCTCTCCTGCAGGGCCAGT<br>CAGAGTGTTAACAGCAACTTAGTCTGGTACCAGCAGAAACCTGGCCAGGCTCCCAGGCTCCTCATCTATGGTGCATCC<br>ACCAGGGCCACTGGTATCCCAGCCAGGATCAGTGGCAGTGGGTCTGGGACAGAGTTCACTCTCACCATCAGCAGCCTG<br>CAGTCTGAAGATTTTGCAGTTTATTACTGTCAGCAGTATGATAACAGGCCTCAGACGTTCGGCCAAGGGACCAAGGTG<br>GAAATCAAA |
| SNV-39 | 13 | heavy | CAGGAGCAATTGGAGGAATCTGGGGGAGGCGTGGTCCAGCCTGGGAGGTCCCTGACACTCTCCTGTGCAGCGTCTGG<br>ATTCACCTTCAGGAGCTATGACATGCACTGGGTCCGCCAGGCTCCAGGCAAGGGGCTGGAGTGGGTGGCACTTATATC<br>GTATGATGGAAGAAATAAACACTATGGAGACTCCGTGAAGGGCCGATTCACCATCTCCAGAGACAATTCCAAGAACAC<br>GCTCTATCTGCACTTGAGCAGCCTGAGAGCCGAGGACACGTCTGTCTATTACTGCGCGAGAGGGGCTGATAATGGTCT<br>ATTTACCGACTCCTGGGGCCAGGGAACCCTGGTCATCGTCTCCTCA |
| | 14 | light | GACATCGTGATGACCCAGTCTCCAGACTCCCTGGCCGTGTCTCTGGGCGACAGGGCCACCATCAACTGCAAGTCCAGC<br>CAGAGTGTTTTGTACGGCTCCACCAATAAAAACTrCTTAGCTTGGTACCAACAGAAACCAGGACAGCCTCCTAAGCTGC<br>TCATCTACTGGGCATCTGCCCGGGAATCCGGGTCCCTGACCGATTCAGTGGCAGCGGGTCTGGGACAGATTTCACTC<br>TCACCATCAGCAGCCTGCAGACTGAAGATGTGGCAGTTTATTACTGTCAGCAATATTCTAGTATTCCGCTCACTTTCGGC<br>GGAGGGACCAAGGTGGAGATCAAA |
| SNV-27 | 15 | heavy | CAGGTGCAGCTGGTGCAGTCTGGGGCTGAGGTGAAGAAGCCTGGGGCCTCAGTGAGGGTCTCCTGCAAGGCTTATG<br>GATACAGCTTCAACGACTACTTTATGCACTGGGTGCGACAGGCCCCTGGGCAGGGGCTTGAGTGGATGGGCCGGGTC<br>AAACCGAGCACTGGTGGCACAAGATATGCACAGAAGTTTCAAGGCAGGGTCACCATGACCCTGGACACCTCCACCAGT<br>ACAGCCTACGTGGAGCTGAGCAGTCTGAGTTCTGACGACACGGCCGTATATTTCTGTGCGAGAAAGTTAGGTCCACTA<br>GGAGATTGTAGTAGTTCCAGCTGTTATTCTGCTCTTGATGTCTGGGGCCAAGGGACAATGGTCACCGTCTCCTCA |
| | 16 | light | GACATCCAGATGACCCAGTCTCCTTCCACCCTGTCTGCATCTGTAGGAGACAGAGTCACCATCACTTGCCGGGCCAGTC<br>AAAGTATTAGTAACTGGTTGGCCTGGTATCAGCAGAAACCAGGGAAAGCCCCTAAGCTCCTGATCTCTAAGGCGTCTA<br>GTTTAGAAAGTGGGGTCCCATCAAGGTTCAGCGGCAGTGGATCTGGGACAGAATTCACTCTCACCATCGGCAGCCTGC<br>AGCCTGATGATTTTGCAACTTATTACTGCCAACAGTATAATACTTATTCGTGGACGTTCGGCCAAGGGACCAAGGTGGA<br>CATCAAA |
| SNV-62 | 17 | heavy | CAGGTACTCCTGGTGCAGTCTGGGGCTGAGGTGAAGAAGCCTGGGGCCTCAGTGAAGGTCTCCTGCAAGGCATCTGG<br>ATACACCTTCACCAGTTACTTTATTCACTGGGTGCGACAGGCCCCTGGACAGGGGCTTGAGTGGATGGGAATGATCAA<br>CCCTATTAGTGGAAACACAAATTACGCACAGAAGTTCCAGGGCAGAGTCACCATGACCAGGACACGTCCACGAGGA<br>CAGTCTACATGCAGCTGAGTAGCCTGACATTTGAAGACACGGCCGTATATTCCTGTGTGAGATGGACTACGGTGCCTT<br>CGTCTTTTGACTTTTGGGGCCAGGGAACCCTGGTCACCGTCTCCTCA |
| | 18 | light | TCCTATGAGCTGACACAGCCACCCTCGGTGTCAGTGTCCCCAGGACAGACGGCCAGGATCACCTGTTCTGGAGATGCA<br>CTGCCAAATCAATATGTTAATTGGTACCAGCAGAAGCCAGGCCAGGCCCCGGTGTTGATGATGTTTAAAGACAATCAG<br>AGGCCCTCAGGTATCCCTGAGCGATTCTCTGGCTCCAGGTCCGGGACAACAGTCACGTTGAGTATAAGTGGAGTCCAG<br>GCAGAAGACGAGGCTGACTATCACTGTCAATCAGACAGAACTGCTACTTCTGTGGCTTTCGGCGGAGGGACCAA<br>GCTGACCGTCCTT |
| SNV-30 | 19 | heavy | CAGCTGCAGCTGCAGGAGTCCGGCTCACGACTGGTGAAGTCTTCAGAGACCCTGTCCCTCACTTGTGCTGTCTCTGGT<br>GGCGCCATCACCAGTGGTCGTAATACCTGGAGCTGGATCCGGCAGCCACCAGGGAAGGGCCTGGAGTGGATTGGGTT<br>CATCTATTATAGTGGGAGCACGTACTCCAACCCGATCACTTACTCCAGCCGTCCCTCAAGAGTCGAGTCACCATATCA<br>TTAGACACGTCCAAGAACCAGTTCTCCCTGAAGCTGAACTCTGTGACCGCCGCGGACACGGCCGTGTATTATTGTGCCA<br>GAGCGAAGCCCAGTAACTTGAACTTCTACTACTACGGTATGGACGTCTGGGGCCAAGGGACCACGGTCACCGTC ICCT<br>CA |
| | 20 | light | gaaatagtgatgacgcagtctccagccaccctgtctgtgtctccaggggaaagagccaccctctcctgcagggccagt<br>CAGAGTGTTAGCAGCAACTTAGCCTGGTACCAGCAGAAACCTGGCCAGGCTCCCAGGCTCCTCATCTATGGTGCCTCC<br>ACCAGGGCCACTGGTATCCCAGCCAGGTTCAGTGGCAGTGGGTCTGAGACAGAGTTCACTCTCACCATCAGCAGCCTG<br>CAGTCTGAAGATTTTGCAGTTTATTACTGTCAGCAGTCTGATAACTGGCCCCCGATCACCTTTGGCCAAGGGACCCGAC<br>TGGAGATTAAA |
| SNV-45 | 21 | heavy | GAACTGCAACTAGTGGAGTCTGGGGGAGGCCTCATACGGCCGGGGGGTCCCTGAGACTCTCCTGTACAGCCGCTGG<br>ATTCACCTTCAGTAATTATAACATGAATTGGGTCCGCCAGGCTCCAGGGAAGGGGCTGGACTGGGTTTCATATATTAG<br>TAGTAGTGGTGGAACCACTATCTACGCAGACTCTGTGAAGGGCCGATTCACCATCTCCAGAGACAATGCCAAGGACTC<br>ACTCTATCTGCAAATGAACAGCCTGAGAGACGACGACACGGCTATTTATTACTGTGTGAGAGGCCGGGGCAGCTCG<br>CCACTCACTTTGACTACTGGGGCCAGGGAACCCTGGTCACCGTCTCCTCA |
| | 22 | light | GAAAGTGTGCTGACTCAGTTTCCAGACTTTCAGTCTGTGACTCCGAAGGAGAAAGTCACCATCACCTGCCGGGCCAGT<br>CAGAGCATTCATATTAACTTACACTGGTACCAACAAAAACCACATCAGTCTCCAAAGCTCCTCATCAAGTATGCTTCCCA<br>GTCCATCGCAGGGGTCCCCTCGAGGTTCAGTGGCAGTGGATCTGGGACAGAATTCACCCTCACCATCAATGCCTGGA<br>AGCTGAAGATGCTGCAACGTATTACTGTCATCAGAGTAATAGTTTACCGTGGACGTTCGGCCAAGGGACCAAGGTGG<br>aaatcaaa |

TABLE 1-continued

NUCLEOTIDE SEQUENCES FOR ANTIBODY VARIABLE REGIONS

| Clone | SEQ ID NO: | Chain | Variable Sequence Region |
|---|---|---|---|
| SNV-36 | 23 | heavy | CAGGTGCAGCTGGTGGAGTCTGGGGGAGGCGTGGTCCAGCCTGGGAGGTCCCTGAGACTCTCCTGTGCAGCGTCTGG ATTCAGGTTCAGTAGCTATGCCATGCACTGGGTCCGCCAGGCTCCAGGCAAGGGGCTGGAGTGGGTGGCAACTATCT GGTTTGATGGGACTAACGAATACTATGGAGACTCCGCAGGGGCCGATTCACCATCTCCAGAGACAATTCCATGAGCA CGCTTTATCTGCAAATGAACAGCCTGAGAGTCGAGGACACGGCTGTGTATTACTGTGCGAGACCCGCAAATGGCTACA GTGACTACTACTATGGTATGGACGTCTGGGGCCAAGGGACCACGGTCACCGTCTCCTCA |
| | 24 | light | CAGTCTGCCCTGACTCAGCCTGCCTCCGTGTCTGGGTCTCCTGGACAGTCGATCACCATCTCCTGCACTGGAACCAGCA GTGATGTTGGGACTTATAACCTTGTCTCCTGGTACCAACAGCACCCAGGCAAAGCCCCCAAACTCATGATTTTTGAGGT CAATAAGCGGCCCTCAGGGGTTTCTTATCGCTTCTCTGGCTCCAAGTCTGGCAACACGGCCTCCCTGACAATCTCTGGG CTCCAGGClGAGGACGAGGCTGATTATTACTGCTGCTCATAlGCAGATAATAGAACTCCCTTTCTCTTCGGAACTGGGA CCAAGGTCACCGTCCTAGGTCA |
| SNV-67 | 25 | heavy | CAGGTGCAGCTGGTGCAGTCCGGGGCTGAGGTGAAGAAGCCTGGGGCCTCAGTGAGGGTCTCCTGCAAGGCTTCTG GATACACCTTCACCGCCTACTTTATGAACTGGGTGCGACAGGCCCCTGGACAAGGGCTTGAGTGGATGGGACGGATC AACCCTATCAGTGGTGACACAAACTTTGCACAGAATTTTCAGGGCAGGGTCACCATGACCAGGGACACGTCCATCACT ACAGTCTACATGGAGCTGAACAGGCTGACATCTGACGACACGGCCGTGTATTATTGTGCGAGAGTTAGAAGTGGTTAT TCCTATATTGACTTCTGGGGCCAGGGAACCCTGGTCACCGTCGCCTCA |
| | 26 | light | TCCTATGACCTGACACAGCCACCCTCGGTGTCAGTGTCCCAGGACAGACGGCCCGGATCACCTGCTCTGGAGATGCT TTGTCAAACCAATATGCTTATTGGTATCAGCAGAGGCCAGGCCAGGCCCCTGTAGTGGTCATATATAAATATAGTGAG AGGCCGTCAGGGATCCCTGAGCGATTCTCTGGCTCCAGCTCAGGGACAACAGTCACGTTGACCATCAGTGGAGTCCAG GCAGAAGACGAGGCTGACTATTACTGTCAATCAGCAGACAGGCTTGGTACTTATTGGGTTTTCGGCGGAGGGACCAA GCTGACCGTCCTA |
| SNV-21 | 27 | heavy | CAGGTGCAACTGGTGGAGTCTGGGGGAGGCGTGGTCCAGCCTGGGAGGGCCCTGAGACTCTCCTGTGCAGCGTCTGG GATTCACCTTTAGCAGCTATGGCATGCACTGGGTCCGCCAGGCTCCAGGCAAGGGGCTGGAGTGGGTGGCAGTTGTT TGGAATGATGGCGGTAATAAATACTATGCAGACTCCGTGAAGGGCCGATTCACCATCTCCAGAGACAATTCCAAGAAC ACGCTGTATCTGCAAATGAACAGCCTGAGAGCCGAGGACACGGCTGTGTATTTCTGTGCGAGAGATGGTTACTATGTT AGCAGTGGTTATCACCCTCTAAGGTACTACTACTACTACATGGACGTCTGGGGCAAAGGGACCACGGTCGCCGTCTCC TCA |
| | 28 | light | GACATCGTGATGACCCAGTCTCCAGACTCCCTGGCTGTGTCTCTGGGCGAGAGGGCCACCATCAACTGCAAGTCCAGC CAGAGTGTTTTATACAGCCCCAACAATAAGAACTACTTAGCTTGGTACCAGCAGAAACCAGGACAGCCTCCTAAGCTG CTCATTTACTGGGCATCTACCCGGGAATCCGGGGTCCCTGACCGATTCAGTGGCAGCGGGTCTGCGACAGATTTTACTC TCACCATCGACAGCCTGCAGGCTGAAGATGTGGCAGTTTATTACTGTCAGCAATATTATAGTACTCCTCCGCTCACTTTC GGCGGAGGGACCAAGGTGGAGATCAAA |
| SNV-50 | 29 | heavy | GAGATGCAGCTGTTGGAGTCTGGGGGAGGCTTGATCCAGCCTGGGGAGTCCCTGAGACTCTCCTGTGCAGGCTCTGG ATTCACCTTTAGGAACTATGCCATGAGCTGGGTCCGCCAGGCTCCAGGGAAGGGGCTGCAGTGGGTCTCAGCTATTAG TGCTAGTGGTGGTATCACACACTACGCAGATCCGTGAAGGGCCGGTTCACCATCTCCAGAGACAACTCCAAGAATAC GCTGTTTCTGCAAATGAACAGCCTGAGAGCCGAGGACACGGCCGTATATTACTGTGCGAAAGGGGAGATAATGAGAG ACACAGGGTACCATGATGATGCTTTTGATGTCTGGGGCCAAGGGAAAATGGTCACCGTCTCTTCA |
| | 30 | light | GACATCCAGTTGACCCAGTCTCCATCCTTCCTGTCTGCATCTGTAGGAGACAGAGGTCACCATCACTTGCCGGGCCAGTC AGGGCATTAGCAGTTATTTAGTCTGGTATCAGCAAAAACCAGGGAAGCCCCTAAAGCTCCTGATCTATACTGCATCCAC TTTGCAAAGTGGGGTCCCATCAAGGTTCAGCGGCAGTGGATCTGGGACAGAATTCACTCTCACAATCAGCAGCCTGCA GCCTGAAGATTTTGCAACTTATCACTGTCAACAGGTTGAGAGTTACCCGTACAGTTTTGGCCAGGGGACCAAGCTGGA GATCAAA |
| SNV-56 | 31 | heavy | GAGGTGCAGCTGGTGGAGTCTGGGGGACGCCTGGTCAGGCCTGGGGGGTCCCTGAGACTCTCCTGTGCAGCCTCTGG ATTCACCTTCAGTCACTATAACATGAATTGGGTCCGCCAGGCTCCAGGGAAGGGGCTGGAGTGGGTCTCATCCATTAA TAGTAGAAATGGTTATACATACTACGCAGACTCAGTGAAGGGCCGATTCACCATCTCCAGAGACAACGCCAAGAACTC ACTGTATCTGCAAATGAACAGCCTGAGACCCGAGGACACGGCTGTCTATTACTGTGCGAGAGACCCCCCCCCTTTATAGT GGCTACGACTTAGGCTATTACTATTACGGTATGGACGTCTGGGGCCAAGGGACCACGGTCACCGTCTCCTCA |
| | 32 | light | GACATCCAGATGACCCAGTCTCCTTCCACCCTGTCTGCATTTGTAGGAGACAGAGTCACCATCACTTGCCGGGCCAATC aaaatattagtaagtggttggcctggtatcagcagaaaccagggaaagcccctaatctcctgatccataaggcgtcga GTTTAGAAAGTGGGGTCCCATCAAGGTTCAGCGGCAGTGGATCTGGGACAGAATTCACTCTCACCATCAGCAGCCTGC AGCCTGATGATTTTGCAACTTATTCCTGCCAACAGTATAATAGTTATCCGTGGGCGTTCGGCCAAGGGACCAGGGTGG AAAT CAAA |
| SNV-65 | 33 | heavy | CAGGTGCAGCTGCAGGAGTCGGGCCCAGGTCTGGTGAAGCCTTCACAGACCCTGTCCTCACTTGCACTGTCTCTGGT GGTTCCATCAGCAGTGGCGGTTACTTCTGGAGCTGGATCCGCCAGCACCCAGGGAAGGGCCTGGAGTGGATTGGGTA CATCTATTACAGTGGGAGCACCTACTACAACCCGTCCCTCAAGAGTCGAGTTACTATATCAATTGACACGTCTAAGATC CAGTTTTCCCTGAAGCTGACCTCTGTGACTGCCGCGGACACGGCCGTGTATTACTGTGCGAGAGATGTAGGTGGTTTT GATATCTGGGGCCAAGGGACAATGGTCACCGTCTTCA |
| | 34 | light | GACATCCAGATGACCCAGTCTCCATCCTCCCTGTCTGCATCTATAGGAGACAGAGTCACCATCACTTGCCAGGCGAGTC AGGACATTAACAAGTATTTAAATTGGTATCAGCAGAAACCAGGGAAAGCCCCTAAGGTCCTGATCTACGATGCATCCA ATTTGGAAACAGGGGTCCCATCAAGGTTCAGTGGAAGTGGATCTGGGACAGATTTTACTTTCACCATCAGCAGCCTGC AGCCTGAAGATGTTGCAACATATTACTGTCAACAGTATGAGAATCTCCCTCGGACGTTCGGCCAAGGGACCAAGGTGG aaatcaaa |
| SNV-66 | 35 | heavy | CAGGTGCAGCTGGTGGAATCTGGGGGAGGCGTGGTCCAGCCTGGGAGGTCCCTGAGACTCTCCTGTGCAGCCTCTGG ATTTACCTTCAGAAGTTATGGCATGCACTGGGTCCGCCAGGCTCCAGGCAAGGGGCTGGAGTGGGTGGCACTTATrTC ACTTGATGGATCTGAGAAACATTATGCAGACTCCGTTAAGGGCCGACTCACCATCTCCAGAGACAACTCCAAGAACAT GTTGTATCTGCAAATGAACAACCTGAGAGTTGAGGACACGGCTGTTTACTATTGTGCGAAAGATCGCCCGTACAGCTG GAGGGACGTCCTTGACTACTGGGGCCAGGGAACCCTGGTCACCGTCTCCTCA |

TABLE 1-continued

NUCLEOTIDE SEQUENCES FOR ANTIBODY VARIABLE REGIONS

| Clone | SEQ ID NO: | Chain | Variable Sequence Region |
|---|---|---|---|
| | 36 | light | GACATCCAGATGACCCAGTCTCCTTCCTCCCTGTCTGCATCTGTAGGCGACAGAGTCACCATCACTTGCCGGGCGAGTC<br>GGGACATTCACACCTCTTTAAATTGGTATCAACACACCCCGGGGAAAGCCCCTGAGCTCCTCATCTACGCTGCATCCAC<br>TTTGGAGATGGGGGTCCCATCGAGATTCAGTGGAAGTGGATCAGGGACAGATTTTCACCATCAGCAGCCTGCA<br>GCCTGAAGATATTGCAACATATTACTGTCAACAGTATGATGAGCTCCCTCTCACTTTCGGCGGAGGGACCAAGGTGGA<br>GATGAAA |
| SNV-40 | 37 | heavy | CAGGTACAGCTGCAGCAGTCAGGTCCAGGACTGGTGAAGCCCTCGCAGATCCTCTCACTCACCTGTGCCATCTCCGGG<br>GACAGTGTCTCTAGCAACCGTGCTGCTTGGAACTGGATCAGGCAGTCTCCATTGAGAGGCCTTGAGTGGCTGGGAAG<br>GACATACTACAGGTCCAAGTGGTATAATGATTATGCACTATCTGTGAAAAGTCGAATAAGCATCAACCCAGACACATCC<br>AAGAACCAGTTCTCCCTGCAGCTGAACTCTGTGACTCCCGAGGACACGGCTGTGTATTACTGTGCAAGAACTCCGAGG<br>GCTTATAGCAGTGGCTGGCACGTTCCTTATTATTATTCCGGTATGGACGTCTGGGGCCAAGGGACCACGGTCACCGTCT<br>CCTCA |
| | 38 | light | GACATCCAGATGACCCAGTCTCCATCCTCCCTGTCTGCATCTATAGCAGACAGAGTCACCATCACTTGCCAGGCGAGTC<br>AGGACATCAGCGACCATTTAAATTGGTATCAGCAGAAGCCAGGGACAGCCCCTAAGCTCCTGATCTACGATGCATCCA<br>ATTTGGAAACAGGGGTCCCATCAAGGTTCAGTGGGAGTGGATCTGGGACAGATTTTACTTTCACCATCAACAGGCTGC<br>AGCCTGAAGATTTTGCAACATATTACTGTCAACAGTATGATGAGGTCCCTCCGACATTCGGCCAAGGGACCAAGGTGG<br>ACATCAGA |
| SNV-3 | 39 | heavy | CAGGTACAGCTGCAGCAGTCAGGTCCAGGACTGGTGAAGCCCTCGCAGACCCTCTCACTCACCTGTGCCATCTCCGGG<br>GACAGTGTCTCTAGCAACAGTGCTGCTTGGAACTGGATCAGGCAGTCCCCATCGAGAGGCCTTGAGTGGCTGGGAAG<br>GACATACTACAGGTCCAAGTGGTATAATGATTATGCAGTATCTGTGAAAAGTCGAATAACCATCAACCCAGACACATC<br>GAAGAACCAGTTCTCCCTGCAGATGAACTCTGTGACTCCCGAGGACACGGCTGTGTATTATTGTGCAAGAGATAGAAG<br>AAAACTGGAACCACCTCCTTTTTCGTACTACTACTACGGTTTGGACGTCTGGGGCCAAGGGACCACGGTCACCGTCTCC<br>TCA |
| | 40 | light | GACATCCAGATGACCCAGTCTCCATCCTCCCTGTCTGCATCTGTAGGAGACAGAGTCACCATCACTTGCCAGGCGAGTC<br>AGGACATTAGCAACTATTTAAATTGGTATCAGCAGAAACCAGGGAAAGCCCCTAAGCTCCTGATCTACGATGCATCCA<br>ATTTGGAAACAGGGGTCCCATCAAGGTTCAGTGAAGTGGATCTGGGACAGATTTTACTTTCACCATCAGCAGCCTGC<br>AGCCTGAAGATATTGCAACATATTACTGTCAACAATATGATAATGTCCCCCTCACTTTCGGCGGAGGGACCAAGGTGG<br>agatcaaa |
| SNV-42 | 41 | heavy | GAGGTGCAGCTGGTGGAGTCTGGGGGAGGCTTGGTACAGCCTGGAGGGTCCCTGAGACTCTCCTGTGCAGCCTCTGG<br>ATTCACCTTCAGTACTTATGAAATGAACTGGGTCCGCCAGGCTCCAGGGAAGGGGCTGGAGTGGATTTCATACATTAG<br>AAGTAGTGGTAGTACCGTATACTACGCAGACTCTGTGAAGGGCCGATTCACCATCTCCAGAGACAACGCCAAGAACTT<br>ACTGTATCTGCAAATGAACAGCCTGAGAGCCGGGACACGGCTGTTTATTACTGTGCGAGAATACCCGGTGGATATAC<br>TGGCTACTTTGACTATTGGGGCCAGGGAGCCCTGGTCACCGTCTCCTCA |
| | 42 | light | CAGTCTGTGCTGACGCAGCCGCCCTCAGTGTCTGGGGCCCAGAGGGTCACCATCTCCTGCACTGGGAGCAG<br>CTCCAACATCGGGCAGGTTATTATGTACACTGGTACCAGCAGCTTCCAGGAACAGTCCCCAAACTCCTCATCTATGGT<br>aacaacaatcggccctcagggggtccctgaccgattctctggctccaagtctggcacctcagcctccctggccatcactg<br>GGCTCCAGACTGAGGATGAGGCTGATTATTACTGCCAGTCCTATGACAGCAGCCTGAGTGGTTGGGTGTTCGGCGGA<br>GGGACCAAGCTGACCGTCCTA |
| ANDV-2 | 2.11 | heavy | CAGGTCACCTTGAAGGAGTCTGGTCCTGCGCTGGTGAAACCCACACAGACCCTCACACTGACCTGCACGTTCTCTGG<br>GTTCTCACTCAGCACTAGTGGAATGCGTGTGAGCTGGATCCGTCAGCCCCCAGGGAAGGCCCTGGAGTGGCTTGCA<br>CGCATTGATTGGGATGATGATAAATTCTACAGCACATCTCTGAAGACCAGGCTCACCATCTCCAAGGACACCTCCAAA<br>AACCAGGTGGTCCTTATAATGACCAACATGGACCCTGTAGACACAGCCACGTATTACTGTGCACGGATGATGGTTGG<br>CGAGGGAACATTTGACTACTGGGGCCAGGGAACCCTGGTCACCGTCTCCTCA |
| | 212 | light | GACATCCAGATGACCCAGTTTCCTTCCACCCTGTCTGCATCTGTAGGAGACAGAGTCACCATCACTTGCCGGGCCAGT<br>CAGGATATTAGTAGCTTTATTGGCCTGGTATCAGCAGAAACCAGGGAAAGCCCCTAAGCTCCTGATCTATACGGCGTC<br>TAATTTAGAAGGTGGGGTCCCATCAAGATTCAGCGGCAGTGGATCTGGGACAGAATTCACTCTCACCATCAGCAGCC<br>TGCAGCCTGATGATTTTGCAACTTATTACTGCCAACAATATATTAGATATTGGACGTTCGGCCAAGGGACCAAGGTG<br>GAAATCAAA |
| ANDV-3 | 213 | heavy | CAGGTGCAGCTGGTGCAGTCTGGAGGTGAGGTGAAGAAGCCTGGGGCCTCAGTGAAGGTCTCCTGCAAGGCTTCTG<br>GTTACACCTTTACCAACTATGGAATCAGCTGGGTGCGACAGGCCCCTGGACAAGGGCCTGAGTGGATGGGATGGAT<br>CAGCACTTTCAATGGTAACACAAACTATGCACAGAAGCTCCAGGGCAGAGTCACCATGACTATAGACTCATCCACGA<br>GCACAGCCTACCTGGAGCTGAGGAGCCTGAGATCTAACGACACGGCCGTGTATTACTGTGCGAGACGTCCGCCTTAC<br>TATGATAGTACTGCTTTTGATATATGGGGCCAAGGGACAATGGTCATCGTCTTCA |
| | 2.14 | light | CAGTCTGTGCTGACTCAGCCACCCTCAGCGTCTGGGACCCCCGGGCAGAGGGTCAGCATCTCTTGTTCTGGAAGCAG<br>CTCCAACATAGGAAGTAATATTGTAAACTGGTACCAGCAGCTCCCAGGAACGGCCCCCAAACTCCTCATCTATAGTAA<br>TAATCAGCGGCCCTCATGGGTCCCTGACCGATTCTCTGGCTCCAAGTCTGGCACCTCAGCCTCCCTGGCCATCAGTGG<br>GCTCCAGTCTGAGGATGAGGCTGATTATTACTGTTCAACATGGGATGCCAGCCTGAATGGTGTGGTATTCGGCGGAG<br>GGACCAAGCTGACCGTCCTA |
| ANDV-4 | 215 | heavy | GGGGTGCAGCTGGTGGAGTCTGGGGGAGGCTTGGTGAAGCCTGGGGGGTCCCTTAGACTCTCCTGTACAGACTCTG<br>GACTCACCTTCGGTCACGCCTGGATGAACTGGGTCCGCCAGGCTCCAGGGAAGGGGCTGGAGTGGGTTGGCCGTAT<br>TAAAACCAAGGCTGATGGTGAGACAACAGATACGCTGCAGCCGTGAAGGGAAGATTCACCATCTTAAGAGATGAT<br>TCAAAAAGACTCTGTTTCTGCAAATGAATGGCCTGAAGACCGAGGACACAGGCGTCTATTACTGTACTACAGATTT<br>ACGGGCTTTGGAGGCCTTATTATCCCTGGGTTTTGTCTACACGTACAACTTTATGGACGTCTGGGGCCAAGGGACCA<br>CGGTCTTCGTCTCCTCA |
| | 216 | light | GAAATTGTGTTGACGCAGTCTCCAGGCACCCTGTCTTTGTCTCCAGGGGAAAGAGCCACCCTCTCCTGCAGGGCCAG<br>TCAGATTGTTTCCAGCAACTACTTAGCCTGGTTCCAGCAGAAACCTGGCCAGGCTCCCAGGCTCGTCATCTATGGTGC<br>CTCCAGCAGGGCCACTGGCATCCCAGACAGGTTCAGTGGCAGTGGGTCTGCGACAGACTTCACTCTCACCATCAGCA<br>GACTGGAGCCTGAAGATTTTGCAGTGTATTACTGTCAGCAGTATGGTAGCTCACCGTACACTTTTGGCCAGGGGACC<br>AAGGTGGAGATCAAA |

TABLE 1-continued

NUCLEOTIDE SEQUENCES FOR ANTIBODY VARIABLE REGIONS

| Clone | SEQ ID NO: | Chain | Variable Sequence Region |
|---|---|---|---|
| ANDV-5 | 217 | heavy | CAGGTGCAGTTGCTGCAGTCTGGGGCTGAGGTGAAGAAGCCTGGGTCCTCGGTGAGGGTCTCCIGTCAGTCTTCTG<br>GAGACATCTACAACTACTATGGTATCAGCTGGGTGCGACAGGCCCCTGGACAAGGGCTTGAGTGGATGGGAGGGAT<br>CATCCCTGTCTATGGAAGACCAAACTACGTACAGAAGTTTAGGGGCAGAGTCACTTTTACCGTGGACAAATCCACGA<br>GCACAGCCTACATGGAGCTGAGCACCCTGAGAGCTGACGACACGGCCGTCTATTACTGTGCGAGAGACACGGCCCG<br>CTCTCATTACTTTGGCTCGGGGAACGACTACGGTATGGACGTCTGGGGCCAAGGGACCACGGTCATCGTCTCTTCA |
|  | 218 | light | GATATTGTGATGACTCAGTCTCCACTCTCCCTGCCCGTCACCCCTGGAGAGCCGGCCTCCATCTCCTGCAGGTCTAGT<br>CAGAGCCTCCTGCATAGTAATGGATTCAACTTTGTGGATTGTACCTGCAGAAGCCAGGGCAGTCTCCACAGCTCCT<br>GATCTATTTGGGTTCTACTCGGGCCTCCGGGGTCCCTGACAGGTTCAGCGGCAGTGGATCAGGCACAGATTTTACAC<br>TGGAAATCAGCAGAGTGGAGGCTGAGGATGTTGGCGTGTATTACTGCATGCAGGCTCTACAATTTCCTCGGACTTTT<br>GGCCAGGGGACCAAGCTGGACATCAAA |
| ANDV-11 | 219 | heavy | CAGGTGCAGCTCCAGGAGTCGGGCCCAGGACTGGTGAAGCCTTCGGGGACCCTGTCCCTCACCTGCACTGTCTCTGG<br>TGACTCCATCAGCAGTGGTGGTTTTTACTGGAGCTGGATTCGGCAGCCCCCAGGGAAGGGACTGGAGTGGATTGGG<br>TATATGTACTACAGAGGGAACACCAACTACAATCCCTCCCTCAAGAGTCGAATCACCATATCAATAGACGCGTCCAAG<br>AACCAGTTTTCCCTGACGGTGGATTCTGTGACCCCTGCGGACACGGCCGTGTATTATTGTGCGAGAGGAGGCTTATA<br>TGGTCAACTCATCCGAGGATTTTTCCACCCCTGGGGCCAGGGAACCCTGGTCACCGTCTCCTCA |
|  | 220 | light | CAGTCTGTGCTGACTCAGTCACCCTCAGTGTCTGGGACCCCCGGGCAGACGGTCTCCATCTCTTGTTCTGGAAGCTGG<br>TCCAACATCGGACGGAATCACGTATACTGGTATCACCAACTCCCAGGATCGGCCCCCAAACTTCTCATCTATATGAGC<br>AGTCAGCGACCCTTAGGGGTCCCTGACCGATTCTCTGGCTCCAGGTCTGACACTTCAGCCTCCCTGGCCATCAGTGGG<br>CTCCGGTCCGAGGATGAGGCTGATTATTACTGTGTGGCATGGGATGATAGTCTGAGTGGTTTCTATGTCTTCGGAAC<br>TGGGACCAAGGTCACCGTCCTA |
| ANDV-12 | 221 | heavy | GAGGTGCAGCTGGTGGAGTCTGGGGGAGGCTTGGTCCAGCCGGGGGGGTCCCTGAGACTCTCCTGTGCAGCCTCT<br>GGATTCGCCTTTAGTAGTTACTGGATGACCTGGGTCCGCCAGGCTCCAGGGAAGGGGCTGGAGTTTGTGGCCAACA<br>taaagtatgatgcaagtgaaaaatactatgtggactccgtgaagggccgattcaccatttccagagacaacggcag<br>GAATTCATTCTATTTGCAAATGAACAGCCTGAGAGCCGAGGACACGGCTGTGTATTATTGTGCGGTTCCGGGCCCGG<br>GATACAGTTTTGCTTATGACTACTGGGGTCAGGGAACCCAGGTCACCGTCTCCTCA |
|  | 222 | light | GACATCCAGATGACCCAATCTCCATCCTCCCTGTCTGCATCTGTAGGAGACAGAATCACCATCACTTGCCGGGCAAGT<br>CAGAGCGTTGGCACCTATTTAAATTGGTATCAGCAAAAACCAGGGAAAGCCCCTAAACTCCTAATCTATGAAGCATCT<br>AGTTTGCAGAGTGGGGTCCCATCAAGGTTCAGTGGCAGTGGATCTGGGACAGATTTCACTCTCACCATCAGTAGGCT<br>GCAACCCGAAGATTTTGCAACTTACTCCTGTCAACAGAGTGACATTCCCCCGTGGACGTTCGGCCAAGGGACTAAGG<br>TGGAGATCAAA |
| ANDV-22 | 223 | heavy | GAAGTGAAGTTGGTGGAGTCTGGGGGAGGCTTGGTACAGCCTGGCAGGTCCCTGAGACTCTCCTGTGCAGCCTCAG<br>GATTCAGTTTTGATGATTACGCCATGCACTGGGTCCGGCAACCTCTAGGGAAGGGCCTGGAGTGGGTCTCAGGTATT<br>AGTTGGAACAGCGGAAACACAGCCTATGCGGACTCTGTGAAGGGCCGATTCACCATTTCCAGAGACAACACCAAGA<br>ACTCCCTGTATCTGCAAATGAACAGTCTGAGACCTGAAGACACGGCCTTGTATTACTGTGGAAAAGATCTAGGAGGT<br>ATAGTATTGGCTCCGATTGACTCCTGGGGCCAGGGAACCCTGGTCACCGTCTCCTCA |
|  | 224 | light | CAGTCTGCCCTGACTCAGCCTGCCTCCGTGTCTGGGTCTCCTGGACAGTCGGTCACCATCTCCTGCACTGGAACCAGC<br>AGTGACGTTGGTGCTTTTAACTATGTCTCCTGGTACCAACAACACCCAGGCAAAGCCCCCAAACTCTTGATTTCTGCG<br>GTCAATAATCGGCCCTCAGGGGTTTTCTAATCGCTTCTCTATCTCCAAGTCTGGCAACACGGCCTCCCTGACCATCTCTG<br>GGCTCCAGGCTGAGGACGAGGCTGATTATTTCTGCAGCTCATATACAGTCAGCTACACTCTCACATTCGGCGGAGGG<br>ACCAAGCTGACCGTCCTA |
| ANDV-23 | 225 | heavy | CAGGTGCAGCTGGTGGAGTCTGGGGGAGGCGTGGTCCAGCCTGGGAGGTCCCTCAGACTCTCCTGTGCAGTCTCCG<br>GATTCACCTTCAGGAACTATGCCATGCACTGGGTCCGCCAGGCTCCAGGCAAGGGGCTGGAGTGGGTGGCAGTTAT<br>ATCATATGACGGAGGTAACAAAGATTATGCAGCCTCCGTGAAGGGCCGATTCACCATCTCCAGAGACGATTCCAAGA<br>ACGCCCTTTATCTGCAAATGAACAGCCTGAGACCTGAGGACACGGCTGTGTATTCCTGTGTGAAAGATCTTGGGGGA<br>GACTATCCCCGCTTGACCCACACTACTGGTACTACGGTATGGATGTCTGGGGCCAAGGGACCACGGTCATCGTCTCC<br>CTCA |
|  | 226 | light | CAGTCTGTGCTGACTCAGCCACCCTCAGCGTCTGGGACCCCCGGACAGGGGGTCACCATCTCTTGTTCTGGAAGCAG<br>CTCCAACATCGGAACTAAGTCTGTACTCTGGTACCAGCAACTCCCAGGAACGGCCCCCAAACTCCTGATCTATAGGAA<br>TAATCAGCGGCCCTCAGGGGTCCCTGACCGGTTCTCTGGCTCCAAGTCCGGCACCTCTGCCTCCCTGGCCATCAGTGG<br>GCTCCGGTCCGAGGATGAGGGTGATTACTACTGTGCCTCATGGGATGTCAGCCTGAGTGTTTGGGTGTTCGGCGGA<br>CGGACCAAGCTGACCGTCCT |
| ANDV-34 | 227 | heavy | CAGGTGCACCTGGTGCAGTCTGGGGGTGAGCTGAGGAAGCCTGGGTCCTCGGTGAAGGTCTCCTGCAAGGCTTCTG<br>GAGGCACCTTCAGCAGTTTTGCTATTACGTGGCTGCGACAGGCCCCTGGACAGGGGCTTGAGTGGGTGGGAGCATA<br>CATTCCTGTCTTTGGCTCAGCAATCCACGGACAGAAGGTCCACGGCAGAGTCACTCTTACCGCGGACGAATCCACGA<br>CCACAGCCTACATGGAGCTGAGCAGCCTGAGATCTGAGGACACGGCCGTGTATTTCTGTGCGAGAGGACCGACGCA<br>GAATTGGAATATAGTTATTATACCTACTTTGAGTCCTGGGGCCAGGGAACCCTGGTCACCGTCTCCTCA |
|  | 228 | light | CAAATCGTGTTGACGCAGTCTCCAGGCACCCTGTCTCTGTCTCCAGGGGAAAGAGCCACCCTCTCCTGCAGGGCCAG<br>TCAGAGTGTTACCAGCAGATACTTAGCCTGGTACCAGCAGAAACCCGGCCAGGCTCCCAGACTCCTCATCTATGATA<br>CCTCGAGCAGGGCCACTGGCATCCCAGACAGGTTCAGTGGCAGTGGGTCTGAGACAGACTTCACTCTCACCATCAGC<br>AGACTGGCGCCTGAAGATTTTGCAGTGTATTACTGTCAGCAGTATGGTACCTCACCTGCGGTCACCTTCGGCCAAGG<br>GACACGACTGGAGATTAAA |
| ANDV-38 | 229 | heavy | GAGGAGCAGCTGGTGGAGTCTGGGGGAGGCCTGGTCAAGCCGGGGGGGTCCCTGAGACTCTCCTGCGCAGCCTCT<br>GGAATCACCGTCAGAAGTTACTTCATCAGCTGGGTCCGCCAGGCTCCAGGGAAGGGACTGGAATGGGTCTCCTCTAT<br>AAGTAATGGGGGCTCTTACATATATTACGCCGAGTCAGTGAAGGGCCGATTCACCATCTCCAGAGACGACGCCAAG<br>AACTCAGTGTTTCTGCAAATGAGTAGTCTGAGAGTCGACGACACGGCTCTTTACTATTGTGTGAGAAGTCCAAATCTC<br>GGCTTGATGTACCAAGGCATGGACCTCTGGGGCCATGGGACCACGGTCAGCGT |

TABLE 1-continued

NUCLEOTIDE SEQUENCES FOR ANTIBODY VARIABLE REGIONS

| Clone | SEQ ID NO: | Chain | Variable Sequence Region |
|---|---|---|---|
| | 230 | light | TCCTATGTGCTGACTCAGCCACCCTCGGTGTCAGTGGCCCCAGGACAGACGGCCAGGATTTCCTGTGGGGAAATAA<br>TCTTGGCAGTAAAAGTGTGAACTGGTACCAGCAGAAGGCAGGCCAGGCCCCTGTGTTGGTCATCTATGATAATTACG<br>ACCGGCCCTCAGGGATCCCTGAGCGATTCTCTGGCTCCACCTCTGGGAATGTGGCCACCCTGGCCATCAGCAGGGTC<br>GCAGCCGGGGATGAGGCCGACTTTTACTGTCAGGTGTGGGATATTGGTAGTGAACATTGGGTCTTCGGCGGAGGGA<br>CCAAGCTGACCGTCCTA |
| ANDV-42 | 231 | heavy | CAGCTGCAGTTGCAGGAGTCCGGCTCAGGACTGGTGAAGCCTTCACAGACTCTGTCCCTCACCTGCGCTGTCTCTGG<br>TGGCTCCATCAGTAGTGGTGGTAAGTCCTGGAGCTGGATCCGGCAGTCACCACGGAAGGGCCTGGAGTGGATTGGA<br>AGCATCTTTCAGAGTGGCAGCACCTACTACAACCCGTCCCTCAAGAGTCGAGTCACCATATCAGTAGACAGGTCGAA<br>GAACCACCTCTCCCTAAAACTGAACTCCGTGACCGGCGCGGACACGGCCTTGTATTACTGTGCCAGAGACCGGAGTG<br>CCACCCAAGATGCCTTTGATATCTGGGGCCAAGGGGTAATGGTCACCGTCTCTTC |
| | 232 | light | TCCTATGTGCTGACTCAGCCACCCTCGGTGTCAGTGGCCCCAGGACAGACGGCCACCATTCCTGTGGGGGTAACAA<br>CATTGAAACTAAAAGGGTGCACTGGTACCAGCAGAAGCCAGGCCAGGCCCCTGTGCTGGTCGTCTATGATGATTAC<br>GACCGGCCCTCAGGGATCCCTGACCGATTCTCTGGCTCACACTCTGGGAACACGGCCACCCTGACCATCAGCGGGGT<br>CGAAGCCGGGGATGAGGCCGACTATTACTGTCACGTGTGGGATATCAGTAGTGATCTTCCGGTGGTGTTCGGCGGA<br>GGGACCCAGCTGACCGTCCTA |
| ANDV-43 | 233 | heavy | CAAATGCAGCTGGTGCAGTCTGGGCCTGAGGTGAAGAAGCCTGGGACCTCAGTGAAGGTCTCCTGCAAGGCTTCTG<br>GATTCACCTTTAGTAGGTCCACTGTGCAGTGGGTGCGACAGACTCGTGGACAACGCCTrGAGTGGATTGGATGGATC<br>CTCGTTGGCAATGGTGACACAAACTACGCACAGGAGTTCCAGGAAAGAGTCAGCATTACCACGGACATGTCTACAA<br>GCACTGTCTACATGGAACTGAGCAGCCTGAGATCCGACGACACGGCCGTGTATTATTGTGCGGCGATGGGCAGTGG<br>CTGGTGGTACTACCACTACGATTTGGACGTCTGGGGCCACGGGACCACGGTCACCGTCTCCTCA |
| | 234 | light | CAATCTGTGCTGACTCAGCCACCCTCAGCGTCTGGGACCCCCGGCAGAGGTCACCATCTCTTGTTCTGGAAGCAG<br>CTCCAACATCGGGAGAAGTTTTGTGAACTGGTACCAGCAGCTCCCAGGAACGGCCCCCAACTCCTCATCTACAAAA<br>ATGATCAGCGGCCCTCAGGGGTCCCTGACCGATTCTCTGCCTCAAGTCTGGCACCTCAGCCTCCTGGCCATCAGTG<br>GGCTCCAGTCTGAGGATGAGGCTGATTATTTCTGTGCAGCATGGGTTGACAGCGTGAATGGTCTTGTGGTATTCGGC<br>GGAGGGACCAAGCTGACCGTCCTA |
| ANDV-44 | 235 | heavy | CAGGTTCAGCTGGTGCAGTCTGGAGCTGAGGTGAGGAAGCCTGGGGCCTCAGTGAAGGTCTCCTGCAAGGCTTCTG<br>GTTACACCTTCACCAGCAATGGTGTCAGCTGGGTGCGACAGGCCCCTGGACAAGGGCTTGAGTGGATGGGGTGGAT<br>CGCCCGGTTACGACGGTTACACAAACTATACGGAGAAGTTCCAGGGAAGAGTCACCATGACCACAGACACATCCACG<br>ACTACGGTCTACATGGAACTGAGGAGTCTGAGATTTGACGACACGGCCGTGTATTACTGTGCGAGAGATGAAGGCC<br>TACATAACTGGAAATTCAACGCGATGGACGTCTGGGGCCAAGGGACCACGGTCATCGTCTCCTCA |
| | 236 | light | GAAATTGTGTTGACGCAGTCTCCAGGCACCCTGTCTTTGTCTCAGGGGAAAGAGCCACCCTCTCCTGCAGGGCCAG<br>TCAGAGTGTTAGCAGCAGCTACTTAGCCTGGTACCAGCAGAAACCrGGCCAGGCTCCCAGGCrCCTCATGTCTGAGA<br>CATCCAGGAGGGCCACTGGCATCCCAGACAGGTTCAGTGGCAGTGTGTCTGGGACAGACTTCATTCTCACCATCAAC<br>AGAGTGGACCCTGAAGATTTTGCAGTGTATTACTGTCAGCAGTATAGTAGCCCACCTTGGACGTTCGGCCAAGGGAC<br>CAAGGTGGAAATCAAA |
| ANDV-54 | 237 | heavy | GAGGTGCAGCTGGTGGAGTCGGGGGGAGGCGTGGTCCAGCCTGGGAGGTCCCTGAGACTCTCCTGTGCAGCGTCT<br>GGATTCACCTTCAGTCCCTATGGCATGCACTGGGTCCGCCAGGCTCCAGGCAAGGGGCTGGAGTGGGTGGCAGTTG<br>TATGGTATGATGGAAATAATAAATACTATGCAGACTCCGTGAAGGGCCGATTCACCATCTCCAGAGACAATTCCAAG<br>AACACGCTATATCTGCAAATGAACAGCCTGAGAGCCGAGGACACGGCTGTATATTACTGTGCGAGAGAATACCC<br>CCACATACAACTCTGGTTACTACTTTGACTACTGGGGCCAGGGAACCCTGGTCACCGTCTCCTCA |
| | 238 | light | CAGTCTGCCCTGACTCAGCCTGCCTCCGTGTCTGGGTCTCCTGGACAGTCAGTCACCATCACCTGCACTGGAACCAGC<br>AGTGATGTTGGGAGTTATGACCTTGTCTCCTGGTACCAACAACACCCAGGCAAAGCCCCCAAACTCATAATTTATGAG<br>GGCAGTAAGCGGCCCTCAGGGGTTTCTAATCGCTTCTCTGGCTCCAAGTCTGGCAACACGGCCTCCCTGACAATCTCT<br>GGGCTCCAGGCTGAGGACGAGGCTGATTATTACTGCTGCTCATATGCAGGTAGTAGCACTTGGGTGTTCGGCGGAG<br>GGACCAAGGTGACCGTCCTA |
| ANDV-59 | 239 | heavy | CAGGTGGTACTGCAGGAGTCGGGCCCAGGACTGGTGAAGCCTTCGGAGACCCTGTCCCTCACCTGCACTGTCTCTGG<br>TGGGTCCATCAATAATTACTACTGGAGCTGGATCCGGCAGCCCCCAGGGAAGGGACTGGAGTGGATTGGCTGGCTC<br>TATTACAGTGGGATCACCACCTTCAACCCCTCCCTCAAGAGTCGAGTCACCATATCAATAGACACGTCAAGAACCAG<br>GTCTCCCTGAATCTGCGCTCTGTGACCGCTGCGGACACGGCCGTGTATTATTGTGCGAGAGTCCAGGGGTCTGATAG<br>TAGTGGTTATTACCACCTGAAGTCGGACTGGTTCGACCCCTGGGCAGGGAATCCCGGTCACCGTCTCCTCA |
| | 240 | light | CAGTCTGTGTTGACGCAGCCGCCCTCAGTGTCTGCGGCCCCAGGACAGAAGGTCACCATCTCCTGCTCTGGCAGCAG<br>CTCCAACATTCGGCATAATTTTGTTTCGTGGTACCAGCAGCTCCCAGGAACAGCCCCCAAACTCCTCATTTATGAAAA<br>TAATAAGCGACCCTCAGGGATTCCTGACCGATTCTCTGGCTCCAAGTCTGGCACGTCAGCCACCCTGGGCATCACCG<br>GACTCCAGACTGGGGACGAGGCCGATTATTACTGCGGAACATGGGATAGCAGCCTGAGTGCTCCCCATTGGGTGTT<br>CGGCGGAGGGACCAGGCTGACTGTCCTA |
| ANDV-69A | 241 | heavy | CAGGTGCATCTGCAGGAGTCGGGCCCAGGACTAGTGAAGCCTTCGGAGACCCTGTCCCTCACCTGCGCTGTCTCTGG<br>CTACTCCATCAGCAGTGGTTACTGCTGGGGCTGGATCCGGCAGACCCCAGGGAAGGGGCTGGAGTGGATTGGGAG<br>TATCTGGCATACTGGGACCACCTACTACAACCCGTCCCTCAAGAGTCGAGTCACCATATCACTGGACACGTCCAAGAA<br>CCAGTTCTCCCTGAAGCTGAGTTCTGTGACCGCCGCAGACACGGCCGTCTATTACTGTGCGAGAGCGATCTATGATA<br>GTAGTGGTTATTCCCCGTTCAGCGGTTTAGACATCTGGGGCCAAGGGACTACAGTCACCGTCTCCTCA |
| | 242 | light | CAGTCTGTGTTGACGCAGCCGCCCTCAGTGTCTGCGCCCCAGGACAGAAGGTCACCATCTCCTGTTCTGGAAGCAG<br>CTCCAACATTGGGAATAATTATGTATCCTGGTACCAACAAGTCCCGGAACAGCCCCCAAACTCCTCTTTTATGACAA<br>TAACAAGCGACCCTCAGGGATTCCTTACCGATTCTCTGGCTCCAAGTCTGGCACGTCCGCCACCCTGGCCATCACCGG<br>ACTCCAGACTGGGGACGAGGCCGATTATTACTGCGGAACATGGGATAGCAGCCTGAATCTTTGGGTGTTCGGCGGA<br>GGGACCAAGCTGACCGTCCTA |

TABLE 1-continued

NUCLEOTIDE SEQUENCES FOR ANTIBODY VARIABLE REGIONS

| Clone | SEQ ID NO: | Chain | Variable Sequence Region |
|---|---|---|---|
| ANDV-69B | 243 | heavy | CAGGTGCATCTGCAGGAGTCGGGCCCAGGACTAGTGAAGCCTTCGGAGACCCTGTCCCTCACCTGCGCTGTCTCTGG<br>CTACTCCATCAGCAGTGGTTACTGCTGGGGCTGGATCCGGCAGACCCCAGGGAAGGGGCTGGAGTGGATTGGGAG<br>TATCTGGCATACTGGGACCACCTACTACAACCCGTCCCTCAAGAGTCGAGTCACCATATCACTGGACACGTCCAAGAA<br>CCAGTTCTCCCTGAAGCTGAGTTCTCTGACCGCCGCAGACACGGCCGTCTATTACTGTGCGAGAGCGATCTATGATA<br>GTAGTGGTTATTCCCCGTTCAGCGGTTTAGACATCTGGGGCCAAGGGACTACAGTCACCATCTCCTCA |
| | 244 | light | TCCTATGAGCTGACTCAGCCACACTCAGTGTCAGTGGCCACAGCACAGATGGCCAGGATCACCTGTGGGGGAAACA<br>ACATTGGAAGTAAAGCTGTGCACTGGTACCAGCAAAAGCCAGGCCAGGACCCTGTGCTGGTCATCTATAGCGATAG<br>CAACCGGCCCTCAGGGATCCCTGAGCGATTCTCTGGCTCCAACCCAGGGAACACCGCCACCCTAACCATCAGCAGGA<br>TCGAGGCTGGGGATGAGGCTGACTATTACTGTCAGGTGTGGGACAGTAGTAGTGATCATCGCTGGGTGTTCGGCGG<br>AGGGACCAAGCTGACCGTCCTA |

TABLE 2

PROTEIN SEQUENCES FOR ANTIBODY VARIABLE REGIONS

| Clone | SEQ ID NO: | Chains | Variable Sequence |
|---|---|---|---|
| SNV-24 | 43 | heavy | EVQLLESGGGLIQSGGSLRLSCVVSGIDFSNYAMTWVRHAPGKGLEWISTI<br>SGSGDTTNYADSAKGRFTISRDNSRNTLFVRINSLRAEDTAIYYCAKTMGP<br>VSGQYAFDIWGQGTKVTVSS |
| | 44 | light | SYELTQPPSVSVSPGQTATITCSGDNLGNKFASWYQQKPGLSPVLVIYQDK<br>KRPSGIPERFSGSNSGNTATLTISGTQAMDEADYFCQAWHSGSVFGGGT<br>KLTVL |
| SNV-57 | 45 | heavy | QVQLVESGGGVVQPGRSLRLSCAASGFTFSSYAMHWVRQAPGKGLEWV<br>ALISLDGFNTYYPDSVKGRFTISRDSSKNTLFLQLNSLRIEDTAVYYCVKDRG<br>PTGSGSYGMDVWGQGTTVTSS |
| | 46 | light | SYELTQPPSVSVSPGQTASITCSGDKLGNKFACWYQQKPGQSPVLVIHQD<br>KKRPSGIPERFSGSNSGNTATLTISGTQAVDEADYYCQAWDSSNVVFGGG<br>TKLTVL |
| SNV-68 | 47 | heavy | QVQLQESGPGLVKPSGTLSLTCLVSGGSIGSSHWWSWVRQSPGKGLEWF<br>GEIHHTESTNYNPSLKSRVTITMDKSKNQFYLKLTSVTAADTAVYYCARAG<br>ATFAEPFSLWGQGTMVTVSP |
| | 48 | light | DIQMTQSPSTLSASVGDRVTITCRAGQSVTNWLAWYQQKPGKAPKLLIYK<br>ASILASGVPSRFSGSGSGTEFTLTISSVQPDDSAVYYCQQYKSHRTFGQGTK<br>VEIK |
| SNV-25 | 49 | heavy | QVQLQESGPGLVKPSGTLSLTCAVSGGSISSSNWWSWVRQPPGKGLEWI<br>GEIYHSGSTNYNPSLKSRATiSVDKSKNQFSLKLSSVTAADTAFYYCARARG<br>EWLAHFDYWGQGTLVTVSS |
| | 50 | light | DIQMTQSPSTLSASVGDRVTITCRASQSISRWLAWYQQKPGKAPKLLIYKA<br>SSLESGVPSRFSGSGSGTEFTLTISSLQPDDFAIYYCQQYNTDKTFGQGTKV<br>EIK |
| SNV-53 | 51 | heavy | EVQLVQSGAEVKTPGESLKISCKGSGYRFYTYWIAWVRQMPGKGLEWM<br>GHYPGDSDPRYSPSFQGQVTISADKSISTAYLQWSSLKASDTAMYYCVRV<br>QGTMLDYWGQGTLVTVSS |
| | 52 | light | QSVLTQPPSVSGAPGQSVTISCSGSSSNIGAGYDVHWYQQLLGRAPKLLIH<br>GNSNRPSGVPDRFSGSKSGTSGSLAITGLQSEDEADYYCQSYDISLSGWVF<br>GGGTKLTVL |
| SNV-32 | 53 | heavy | QVQLVQSGAEVKKPGSSVKVSCRASGGTFRSYSISWVRQAPGQGLEWM<br>GDIIPIFSTTNYAQKFQGRVTITADEATSTAYMELSSLRSDDTAVYYCARPS<br>NLLNWFDPWGQGTLVTVSS |
| | 54 | light | EIVMTQSPATLSVSPGERATLSCRASQSVNSNLVWYQQKPGQAPRLLIYG<br>ASTRATGIPARISGSGSGTEFTLTISSLQSEDFAVYYCQQYDNRPQTFGQGT<br>KVEIK |
| SNV-39 | 55 | heavy | QEQLEESGGGVVQPGRSLTLSCAASGFTFRSYDMHWVRQAPGKGLEWV<br>ALISYDGRNKHYGDSVKGRFTISRDNSKNTLYLHLSSLRAEDTSVYYCARGA<br>DNGLFTDSWGQGTLVIVSS |
| | 56 | light | DIVMTQSPDSLAVSLGDRATINCKSSQSVLYGSTNKNFLAWYQQKPGQPP<br>KLLIYWASARESGVPDRFSGSGSGTDFTLTISSLQTEDVAVYYCQQYSSIPLT<br>FGGGTKVEIK |
| SNV-27 | 57 | heavy | QVQLVQSGAEVKKPGASVRVSCKAYGYSFNDYFMHWVRQAPGQGLEW<br>MGRVKPSIGGTRYAQKFQGRVTMLDISISIAYVELSSLSSDDTAVYFCA<br>RKLGPLGDCSSSSCYSALDVWGQGTMVTVSS |

TABLE 2-continued

PROTEIN SEQUENCES FOR ANTIBODY VARIABLE REGIONS

| Clone | SEQ ID NO: | Chairs | Variable Sequence |
|---|---|---|---|
| | 58 | light | DIQMTQSPSTLSASVGDRVTITCRASESISNWLAWYQQKPGKAPKLLISKA SSLESGVPSRFSGSGSGIEFILTIGSLQPDDFATYYCQQYNYSWTFGQGT KVDIK |
| SNV-62 | 59 | heavy | QVLLVQSGAEVKKPGASVKVSCKASGYTFTSYFIHWVRQAPGQGLEWM GMINPISGNTNYAQKFQGRVTMTRDTSTRTVYMQLSSLTFEDTAVYSCVR WTTVPSSFDFWGQGTLVTVSS |
| | 60 | light | SYELTQPPSVSVSPGQTARITCSGDALPNQYVNWYQQKPGQAPVLMMF KDNQRPSGIPERFSGSRSGTTVTLSISGVQQAEDEADYHCQSADRTATSVAF GGGTKLTVL |
| SNV-30 | 61 | heavy | QLQLQESGSRLVKSSETLSLTCAVSGGAITSGRNTWSWIRQPPGKGLEWI GFIYYSGSTYSNPITYSSPSLKSRVTISLDTSKNQFSLKLNSVTAADTAVYYCA RAKPSNLNFYYYGMDVWGQGTTVTVSS |
| | 62 | light | EIVMTQSPATLSVSPGERATLSCRASQSVSSNLAWYQQKPGQAPRLLIYG ASTRATGIPARFSGSGSETEFTLTISSLQSEDFAVYYCQQSDNWPPITFGQG TRLEIK |
| SNV-45 | 63 | heavy | ELQLVESGGGLIRPGGSLRLSCTAAGFTFSNYNMNWVRQAPGKGLDWVS YISSSGGTTIYADSVKGRFTISRDNAKDSLYLQMNSLRDDDTAiYYCVRGRG QLATHFDYWGQGTLVTVSS |
| | 64 | light | ESVLTQPPDFQSVTPKEKVTITCRASQSIHINLHWYQQKPHQSPKLLIKYAS QSIAGVPSRFSGSGSGTEFTLTINGLEAEDAATYYCHQSNSLPWTFGQGTK VEIK |
| SNV-36 | 65 | heavy | QVQLVESGGGWQPGRSLRLSCAASGFRFSSYAMHWVRQAPGKGLEWV ATIWFDGTNEYYGDSAKGRFTISRDNSMSTLYLQMNSLRVEDTAVYYCAR PANGYSDYYYGMDVWGQGTTVTVSS |
| | 66 | light | QSALTQPASVSGSPGQSITISCTGTSSDVGTYNLVSWYQQHPGKAPKLMI FEVNKRPSGVSYRFSGSKSGNTASLTiSGLQAEDEADYYCCSYADNRTPFLF GTGTKVTVLG |
| SNV-67 | 67 | heavy | QVQLVQSGAEVKKPGASVRVSCKASGYTFTAYFMNWVRQAPGQGLEW MGRINPISGDTNFAQNFQGRVTMTRDTSITTVYMELNRLTSDDTAVYYC ARVRSGYSYIDFWGQGTLVTVAS |
| | 68 | light | SYDLTQPPSVSVSPGQTARITCSGDALSNQYAYWYQQRPGQAPVWIYKY SERPSGIPERFSGSSSGTTVTLTISGVQAEDEADYYCQSADRLGTYWVFGG GTKLTVL |
| SNV-21 | 69 | heavy | QVQLVESGGGVVQPGRALRLSCAASGFTFSSYGMHWVRQAPGKGLEW VAVVWNDGGNKYYADSVKGRFTISRDNSKNTLYLQMNSLRAEDTAVYFC ARDGYYVSSGYHPLRYYYYYMDVWGKGTTVAVSS |
| | 70 | light | DIVMTQSPDSLAVSLGERATINCKSSQSVLYSPNNKNYLAWYQQKPGQPP KLLIYWASTRESGVPDRFSGSGSATDFTLTIDSLQAEDVAVYYCQQYYSTPP LTFGGGTKVEIK |
| SNV-50 | 71 | heavy | EMQLLESGGGLIQPGESLRLSCAGSGFTFRNYAMSWVRQAPGKGLQWV SAISASGGITHYADSVKGRFTISRDNSKNTLFLQMNSLRAEDTAVYYCAKG EIMRDTGYHDDAFDVWGQGKMVTVSS |
| | 72 | light | DIQLTQSPSFLSASVGDRVTITCRASQGISSYLVWYQQKPGEAPKLLIYTAS TLQSGVPSRFSGSGSGTEFTLTISSLQPEDFATYHCQQVESYPYSFGQGTKL EiK |
| SNV-56 | 73 | heavy | EVQLVESGGRLVRPGGSLRLSCAASGFTFSHYNMNWVRQAPGKGLEWV SSINSRNGYTYYADSVKGRFTISRDNAKNSLYLQMNSLRPEDTAVYYCARD PPLYSGYDLGYYYYGMDVWGQGTTVTVSS |
| | 74 | light | DIQMTQSPSTLSAFVGDRVTITCRANQNISKWLAWYQQKPGKAPNLLIHK ASSLESGVPSRFSGSGSGIEFILTISSLQPDDFATYSCQQYNSYPWAFGQG TRVEIK |
| SNV-65 | 75 | heavy | QVQLQESGPGLVKPSQTLSLTCTVSGGSISSGGYFWSWIRQHPGKGLEWI GYIYYSGSTYYNPSLKSRVTISIDTSKIQFSLKLTSVTAADTAVYYCARDVGGF DIWGQGTMVTVSS |
| | 76 | light | DIQMTQSPSSLSASIGDRVTITCQASQDINKYLNWYQQKPGKAPKVLIYDA SNLETGVPSRFSGSGSGTDFTFTISSLQPEDVATYYCQQYENLPRTFGQGT KVEIK |
| SNV-66 | 77 | heavy | QVRLVESGGGWVQPGRSLRLSCAASGFTFRSYGMHWVRQAPGKGLEWV ALISLDGSEKHYADSVKGRLTISRDNSKNMLYLQMNNLRVEDTAVYYCAK DRPYSWRDVLDYWGQGTLVTVSS |
| | 78 | light | DIQMTQSPSSLSASVGDRVTITCRASRDIHTSLNWYQHTPGKAPELLIYAA STLEMGVPSRFSGSGSGTDFTFTISSLQPEDIATYYCQQYDELPLTFGGGTK VEMK |

TABLE 2-continued

PROTEIN SEQUENCES FOR ANTIBODY VARIABLE REGIONS

| Clone | SEQ ID NO: | Chairs | Variable Sequence |
|---|---|---|---|
| SNV-40 | 79 | heavy | QVQLQQSGPGLVKPSQILSLTCAISGDSVSSNRAAWNWIRQSPLRGLEWL GRTYYRSKWYNDYALSVKSRISINPDTSKNQFSLQLNSVTPEDTAVYYCAR TPRAYSSGWHVPYYYSGMDVWGQGTTVTVSS |
|  | 80 | light | DIQMTQSPSSLSASIAQRVTITCQASQDISDHLNWYQQKPGTAPKLLIYDA SNLETGVPSRFSGSGSGTDFTFTINRLQPEDFATYYCQQYDEVPPTFGQGT KVDIR |
| SNV-3 | 81 | heavy | QVQLQQSGPGLVKPSQTLSLTCAISGDSVSSNSAAWNWIRQSPSRGLEW LGRTYYRSKWYNDYAVSVKSRITINPDTSKNQFSLQMNSVTPEDTAVYYC ARDRRKLEPPPFSYYYYGLDVWGQGTTVTVSS |
|  | 82 | light | DIQMTQSPSSLSASVGDRVTITCQASQDISNYLNWYQQKPGKAPKLLIYD ASNLETGVPSRFSGSGSGTDFTFTISSLQPEDIATYYCQQYDNVPLTFGGGT KVEIK |
| SNV-42 | 83 | heavy | EVQLVESGGGLVQPGGSLRLSCAASGFTFSTYEMNWVRQAPGKGLEWIS YRSSGSTVYYADSVKGRFTISRDNAKNLLYLQMNSLRAGDTAVYYCARIP GGYTGYFDYWGQGALVTVSS |
|  | 84 | light | QSVLTQPPSVSGAPGQRVTISCTGSSSNIGAGYYVHWYQQLPGTVPKLLIY GNNNRPSGVPDRFSGSKSGTSASLAITGLQTEDEADYYCQSYDSSLSGWV FGGGTKLTVL |
| ANDV-2 | 245 | heavy | QVTLKESGPALVKPTQTLTLTCTFSGFSLSTSGMRVSWIRQPPGKALEWL ARIDWDDDKFYSTSLKTRLTISKDTSKNQVVLIMTNMDPVDTATYYCAR MMVGEGTFDYWGQGTLVTVSS |
|  | 246 | light | DIQMTQFPSTLSASVGDRVTITCRASQDISSLLAWYQQKPGKAPKLLIYT ASNLEGGVPSRFSGSGSGTEFTLTISSLQPDDFATYYCQQYIRYWTFGQG TKVEIK |
| ANDV-3 | 247 | heavy | QVQLVQSGGEVKKPGASVKVSCKASGYTFTNYGISWVRQAPGQGPEW MGWISTFNGNTNYAQKLQGRVTMTIDSSTSTAYLELRSLRSNDTAVYYC ARRPPYYDSTAFDIWGQGTMVIVSS |
|  | 248 | light | QSVLTQPPSASGTPGQRVSISCSGSSSNIGSNIVNWYQQLPGTAPKLLIYS NNQRPSWVPDRFSGSKSGTSASLAISGLQSEDEADYYCSTWDASLNGV VFGGGTKLTVL |
| ANDV-4 | 249 | heavy | GVQLVESGGGLVKPGGSLRLSCTDSGLTFGHAWMNWVRQAPGKGLE WVGRIKTKADGETTDYAAAVKGRFTILRDDSKKTLFLQMNGLKTEDTGV YYCTTDLRALEALLSLGFVYTYNFMDVWGQGTTVFVSS |
|  | 250 | light | EIVLTQSPGTLSLSPGERATLSCRASQIVSSNYLAWFQQKPGQAPRLVIYG ASSRATGIPDRFSGSGSATDFTLTISRLEPEDFAVYYCQQYGSSPYTFGQG TKVEIK |
| ANDV-5 | 251 | heavy | QVQLLQSGAEVKKPGSSVRVSCQSSGDIYNYYGISWVRQAPGQGLEW MGGIIPVYGRPNYVQKFRGRVTFTVDKSTSTAYMELSTLRADDTAVYYC ARDTARSHYFGSGNDYGMDVWGQGTTVIVSS |
|  | 252 | light | DIVMTQSPLSLPVTPGEPASISCRSSQSLLHSNGFNFVDWYLQKPGQSP QLLIYLGSTRASGVPDRFSGSGSGTDFTLEiSRVEAEDVGVYYCMQALQF PRTFGQGTKLDIK |
| ANDV-11 | 253 | heavy | QVQLQESGPGLVKPSGTLSLTCTVSGDSISSGGFYWSWIRQPPGKGLE WIGYMYYNGNTNYNPSLKSRITISIDASKNQFSLTVDSVTPADTAVYYCA RGGLYGQLRGFFHPWGQGTLVTVSS |
|  | 254 | light | QSVLTQSPSVSGTPGQTVSISCSGSWSNIGRNHVYWYHQLPGSAPKLLI YMSSQRPLGVPDRFSGSRSDTSASLAISGLRSEDEADYYCVAWDDSLSG FYVFGTGTKVTVL |
| ANDV-12 | 255 | heavy | EVQLVESGGGLVQPGGSLRLSCAASGFAFSSYWMTWVRQAPGKGLEF VANIKYDASEKYYVDSVKGRFTISRDNGRNSFYLQMNSLRAEDTAVYYC AVPGPGYSFAYDYWGQGTQVTVSS |
|  | 256 | light | DIQMTQSPSSLSASVGDRmTCRASQSVGTYLNWYQQKPGKAPKLLIYE ASSLQSGVPSRFSGSGSGTDFTLTISRLQPtDFATYSCQQSDIPPWTFGQ GTKVEIK |
| ANDV-22 | 257 | heavy | EVKLVESGGGLVQPGRSLRLSCAASGFSFDDYAMHWVRQPLGKGLEW VSGISWNSGNTAYADSVKGRFTISRDNTKNSLYLQMNSLRPEDTALYYC GKDLGGIVLAPIDSWGQGTLVTVSS |
|  | 258 | light | QSALTQPASVSGSPGQSVTISCTGTSSDVGAFNYVSWYQQHPGKAPKLL ISAVNNRPSGVSNRFSISKSGNTASLTISGLQAEDEADYFCSSYTVSYTLTF GGGTKLTVL |
| ANDV-23 | 259 | heavy | QVQLVESGGGVVQPGRSLRLSCAVSGFTFRNYAMHWVRQAPGKGLE WVAVISYDGGNKDYAASVKGRFTISRDDSKNALYLQMNSLRPEDTAVY SCVKDLGGDYPPLDPHYWYYGMDVWGQGTTVIVSS |

TABLE 2-continued

PROTEIN SEQUENCES FOR ANTIBODY VARIABLE REGIONS

| Clone | SEQ ID NO: | Chairs | Variable Sequence |
|---|---|---|---|
| | 260 | light | QSVLTQPPSASGTPGQGVTISCSGSSSNIGTKSVLWYQQLPGTAPKLLIY RNNQRPSGVPDRFSGSKSGTSASLAISGLRSEDEGDYYCASWDVSLSVW VFGGRTKLTVL |
| ANDV-34 | 261 | heavy | QVHLVQSGGELRKPGSSVKVSCKASGGTFSSFAITWLRQAPGQGLEWV GAYIPVFGSAIHGQKVHGRVTLTADESTTTAYMELSSLRSEDTAVYFCAR GPTQNWEYSYYTYFESWGQGTLVTVSS |
| | 262 | light | QIVLTQSPGTLSLSPGERATLSCRASQSVTSRYLAWYQQKPGQAPRLLIY DTSSRATGIPDRFSGSGSETDFTLTISRLAPEDFAVYYCQQYGTSPAVTFG QGTRLEIK |
| ANDV-38 | 263 | heavy | EEQLVESGGGLVKPGGSLRLSCAASGITVRSYFISWVRQAPGKGLEWVS SISNGGSYIYYAESVKGRFTISRDDAKNSVFLQMSSLRVDDTALYYCVRSP NLGLMYQGMDLWGHGTTVSV |
| | 264 | light | SYVLTQPPSVSVAPGQTARISCGGNNLGSKSVNWYQQKAGQAPVLVIY DNYDRPSGIPERFSGSTSGNVATLAISRVAAGDEADFYCQVWDIGSEH WVFGGGTKLTVL |
| ANDV-42 | 265 | heavy | QLQLQESGSGLVKPSQTLSLTCAVSGGSISSGGKSWSWIRQSPRKGLEW IGSIFQSGSTYYNPSLKSRVTISVDRSKNHLSLKLNSVTGADTALYYCARDR SATQDAFDIWGQGVMVTVSS |
| | 266 | light | SYVLTQPPSVSVAPGQTATIPCGGNNIETKRVHWYQQKPGQAPVLVVY DDYDRPSGIPDRFSGSHSGNTATLTISGVEAGDEADYYCHVWOISSDLP WFGGGTQLTVL |
| ANDV-43 | 267 | heavy | QMQLVOSGPEVKKPGTSVKVSCKASGFTFSRSTVQWVRQTRGQRLEW IGWILVGNGDTNYAQEFQERVSITTDMSTSTVYMELSSLRSDOTAVYYC AAMGSGWWYYHYDLDVWGHGTTVTVSS |
| | 268 | light | QSVLTQPPSASGTPGQRVTISCSGSSSNIGRSFVNWYQQLPGTAPQLLIY KNDQRPSGVPDRFSASKSGTSASLAISGLQSEDEADYFCAAWVDSVNGL WFGGGTKLTVL |
| ANDV-44 | 269 | heavy | QVQLVQSGAEVRKPGASVKVSCKASGYTFTSNGVSWVRQAPGQGLEW MGWIAGYDGYTNYTQKFQGRVTMTTDTSTTTVYMELRSLRFDDTAVY YCARDEGLHNWKFNAMDVWGQGTTVIVSS |
| | 270 | light | EIVLTQSPGTLSLSPGERATLSCRASQSVSSSYLAWYQQKPGQAPRLLMS ETSRRATGIPDRFSGSVSGTDFILTINRVDPEDFAVYYCQQYSSPPWTFG QGTKVEIK |
| ANDV-54 | 271 | heavy | EVQLVESGGGWQPGRSLRLSCAASGFTFSPYGMHWVRQAPGKGLEW VAVVWYDGNNKYYADSVKGRFTISRDNSKNTLYLQMNSLRAEDTAVYY CARENTPTYNSGYYFDYWGQGTLVTVSS |
| | 272 | light | QSALTQPASVSGSPGQSITISCTGTSSDVGSYDLVSWYQQHPGKAPKLII YEGSKRPSGVSNRFSGSKSGNTASLTISGLQAEDEADYYCCSYAGSSTWV FGGGTKVTVL |
| ANDV-59 | 273 | heavy | QVVLQESGPGLVKPSETLSLTCTVSGGSINNYYWSWIRQPPGKGLEWIG WLYYSGITTFNPSLKSRVTISIDTSKNQVSLNLRSVTAADTAVYYCARVQG SDSSGYYHLKSDWFDPWGQGIPVTVSS |
| | 274 | light | QSVLTQPPSVSAAPGQTVTISCSGSSSNIRHNFVSWYQQLPGTAPKLVIY ENNKRPSGIPDRFSGSKSGTSATLGITGLQTGDEADYYCGTWDSSLSAP HWVFGGGTRLTVL |
| ANDV-69A | 275 | heavy | QVHLQESGPGLVKPSETLSLTCAVSGYSISSGYCWGWIRQTPGKGLEWI GSIWHTGTTYYNPSLKSRVTISLDTSKNQFSLKLSSLTAADTAVYYCARAIY DSSGYSPFSGLDIWGQGTTVTISS |
| | 276 | light | QSVLTQPPSVSAAPGQKVTISCSGSSSNIGNNYVSWYQQVPGTAPKLLF YDNNKRPSGIPYRFSGSKSGTSATLAITGLQTGDEADYYCGTWDSSLNL WVFGGGTKLTVL |
| ANOV-69B | 277 | heavy | QVHLQESGPGLVKPSETLSLTCAVSGYSISSGYCWGWIRQTPGKGLEWI GSIWHTGTTYYNPSLKSRVTISLDTSKNQFSLKLSSLTAADTAVYYCARAIY DSSGYSPFSGLDIWGQGTTVTISS |
| | 278 | light | SYELTQPHSVSVATAQMARITCGGNNIGSKAVHWYQQKPGQDPVLVIY SDSNRPSGIPERFSGSNPGNTATLTISRIEAGDEADYYCQVWDSSSDHR WVFGGGTKLTVL |

TABLE 3

CDR HEAVY CHAIN SEQUENCES

| Clone | CDRH1 (SEQ ID NO:) | CDRH2 (SEQ ID NO:) | CDRH3 (SEQ ID NO:) |
|---|---|---|---|
| SNV-24 | GIDFSNYA 85 | ISGSGDTT 86 | AKTMGPVSGQYAFDI 87 |
| SNV-57 | GFTFSSYA 88 | ISLDGFNT 89 | VKDRGPTGSGSYGMDV 90 |
| SNV-68 | GGSIGSSHW 91 | IHHTEST 92 | ARAGATFAEPFSL 93 |
| SNV-25 | GGSISSSNW 94 | IYHSGST 95 | ARARGEWLAHFDY 96 |
| SNV-53 | GYRFYTYW 97 | IYPGDSDP 98 | VRVQGTMLDY 99 |
| SNV-32 | GGTFRSYS 100 | IIPIFSTT 101 | ARPSNLLNWFDP 102 |
| SNV-39 | GFTFRSYD 103 | ISYDGRNK 104 | ARGADNGLFTDS 105 |
| SNV-27 | GYSFNDYF 106 | VKPSTGGT 107 | ARKLGPLGDCSSSCYSALDV 108 |
| SNV-62 | GYTFTSYF 109 | INPISGNT 110 | VRWTTVPSSFOF 111 |
| SNV-30 | GGAITSGRNT 112 | IYYSGST 113 | ARAKPSNLNFYYYGMDV 114 |
| SNV-45 | GFTFSNYN 115 | ISSSGGTT 116 | VRGRGQLATHFDY 117 |
| SNV-36 | GFRFSSYA 118 | IWFDGTNE 119 | ARPANGYSDYYYGMDV 120 |
| SNV-67 | GYTFTAYF 121 | INPISGDT 122 | ARVRSGYSYIDF 123 |
| SNV-21 | GFTFSSYG 124 | VWNDGGNK 125 | ARDGYYVSSGYHPLRYYYYYMDV 126 |
| SNV-50 | GFTFRNYA 127 | ISASGGIT 128 | AKGEIMRDTGYHDDAFDV 129 |
| SNV-56 | GFTFSHYN 130 | INSRNGYT 131 | ARDPPLYSGYDLGYYYYGMDV 132 |
| SNV-65 | GGSISSGGYF 133 | IYYSGST 134 | ARDVGGFDI 135 |
| SNV-66 | GFTFRSYG 136 | ISLDGSEK 137 | AKDRPYSWRDVLDY 138 |
| SNV-40 | GDSVSSNRAA 139 | TYYRSKWYN 140 | ARTPRAYSSGWHVPYYYSGMDV 141 |
| SNV-3 | GDSVSSNSAA 142 | TYYRSKWYN 143 | ARDRRKLEPPPFSYYYYGLDV 144 |
| SNV-42 | GFTFSTYE 145 | IRSSGSTV 146 | ARIPGGYTGYFDY 147 |
| ANDV-2 | GFSLSTSGMR 279 | IDWDDDK 280 | ARMMVGEGTFDY 281 |
| ANDV-3 | GYTFTNYG 282 | ISTFNGNT 283 | ARRPPYYDSTAFDI 284 |
| ANDV-4 | GLTFGHAW 285 | IKTKADGETT 286 | TTDLRALEALLSLGFVYTYNFMDV 287 |
| ANDV-5 | GDIYNYYG 288 | IIPVYGRP 289 | ARDTARSHYFGSGNDYGMDV 290 |

TABLE 3-continued

CDR HEAVY CHAIN SEQUENCES

| Clone | CDRH1 (SEQ ID NO:) | CDRH2 (SEQ ID NO:) | CDRH3 (SEQ ID NO:) |
|---|---|---|---|
| ANDV-11 | GDSISSGGFY 291 | MYYNGNT 292 | ARGGLYGQLIRGFFHP 293 |
| ANDV-12 | GFAFSSYW 294 | IKYDASEK 295 | AVPGPGYSFAYDY 296 |
| ANOV-22 | GFSFDDYA 297 | ISWNSGNT 298 | GKDLGGIVLAPIDS 299 |
| ANDV-23 | GFTFRNYA 300 | ISYDGGNK 301 | VKDLGGDYPPLDPHYWYYGMD TABLE 4-continued

CDR LIGHT CHAIN SEQUENCES

| Clone | CDRL1 (SEQ ID NO:) | CDRL2 (SEQ ID NO:) | CDRL3 (SEQ ID NO:) |
|---|---|---|---|
| SNV-66 | RDIHTS 199 | AAS 200 | QQYDELPLT 201 |
| SNV-40 | QDISDH 202 | DAS 203 | QQYDEVPPT 204 |
| SNV-3 | QDISNY 205 | DAS 206 | QQYDNVPLT 207 |
| SNV-42 | SSNIGAGYY 208 | GNN 209 | QSYDSSLSGWV 210 |
| ANDV-2 | QDISSL 330 | TAS 331 | QQYIRYWT 332 |
| ANDV-3 | SSNIGSNI 333 | SNN 334 | STWDASLNGVV 335 |
| ANDV-4 | QIVSSNY 336 | GAS 337 | QQYGSSPYT 338 |
| ANDV-5 | QSLLHSNGFNF 339 | LGS 340 | MQALQFPRT 341 |
| ANDV-11 | WSNIGRNH 342 | MSS 343 | VAWDDSLSGFYV 344 |
| ANDV-12 | QSVGTY 345 | EAS 346 | QQSDIPPWT 347 |
| ANOV-22 | SSDVGAFNY 348 | AVN 349 | SSYTVSYTLT 350 |
| ANDV-23 | SSNIGTKS 351 | RNN 352 | ASWDVSLSVWV 353 |
| ANDV-34 | QSVTSRY 354 | DTS 355 | QQYGTSPAVT 356 |
| ANDV-38 | NLGSKS 357 | DNY 358 | QVWDIGSEHWV 359 |
| ANDV-42 | NIETKR 360 | DDY 361 | HVWDISSDLPVV 362 |
| ANDV-43 | SSNIGRSF 363 | KND 364 | AAWVDSVNGLWV 365 |
| ANDV-44 | QSVSSSY 366 | ETS 367 | QQYSSPPWT 368 |
| ANDV-54 | SSDVGSYDL 369 | EGS 370 | CSYAGSSTWV 371 |
| ANDV-59 | SSNIRHNF 372 | ENN 373 | GTWDSSLSAPHWV 374 |
| ANDV-69A | SSNIGNNY 375 | DNN 376 | GTWDSSLNLWV 377 |
| ANDV-69B | NIGS KA 378 | SDS 379 | QVWDSSSDHRWV 380 |

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the method described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

VII. REFERENCES

The following references, to the extent that they provide exemplary procedural or other details supplementary to those set forth herein, are specifically incorporated herein by reference.

U.S. Pat. No. 3,817,837
U.S. Pat. No. 3,850,752
U.S. Pat. No. 3,939,350
U.S. Pat. No. 3,996,345
U.S. Pat. No. 4,196,265
U.S. Pat. No. 4,275,149
U.S. Pat. No. 4,277,437
U.S. Pat. No. 4,366,241
U.S. Pat. No. 4,472,509
U.S. Pat. No. 4,554,101
U.S. Pat. No. 4,680,338
U.S. Pat. No. 4,816,567
U.S. Pat. No. 4,867,973
U.S. Pat. No. 4,938,948
U.S. Pat. No. 5,021,236
U.S. Pat. No. 5,141,648
U.S. Pat. No. 5,196,066
U.S. Pat. No. 5,563,250
U.S. Pat. No. 5,565,332
U.S. Pat. No. 5,856,456
U.S. Pat. No. 5,880,270
U.S. Pat. No. 6,485,982
"Antibodies: A Laboratory Manual," Cold Spring Harbor Press, Cold Spring Harbor, NY, 1988.
Abbondanzo et al., *Am. J. Pediatr. Hematol. Oncol.*, 12(4), 480-489, 1990.
Allred et al., *Arch. Surg.*, 125(1), 107-113, 1990.
Atherton et al., *Biol. of Reproduction.* 32, 155-171, 1985.
Barton et al., *Euro Surveill.* 2016 Aug. 11; 21(32).
Beltramello et al., *Cell Host Microbe* 8, 271-283, 2010.
Brown et al., *J. Immunol. Meth.*, 12:130(1), :111-121, 1990.
Campbell, In: *Monoclonal Antibody Technology, Laboratory Techniques in Biochemistry and Molecular Biology*, Vol. 13, Burden and Von Knippenberg, Eds. pp. 75-83, Amsterdam, Elsevier, 1984.
Capaldi et al., *Biochem. Biophys. Res. Comm.*, 74(2):425-433, 1977.
De Jager et al., *Semin. Nucl. Med.* 23(2), 165-179, 1993.
Dholakia et al., *J. Biol. Chem.*, 264, 20638-20642, 1989.
Diamond et al., *J Virol* 77, 2578-2586, 2003.
Doolittle and Ben-Zeev, *Methods Mol. Biol.*, 109, :215-237, 1999.
Duffy et al., *N. Engl. J. Med.* 360, 2536-2543, 2009.
Elder et al. Infections, infertility and assisted reproduction. Part II: Infections in reproductive medicine & Part III: Infections and the assisted reproductive laboratory. Cambridge UK: Cambridge University Press; 2005.
Gefter et al., *Somatic Cell Genet.*, 3:231-236, 1977.
Gornet et al., *Semin Reprod Med.* 2016 September; 34(5): 285-292. Epub 2016 Sep. 14.
Gulbis and Galand, *Hum. Pathol.* 24(12), 1271-1285, 1993.
Halfon et al., *PLoS ONE* 2010; 5 (5) e10569
Hessell et al., *Nature* 449, 101-4, 2007.
Khatoon et al., *Ann. of Neurology*, 26, 210-219, 1989.

King et al., *J. Biol. Chem.*, 269, 10210-10218, 1989.
Kohler and Milstein, *Eur. J. Immunol.*, 6, 511-519, 1976.
Kohler and Milstein, *Nature*, 256, 495-497, 1975.
Kyte and Doolittle, *J. Mol. Biol.*, 157(1):105-132, 1982.
Mansuy et al., *Lancet Infect Dis.* 2016 October; 16(10): 1106-7.
Nakamura et al., In: *Enzyme Immunoassays: Heterogeneous and Homogeneous Systems*, Chapter 27, 1987.
O'Shannessy et al., *J. Immun. Meth.*, 99, 153-161, 1987.
Persic et al., *Gene* 187:1, 1997
Potter and Haley, *Meth. Enzymol.*, 91, 613-633, 1983.
Purpura et al., *Lancet Infect Dis.* 2016 October; 16(10): 1107-8. Epub 2016 Sep. 19.
Remington's Pharmaceutical Sciences, 15th Ed., 3:624-652, 1990.
Tang et al.. *J. Biol. Chem.*, 271:28324-28330, 1996.
Wawrzynczak & Thorpe, In: *Immunoconjugates, Antibody Conjugates in Radioimaging And Therapy Of Cancer*, Vogel (Ed.), NY, Oxford University Press, 28, 1987.
Yu et al., *J Immunol Methods* 336, 142-151. doi:10.1016/j.jim.2008.04.008, 2008.
Brocato et al., *Clin Vaccine Immunol* 20, 218-226, 2013.
Hooper et al., *Sci Transl Med* 6, 264ra162, 2014.
Hooper et al., *J Virol* 75, 8469-8477, 2001.
Hooper et al., *Vaccine* 31, 4314-4321, 2013.
Whitt, M. A., *J Virol* Methods 169, 365-374, 2010.
Allen, E. R., Krumm, S. A., Raghwani, J., Halldorsson, S., Elliott, A., Graham, V. A., Koudriakova, E., Harlos, K., Wright, D., Warimwe, G. M., et al. (2018). A protective monoclonal antibody targets a site of vulnerability on the surface of Rift Valley fever virus. Cell Rep 25, 3750-3758 e3754.
Alonso, D. O., Perez-Sautu, U., Bellomo, C. M., Prieto, K., Iglesias, A., Coelho, R., Periolo, N., Domenech, I., Talmon, G., Hansen, R., et al. (2020). Person-to-person transmission of Andes virus in hantavirus pulmonary syndrome, Argentina, 2014. Emerg Infect Dis 26, 756-759.
Alvarado, G., and Crowe, J. E., Jr. (2016). Development of human monoclonal antibodies against respiratory syncytial virus using a high efficiency human hybridoma technique. Methods Mol Biol 1442, 63-76.
Arikawa, J., Schmaljohn, A. L., Dalrymple, J. M., and Schmaljohn, C. S. (1989). Characterization of Hantaan virus envelope glycoprotein antigenic determinants defined by monoclonal antibodies. J Gen Virol 70 (Pt 3), 615-624.
Bangaru, S., Lang, S., Schotsaert, M., Vanderven. H. A., Zhu, X., Kose, N., Bombardi, R., Finn, J. A., Kent, S. J., Gilchuk, P., et al. (2019). A site of vulnerability on the Influenza virus hemagglutinin head domain trimer interface. Cell 177, 1136-1152 e1118.
Bharadwaj, M., Nofchissey, R., Goade, D., Koster, F., and Hjelle, B. (2000). Humoral immune responses in the hantavirus cardiopulmonary syndrome. J Infect Dis 182, 43-48.
Bignon, E. A., Albornoz, A., Guardado-Calvo, P., Rey, F. A., and Tischler, N. D. (2019). Molecular organization and dynamics of the fusion protein Gc at the hantavirus surface. Elife 8, e46028.
Boudreau, E. F., Josleyn, M., Ullman, D., Fisher, D., Dalrymple, L., Sellers-Myers, K., Loudon, P., Rusnak, J., Rivard, R., Schmaljohn, C., et al. (2012). A Phase 1 clinical trial of Hantaan virus and Puumala virus M-segment DNA vaccines for hemorrhagic fever with renal syndrome. Vaccine 30, 1951-1958.
Brocato, R. L., Josleyn, M. J., Wahl-Jensen, V., Schmaljohn, C. S., and Hooper, J. W. (2013). Construction and non-clinical testing of a Puumala virus synthetic M gene-based DNA vaccine. Clin Vaccine Immunol 20, 218-226.
Chu, Y. K., Jennings, G., Schmaljohn, A., Elgh, F., Hjelle, B., Lee, H. W., Jenison, S., Ksiazek, T., Peters, C. J., Rollin, P., et al. (1995). Cross-neutralization of hantaviruses with immune sera from experimentally infected animals and from hemorrhagic fever with renal syndrome and hantavinms pulmonary syndrome patients. J Infect Dis 172, 1581-1584.
Corti, D., Voss, J., Gamblin. S. J., Codoni, G., Macagno, A., Jarmssay, D., Vachieri, S. G., Pinna, D., Minola, A., Vanzetta, F., et al. (2011). A neutralizing antibody selected from plasma cells that binds to group 1 and group 2 influenza A hemagglutinins. Science 333, 850-856.
Custer. D. M., Thompson, E., Schmaljohn, C. S., Ksiazek, T. G., and Hooper, J. W. (2003). Active and passive vaccination against hantavirus pulmonary syndrome with Andes virus M genome segment-based DNA vaccine. J Virol 77, 9894-9905.
Duehr, J., McMahon, M., Williamson, B., Amanat, F., Durbin, A., Hawman, D. W., Noack, D., Uhl, S., Tan, G. S., Feldmann, H., et al. (2020). Neutralizing monoclonal antibodies against the Gn and the Gc of the Andes Virus glycoprotein spike complex protect from virus challenge in a preclinical hamster model. mBio 11, e00028-00020.
Engdahl, T. B., and Crowe, J. E., Jr. (2020). Humoral immunity to hantavirus infection. mSphere 5, e00482-00420.
Flyak, A. I., Kuzmina, N., Murin, C. D., Bryan, C., Davidson, E., Gilchuk, P., Gulka, C. P., Ilinykh, P. A., Shen, X., Huang, K., et al. (2018). Broadly neutralizing antibodies from human survivors target a conserved site in the Ebola virus glycoprotein HR2-MPER region. Nat Microbiol 3, 670-677.
Fox, J. M., Long, F., Edeling, M. A., Lin, H., van Duijl-Richter, M. K. S., Fong, R. H., Kahle, K. M., Smit, J. M., Jin, J., Simmons, G., et al. (2015). Broadly neutralizing alphavirus antibodies bind an epitope on E2 and inhibit entry and egress. Cell 163, 1095-1107.
Garrido, J. L., Prescott, J., Calvo, M., Bravo, F., Alvarez, R., Salas, A., Riquelme, R., Rioseco, M. L., Williamson, B. N., Haddock, E., et al. (2018). Two recombinant human monoclonal antibodies that protect against lethal Andes hantavirus infection in vivo. Sci Transl Med 10, eaat6420.
Gavrilovskaya, I. N., Brown, E. J., Ginsberg, M. H., and Mackow, E. R. (1999). Cellular entry of hantaviruses which cause hemorrhagic fever with renal syndrome is mediated by beta3 integrins. J Virol 73, 3951-3959.
Gavrilovskaya, I. N., Gorbunova, E. E., and Mackow, E. R. (2010). Pathogenic hantaviruses direct the adherence of quiescent platelets to infected endothelial cells. J Virol 84, 4832-4839.
Gavrilovskaya, I. N., Shepley, M., Shaw, R., Ginsberg, M. H., and Mackow, E. R. (1998). beta3 integrins mediate the cellular entry of hantaviruses that cause respiratory failure. Proc Natl Acad Sci USA 95, 7074-7079.
Giudicelli, V., Brochet, X., and Lefranc, M. P. (2011). IMGT/V-QUEST: IMGT standardized analysis of the immunoglobulin (IG) and T cell receptor (TR) nucleotide sequences. Cold Spring Harb Protoc 2011, 695-715.
Guardado-Calvo, P., Bignon, E. A., Stettner. E., Jeffers, S. A., Perez-Vargas, J., Pehau-Arnaudet, G., Tortorici, M. A., Jestin, J. L., England, P., Tischler, N. D., et al. (2016). Mechanistic insight into bunyavirus-induced membrane fusion from structure-function analyses of the hantavirus envelope glycoprotein Gc. PLoS Pathog 12, e1005813.

Heiskanen. T., Lundkvist, A., Soliymani, R., Koivunen. E., Vaheri, A., and Lankinen, H. (1999). Phage-displayed peptides mimicking the discontinuous neutralization sites of puumala Hantavirus envelope glycoproteins. Virology 262, 321-332.

Higa, M. M., Petersen, J., Hooper, J., and Doms, R. W. (2012). Efficient production of Hantaan and Puumala pseudovirions for viral tropism and neutralization studies. Virology 423, 134-142.

Hooper, J. W., Brocato, R. L., Kwilas, S. A., Hammerbeck, C. D., Josleyn, M. D., Royals, M., Ballantyne, J., Wu, H., Jiao, J. A., Matsushita, H., et al. (2014a). DNA vaccine-derived human IgG produced in transchromosomal bovines protect in lethal models of hantavirus pulmonary syndrome. Sci Transl Med 6, 264ra162.

Hooper, J. W., Custer, D. M., Smith, J., and Wahl-Jensen, V. (2006). Hantaan/Andes virus DNA vaccine elicits a broadly cross-reactive neutralizing antibody response in nonhuman primates. Virology 347, 208-216.

Hooper, J. W., Custer, D. M., Thompson, E., and Schmaljohn, C. S. (2001a). DNA vaccination with the Hantaan virus M gene protects Hamsters against three of four HFRS hantaviruses and elicits a high-titer neutralizing antibody response in Rhesus monkeys. J Virol 75, 8469-8477.

Hooper, J. W., Ferro, A. M., and Wahl-Jensen, V. (2008). Immune serum produced by DNA vaccination protects hamsters against lethal respiratory challenge with Andes virus. J Virol 82, 1332-1338.

Hooper, J. W., Josleyn, M., Ballantyne, J., and Brocato, R. (2013). A novel Sin Nombre virus DNA vaccine and its inclusion in a candidate pan-hantavirus vaccine against hantavirus pulmonary syndrome (HPS) and hemorrhagic fever with renal syndrome (HFRS). Vaccine 31, 4314-4321.

Hooper, J. W., Larsen, T., Custer, D. M., and Schmaljohn, C. S. (2001b). A lethal disease model for hantavirus pulmonary syndrome. Virology 289, 6-14.

Hooper, J. W., Moon, J. E., Paolino, K. M., Newcomer, R., McLain, D. E., Josleyn, M., Hannaman, D., and Schmaljohn, C. (2014b). A Phase 1 clinical trial of Hantaan virus and Puumala virus M-segment DNA vaccines for haemorrhagic fever with renal syndrome delivered by intramuscular electroporation. Clin Microbiol Infect 20 Suppl 5, 110-117.

Huiskonen, J. T., Hepojoki, J., Laurinmaki, P., Vaheri, A., Lankinen, H., Butcher, S. J., and Grunewald, K. (2010). Electron cryotomography of Tula hantavirus suggests a unique assembly paradigm for enveloped viruses. J Virol 84, 4889-4897.

Ilona Rissanen, R. S., Stefanie A. Krumm, Jeffrey Seow, Ruben J. G. Hulswit, Guido C. Paesen, Jussi Hepojoki, Olli Vapalahti, Ake Lundkvist, Olivier Reynard, Viktor Volchkov, Katie J. Doores, Juha T. Huiskonen, Thomas A. Bowden (2020). Molecular rationale for hantavirus neutralization by a reservoir host-derived monoclonal antibody. bioRxiv 2020.04.17, 029876.

Jangra, R. K., Herbert, A. S., Li, R., Jae, L. T., Kleinfelter, L. M., Slough, M. M., Barker, S. L., Guardado-Calvo, P., Roman-Sosa, G., Dieterle, M. E., et al. (2018). Protocadherin-1 is essential for cell entry by New World hantaviruses. Nature 563, 559-563.

Koch, J., Liang, M., Queitsch, I., Kraus, A. A., and Bautz, E. K. (2003). Human recombinant neutralizing antibodies against hantaan virus G2 protein. Virology 308, 64-73.

Kruger, D. H., Figueiredo, L. T., Song, J. W., and Klempa, B. (2015). Hantaviruses—globally emerging pathogens. J Clin Virol 64, 128-136.

Li, S., Rissanen, I., Zeltina, A., Hepojoki, J., Raghwani, J., Harlos, K., Pybus, O. G., Huiskonen, J. T., and Bowden, T. A. (2016). A molecular-level account of the antigenic hantaviral surface. Cell Rep 15, 959-967.

Lundkvist, A., Hukic, M., Horling, J., Gilljam, M., Nichol, S., and Niklasson, B. (1997). Puumala and Dobrava viruses cause hemorrhagic fever with renal syndrome in Bosnia-Herzegovina: evidence of highly cross-neutralizing antibody responses in early patient sera. J Med Virol 53, 51-59.

Martinez, V. P., Bellomo, C., San Juan, J., Pinna, D., Forlenza, R., Elder, M., and Padula, P. J. (2005). Person-to-person transmission of Andes virus. Emerg Infect Dis 11, 1848-1853.

McCoy, L. E., Falkowska, E., Doores, K. J., Le. K., Sok, D., van Gils, M. J., Euler, Z., Burger, J. A., Seaman. M. S., Sanders, R. W., et al. (2015). Incomplete neutralization and deviation from sigmoidal neutralization curves for HIV broadly neutralizing monoclonal antibodies. PLoS Pathog 11, e1005110.

Morens, D. M., and Fauci, A. S. (2020). Emerging pandemic diseases: How we got to COVID-19. Cell 182, 1077-1092.

Parvate, A., Williams, E. P., Taylor, M. K., Chu, Y. K., Lanman, J., Saphire, E. O., and Jonsson, C. B. (2019). Diverse morphology and structural features of Old and New World hantaviruses. Viruses 11, 862.

Perley, C. C., Brocato, R. L., Wu, H., Bausch, C., Karmali, P. P., Vega, J. B., Cohen, M. V., Somerville, B., Kwilas, S. A., Principe, L. M., et al. (2020). Anti-HFRS human IgG produced in transchromosomic bovines has potent hantavirus neutralizing activity and Is protective in animal models. Front Microbiol 11, 832.

Plyusnin, A., Vapalahti, O., and Vaheri, A. (1996). Hantaviruses: genome structure, expression and evolution. J Gen Virol 77 (Pt 11), 2677-2687.

Powell, L. A., Fox, J. M., Kose, N., Kim, A. S., Majedi, M., Bombardi, R., Carnahan, R. H., Slaughter, J. C., Morrison, T. E., Diamond, M. S., et al. (2020a). Human monoclonal antibodies against Ross River virus target epitopes within the E2 protein and protect against disease. PLoS Pathog 16, e1008517.

Powell, L. A., Miller, A., Fox, J. M., Kose, N., Klose, T., Kim, A. S., Bombardi, R., Tennekoon, R. N., Dharshan de Silva, A., Carnahan, R. H., el al. (2020b). Human mAbs broadly protect against arthritogenic alphaviruses by recognizing conserved elements of the Mxra8 receptor-binding site. Cell Host Microbe 20, 30404-30402.

Prist, P. R., Uriarte, M., Tambosi, L. R., Prado, A., Pardini, R., PS, D. A., and Metzger, J. P. (2016). Landscape, environmental and social predictors of hantavirus risk in Sao Paulo, Brazil. PLoS One 11, e0163459.

Ray, N., Whidby, J., Stewart, S., Hooper, J. W., and Bertolotti-Ciarlet, A. (2010). Study of Andes virus entry and neutralization using a pseudovirion system. J Virol Methods 163, 416-423.

Schnell, M. J., Buonocore, L., Kretzschmar, E., Johnson, E., and Rose, J. K. (1996). Foreign glycoproteins expressed from recombinant vesicular stomatitis viruses are incorporated efficiently into virus particles. Proc Natl Acad Sci USA 93, 11359-11365.

Serris, A., Stass, R., Bignon, E. A., Muena, N. A., Manuguerra, J. C., Jangra, R. K., Li, S., Chandran, K., Tischler, N. D., Huiskonen, J. T., et al. (2020). The hantavirus surface glycoprotein lattice and its fusion control mechanism. Cell 20, 31064-31063.

Smith, S. A., and Crowe, J. E., Jr. (2015). Use of human hybridoma technology to isolate human monoclonal antibodies. Microbiol Spectr 3, AID-0027-2014.

Tischler, N. D., Galeno, H., Rosemblatt, M., and Valenzuela, P. D. (2005). Human and mdent humoral immune responses to Andes virus structural proteins. Virology 334, 319-326.

Turchaninova, M. A., Davydov, A., Britanova, O. V., Shugay, M., Bikos, V., Egorov, E. S., Kirgizova, V. I., Merzlyak, E. M., Staroverov, D. B., Bolotin, D. A., et al. (2016). High-quality full-length immunoglobulin profiling with unique molecular barcoding. Nat Protoc 11, 1599-1616.

Wahl-Jensen, V., Chapman, J., Asher, L., Fisher, R., Zimmerman, M., Larsen, T., and Hooper, J. W. (2007). Temporal analysis of Andes virus and Sin Nombre virus infections of Syrian hamsters. J Virol 81, 7449-7462.

Wang, M., Pennock, D. G., Spik, K. W., and Schmaljohn, C. S. (1993). Epitope mapping studies with neutralizing and non-neutralizing monoclonal antibodies to the G1 and G2 envelope glycoproteins of Hantaan virus. Virology 197, 757-766.

Webb, N. E., Montefiori, D. C., and Lee, B. (2015). Dose-response curve slope helps predict therapeutic potency and breadth of HIV broadly neutralizing antibodies. Nat Commun 6, 8443.

Wec, A. Z., Nyakatura, E. K., Herbert, A. S., Howell, K. A., Holtsberg, F. W., Bakken, R. R., Mittler, E., Christin, J. R., Shulenin, S., Jangra, R. K., et al. (2016). A "Trojan horse" bispecific-antibody strategy for broad protection against ebolaviruses. Science 354, 350-354.

Wec, A. Z., Wrapp, D., Herbert, A. S., Maurer, D. P., Haslwanter, D., Sakharkar, M., Jangra, R. K., Dieterle, M. E., Lilov, A., Huang, D., et al. (2020). Broad neutralization of SARS-related viruses by human monoclonal antibodies. Science 369, 731-736.

Whitt, M. A. (2010). Generation of VSV pseudotypes using recombinant DeltaG-VSV for studies on virus entry, identification of entry inhibitors, and immune responses to vaccines. J Virol Methods 169, 365-374.

Willensky, S., Bar-Rogovsky, H., Bignon, E. A., Tischler, N. D., Modis, Y., and Dessau, M. (2016). Crystal structure of glycoprotein C from a hantavirus in the post-fusion conformation. PLoS Pathog 12, e1005948.

Yu, X., McGraw, P. A., House, F. S., and Crowe, J. E., Jr. (2008). An optimized electrofusion-based protocol for generating virus-specific human monoclonal antibodies. J Immunol Methods 336, 142-151.

What is claimed is:

1. A method of detecting a hantavirus infection in a subject comprising:

(a) contacting a sample from said subject with an antibody or antibody fragment comprising heavy chain complementarity determining region (CDRH1-3) sequences and light chain complementarity determining region (CDRL1-3) sequences comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 103-105 and 166-168; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 130-132 and 193-195; SEQ ID NOS: 133-135 and 196-198; SEQ ID NOS: 136-138 and 199-201; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEQ ID NOS: 312-314 and 363-365; SEQ ID NOS: 315-317 and 366-368; SEQ ID NOS: 318-320 and 369-371; SEQ ID NOS: 321-323 and 372-374; SEQ ID NOS: 324-326 and 375-377; or SEQ ID NOS: 327-329 and 378-380; and (b) detecting hantavirus in said sample by binding of said antibody or antibody fragment to a hantavirus antigen in said sample.

2. A method of treating a subject infected with hantavirus, or reducing the likelihood of infection of a subject at risk of contracting hantavirus, comprising delivering to said subject an antibody or antibody fragment comprising heavy chain complementarity determining region (CDRH1-3) sequences and light chain complementarity determining region (CDRL1-3) sequences comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEQ ID NOS: 312-314 and 363-365; SEQ ID NOS: 315-317 and 366-368; or SEQ ID NOS: SEQ ID NOS: 321-323 and 372-374.

3. The method of claim 2, the antibody or antibody fragment is encoded by heavy chain variable region sequences and light chain variable region sequences comprising SEQ ID NOS: 1 and 2, SEQ ID NOS: 3 and 4; SEQ ID NOS: 5 and 6, SEQ ID NOS: 7 and 8, SEQ ID NOS: 9 and 10, SEQ ID NOS: 11 and 12, SEQ ID NOS: 15 and 16, SEQ ID NOS: 17 and 18, SEQ ID NOS: 19 and 20, SEQ ID NOS: 21 and 22, SEQ ID NOS: 23 and 24, SEQ ID NOS: 25 and 26, SEQ ID NOS: 27 and 28, SEQ ID NOS: 29 and 30; SEQ ID NOS: 39 and 40, SEQ ID NOS: 41 and 42, SEQ ID NOS: 211 and 212, SEQ ID NOS: 213 and 214, SEQ ID NOS: 215 and 216, SEQ ID NOS: 217 and 218, SEQ ID NOS: 219 and 220, SEQ ID NOS: 221 and 222, SEQ ID NOS: 223 and 224, SEQ ID NOS: 225 and 226, SEQ ID NOS: 227 and 228, SEQ ID NOS: 229 and 230, SEQ ID NOS: 231 and 232, SEQ ID NOS: 233 and 234, SEQ ID NOS: 235 and 236, or SEQ ID NOS: 239 and 240, respectively.

4. The method of claim 2, the antibody or antibody fragment is encoded by heavy chain variable region sequences and light chain variable region sequences having 95% identity to SEQ ID NOS: 1 and 2, SEQ ID NOS: 3 and 4; SEQ ID NOS: 5 and 6, SEQ ID NOS: 7 and 8, SEQ ID NOS: 9 and 10, SEQ ID NOS: 11 and 12, SEQ ID NOS: 15 and 16, SEQ ID NOS: 17 and 18, SEQ ID NOS: 19 and 20, SEQ ID NOS: 21 and 22, SEQ ID NOS: 23 and 24, SEQ ID NOS: 25 and 26, SEQ ID NOS: 27 and 28, SEQ ID NOS: 29 and 30; SEQ ID NOS: 39 and 40, SEQ ID NOS: 41 and 42, SEQ ID NOS: 211 and 212, SEQ ID NOS: 213 and 214, SEQ ID NOS: 215 and 216, SEQ ID NOS: 217 and 218, SEQ ID NOS: 219 and 220, SEQ ID NOS: 221 and 222, SEQ ID NOS: 223 and 224, SEQ ID NOS: 225 and 226, SEQ ID NOS: 227 and 228, SEQ ID NOS: 229 and 230, SEQ ID NOS: 231 and 232, SEQ ID NOS: 233 and 234, SEQ ID NOS: 235 and 236, or SEQ ID NOS: 239 and 240, respectively.

5. The method of claim 2, wherein said antibody or antibody fragment is encoded by heavy chain variable region sequences and light chain variable region sequences having 70%, 80%, or 90% identity to SEQ ID NOS: 1 and 2, SEQ ID NOS: 3 and 4; SEQ ID NOS: 5 and 6, SEQ ID NOS: 7 and 8, SEQ ID NOS: 9 and 10, SEQ ID NOS: 11 and 12, SEQ ID NOS: 15 and 16, SEQ ID NOS: 17 and 18, SEQ ID NOS: 19 and 20, SEQ ID NOS: 21 and 22, SEQ ID NOS: 23 and 24, SEQ ID NOS: 25 and 26, SEQ ID NOS: 27 and 28, SEQ ID NOS: 29 and 30; SEQ ID NOS: 39 and 40, SEQ ID NOS: 41 and 42, SEQ ID NOS: 211 and 212, SEQ ID NOS: 213 and 214, SEQ ID NOS: 215 and 216, SEQ ID NOS: 217 and 218, SEQ ID NOS: 219 and 220, SEQ ID NOS: 221 and 222, SEQ ID NOS: 223 and 224, SEQ ID NOS: 225 and 226, SEQ ID NOS: 227 and 228, SEQ ID NOS: 229 and 230, SEQ ID NOS: 231 and 232, SEQ ID NOS: 233 and 234, SEQ ID NOS: 235 and 236, or SEQ ID NOS: 239 and 240, respectively.

6. The method of claim 2, wherein said antibody or antibody fragment comprises heavy chain variable region sequences and light chain variable region sequences comprising SEQ ID NOS: 43 and 44, SEQ ID NOS: 45 and 46, SEQ ID NOS: 47 and 48; SEQ ID NOS: 49 and 50, SEQ ID NOS: 51 and 52, SEQ ID NOS: 53 and 54, SEQ ID NOS: 57 and 58, SEQ ID NOS: 59 and 60, SEQ ID NOS: 61 and 62, SEQ ID NOS: 63 and 64, SEQ ID NOS: 65 and 66, SEQ ID NOS: 67 and 68, SEQ ID NOS: 69 and 70, SEQ ID NOS: 71 and 72, SEQ ID NOS: 79 and 80, SEQ ID NOS: 81 and 82, SEQ ID NOS: 83 and 84, SEQ ID NOS: 245 and 246, SEQ ID NOS: 247 and 248, SEQ ID NOS: 249 and 250, SEQ ID NOS: 251 and 252, SEQ ID NOS: 253 and 254, SEQ ID NOS: 255 and 256, SEQ ID NOS: 257 and 258, SEQ ID NOS: 259 and 260, SEQ ID NOS: 261 and 262, SEQ ID NOS: 263 and 264, SEQ ID NOS: 265 and 266, SEQ ID NOS: 267 and 268, SEQ ID NOS: 269 and 270, or SEQ ID NOS: 273 and 274.

7. The method of claim 2, wherein said antibody or antibody fragment comprises heavy chain variable region sequences and light chain variable region sequences having 70%, 80% or 90% identity to SEQ ID NOS: 43 and 44, SEQ ID NOS: 45 and 46, SEQ ID NOS: 47 and 48; SEQ ID NOS: 49 and 50, SEQ ID NOS: 51 and 52, SEQ ID NOS: 53 and 54, SEQ ID NOS: 57 and 58, SEQ ID NOS: 59 and 60, SEQ ID NOS: 61 and 62, SEQ ID NOS: 63 and 64, SEQ ID NOS: 65 and 66, SEQ ID NOS: 67 and 68, SEQ ID NOS: 69 and 70, SEQ ID NOS: 71 and 72, SEQ ID NOS: 79 and 80, SEQ ID NOS: 81 and 82, SEQ ID NOS: 83 and 84, SEQ ID NOS: 245 and 246, SEQ ID NOS: 247 and 248, SEQ ID NOS: 249 and 250, SEQ ID NOS: 251 and 252, SEQ ID NOS: 253 and 254, SEQ ID NOS: 255 and 256, SEQ ID NOS: 257 and 258, SEQ ID NOS: 259 and 260, SEQ ID NOS: 261 and 262, SEQ ID NOS: 263 and 264, SEQ ID NOS: 265 and 266, SEQ ID NOS: 267 and 268, SEQ ID NOS: 269 and 270, or SEQ ID NOS: 273 and 274.

8. The method of claim 2, wherein said antibody or antibody fragment comprises heavy chain variable region sequences and light chain variable region sequences having 95% identity to SEQ ID NOS: 43 and 44, SEQ ID NOS: 45 and 46, SEQ ID NOS: 47 and 48; SEQ ID NOS: 49 and 50, SEQ ID NOS: 51 and 52, SEQ ID NOS: 53 and 54, SEQ ID NOS: 57 and 58, SEQ ID NOS: 59 and 60, SEQ ID NOS: 61 and 62, SEQ ID NOS: 63 and 64, SEQ ID NOS: 65 and 66, SEQ ID NOS: 67 and 68, SEQ ID NOS: 69 and 70, SEQ ID NOS: 71 and 72, SEQ ID NOS: 79 and 80, SEQ ID NOS: 81 and 82, SEQ ID NOS: 83 and 84, SEQ ID NOS: 245 and 246, SEQ ID NOS: 247 and 248, SEQ ID NOS: 249 and 250, SEQ ID NOS: 251 and 252, SEQ ID NOS: 253 and 254, SEQ ID NOS: 255 and 256, SEQ ID NOS: 257 and 258, SEQ ID NOS: 259 and 260, SEQ ID NOS: 261 and 262, SEQ ID NOS: 263 and 264, SEQ ID NOS: 265 and 266, SEQ ID NOS: 267 and 268, SEQ ID NOS: 269 and 270, or SEQ ID NOS: 273 and 274.

9. The method of claim 2, wherein the antibody fragment is a recombinant single chain fragment variable (scFv) antibody, Fab fragment, F(ab')$_2$ fragment, or Fv fragment.

10. The method of claim 2, wherein said antibody is an IgG, or a recombinant IgG antibody or antibody fragment comprising an Fc portion mutated to eliminate or enhance FcR interactions, to increase half-life and/or increase therapeutic efficacy, or is glycan modified to eliminate or enhance FcR interactions.

11. The method of claim 10, wherein the Fc comprises a mutation selected from the group consisting of LALA, N297, GASD/ALIE, YTE and LS, or comprises a glycan modification selected from the group consisting of enzymatic addition of glycan, enzymatic removal of glycan, chemical addition of glycan, and chemical removal of glycan, or is expressed in a cell line engineered with defined glycosylating pattern.

12. The method of claim 2, wherein said antibody is a chimeric antibody or a bispecific antibody.

13. The method of claim 2, wherein said antibody or antibody fragment is administered prior to infection or after infection.

14. The method of claim 2, wherein said subject is a pregnant female, a sexually active female, or a female undergoing fertility treatments.

15. The method of claim 2, wherein delivering comprises antibody or antibody fragment administration, or genetic delivery with an RNA or DNA sequence or vector encoding the antibody or antibody fragment.

16. A monoclonal antibody or antigen-binding fragment thereof, wherein the antibody or antibody fragment comprises heavy chain complementarity determining region (CDRH1-3) sequences and light chain complementarity determining region (CDRL1-3) sequences comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 103-105 and 166-168; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 130-132 and 193-195; SEQ ID NOS: 133-135 and 196-198; SEQ ID NOS: 136-138 and 199-201; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEQ ID NOS: 312-314 and 363-365; SEQ ID NOS: 315-317 and 366-368; SEQ ID NOS: 318-320 and 369-371; SEQ ID NOS: 321-323 and 372-374; SEQ ID NOS: 324-326 and 375-377; or SEQ ID NOS: 327-329 and 378-380.

17. A vaccine formulation comprising one or more expression vectors encoding an antibody or antibody fragment comprising heavy chain complementarity determining region (CDRH1-3) sequences and light chain complementarity determining region (CDRL1-3) sequences comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEO ID NOS: 312-314 and 363-365; SEQ ID NOS: 315-317 and 366-368; or SEQ ID NOS: SEQ ID NOS: 321-323 and 372-374.

18. The monoclonal antibody or antigen-binding fragment thereof of claim 16, wherein said antibody is an IgG, or a recombinant IgG antibody or antibody fragment comprising an Fc portion mutated to eliminate or enhance FcR interactions, to increase half-life and/or increase therapeutic efficacy, or is glycan modified to eliminate or enhance FcR interactions.

19. An engineered cell encoding an antibody or antibody fragment, wherein the antibody or antibody fragment comprises heavy chain complementarity determining region (CDRH1-3) sequences and light chain complementarity determining region (CDRL1-3) sequences comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 103-105 and 166-168; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 130-132 and 193-195; SEQ ID NOS: 133-135 and 196-198; SEQ ID NOS: 136-138 and 199-201; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEQ ID NOS: 312-314 and 363-365; SEQ ID NOS: 315-317 and 366-368; SEQ ID NOS: 318-320 and 369-371; SEQ ID NOS: 321-323 and 372-374; SEQ ID NOS: 324-326 and 375-377; or SEQ ID NOS: 327-329 and 378-380.

20. A vaccine formulation comprising one or more antibodies or antibody fragments comprising heavy chain complementarity determining region (CDRH1-3) sequences and light chain complementarity determining region (CDRL1-3) comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEQ ID NOS: 312-314 and 363-365; SEQ ID NOS: 315-317 and 366-368; or SEQ ID NOS: SEQ ID NOS: 321-323 and 372-374.

21. A method of protecting the health of a placenta and/or fetus of a pregnant subject infected with or at risk of infection with hantavirus comprising delivering to said subject an antibody or antibody fragment comprising heavy chain complementarity determining region (CDRH1-3) sequences and light chain complementarity determining region (CDRL1-3) sequences comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEQ ID NOS: 312-314 and 363-365; SEQ ID NOS: 315-317 and 366-368; or SEQ ID NOS: SEQ ID NOS: 321-323 and 372-374.

22. A method of determining the antigenic stability, antigen amount, correct antigen conformation and/or correct antigen sequence of a hantavirus antigen comprising:
(a) contacting a sample comprising said antigen with a first antibody or antibody fragment comprising heavy chain complementarity determining region (CDRH1-3) sequences and light chain complementarity determining region (CDRL1-3) sequences comprising SEQ ID NOS: 85-87 and 148-150, SEQ ID NOS: 88-90 and 151-153, SEQ ID NOS: 91-93 and 154-156; SEQ ID NOS: 94-96 and 157-159; SEQ ID NOS: 97-99 and 160-162; SEQ ID NOS: 100-102 and 163-165; SEQ ID NOS: 103-105 and 166-168; SEQ ID NOS: 106-108 and 169-171; SEQ ID NOS: 109-111 and 172-174; SEQ ID NOS: 112-114 and 175-177; SEQ ID NOS: 115-117 and 178-180; SEQ ID NOS: 118-120 and 181-183; SEQ ID NOS: 121-123 and 184-186; SEQ ID NOS: 124-126 and 187-189; SEQ ID NOS: 127-129 and 190-192; SEQ ID NOS: 130-132 and 193-195; SEQ ID NOS: 133-135 and 196-198; SEQ ID NOS: 136-138 and 199-201; SEQ ID NOS: 142-144 and 205-207; SEQ ID NOS: 145-147 and 208-210; SEQ ID NOS: 279-281 and 330-332; SEQ ID NOS: 282-284 and 333-335; SEQ ID NOS: 285-287 and 336-338; SEQ ID NOS: 288-290 and 339-341; SEQ ID NOS: 291-293 and 342-344; SEQ ID NOS: 294-296 and 345-347; SEQ ID NOS: 297-299 and 348-350; SEQ ID NOS: 300-302 and 351-353; SEQ ID NOS: 303-305 and 354-356; SEQ ID NOS: 306-308 and 357-359; SEQ ID NOS: 309-311 and 360-362; SEQ ID NOS: 312-314 and 363-365; SEQ ID NOS: 315-317 and 366-368; SEQ ID NOS: 318-320 and 369-371; SEQ ID NOS: 321-323 and 372-374; SEQ ID NOS: 324-326 and 375-377; or SEQ ID NOS: 327-329 and 378-380; and
(b) determining antigenic stability, antigen amount, correct antigen conformation and/or correct antigen sequence of said antigen by detectable binding of said first antibody or antibody fragment to said antigen.

* * * * *

SEQUENCE LISTING

<160> NUMBER OF SEQ ID NOS: 453

<210> SEQ ID NO 1
<211> LENGTH: 366
<212> TYPE: DNA
<213> ORGANISM: Artificial sequence
<220> FEATURE:
<223> OTHER INFORMATION: Synthetic oligonucleotide

<400> SEQUENCE: 1

```
gaggtgcaac tgttggagtc tgggggaggc ttgatacagt ccggggggtc gctgagactc      60
tcctgtgttg tctctggaat cgattttagc aactatgcca tgacctgggt ccgccacgct     120
ccagggaagg ggctggagtg gatctcgact attagtggta gtggcgacac cacaaactac     180
gcagactccg cgaagggccg gttcaccatc tccagagaca attccaggaa cacactgttt     240
gtgcgaatta atagcctgag agccgaggac acggccattt attactgtgc gaaaactatg     300
ggaccagttt ctggccaata tgcttttgat atctggggcc aagggacaaa ggtcaccgtc     360
tcctca                                                                 366
```

<210> SEQ ID NO 2
<211> LENGTH: 315
<212> TYPE: DNA
<213> ORGANISM: Artificial sequence
<220> FEATURE:
<223> OTHER INFORMATION: Synthetic oligonucleotide

<400> SEQUENCE: 2

```
tcctatgagc tgactcagcc accctcagtg tccgtgtccc aggacagac agccaccatc      60 acctgttctg gagataattt ggggaataaa tttgcttcct ggtatcagca gaagccaggc     120
ctgtcccctg tgttggtcat ctatcaagat aagaagcggc cctcaggaat ccctgagcga     180
ttctctggct ccaactctgg gaacacagcc actctgacca tcagcgggac ccaggctatg     240
gatgaggctg actatttctg tcaggcgtgg cacagcggct cggttttcgg cggagggacc     300
aagctgaccg tccta                                                       315
```

<210> SEQ ID NO 3
<211> LENGTH: 369
<212> TYPE: DNA
<213> ORGANISM: Artificial sequence
<220> FEATURE:
<223> OTHER INFORMATION: Synthetic oligonucleotide

<400> SEQUENCE: 3

| | |
|---|---:|
| caggtgcagt tggtggagtc tgggggaggc gtggtccagc ctgggaggtc cctgagactc | 60 |
| tcctgtgcag cctctggatt caccttcagt agctatgcca tgcactgggt ccgccaggct | 120 |
| ccaggcaagg ggctggagtg ggtggcactt atatcacttg atggatttaa tacatactat | 180 |
| ccagactccg tgaagggccg attcaccatc tccagagaca gttccaagaa cacgctgttt | 240 |
| ctgcaactga acagtctgag aattgaggac acggctgtgt attactgtgt gaaagatcgg | 300 |
| ggtcctaccg gttcagggag ttatgggatg gacgtctggg gccaagggac cacggtcacc | 360 |
| gtctcctca | 369 |

<210> SEQ ID NO 4
<211> LENGTH: 318
<212> TYPE: DNA
<213> ORGANISM: Artificial sequence
<220> FEATURE:
<223> OTHER INFORMATION: Synthetic oligonucleotide

<400> SEQUENCE: 4

| | |
|---|---:|
| tcctatgagt tgactcagcc accctcagtg tccgtgtccc caggacagac agccagcatc | 60 |
| acctgctctg gagataaaatt ggggaataaa tttgcttgtt ggtatcagca gaagccaggc | 120 |
| cagtcccctg tattggtcat ccatcaagat aagaagcggc cctcagggat ccctgagcga | 180 |
| ttctctggct ccaactctgg gaacacagcc actctgacca tcagcgggac ccaggctgtg | 240 |
| gatgaggctg actattactg tcaggcgtgg gacagcagca atgtggtctt cggcggaggg | 300 |
| accaagctga ccgtcccta | 318 |

<210> SEQ ID NO 5
<211> LENGTH: 360
<212> TYPE: DNA
<213> ORGANISM: Artificial sequence
<220> FEATURE:
<223> OTHER INFORMATION: Synthetic oligonucleotide

<400> SEQUENCE: 5

| | |
|---|---:|
| caagtgcaac tgcaagagtc gggcccagga ctggtgaagc cttcggggac cctgtccctc | 60 |
| acctgccttg tgtctggtgg ctccatcggc agcagtcact ggtggagttg ggtccgccag | 120 |
| tccccaggga aggggctgga gtggtttgga gaaatccatc atactgagag taccaactac | 180 |
| aacccgtccc tcaagagtcg agtcaccata actatggaca gtccaagaa ccaattctac | 240 |
| ctgaagctga cctctgtgac cgccgcggac acggccgtat attattgtgc gagagcaggg | 300 |
| gcgaccttcg cggaaccttt ttctttgtgg ggccaaggga caatggtcac cgtctctcca | 360 |

<210> SEQ ID NO 6
<211> LENGTH: 318
<212> TYPE: DNA
<213> ORGANISM: Artificial sequence
<220> FEATURE:
<223> OTHER INFORMATION: Synthetic oligonucleotide

<400> SEQUENCE: 6

```
gacatccaga tgacccagtc tccttctacc ctgtctgcat ctgtaggaga cagagtcacc      60
atcacttgcc gggccggtca gagtgtgact aactggttgg cctggtatca gcagaaacca     120
gggaaagccc ctaagctcct gatctataag gcgtctattt tagcaagtgg agtcccttca     180
aggttcagcg gcagtggatc tgggacagaa ttcactctca ccatcagcag tgtgcagcct     240
gatgattctg cagtttatta ctgccaacag tataaaagtc accggacgtt cggccagggg     300
accaaggtgg aaatcaaa                                                   318

<210> SEQ ID NO 7
<211> LENGTH: 360
<212> TYPE: DNA
<213> ORGANISM: Artificial sequence
<220> FEATURE:
<223> OTHER INFORMATION: Synthetic oligonucleotide

<400> SEQUENCE: 7
caggtgcagc tgcaggagtc gggcccagga ctggtgaagc cttcggggac cctgtccctc      60
acctgcgctg tctctggtgg ctccatcagt agtagtaact ggtggagttg ggtccgccag     120
cccccaggga aggggctgga gtggattggg gaaatctatc atagtgggag caccaactac     180
aacccgtccc tcaagagtcg agccaccata tcagtagaca agtccaagaa ccagttctcc     240
ctgaagttga gctctgtgac cgccgcggac acggccttct attactgtgc gagagccagg     300
ggggagtggc tggcccactt tgactactgg ggccagggaa ccctggtcac cgtctcctca     360

<210> SEQ ID NO 8
<211> LENGTH: 318
<212> TYPE: DNA
<213> ORGANISM: Artificial sequence
<220> FEATURE:
<223> OTHER INFORMATION: Synthetic oligonucleotide

<400> SEQUENCE: 8
gacatccaga tgacccagtc tccttccact ctgtctgcat ctgtaggaga cagagtcacc      60
atcacttgcc gggccagtca gagtattagt agatggttgg cctggtatca gcagaaacca     120
gggaaagccc ctaagctcct gatctataag gcgtctagtt tagaaagtgg ggtcccatca     180
aggttcagcg gcagtggatc tgggacagaa ttcactctca ccatcagcag cctgcagcct     240
gatgattttg caatttatta ctgccaacag tataatactg ataagacgtt cggccaaggg     300
accaaggtgg aaatcaaa                                                   318

<210> SEQ ID NO 9
<211> LENGTH: 351
<212> TYPE: DNA
<213> ORGANISM: Artificial sequence
<220> FEATURE:
<223> OTHER INFORMATION: Synthetic oligonucleotide

<400> SEQUENCE: 9
gaggtgcagc tggtgcagtc tggagcagag gtgaagacgc ccggggagtc tctgaagatc      60
tcctgcaagg gttctggata caggttttac acctactgga tcgcctgggt gcgccagatg     120
cccgggaaag gcctggagtg gatgggcatc atctatcctg gtgactctga tcccagatac     180
agcccgtcct tccaaggcca ggtcaccatc tcagccgaca gtccatcag caccgcctac     240 ctgcagtgga gcagcctgaa ggcctcggac accgccatgt attactgtgt gagagtacaa     300
gggactatgt tggactactg ggccagggaa ccctggtca ccgtctcctc a                351
```

```
<210> SEQ ID NO 10
<211> LENGTH: 333
<212> TYPE: DNA
<213> ORGANISM: Artificial sequence
<220> FEATURE:
<223> OTHER INFORMATION: Synthetic oligonucleotide

<400> SEQUENCE: 10
cagtctgtac tgacgcagcc gccctcagtg tctggggccc cagggcagag cgtcaccatc    60
tcctgttctg ggagcagctc caacatcggg gcaggttatg atgtacactg gtaccagcag   120
cttctaggaa gagcccccaa actcctcatc catggtaaca gcaatcggcc ctcaggggtc   180
ccggaccgat tctctggctc caagtctggc acctcaggtt ccctggccat cactgggctc   240
cagtctgagg atgaggctga ttattactgc cagtcctatg acatctctct gagtggttgg   300
gttttcggcg agggaccaa gctgaccgtc ctg                                 333

<210> SEQ ID NO 11
<211> LENGTH: 357
<212> TYPE: DNA
<213> ORGANISM: Artificial sequence
<220> FEATURE:
<223> OTHER INFORMATION: Synthetic oligonucleotide

<400> SEQUENCE: 11
caggtgcaac tggtgcagtc tggggctgag gtgaagaagc ctgggtcttc ggtgaaggtc    60
tcctgcaggg cttctggagg caccttccgc agctattcta tcagctgggt gcgacaggcc   120
cctggacaag gcttgagtg gatgggagat atcatcccca tctttagtac aacaaactac   180
gcacagaagt tccagggcag agtcacgatt accgcggacg aagccacgag cacagcctac   240
atggagctga gcagcctgag atctgacgac acggccgtat attactgtgc gagaccgtca   300
aatttactta attggttcga ccctggggc cagggaaccc tggtcaccgt ctcctca      357

<210> SEQ ID NO 12
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 12
gaaatagtga tgacgcagtc tccagccacc ctgtctgtgt ctccagggga aagagccacc    60
ctctcctgca gggccagtca gagtgttaac agcaacttag tctggtacca gcagaaacct   120
ggccaggctc ccaggctcct catctatggt gcatccacca gggccactgg tatcccagcc   180
aggatcagtg gcagtgggtc tgggacagag ttcactctca ccatcagcag cctgcagtct   240
gaagattttg cagtttatta ctgtcagcag tatgataaca ggcctcagac gttcggccaa   300
gggaccaagg tggaaatcaa a                                             321

<210> SEQ ID NO 13
<211> LENGTH: 357
<212> TYPE: DNA
<213> ORGANISM: Artificial sequence
<220> FEATURE:
<223> OTHER INFORMATION: Synthetic oligonucleotide

<400> SEQUENCE: 13
caggagcaat tggaggaatc tgggggaggc gtggtccagc ctgggaggtc cctgacactc    60
tcctgtgcag cgtctggatt caccttcagg agctatgaca tgcactgggt ccgccaggct   120
```

```
ccaggcaagg ggctggagtg ggtggcactt atatcgtatg atggaagaaa taaacactat    180
ggagactccg tgaagggccg attcaccatc tccagagaca attccaagaa cacgctctat    240
ctgcacttga gcagcctgag agccgaggac acgtctgtct attactgcgc gagagggct    300 gataatggtc tatttaccga ctcctggggc cagggaaccc tggtcatcgt ctcctca      357

<210> SEQ ID NO 14
<211> LENGTH: 339
<212> TYPE: DNA
<213> ORGANISM: Artificial sequence
<220> FEATURE:
<223> OTHER INFORMATION: Synthetic oligonucleotide

<400> SEQUENCE: 14
gacatcgtga tgacccagtc tccagactcc ctggccgtgt ctctgggcga cagggccacc    60
atcaactgca agtccagcca gagtgttttg tacggctcca ccaataaaaa cttcttagct    120
tggtaccaac agaaaccagg acagcctcct aagctgctca tctactgggc atctgcccgg    180
gaatccgggg tccctgaccg attcagtggc agcgggtctg ggacagattt cactctcacc    240
atcagcagcc tgcagactga agatgtggca gtttattact gtcagcaata ttctagtatt    300
ccgctcactt tcggcggagg gaccaaggtg gagatcaaa                          339

<210> SEQ ID NO 15
<211> LENGTH: 384
<212> TYPE: DNA
<213> ORGANISM: Artificial sequence
<220> FEATURE:
<223> OTHER INFORMATION: Synthetic oligonucleotide

<400> SEQUENCE: 15
caggtgcagc tggtgcagtc tggggctgag gtgaagaagc ctggggcctc agtgagggtc    60
tcctgcaagg cttatggata cagcttcaac gactacttta tgcactgggt gcgacaggcc    120
cctgggcagg gcttgagtg gatgggccgg gtcaaaccga gcactggtgg cacaagatat    180
gcacagaagt ttcaaggcag ggtcaccatg accctggaca cctccaccag tacagcctac    240
gtggagctga gcagtctgag ttctgacgac acggccgtat attctgtgc gagaaagtta    300 ggtccactag gagattgtag tagttccagc tgttattctg ctcttgatgt ctggggccaa    360
gggacaatgg tcaccgtctc ctca                                          384

<210> SEQ ID NO 16
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 16
gacatccaga tgacccagtc tccttccacc ctgtctgcat ctgtaggaga cagagtcacc    60
atcacttgcc gggccagtga agtattagt aactggttgg cctggtatca gcagaaacca    120
gggaaagccc ctaagctcct gatctctaag gcgtctagtt tagaaagtgg ggtcccatca    180
aggttcagcg gcagtggatc tgggacagaa ttcactctca ccatcggcag cctgcagcct    240
gatgattttg caacttatta ctgccaacag tataatactt attcgtggac gttcggccaa    300
gggaccaagg tggacatcaa a                                             321

<210> SEQ ID NO 17
<211> LENGTH: 357
```

```
<212> TYPE: DNA
<213> ORGANISM: Artificial sequence
<220> FEATURE:
<223> OTHER INFORMATION: Synthetic oligonucleotide

<400> SEQUENCE: 17
caggtactcc tggtgcagtc tggggctgag gtgaagaagc ctggggcctc agtgaaggtc      60
tcctgcaagg catctggata caccttcacc agttacttta ttcactgggt gcgacaggcc     120
cctggacagg gcttgagtg gatgggaatg atcaaccctc ttagtggaaa cacaaattac      180
gcacagaagt tccagggcag agtcaccatg accagggaca cgtccacgag gacagtctac     240
atgcagctga gtagcctgac atttgaagac acggccgtat attcctgtgt gagatggact     300
acggtgcctt cgtcttttga cttttgggc agggaaccc tggtcaccgt ctcctca         357

<210> SEQ ID NO 18
<211> LENGTH: 324
<212> TYPE: DNA
<213> ORGANISM: Artificial sequence
<220> FEATURE:
<223> OTHER INFORMATION: Synthetic oligonucleotide

<400> SEQUENCE: 18
tcctatgagc tgacacagcc accctcggtg tcagtgtccc caggacagac ggccaggatc      60
acctgttctg gagatgcact gccaaatcaa tatgttaatt ggtaccagca gaagccaggc     120
caggccccgg tgttgatgat gtttaaagac aatcagaggc cctcaggtat ccctgagcga     180
ttctctggct ccaggtccgg gacaacagtc acgttgagta taagtggagt ccaggcagaa     240
gacgaggctg actatcactg tcaatcagca gacagaactg ctacttctgt ggctttcggc     300
ggagggacca agctgaccgt cctt                                             324

<210> SEQ ID NO 19
<211> LENGTH: 393
<212> TYPE: DNA
<213> ORGANISM: Artificial sequence
<220> FEATURE:
<223> OTHER INFORMATION: Synthetic oligonucleotide

<400> SEQUENCE: 19
cagctgcagc tgcaggagtc cggctcacga ctggtgaagt cttcagagac cctgtccctc      60
acttgtgctg tctctggtgg cgccatcacc agtggtcgta atacctggag ctggatccgg     120
cagccaccag ggaagggcct ggagtggatt gggttcatct attatagtgg gagcacgtac     180
tccaacccga tcacttactc cagcccgtcc ctcaagagtc gagtcaccat atcattagac     240
acgtccaaga accagttctc cctgaagctg aactctgtga ccgccgcgga cacggccgtg     300
tattattgtg ccagagcgaa gcccagtaac ttgaacttct actactacgg tatggacgtc     360
tggggccaag ggaccacggt caccgtctcc tca                                   393

<210> SEQ ID NO 20
<211> LENGTH: 324
<212> TYPE: DNA
<213> ORGANISM: Artificial sequence
<220> FEATURE:
<223> OTHER INFORMATION: Synthetic oligonucleotide

<400> SEQUENCE: 20
gaaatagtga tgacgcagtc tccagccacc ctgtctgtgt ctccagggga aagagccacc      60
ctctcctgca gggccagtca gagtgttagc agcaacttag cctggtacca gcagaaacct     120
```

```
ggccaggctc ccaggctcct catctatggt gcctccacca gggccactgg tatcccagcc        180
aggttcagtg gcagtgggtc tgagacagag ttcactctca ccatcagcag cctgcagtct        240
gaagattttg cagtttatta ctgtcagcag tctgataact ggccccgat caccctttggc       300 caagggaccc gactggagat taaa                                               324
```

```
<210> SEQ ID NO 21
<211> LENGTH: 360
<212> TYPE: DNA
<213> ORGANISM: Artificial sequence
<220> FEATURE:
<223> OTHER INFORMATION: Synthetic oligonucleotide

<400> SEQUENCE: 21
gaactgcaac tagtggagtc tgggggaggc ctcatacggc cggggggtc cctgagactc         60 tcctgtacag ccgctggatt caccttcagt aattataaca tgaattgggt ccgccaggct       120
ccagggaagg gctggactg gtttcatat attagtagta gtggtggaac cactatctac         180
gcagactctg tgaagggccg attcaccatc tccagagaca atgccaagga ctcactctat      240
ctgcaaatga acagcctgag agacgacgac acggctattt attactgtgt gagaggccgg      300
gggcagctcg ccactcactt tgactactgg ggccagggaa ccctggtcac cgtctcctca       360
```

```
<210> SEQ ID NO 22
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 22
gaaagtgtgc tgactcagtt tccagacttt cagtctgtga ctccgaagga gaaagtcacc        60
atcacctgcc gggccagtca gagcattcat attaacttac actggtacca acaaaaacca     120
catcagtctc caaagctcct catcaagtat gcttcccagt ccatcgcagg ggtcccctcg       180
aggttcagtg gcagtggatc tgggacagaa ttcaccctca ccatcaatgg cctggaagct      240
gaagatgctg caacgtatta ctgtcatcag agtaatagtt taccgtggac gttcggccaa      300
gggaccaagg tggaaatcaa a                                                  321
```

```
<210> SEQ ID NO 23
<211> LENGTH: 369
<212> TYPE: DNA
<213> ORGANISM: Artificial sequence
<220> FEATURE:
<223> OTHER INFORMATION: Synthetic oligonucleotide

<400> SEQUENCE: 23
caggtgcagc tggtggagtc tgggggaggc gtggtccagc ctgggaggtc cctgagactc         60
tcctgtgcag cgtctggatt caggttcagt agctatgcca tgcactgggt ccgccaggct      120
ccaggcaagg gctggagtg gtggcaact atctggtttg atgggactaa cgaatactat        180
ggagactccg cgaagggccg attcaccatc tccagagaca attccatgag cacgctttat      240
ctgcaaatga acagcctgag agtcgaggac acggctgtgt attactgtgc gagacccgca      300
aatggctaca gtgactacta ctatggtatg gacgtctggg gccaagggac cacggtcacc      360
gtctcctca                                                                369
```

```
<210> SEQ ID NO 24
<211> LENGTH: 338
```

```
<212> TYPE: DNA
<213> ORGANISM: Artificial sequence
<220> FEATURE:
<223> OTHER INFORMATION: Synthetic oligonucleotide

<400> SEQUENCE: 24
cagtctgccc tgactcagcc tgcctccgtg tctgggtctc ctggacagtc gatcaccatc    60
tcctgcactg gaaccagcag tgatgttggg acttataacc ttgtctcctg gtaccaacag   120
cacccaggca agccccccaa actcatgatt tttgaggtca ataagcggcc ctcaggggtt   180
tcttatcgct ctctctggct caagtctggc aacacggcct ccctgacaat ctctgggctc   240
caggctgagg acgaggctga ttattactgc tgctcatatg cagataatag aactcccttt   300
ctcttcggaa ctgggaccaa ggtcaccgtc ctaggtca                           338

<210> SEQ ID NO 25
<211> LENGTH: 357
<212> TYPE: DNA
<213> ORGANISM: Artificial sequence
<220> FEATURE:
<223> OTHER INFORMATION: Synthetic oligonucleotide

<400> SEQUENCE: 25
caggtgcagc tggtgcagtc cggggctgag gtgaagaagc ctggggcctc agtgagggtc    60
tcctgcaagg cttctggata caccttcacc gcctacttta tgaactgggt gcgacaggcc   120
cctggacaag ggcttgagtg gatgggacgg atcaaccctc tcagtggtga cacaaacttt   180
gcacagaatt ttcagggcag ggtcaccatg accagggaca cgtccatcac tacagtctac   240
atggagctga acaggctgac atctgacgac acggccgtgt attattgtgc gagagttaga   300
agtggttatt cctatattga cttctggggc cagggaaccc tggtcaccgt cgcctca     357

<210> SEQ ID NO 26
<211> LENGTH: 324
<212> TYPE: DNA
<213> ORGANISM: Artificial sequence
<220> FEATURE:
<223> OTHER INFORMATION: Synthetic oligonucleotide

<400> SEQUENCE: 26
tcctatgacc tgacacagcc accctcggtg tcagtgtccc caggacagac ggcccggatc    60
acctgctctg gagatgcttt gtcaaaccaa tatgcttatt ggtatcagca gaggccaggc   120
caggcccctg tagtggtcat atataaatat agtgagaggc cgtcagggat ccctgagcga   180
ttctctggct ccagctcagg acaacagtc acgttgacca tcagtggagt ccaggcagaa   240
gacgaggctg actattactg tcaatcagca gacaggcttg gtacttattg gttttcggc    300 ggagggacca agctgaccgt ccta                                          324

<210> SEQ ID NO 27
<211> LENGTH: 390
<212> TYPE: DNA
<213> ORGANISM: Artificial sequence
<220> FEATURE:
<223> OTHER INFORMATION: Synthetic oligonucleotide

<400> SEQUENCE: 27
caggtgcaac tggtggagtc tgggggaggc gtggtccagc ctgggagggc cctgagactc    60
tcctgtgcag cgtctggatt cacctttagc agctatggca tgcactgggt ccgccaggct   120
ccaggcaagg ggctggagtg ggtggcagtt gtttggaatg atggcggtaa taaatactat   180
```

```
gcagactccg tgaagggccg attcaccatc tccagagaca attccaagaa cacgctgtat    240
ctgcaaatga acagcctgag agccgaggac acggctgtgt atttctgtgc gagagatggt    300
tactatgtta gcagtggtta tcaccctcta aggtactact actactacat ggacgtctgg    360
ggcaaaggga ccacggtcgc cgtctcctca                                     390
```

<210> SEQ ID NO 28
<211> LENGTH: 342
<212> TYPE: DNA
<213> ORGANISM: Artificial sequence
<220> FEATURE:
<223> OTHER INFORMATION: Synthetic oligonucleotide

<400> SEQUENCE: 28

```
gacatcgtga tgacccagtc tccagactcc ctggctgtgt ctctgggcga gagggccacc     60
atcaactgca agtccagcca gagtgtttta tacagcccca acaataagaa ctacttagct    120
tggtaccagc agaaaccagg acagcctcct aagctgctca tttactgggc atctacccgg    180
gaatccgggg tccctgaccg attcagtggc agcgggtctg ggacagattt tactctcacc    240
atcgacagcc tgcaggctga agatgtggca gtttattact gtcagcaata ttatagtact    300
cctccgctca ctttcggcgg agggaccaag gtggagatca aa                       342
```

<210> SEQ ID NO 29
<211> LENGTH: 375
<212> TYPE: DNA
<213> ORGANISM: Artificial sequence
<220> FEATURE:
<223> OTHER INFORMATION: Synthetic oligonucleotide

<400> SEQUENCE: 29

```
gagatgcagc tgttggagtc tgggggaggc ttgatccagc ctggggagtc cctgagactc     60
tcctgtgcag gctctggatt cacctttagg aactatgcca tgagctgggt ccgccaggct    120
ccagggaagg gctgcagtg gtctcagct attagtgcta gtggtggtat cacacactac    180
gcagactccg tgaagggccg gttcaccatc tccagagaca actccaagaa tacgctgttt    240
ctgcaaatga acagcctgag agccgaggac acggccgtat attactgtgc gaagggggag    300
ataatgagag acacagggta ccatgatgat gcttttgatg tctggggcca agggaaaatg    360
gtcaccgtct cttca                                                     375
```

<210> SEQ ID NO 30
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 30

```
gacatccagt tgacccagtc tccatccttc ctgtctgcat ctgtaggaga cagagtcacc     60
atcacttgcc gggccagtca gggcattagc agttatttag tctggtatca gcaaaaacca    120
gggaagcccc ctaaactcct gatctatact gcatccactt tgcaaagtgg ggtcccatca    180
aggttcagcg gcagtggatc tgggacagaa ttcactctca caatcagcag cctgcagcct    240
gaagattttg caacttatca ctgtcaacag gttgagagtt acccgtacag ttttggccag    300
gggaccaagc tggagatcaa a                                              321
```

<210> SEQ ID NO 31
<211> LENGTH: 384

```
<212> TYPE: DNA
<213> ORGANISM: Artificial sequence
<220> FEATURE:
<223> OTHER INFORMATION: Synthetic oligonucleotide

<400> SEQUENCE: 31
gaggtgcagc tggtggagtc tgggggacgc ctggtcaggc ctgggggtc cctgagactc      60 tcctgtgcag cctctggatt caccttcagt cactataaca tgaattgggt ccgccaggct    120
ccagggaagg ggctggagtg ggtctcatcc attaatagta gaaatggtta tacatactac    180
gcagactcag tgaagggccg attcaccatc tccagagaca acgccaagaa ctcactgtat    240
ctgcaaatga acagcctgag acccgaggac acggctgtct attactgtgc gagagacccc    300 ccccttttata gtggctacga cttaggctat tactattacg gtatggacgt ctggggccaa    360
gggaccacgg tcaccgtctc ctca                                           384

<210> SEQ ID NO 32
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 32
gacatccaga tgacccagtc tccttccacc ctgtctgcat tgtaggaga cagagtcacc      60 atcacttgcc gggccaatca aaatattagt aagtggttgg cctggtatca gcagaaacca    120
gggaaagccc ctaatctcct gatccataag gcgtcgagtt tagaaagtgg ggtcccatca    180
aggttcagcg gcagtggatc tgggacagaa ttcactctca ccatcagcag cctgcagcct    240
gatgattttg caacttattc ctgccaacag tataatagtt atccgtgggc gttcggccaa    300
gggaccaggg tggaaatcaa a                                              321

<210> SEQ ID NO 33
<211> LENGTH: 351
<212> TYPE: DNA
<213> ORGANISM: Artificial sequence
<220> FEATURE:
<223> OTHER INFORMATION: Synthetic oligonucleotide

<400> SEQUENCE: 33
caggtgcagc tgcaggagtc gggcccaggt ctggtgaagc cttcacagac cctgtccctc      60
acttgcactg tctctggtgg ttccatcagc agtggcggtt acttctggag ctggatccgc    120
cagcacccag ggaagggcct ggagtggatt gggtacatct attacagtgg gagcacctac    180
tacaacccgt ccctcaagag tcgagttact atatcaattg acacgtctaa gatccagttt    240
tccctgaagc tgacctctgt gactgccgcg gacacggccg tgtattactg tgcgagagat    300
gtaggtggtt ttgatatctg gggccaaggg acaatggtca ccgtctcttc a             351

<210> SEQ ID NO 34
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 34
gacatccaga tgacccagtc tccatcctcc ctgtctgcat ctataggaga cagagtcacc      60
atcacttgcc aggcgagtca ggacattaac aagtatttaa attggtatca gcagaaacca    120
```

```
gggaaagccc ctaaggtcct gatctacgat gcatccaatt tggaaacagg ggtcccatca    180
aggttcagtg gaagtggatc tgggacagat tttactttca ccatcagcag cctgcagcct    240
gaagatgttg caacatatta ctgtcaacag tatgagaatc tccctcggac gttcggccaa    300
gggaccaagg tggaaatcaa a                                              321

<210> SEQ ID NO 35
<211> LENGTH: 363
<212> TYPE: DNA
<213> ORGANISM: Artificial sequence
<220> FEATURE:
<223> OTHER INFORMATION: Synthetic oligonucleotide

<400> SEQUENCE: 35
caggtgcgac tggtggaatc tgggggaggc gtggtccagc ctgggaggtc cctgagactc     60
tcctgtgcag cctctggatt taccttcaga agttatggca tgcactgggt ccgccaggct    120
ccaggcaagg gcctggagtg ggtggcactt atttcacttg atggatctga gaaacattat    180
gcagactccg ttaagggccg actcaccatc tccagagaca actccaagaa catgttgtat    240
ctgcaaatga acaacctgag agttgaggac acggctgttt actattgtgc gaaagatcgc    300
ccgtacagct ggagggacgt ccttgactac tggggccagg gaaccctggt caccgtctcc    360
tca                                                                  363

<210> SEQ ID NO 36
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 36
gacatccaga tgacccagtc tccttcctcc ctgtctgcat ctgtaggcga cagagtcacc     60
atcacttgcc gggcgagtcg ggacattcac acctctttaa attggtatca acacaccccg    120
gggaaagccc ctgagctcct catctacgct gcatccactt tggagatggg ggtcccatcg    180
agattcagtg gaagtggatc agggacagat tttactttca ccatcagcag cctgcagcct    240
gaagatattg caacatatta ctgtcaacag tatgatgagc tccctctcac tttcggcgga    300
gggaccaagg tggagatgaa a                                              321

<210> SEQ ID NO 37
<211> LENGTH: 396
<212> TYPE: DNA
<213> ORGANISM: Artificial sequence
<220> FEATURE:
<223> OTHER INFORMATION: Synthetic oligonucleotide

<400> SEQUENCE: 37
caggtacagc tgcagcagtc aggtccagga ctggtgaagc cctcgcagat cctctcactc     60
acctgtgcca tctccgggga cagtgtctct agcaaccgtg ctgcttggaa ctggatcagg    120
cagtctccat tgagaggcct tgagtggctg ggaaggacat actacaggtc caagtggtat    180
aatgattatg cactatctgt gaaaagtcga ataagcatca acccagacac atccaagaac    240
cagttctccc tgcagctgaa ctctgtgact cccgaggaca cggctgtgta ttactgtgca    300
agaactccga gggcttatag cagtggctgg cacgttcctt attattattc cggtatggac    360
gtctggggcc aagggaccac ggtcaccgtc tcctca                              396
```

```
<210> SEQ ID NO 38
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 38
gacatccaga tgacccagtc tccatcctcc ctgtctgcat ctatagcaga cagagtcacc      60
atcacttgcc aggcgagtca ggacatcagc gaccatttaa attggtatca gcagaagcca     120
gggacagccc ctaagctcct gatctacgat gcatccaatt tggaaacagg ggtcccatca     180
aggttcagtg ggagtggatc tgggacagat tttactttca ccatcaacag gctgcagcct     240
gaagattttg caacatatta ctgtcaacag tatgatgagg tccctccgac attcggccaa     300
gggaccaagg tggacatcag a                                               321

<210> SEQ ID NO 39
<211> LENGTH: 393
<212> TYPE: DNA
<213> ORGANISM: Artificial sequence
<220> FEATURE:
<223> OTHER INFORMATION: Synthetic oligonucleotide

<400> SEQUENCE: 39
caggtacagc tgcagcagtc aggtccagga ctggtgaagc cctcgcagac cctctcactc      60
acctgtgcca tctccgggga cagtgtctct agcaacagtg ctgcttggaa ctggatcagg     120
cagtccccat cgagaggcct tgagtggctg gaaggacat actacaggtc caagtggtat     180
aatgattatg cagtatctgt gaaaagtcga ataaccatca cccagacac atcgaagaac     240 cagttctccc tgcagatgaa ctctgtgact cccgaggaca cggctgtgta ttattgtgca     300
agagatagaa gaaaactgga accacctcct ttttcgtact actactacgg tttggacgtc     360
tggggccaag ggaccacggt caccgtctcc tca                                  393

<210> SEQ ID NO 40
<211> LENGTH: 321
<212> TYPE: DNA
<213> ORGANISM: Artificial sequence
<220> FEATURE:
<223> OTHER INFORMATION: Synthetic oligonucleotide

<400> SEQUENCE: 40
gacatccaga tgacccagtc tccatcctcc ctgtctgcat ctgtaggaga cagagtcacc      60
atcacttgcc aggcgagtca ggacattagc aactatttaa attggtatca gcagaaacca     120
gggaaagccc ctaagctcct gatctacgat gcatccaatt tggaaacagg ggtcccatca     180
aggttcagtg gaagtggatc tgggacagat tttactttca ccatcagcag cctgcagcct     240
gaagatattg caacatatta ctgtcaacaa tatgataatg tccccctcac tttcggcgga     300
gggaccaagg tggagatcaa a                                               321

<210> SEQ ID NO 41
<211> LENGTH: 360
<212> TYPE: DNA
<213> ORGANISM: Artificial sequence
<220> FEATURE:
<223> OTHER INFORMATION: Synthetic oligonucleotide

<400> SEQUENCE: 41
gaggtgcagc tggtggagtc tgggggaggc ttggtacagc ctggagggtc cctgagactc      60
```

```
tcctgtgcag cctctggatt caccttcagt acttatgaaa tgaactgggt ccgccaggct    120
ccagggaagg ggctggagtg gatttcatac attagaagta gtggtagtac cgtatactac    180
gcagactctg tgaagggccg attcaccatc tccagagaca acgccaagaa cttactgtat    240
ctgcaaatga acagcctgag agccggggac acggctgttt attactgtgc gagaataccc    300
ggtggatata ctggctactt tgactattgg ggccagggag ccctggtcac cgtctcctca    360

<210> SEQ ID NO 42
<211> LENGTH: 333
<212> TYPE: DNA
<213> ORGANISM: Artificial sequence
<220> FEATURE:
<223> OTHER INFORMATION: Synthetic oligonucleotide

<400> SEQUENCE: 42
cagtctgtgc tgacgcagcc gccctcagtg tctggggccc cagggcagag ggtcaccatc     60
tcctgcactg ggagcagctc aacatcgggg caggttatt atgtacactg gtaccagcag    120
cttccaggaa cagtccccaa actcctcatc tatggtaaca acaatcggcc ctcagggatc    180
cctgaccgat tctctggctc caagtctggc acctcagcct ccctggccat cactgggctc    240
cagactgagg atgaggctga ttattactgc cagtcctatg acagcagcct gagtggttgg    300
gtgttcggcg gagggaccaa gctgaccgtc cta                                 333

<210> SEQ ID NO 43
<211> LENGTH: 122
<212> TYPE: PRT
<213> ORGANISM: Artificial sequence
<220> FEATURE:
<223> OTHER INFORMATION: Synthetic polypeptide

<400> SEQUENCE: 43

Glu Val Gln Leu Leu Glu Ser Gly Gly Gly Leu Ile Gln Ser Gly Gly
1               5                   10                  15

Ser Leu Arg Leu Ser Cys Val Val Ser Gly Ile Asp Phe Ser Asn Tyr
            20                  25                  30

Ala Met Thr Trp Val Arg His Ala Pro Gly Lys Gly Leu Glu Trp Ile
        35                  40                  45

Ser Thr Ile Ser Gly Ser Gly Asp Thr Thr Asn Tyr Ala Asp Ser Ala
    50                  55                  60

Lys Gly Arg Phe Thr Ile Ser Arg Asp Asn Ser Arg Asn Thr Leu Phe
65                  70                  75                  80

Val Arg Ile Asn Ser Leu Arg Ala Glu Asp Thr Ala Ile Tyr Tyr Cys
                85                  90                  95

Ala Lys Thr Met Gly Pro Val Ser Gly Gln Tyr Ala Phe Asp Ile Trp
            100                 105                 110

Gly Gln Gly Thr Lys Val Thr Val Ser Ser
        115                 120

<210> SEQ ID NO 44
<211> LENGTH: 105
<212> TYPE: PRT
<213> ORGANISM: Artificial sequence
<220> FEATURE:
<223> OTHER INFORMATION: Synthetic polypeptide

<400> SEQUENCE: 44

Ser Tyr Glu Leu Thr Gln Pro Pro Ser Val Ser Val Pro Gly Gln
1               5                   10                  15
```

Thr Ala Thr Ile Thr Cys Ser Gly Asp Asn Leu Gly Asn Lys Phe Ala
            20                  25                  30

Ser Trp Tyr Gln Gln Lys Pro Gly Leu Ser Pro Val Leu Val Ile Tyr
        35                  40                  45

Gln Asp Lys Lys Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Met
65                  70                  75                  80

Asp Glu Ala Asp Tyr Phe Cys Gln Ala Trp His Ser Gly Ser Val Phe
                85                  90                  95

Gly Gly Gly Thr Lys Leu Thr Val Leu
            100                 105

<210> SEQ ID NO 45
<211> LENGTH: 123
<212> TYPE: PRT
<213> ORGANISM: Artificial sequence
<220> FEATURE:
<223> OTHER INFORMATION: Synthetic polypeptide

<400> SEQUENCE: 45

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Ala Met His Trp Val Arg Gln Ala Pro Gly Lys Gly Leu Glu Trp Val
        35                  40                  45

Ala Leu Ile Ser Leu Asp Gly Phe Asn Thr Tyr Tyr Pro Asp Ser Val
    50                  55                  60

Lys Gly Arg Phe Thr Ile Ser Arg Asp Ser Ser Lys Asn Thr Leu Phe
65                  70                  75                  80

Leu Gln Leu Asn Ser Leu Arg Ile Glu Asp Thr Ala Val Tyr Tyr Cys
                85                  90                  95

Val Lys Asp Arg Gly Pro Thr Gly Ser Gly Ser Tyr Gly Met Asp Val
            100                 105                 110

Trp Gly Gln Gly Thr Thr Val Thr Val Ser Ser
            115                 120

<210> SEQ ID NO 46
<211> LENGTH: 106
<212> TYPE: PRT
<213> ORGANISM: Artificial sequence
<220> FEATURE:
<223> OTHER INFORMATION: Synthetic polypeptide

<400> SEQUENCE: 46

Ser Tyr Glu Leu Thr Gln Pro Pro Ser Val Ser Val Ser Pro Gly Gln
1               5                   10                  15

Thr Ala Ser Ile Thr Cys Ser Gly Asp Lys Leu Gly Asn Lys Phe Ala
            20                  25                  30

Cys Trp Tyr Gln Gln Lys Pro Gly Gln Ser Pro Val Leu Val Ile His
        35                  40                  45

Gln Asp Lys Lys Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Val
65                  70                  75                  80

Asp Glu Ala Asp Tyr Tyr Cys Gln Ala Trp Asp Ser Ser Asn Val Val
                85                  90                  95

Phe Gly Gly Gly Thr Lys Leu Thr Val Leu
            100                 105

<210> SEQ ID NO 47
<211> LENGTH: 120
<212> TYPE: PRT
<213> ORGANISM: Artificial sequence
<220> FEATURE:
<223> OTHER INFORMATION: Synthetic polypeptide

<400> SEQUENCE: 47

Gln Val Gln Leu Gln Glu Ser Gly Pro Gly Leu Val Lys Pro Ser Gly
1               5                   10                  15

Thr Leu Ser Leu Thr Cys Leu Val Ser Gly Gly Ser Ile Gly Ser Ser
            20                  25                  30

His Trp Trp Ser Trp Val Arg Gln Ser Pro Gly Lys Gly Leu Glu Trp
        35                  40                  45

Phe Gly Glu Ile His His Thr Glu Ser Thr Asn Tyr Asn Pro Ser Leu
    50                  55                  60

Lys Ser Arg Val Thr Ile Thr Met Asp Lys Ser Lys Asn Gln Phe Tyr
65                  70                  75                  80

Leu Lys Leu Thr Ser Val Thr Ala Ala Asp Thr Ala Val Tyr Tyr Cys
                85                  90                  95

Ala Arg Ala Gly Ala Thr Phe Ala Glu Pro Phe Ser Leu Trp Gly Gln
            100                 105                 110

Gly Thr Met Val Thr Val Ser Pro
            115                 120

<210> SEQ ID NO 48
<211> LENGTH: 106
<212> TYPE: PRT
<213> ORGANISM: Artificial sequence
<220> FEATURE:
<223> OTHER INFORMATION: Synthetic polypeptide

<400> SEQUENCE: 48

Asp Ile Gln Met Thr Gln Ser Pro Ser Thr Leu Ser Ala Ser Val Gly
1               5                   10                  15

Asp Arg Val Thr Ile Thr Cys Arg Ala Gly Gln Ser Val Thr Asn Trp
            20                  25                  30

Leu Ala Trp Tyr Gln Gln Lys Pro Gly Lys Ala Pro Lys Leu Leu Ile
        35                  40                  45

Tyr Lys Ala Ser Ile Leu Ala Ser Gly Val Pro Ser Arg Phe Ser Gly
    50                  55                  60

Ser Gly Ser Gly Thr Glu Phe Thr Leu Thr Ile Ser Ser Val Gln Pro
65                  70                  75                  80

Asp Asp Ser Ala Val Tyr Tyr Cys Gln Gln Tyr Lys Ser His Arg Thr
                85                  90                  95

Phe Gly Gln Gly Thr Lys Val Glu Ile Lys
            100                 105

<210> SEQ ID NO 49
<211> LENGTH: 120
<212> TYPE: PRT
<213> ORGANISM: Artificial sequence
<220> FEATURE:
<223> OTHER INFORMATION: Synthetic polypeptide

<400> SEQUENCE: 49

Gln Val Gln Leu Gln Glu Ser Gly Pro Gly Leu Val Lys Pro Ser Gly
1               5                   10                  15

Thr Leu Ser Leu Thr Cys Ala Val Ser Gly Gly Ser Ile Ser Ser Ser
            20                  25                  30

Asn Trp Trp Ser Trp Val Arg Gln Pro Pro Gly Lys Gly Leu Glu Trp
        35                  40                  45

Ile Gly Glu Ile Tyr His Ser Gly Ser Thr Asn Tyr Asn Pro Ser Leu
    50                  55                  60

Lys Ser Arg Ala Thr Ile Ser Val Asp Lys Ser Lys Asn Gln Phe Ser
65                  70                  75                  80

Leu Lys Leu Ser Ser Val Thr Ala Ala Asp Thr Ala Phe Tyr Tyr Cys
                85                  90                  95

Ala Arg Ala Arg Gly Glu Trp Leu Ala His Phe Asp Tyr Trp Gly Gln
                100                 105                 110

Gly Thr Leu Val Thr Val Ser Ser
            115                 120

<210> SEQ ID NO 50
<211> LENGTH: 106
<212> TYPE: PRT
<213> ORGANISM: Artificial sequence
<220> FEATURE:
<223> OTHER INFORMATION: Synthetic polypeptide

<400> SEQUENCE: 50

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Ser Ile Ser Arg Trp
            20                  25                  30

Leu Ala Trp Tyr Gln Gln Lys Pro Gly Lys Ala Pro Lys Leu Leu Ile
        35                  40                  45

Tyr Lys Ala Ser Ser Leu Glu Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Ile Tyr Tyr Cys Gln Gln Tyr Asn Thr Asp Lys Thr
                85                  90                  95

Phe Gly Gln Gly Thr Lys Val Glu Ile Lys
                100                 105

<210> SEQ ID NO 51
<211> LENGTH: 117
<212> TYPE: PRT
<213> ORGANISM: Artificial sequence
<220> FEATURE:
<223> OTHER INFORMATION: Synthetic polypeptide

<400> SEQUENCE: 51

Glu Val Gln Leu Val Gln Ser Gly Ala Glu Val Lys Thr Pro Gly Glu
1               5                   10                  15

Ser Leu Lys Ile Ser Cys Lys Gly Ser Gly Tyr Arg Phe Tyr Thr Tyr
            20                  25                  30

Trp Ile Ala Trp Val Arg Gln Met Pro Gly Lys Gly Leu Glu Trp Met
        35                  40                  45

Gly Ile Ile Tyr Pro Gly Asp Ser Asp Pro Arg Tyr Ser Pro Ser Phe
    50                  55                  60

Gln Gly Gln Val Thr Ile Ser Ala Asp Lys Ser Ile Ser Thr Ala Tyr
65                  70                  75                  80

```
Leu Gln Trp Ser Ser Leu Lys Ala Ser Asp Thr Ala Met Tyr Tyr Cys
                85                  90                  95

Val Arg Val Gln Gly Thr Met Leu Asp Tyr Trp Gly Gln Gly Thr Leu
            100                 105                 110

Val Thr Val Ser Ser
        115
```

<210> SEQ ID NO 52
<211> LENGTH: 111
<212> TYPE: PRT
<213> ORGANISM: Artificial sequence
<220> FEATURE:
<223> OTHER INFORMATION: Synthetic polypeptide

<400> SEQUENCE: 52

```
Gln Ser Val Leu Thr Gln Pro Pro Ser Val Ser Gly Ala Pro Gly Gln
1               5                   10                  15

Ser Val Thr Ile Ser Cys Ser Gly Ser Ser Asn Ile Gly Ala Gly
            20                  25                  30

Tyr Asp Val His Trp Tyr Gln Gln Leu Leu Gly Arg Ala Pro Lys Leu
            35                  40                  45

Leu Ile His Gly Asn Ser Asn Arg Pro Ser Gly Val Pro Asp Arg Phe
    50                  55                  60

Ser Gly Ser Lys Ser Gly Thr Ser Gly Ser Leu Ala Ile Thr Gly Leu
65                  70                  75                  80

Gln Ser Glu Asp Glu Ala Asp Tyr Tyr Cys Gln Ser Tyr Asp Ile Ser
                85                  90                  95

Leu Ser Gly Trp Val Phe Gly Gly Gly Thr Lys Leu Thr Val Leu
            100                 105                 110
```

<210> SEQ ID NO 53
<211> LENGTH: 119
<212> TYPE: PRT
<213> ORGANISM: Artificial sequence
<220> FEATURE:
<223> OTHER INFORMATION: Synthetic polypeptide

<400> SEQUENCE: 53

```
Gln Val Gln Leu Val Gln Ser Gly Ala Glu Val Lys Lys Pro Gly Ser
1               5                   10                  15

Ser Val Lys Val Ser Cys Arg Ala Ser Gly Gly Thr Phe Arg Ser Tyr
            20                  25                  30

Ser Ile Ser Trp Val Arg Gln Ala Pro Gly Gln Gly Leu Glu Trp Met
            35                  40                  45

Gly Asp Ile Ile Pro Ile Phe Ser Thr Thr Asn Tyr Ala Gln Lys Phe
    50                  55                  60

Gln Gly Arg Val Thr Ile Thr Ala Asp Glu Ala Thr Ser Thr Ala Tyr
65                  70                  75                  80

Met Glu Leu Ser Ser Leu Arg Ser Asp Asp Thr Ala Val Tyr Tyr Cys
                85                  90                  95

Ala Arg Pro Ser Asn Leu Leu Asn Trp Phe Asp Pro Trp Gly Gln Gly
            100                 105                 110

Thr Leu Val Thr Val Ser Ser
        115
```

<210> SEQ ID NO 54
<211> LENGTH: 107
<212> TYPE: PRT

```
<213> ORGANISM: Artificial sequence
<220> FEATURE:
<223> OTHER INFORMATION: Synthetic polypeptide

<400> SEQUENCE: 54

Glu Ile Val Met Thr Gln Ser Pro Ala Thr Leu Ser Val Ser Pro Gly
1               5                   10                  15

Glu Arg Ala Thr Leu Ser Cys Arg Ala Ser Gln Ser Val Asn Ser Asn
            20                  25                  30

Leu Val Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Ile Ser Gly
50                  55                  60

Ser Gly Ser Gly Thr Glu Phe Thr Leu Thr Ile Ser Ser Leu Gln Ser
65                  70                  75                  80

Glu Asp Phe Ala Val Tyr Tyr Cys Gln Gln Tyr Asp Asn Arg Pro Gln
                85                  90                  95

Thr Phe Gly Gln Gly Thr Lys Val Glu Ile Lys
            100                 105

<210> SEQ ID NO 55
<211> LENGTH: 119
<212> TYPE: PRT
<213> ORGANISM: Artificial sequence
<220> FEATURE:
<223> OTHER INFORMATION: Synthetic polypeptide

<400> SEQUENCE: 55

Gln Glu Gln Leu Glu Glu Ser Gly Gly Gly Val Val Gln Pro Gly Arg
1               5                   10                  15

Ser Leu Thr Leu Ser Cys Ala Ala Ser Gly Phe Thr Phe Arg Ser Tyr
            20                  25                  30

Asp Met His Trp Val Arg Gln Ala Pro Gly Lys Gly Leu Glu Trp Val
        35                  40                  45

Ala Leu Ile Ser Tyr Asp Gly Arg Asn Lys His Tyr Gly Asp Ser Val
50                  55                  60

Lys Gly Arg Phe Thr Ile Ser Arg Asp Asn Ser Lys Asn Thr Leu Tyr
65                  70                  75                  80

Leu His Leu Ser Ser Leu Arg Ala Glu Asp Thr Ser Val Tyr Tyr Cys
                85                  90                  95

Ala Arg Gly Ala Asp Asn Gly Leu Phe Thr Asp Ser Trp Gly Gln Gly
            100                 105                 110

Thr Leu Val Ile Val Ser Ser
        115

<210> SEQ ID NO 56
<211> LENGTH: 113
<212> TYPE: PRT
<213> ORGANISM: Artificial sequence
<220> FEATURE:
<223> OTHER INFORMATION: Synthetic polypeptide

<400> SEQUENCE: 56

Asp Ile Val Met Thr Gln Ser Pro Asp Ser Leu Ala Val Ser Leu Gly
1               5                   10                  15

Asp Arg Ala Thr Ile Asn Cys Lys Ser Ser Gln Ser Val Leu Tyr Gly
            20                  25                  30

Ser Thr Asn Lys Asn Phe Leu Ala Trp Tyr Gln Gln Lys Pro Gly Gln
        35                  40                  45
```

Pro Pro Lys Leu Leu Ile Tyr Trp Ala Ser Ala Arg Glu Ser Gly Val
            50                  55                  60

Pro Asp Arg Phe Ser Gly Ser Gly Ser Gly Thr Asp Phe Thr Leu Thr
65                  70                  75                  80

Ile Ser Ser Leu Gln Thr Glu Asp Val Ala Val Tyr Tyr Cys Gln Gln
                85                  90                  95

Tyr Ser Ser Ile Pro Leu Thr Phe Gly Gly Gly Thr Lys Val Glu Ile
                100                 105                 110

Lys

<210> SEQ ID NO 57
<211> LENGTH: 128
<212> TYPE: PRT
<213> ORGANISM: Artificial sequence
<220> FEATURE:
<223> OTHER INFORMATION: Synthetic polypeptide

<400> SEQUENCE: 57

Gln Val Gln Leu Val Gln Ser Gly Ala Glu Val Lys Lys Pro Gly Ala
1               5                   10                  15

Ser Val Arg Val Ser Cys Lys Ala Tyr Gly Tyr Ser Phe Asn Asp Tyr
                20                  25                  30

Phe Met His Trp Val Arg Gln Ala Pro Gly Gln Gly Leu Glu Trp Met
            35                  40                  45

Gly Arg Val Lys Pro Ser Thr Gly Gly Thr Arg Tyr Ala Gln Lys Phe
    50                  55                  60

Gln Gly Arg Val Thr Met Thr Leu Asp Thr Ser Thr Thr Ala Tyr
65                  70                  75                  80

Val Glu Leu Ser Ser Leu Ser Ser Asp Asp Thr Ala Val Tyr Phe Cys
                85                  90                  95

Ala Arg Lys Leu Gly Pro Leu Gly Asp Cys Ser Ser Ser Ser Cys Tyr
                100                 105                 110

Ser Ala Leu Asp Val Trp Gly Gln Gly Thr Met Val Thr Val Ser Ser
                115                 120                 125

<210> SEQ ID NO 58
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 58

Asp Ile Gln Met Thr Gln Ser Pro Ser Thr Leu Ser Ala Ser Val Gly
1               5                   10                  15

Asp Arg Val Thr Ile Thr Cys Arg Ala Ser Glu Ser Ile Ser Asn Trp
                20                  25                  30

Leu Ala Trp Tyr Gln Gln Lys Pro Gly Lys Ala Pro Lys Leu Leu Ile
            35                  40                  45

Ser Lys Ala Ser Ser Leu Glu Ser Gly Val Pro Ser Arg Phe Ser Gly
    50                  55                  60

Ser Gly Ser Gly Thr Glu Phe Thr Leu Thr Ile Gly Ser Leu Gln Pro
65                  70                  75                  80

Asp Asp Phe Ala Thr Tyr Tyr Cys Gln Gln Tyr Asn Thr Tyr Ser Trp
                85                  90                  95

Thr Phe Gly Gln Gly Thr Lys Val Asp Ile Lys
                100                 105

<210> SEQ ID NO 59
<211> LENGTH: 119
<212> TYPE: PRT
<213> ORGANISM: Artificial sequence
<220> FEATURE:
<223> OTHER INFORMATION: Synthetic polypeptide

<400> SEQUENCE: 59

```
Gln Val Leu Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Phe Ile His Trp Val Arg Gln Ala Pro Gly Gln Gly Leu Glu Trp Met
        35                  40                  45

Gly Met Ile Asn Pro Ile Ser Gly Asn Thr Asn Tyr Ala Gln Lys Phe
    50                  55                  60

Gln Gly Arg Val Thr Met Thr Arg Asp Thr Ser Thr Arg Thr Val Tyr
65                  70                  75                  80

Met Gln Leu Ser Ser Leu Thr Phe Glu Asp Thr Ala Val Tyr Ser Cys
                85                  90                  95

Val Arg Trp Thr Thr Val Pro Ser Ser Phe Asp Phe Trp Gly Gln Gly
            100                 105                 110

Thr Leu Val Thr Val Ser Ser
        115
```

<210> SEQ ID NO 60
<211> LENGTH: 108
<212> TYPE: PRT
<213> ORGANISM: Artificial sequence
<220> FEATURE:
<223> OTHER INFORMATION: Synthetic polypeptide

<400> SEQUENCE: 60

```
Ser Tyr Glu Leu Thr Gln Pro Pro Ser Val Ser Val Ser Pro Gly Gln
1               5                   10                  15

Thr Ala Arg Ile Thr Cys Ser Gly Asp Ala Leu Pro Asn Gln Tyr Val
            20                  25                  30

Asn Trp Tyr Gln Gln Lys Pro Gly Gln Ala Pro Val Leu Met Met Phe
        35                  40                  45

Lys Asp Asn Gln Arg Pro Ser Gly Ile Pro Glu Arg Phe Ser Gly Ser
    50                  55                  60

Arg Ser Gly Thr Thr Val Thr Leu Ser Ile Ser Gly Val Gln Ala Glu
65                  70                  75                  80

Asp Glu Ala Asp Tyr His Cys Gln Ser Ala Asp Arg Thr Ala Thr Ser
                85                  90                  95

Val Ala Phe Gly Gly Gly Thr Lys Leu Thr Val Leu
            100                 105
```

<210> SEQ ID NO 61
<211> LENGTH: 131
<212> TYPE: PRT
<213> ORGANISM: Artificial sequence
<220> FEATURE:
<223> OTHER INFORMATION: Synthetic polypeptide

<400> SEQUENCE: 61

```
Gln Leu Gln Leu Gln Glu Ser Gly Ser Arg Leu Val Lys Ser Ser Glu
1               5                   10                  15
```

```
Thr Leu Ser Leu Thr Cys Ala Val Ser Gly Gly Ala Ile Thr Ser Gly
            20                  25                  30

Arg Asn Thr Trp Ser Trp Ile Arg Gln Pro Pro Gly Lys Gly Leu Glu
        35                  40                  45

Trp Ile Gly Phe Ile Tyr Tyr Ser Gly Ser Thr Tyr Ser Asn Pro Ile
 50                  55                  60

Thr Tyr Ser Ser Pro Ser Leu Lys Ser Arg Val Thr Ile Ser Leu Asp
 65                  70                  75                  80

Thr Ser Lys Asn Gln Phe Ser Leu Lys Leu Asn Ser Val Thr Ala Ala
                85                  90                  95

Asp Thr Ala Val Tyr Tyr Cys Ala Arg Ala Lys Pro Ser Asn Leu Asn
            100                 105                 110

Phe Tyr Tyr Tyr Gly Met Asp Val Trp Gly Gln Gly Thr Thr Val Thr
        115                 120                 125

Val Ser Ser
    130

<210> SEQ ID NO 62
<211> LENGTH: 108
<212> TYPE: PRT
<213> ORGANISM: Artificial sequence
<220> FEATURE:
<223> OTHER INFORMATION: Synthetic polypeptide

<400> SEQUENCE: 62

Glu Ile Val Met Thr Gln Ser Pro Ala Thr Leu Ser Val Ser Pro Gly
 1               5                  10                  15

Glu Arg Ala Thr Leu Ser Cys Arg Ala Ser Gln Ser Val Ser Ser Asn
            20                  25                  30

Leu Ala Trp Tyr Gln Gln Lys Pro Gly Gln Ala Pro Arg Leu Leu Ile
        35                  40                  45

Tyr Gly Ala Ser Thr Arg Ala Thr Gly Ile Pro Ala Arg Phe Ser Gly
 50                  55                  60

Ser Gly Ser Glu Thr Glu Phe Thr Leu Thr Ile Ser Ser Leu Gln Ser
 65                  70                  75                  80

Glu Asp Phe Ala Val Tyr Tyr Cys Gln Gln Ser Asp Asn Trp Pro Pro
                85                  90                  95

Ile Thr Phe Gly Gln Gly Thr Arg Leu Glu Ile Lys
            100                 105

<210> SEQ ID NO 63
<211> LENGTH: 120
<212> TYPE: PRT
<213> ORGANISM: Artificial sequence
<220> FEATURE:
<223> OTHER INFORMATION: Synthetic polypeptide

<400> SEQUENCE: 63

Glu Leu Gln Leu Val Glu Ser Gly Gly Gly Leu Ile Arg Pro Gly Gly
 1               5                  10                  15

Ser Leu Arg Leu Ser Cys Thr Ala Ala Gly Phe Thr Phe Ser Asn Tyr
            20                  25                  30

Asn Met Asn Trp Val Arg Gln Ala Pro Gly Lys Gly Leu Asp Trp Val
        35                  40                  45

Ser Tyr Ile Ser Ser Ser Gly Gly Thr Thr Ile Tyr Ala Asp Ser Val
 50                  55                  60

Lys Gly Arg Phe Thr Ile Ser Arg Asp Asn Ala Lys Asp Ser Leu Tyr
 65                  70                  75                  80
```

Leu Gln Met Asn Ser Leu Arg Asp Asp Thr Ala Ile Tyr Tyr Cys
                85                  90                  95

Val Arg Gly Arg Gly Gln Leu Ala Thr His Phe Asp Tyr Trp Gly Gln
            100                 105                 110

Gly Thr Leu Val Thr Val Ser Ser
        115                 120

<210> SEQ ID NO 64
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 64

Glu Ser Val Leu Thr Gln Phe Pro Asp Phe Gln Ser Val Thr Pro Lys
1               5                   10                  15

Glu Lys Val Thr Ile Thr Cys Arg Ala Ser Gln Ser Ile His Ile Asn
            20                  25                  30

Leu His Trp Tyr Gln Gln Lys Pro His Gln Ser Pro Lys Leu Leu Ile
        35                  40                  45

Lys Tyr Ala Ser Gln Ser Ile Ala Gly Val Pro Ser Arg Phe Ser Gly
    50                  55                  60

Ser Gly Ser Gly Thr Glu Phe Thr Leu Thr Ile Asn Gly Leu Glu Ala
65                  70                  75                  80

Glu Asp Ala Ala Thr Tyr Tyr Cys His Gln Ser Asn Ser Leu Pro Trp
                85                  90                  95

Thr Phe Gly Gln Gly Thr Lys Val Glu Ile Lys
            100                 105

<210> SEQ ID NO 65
<211> LENGTH: 123
<212> TYPE: PRT
<213> ORGANISM: Artificial sequence
<220> FEATURE:
<223> OTHER INFORMATION: Synthetic polypeptide

<400> SEQUENCE: 65

Gln Val Gln Leu Val Glu Ser Gly Gly Val Val Gln Pro Gly Arg
1               5                   10                  15

Ser Leu Arg Leu Ser Cys Ala Ala Ser Gly Phe Arg Phe Ser Ser Tyr
            20                  25                  30

Ala Met His Trp Val Arg Gln Ala Pro Gly Lys Gly Leu Glu Trp Val
        35                  40                  45

Ala Thr Ile Trp Phe Asp Gly Thr Asn Glu Tyr Tyr Gly Asp Ser Ala
    50                  55                  60

Lys Gly Arg Phe Thr Ile Ser Arg Asp Asn Ser Met Ser Thr Leu Tyr
65                  70                  75                  80

Leu Gln Met Asn Ser Leu Arg Val Glu Asp Thr Ala Val Tyr Tyr Cys
                85                  90                  95

Ala Arg Pro Ala Asn Gly Tyr Ser Asp Tyr Tyr Tyr Gly Met Asp Val
            100                 105                 110

Trp Gly Gln Gly Thr Thr Val Thr Val Ser Ser
        115                 120

<210> SEQ ID NO 66
<211> LENGTH: 112
<212> TYPE: PRT

```
<213> ORGANISM: Artificial sequence
<220> FEATURE:
<223> OTHER INFORMATION: Synthetic polypeptide

<400> SEQUENCE: 66

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Thr Tyr
            20                  25                  30

Asn Leu Val Ser Trp Tyr Gln Gln His Pro Gly Lys Ala Pro Lys Leu
        35                  40                  45

Met Ile Phe Glu Val Asn Lys Arg Pro Ser Gly Val Ser Tyr Arg Phe
50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Cys Ser Tyr Ala Asp Asn
                85                  90                  95

Arg Thr Pro Phe Leu Phe Gly Thr Gly Thr Lys Val Thr Val Leu Gly
            100                 105                 110

<210> SEQ ID NO 67
<211> LENGTH: 119
<212> TYPE: PRT
<213> ORGANISM: Artificial sequence
<220> FEATURE:
<223> OTHER INFORMATION: Synthetic polypeptide

<400> SEQUENCE: 67

Gln Val Gln Leu Val Gln Ser Gly Ala Glu Val Lys Lys Pro Gly Ala
1               5                   10                  15

Ser Val Arg Val Ser Cys Lys Ala Ser Gly Tyr Thr Phe Thr Ala Tyr
            20                  25                  30

Phe Met Asn Trp Val Arg Gln Ala Pro Gly Gln Gly Leu Glu Trp Met
        35                  40                  45

Gly Arg Ile Asn Pro Ile Ser Gly Asp Thr Asn Phe Ala Gln Asn Phe
    50                  55                  60

Gln Gly Arg Val Thr Met Thr Arg Asp Thr Ser Ile Thr Thr Val Tyr
65                  70                  75                  80

Met Glu Leu Asn Arg Leu Thr Ser Asp Asp Thr Ala Val Tyr Tyr Cys
                85                  90                  95

Ala Arg Val Arg Ser Gly Tyr Ser Tyr Ile Asp Phe Trp Gly Gln Gly
            100                 105                 110

Thr Leu Val Thr Val Ala Ser
        115

<210> SEQ ID NO 68
<211> LENGTH: 108
<212> TYPE: PRT
<213> ORGANISM: Artificial sequence
<220> FEATURE:
<223> OTHER INFORMATION: Synthetic polypeptide

<400> SEQUENCE: 68

Ser Tyr Asp Leu Thr Gln Pro Pro Ser Val Ser Val Ser Pro Gly Gln
1               5                   10                  15

Thr Ala Arg Ile Thr Cys Ser Gly Asp Ala Leu Ser Asn Gln Tyr Ala
            20                  25                  30

Tyr Trp Tyr Gln Gln Arg Pro Gly Gln Ala Pro Val Val Val Ile Tyr
        35                  40                  45
```

```
Lys Tyr Ser Glu Arg Pro Ser Gly Ile Pro Glu Arg Phe Ser Gly Ser
    50                  55                  60

Ser Ser Gly Thr Thr Val Thr Leu Thr Ile Ser Gly Val Gln Ala Glu
65                  70                  75                  80

Asp Glu Ala Asp Tyr Tyr Cys Gln Ser Ala Asp Arg Leu Gly Thr Tyr
                85                  90                  95

Trp Val Phe Gly Gly Gly Thr Lys Leu Thr Val Leu
            100                 105
```

<210> SEQ ID NO 69
<211> LENGTH: 130
<212> TYPE: PRT
<213> ORGANISM: Artificial sequence
<220> FEATURE:
<223> OTHER INFORMATION: Synthetic polypeptide

<400> SEQUENCE: 69

```
Gln Val Gln Leu Val Glu Ser Gly Gly Val Val Gln Pro Gly Arg
1               5                   10                  15

Ala Leu Arg Leu Ser Cys Ala Ala Ser Gly Phe Thr Phe Ser Ser Tyr
                20                  25                  30

Gly Met His Trp Val Arg Gln Ala Pro Gly Lys Gly Leu Glu Trp Val
            35                  40                  45

Ala Val Val Trp Asn Asp Gly Asn Lys Tyr Ala Asp Ser Val
50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Phe Cys
                85                  90                  95

Ala Arg Asp Gly Tyr Tyr Val Ser Gly Tyr His Pro Leu Arg Tyr
                100                 105                 110

Tyr Tyr Tyr Tyr Met Asp Val Trp Gly Lys Gly Thr Thr Val Ala Val
            115                 120                 125

Ser Ser
    130
```

<210> SEQ ID NO 70
<211> LENGTH: 114
<212> TYPE: PRT
<213> ORGANISM: Artificial sequence
<220> FEATURE:
<223> OTHER INFORMATION: Synthetic polypeptide

<400> SEQUENCE: 70

```
Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Val Leu Tyr Ser
                20                  25                  30

Pro Asn Asn Lys Asn Tyr Leu Ala Trp Tyr Gln Gln Lys Pro Gly Gln
            35                  40                  45

Pro Pro Lys Leu Leu Ile Tyr Trp Ala Ser Thr Arg Glu Ser Gly Val
50                  55                  60

Pro Asp Arg Phe Ser Gly Ser Gly Ser Ala Thr Asp Phe Thr Leu Thr
65                  70                  75                  80

Ile Asp Ser Leu Gln Ala Glu Asp Val Ala Val Tyr Tyr Cys Gln Gln
                85                  90                  95

Tyr Tyr Ser Thr Pro Pro Leu Thr Phe Gly Gly Gly Thr Lys Val Glu
```

Ile Lys

<210> SEQ ID NO 71
<211> LENGTH: 125
<212> TYPE: PRT
<213> ORGANISM: Artificial sequence
<220> FEATURE:
<223> OTHER INFORMATION: Synthetic polypeptide

<400> SEQUENCE: 71

```
Glu Met Gln Leu Leu Glu Ser Gly Gly Gly Leu Ile Gln Pro Gly Glu
1               5                   10                  15

Ser Leu Arg Leu Ser Cys Ala Gly Ser Gly Phe Thr Phe Arg Asn Tyr
            20                  25                  30

Ala Met Ser Trp Val Arg Gln Ala Pro Gly Lys Gly Leu Gln Trp Val
        35                  40                  45

Ser Ala Ile Ser Ala Ser Gly Gly Ile Thr His Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Lys Gly Glu Ile Met Arg Asp Thr Gly Tyr His Asp Asp Ala Phe
            100                 105                 110

Asp Val Trp Gly Gln Gly Lys Met Val Thr Val Ser Ser
        115                 120                 125
```

<210> SEQ ID NO 72
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 72

```
Asp Ile Gln Leu Thr Gln Ser Pro Ser Phe Leu Ser Ala Ser Val Gly
1               5                   10                  15

Asp Arg Val Thr Ile Thr Cys Arg Ala Ser Gln Gly Ile Ser Ser Tyr
            20                  25                  30

Leu Val Trp Tyr Gln Gln Lys Pro Gly Glu Ala Pro Lys Leu Leu Ile
        35                  40                  45

Tyr Thr Ala Ser Thr Leu Gln Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Glu Asp Phe Ala Thr Tyr His Cys Gln Gln Val Glu Ser Tyr Pro Tyr
                85                  90                  95

Ser Phe Gly Gln Gly Thr Lys Leu Glu Ile Lys
            100                 105
```

<210> SEQ ID NO 73
<211> LENGTH: 128
<212> TYPE: PRT
<213> ORGANISM: Artificial sequence
<220> FEATURE:
<223> OTHER INFORMATION: Synthetic polypeptide

<400> SEQUENCE: 73

Glu Val Gln Leu Val Glu Ser Gly Gly Arg Leu Val Arg Pro Gly Gly
1               5                   10                  15

Ser Leu Arg Leu Ser Cys Ala Ala Ser Gly Phe Thr Phe Ser His Tyr
            20                  25                  30

Asn Met Asn Trp Val Arg Gln Ala Pro Gly Lys Gly Leu Glu Trp Val
        35                  40                  45

Ser Ser Ile Asn Ser Arg Asn Gly Tyr Thr Tyr Tyr Ala Asp Ser Val
    50                  55                  60

Lys Gly Arg Phe Thr Ile Ser Arg Asp Asn Ala Lys Asn Ser Leu Tyr
65                  70                  75                  80

Leu Gln Met Asn Ser Leu Arg Pro Glu Asp Thr Ala Val Tyr Tyr Cys
                85                  90                  95

Ala Arg Asp Pro Pro Leu Tyr Ser Gly Tyr Asp Leu Gly Tyr Tyr Tyr
            100                 105                 110

Tyr Gly Met Asp Val Trp Gly Gln Gly Thr Thr Val Thr Val Ser Ser
            115                 120                 125

<210> SEQ ID NO 74
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 74

Asp Ile Gln Met Thr Gln Ser Pro Ser Thr Leu Ser Ala Phe Val Gly
1               5                   10                  15

Asp Arg Val Thr Ile Thr Cys Arg Ala Asn Gln Asn Ile Ser Lys Trp
            20                  25                  30

Leu Ala Trp Tyr Gln Gln Lys Pro Gly Lys Ala Pro Asn Leu Leu Ile
        35                  40                  45

His Lys Ala Ser Ser Leu Glu Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Ser Cys Gln Gln Tyr Asn Ser Tyr Pro Trp
                85                  90                  95

Ala Phe Gly Gln Gly Thr Arg Val Glu Ile Lys
            100                 105

<210> SEQ ID NO 75
<211> LENGTH: 117
<212> TYPE: PRT
<213> ORGANISM: Artificial sequence
<220> FEATURE:
<223> OTHER INFORMATION: Synthetic polypeptide

<400> SEQUENCE: 75

Gln Val Gln Leu Gln Glu Ser Gly Pro Gly Leu Val Lys Pro Ser Gln
1               5                   10                  15

Thr Leu Ser Leu Thr Cys Thr Val Ser Gly Gly Ser Ile Ser Ser Gly
            20                  25                  30

Gly Tyr Phe Trp Ser Trp Ile Arg Gln His Pro Gly Lys Gly Leu Glu
        35                  40                  45

Trp Ile Gly Tyr Ile Tyr Tyr Ser Gly Ser Thr Tyr Tyr Asn Pro Ser
    50                  55                  60

Leu Lys Ser Arg Val Thr Ile Ser Ile Asp Thr Ser Lys Ile Gln Phe
65                  70                  75                  80

```
Ser Leu Lys Leu Thr Ser Val Thr Ala Ala Asp Thr Ala Val Tyr Tyr
                85                  90                  95

Cys Ala Arg Asp Val Gly Gly Phe Asp Ile Trp Gly Gln Gly Thr Met
            100                 105                 110

Val Thr Val Ser Ser
        115

<210> SEQ ID NO 76
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 76

Asp Ile Gln Met Thr Gln Ser Pro Ser Ser Leu Ser Ala Ser Ile Gly
1               5                   10                  15

Asp Arg Val Thr Ile Thr Cys Gln Ala Ser Gln Asp Ile Asn Lys Tyr
            20                  25                  30

Leu Asn Trp Tyr Gln Gln Lys Pro Gly Lys Ala Pro Lys Val Leu Ile
        35                  40                  45

Tyr Asp Ala Ser Asn Leu Glu Thr Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Val Ala Thr Tyr Tyr Cys Gln Gln Tyr Glu Asn Leu Pro Arg
                85                  90                  95

Thr Phe Gly Gln Gly Thr Lys Val Glu Ile Lys
            100                 105

<210> SEQ ID NO 77
<211> LENGTH: 121
<212> TYPE: PRT
<213> ORGANISM: Artificial sequence
<220> FEATURE:
<223> OTHER INFORMATION: Synthetic polypeptide

<400> SEQUENCE: 77

Gln Val Arg Leu Val Glu Ser Gly Gly Val Val Gln Pro Gly Arg
1               5                   10                  15

Ser Leu Arg Leu Ser Cys Ala Ala Ser Gly Phe Thr Phe Arg Ser Tyr
            20                  25                  30

Gly Met His Trp Val Arg Gln Ala Pro Gly Lys Gly Leu Glu Trp Val
        35                  40                  45

Ala Leu Ile Ser Leu Asp Gly Ser Glu Lys His Tyr Ala Asp Ser Val
    50                  55                  60

Lys Gly Arg Leu Thr Ile Ser Arg Asp Asn Ser Lys Asn Met Leu Tyr
65                  70                  75                  80

Leu Gln Met Asn Asn Leu Arg Val Glu Asp Thr Ala Val Tyr Tyr Cys
                85                  90                  95

Ala Lys Asp Arg Pro Tyr Ser Trp Arg Asp Val Leu Asp Tyr Trp Gly
            100                 105                 110

Gln Gly Thr Leu Val Thr Val Ser Ser
        115                 120

<210> SEQ ID NO 78
<211> LENGTH: 107
<212> TYPE: PRT
```

<213> ORGANISM: Artificial sequence
<220> FEATURE:
<223> OTHER INFORMATION: Synthetic polypeptide

<400> SEQUENCE: 78

Asp Ile Gln Met Thr Gln Ser Pro Ser Ser Leu Ser Ala Ser Val Gly
1               5                   10                  15

Asp Arg Val Thr Ile Thr Cys Arg Ala Ser Arg Asp Ile His Thr Ser
            20                  25                  30

Leu Asn Trp Tyr Gln His Thr Pro Gly Lys Ala Pro Glu Leu Leu Ile
        35                  40                  45

Tyr Ala Ala Ser Thr Leu Glu Met Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Tyr Asp Glu Leu Pro Leu
                85                  90                  95

Thr Phe Gly Gly Gly Thr Lys Val Glu Met Lys
            100                 105

<210> SEQ ID NO 79
<211> LENGTH: 132
<212> TYPE: PRT
<213> ORGANISM: Artificial sequence
<220> FEATURE:
<223> OTHER INFORMATION: Synthetic polypeptide

<400> SEQUENCE: 79

Gln Val Gln Leu Gln Gln Ser Gly Pro Gly Leu Val Lys Pro Ser Gln
1               5                   10                  15

Ile Leu Ser Leu Thr Cys Ala Ile Ser Gly Asp Ser Val Ser Ser Asn
            20                  25                  30

Arg Ala Ala Trp Asn Trp Ile Arg Gln Ser Pro Leu Arg Gly Leu Glu
        35                  40                  45

Trp Leu Gly Arg Thr Tyr Tyr Arg Ser Lys Trp Tyr Asn Asp Tyr Ala
    50                  55                  60

Leu Ser Val Lys Ser Arg Ile Ser Ile Asn Pro Asp Thr Ser Lys Asn
65                  70                  75                  80

Gln Phe Ser Leu Gln Leu Asn Ser Val Thr Pro Glu Asp Thr Ala Val
                85                  90                  95

Tyr Tyr Cys Ala Arg Thr Pro Arg Ala Tyr Ser Ser Gly Trp His Val
            100                 105                 110

Pro Tyr Tyr Tyr Ser Gly Met Asp Val Trp Gly Gln Gly Thr Thr Val
        115                 120                 125

Thr Val Ser Ser
    130

<210> SEQ ID NO 80
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 80

Asp Ile Gln Met Thr Gln Ser Pro Ser Ser Leu Ser Ala Ser Ile Ala
1               5                   10                  15

Asp Arg Val Thr Ile Thr Cys Gln Ala Ser Gln Asp Ile Ser Asp His
            20                  25                  30

```
Leu Asn Trp Tyr Gln Gln Lys Pro Gly Thr Ala Pro Lys Leu Leu Ile
            35                  40                  45

Tyr Asp Ala Ser Asn Leu Glu Thr Gly Val Pro Ser Arg Phe Ser Gly
        50                  55                  60

Ser Gly Ser Gly Thr Asp Phe Thr Phe Thr Ile Asn Arg Leu Gln Pro
 65                  70                  75                  80

Glu Asp Phe Ala Thr Tyr Tyr Cys Gln Gln Tyr Asp Glu Val Pro Pro
                85                  90                  95

Thr Phe Gly Gln Gly Thr Lys Val Asp Ile Arg
                100                 105
```

<210> SEQ ID NO 81
<211> LENGTH: 131
<212> TYPE: PRT
<213> ORGANISM: Artificial sequence
<220> FEATURE:
<223> OTHER INFORMATION: Synthetic polypeptide

<400> SEQUENCE: 81

```
Gln Val Gln Leu Gln Gln Ser Gly Pro Gly Leu Val Lys Pro Ser Gln
1               5                   10                  15

Thr Leu Ser Leu Thr Cys Ala Ile Ser Gly Asp Ser Val Ser Ser Asn
            20                  25                  30

Ser Ala Ala Trp Asn Trp Ile Arg Gln Ser Pro Ser Arg Gly Leu Glu
        35                  40                  45

Trp Leu Gly Arg Thr Tyr Tyr Arg Ser Lys Trp Tyr Asn Asp Tyr Ala
    50                  55                  60

Val Ser Val Lys Ser Arg Ile Thr Ile Asn Pro Asp Thr Ser Lys Asn
65                  70                  75                  80

Gln Phe Ser Leu Gln Met Asn Ser Val Thr Pro Glu Asp Thr Ala Val
                85                  90                  95

Tyr Tyr Cys Ala Arg Asp Arg Arg Lys Leu Glu Pro Pro Pro Phe Ser
            100                 105                 110

Tyr Tyr Tyr Tyr Gly Leu Asp Val Trp Gly Gln Gly Thr Thr Val Thr
        115                 120                 125

Val Ser Ser
        130
```

<210> SEQ ID NO 82
<211> LENGTH: 107
<212> TYPE: PRT
<213> ORGANISM: Artificial sequence
<220> FEATURE:
<223> OTHER INFORMATION: Synthetic polypeptide

<400> SEQUENCE: 82

```
Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
            20                  25                  30

Leu Asn Trp Tyr Gln Gln Lys Pro Gly Lys Ala Pro Lys Leu Leu Ile
            35                  40                  45

Tyr Asp Ala Ser Asn Leu Glu Thr Gly Val Pro Ser Arg Phe Ser Gly
        50                  55                  60

Ser Gly Ser Gly Thr Asp Phe Thr Phe Thr Ile Ser Ser Leu Gln Pro
 65                  70                  75                  80

Glu Asp Ile Ala Thr Tyr Tyr Cys Gln Gln Tyr Asp Asn Val Pro Leu
```

```
                    85                  90                  95

Thr Phe Gly Gly Gly Thr Lys Val Glu Ile Lys
                    100                 105

<210> SEQ ID NO 83
<211> LENGTH: 120
<212> TYPE: PRT
<213> ORGANISM: Artificial sequence
<220> FEATURE:
<223> OTHER INFORMATION: Synthetic polypeptide

<400> SEQUENCE: 83

Glu Val Gln Leu Val Glu Ser Gly Gly Leu Val Gln Pro Gly Gly
1               5                   10                  15

Ser Leu Arg Leu Ser Cys Ala Ala Ser Gly Phe Thr Phe Ser Thr Tyr
                20                  25                  30

Glu Met Asn Trp Val Arg Gln Ala Pro Gly Lys Gly Leu Glu Trp Ile
            35                  40                  45

Ser Tyr Ile Arg Ser Ser Gly Ser Thr Val Tyr Tyr Ala Asp Ser Val
    50                  55                  60

Lys Gly Arg Phe Thr Ile Ser Arg Asp Asn Ala Lys Asn Leu Leu Tyr
65                  70                  75                  80

Leu Gln Met Asn Ser Leu Arg Ala Gly Asp Thr Ala Val Tyr Tyr Cys
                85                  90                  95

Ala Arg Ile Pro Gly Gly Tyr Thr Gly Tyr Phe Asp Tyr Trp Gly Gln
                100                 105                 110

Gly Ala Leu Val Thr Val Ser Ser
        115                 120

<210> SEQ ID NO 84
<211> LENGTH: 111
<212> TYPE: PRT
<213> ORGANISM: Artificial sequence
<220> FEATURE:
<223> OTHER INFORMATION: Synthetic polypeptide

<400> SEQUENCE: 84

Gln Ser Val Leu Thr Gln Pro Pro Ser Val Ser Gly Ala Pro Gly Gln
1               5                   10                  15

Arg Val Thr Ile Ser Cys Thr Gly Ser Ser Ser Asn Ile Gly Ala Gly
                20                  25                  30

Tyr Tyr Val His Trp Tyr Gln Gln Leu Pro Gly Thr Val Pro Lys Leu
            35                  40                  45

Leu Ile Tyr Gly Asn Asn Arg Pro Ser Gly Val Pro Asp Arg Phe
    50                  55                  60

Ser Gly Ser Lys Ser Gly Thr Ser Ala Ser Leu Ala Ile Thr Gly Leu
65                  70                  75                  80

Gln Thr Glu Asp Glu Ala Asp Tyr Tyr Cys Gln Ser Tyr Asp Ser Ser
                85                  90                  95

Leu Ser Gly Trp Val Phe Gly Gly Gly Thr Lys Leu Thr Val Leu
                100                 105                 110

<210> SEQ ID NO 85
<211> LENGTH: 8
<212> TYPE: PRT
<213> ORGANISM: Artificial sequence
<220> FEATURE:
<223> OTHER INFORMATION: Synthetic peptide

<400> SEQUENCE: 85
```

```
Gly Ile Asp Phe Ser Asn Tyr Ala
1               5

<210> SEQ ID NO 86
<211> LENGTH: 8
<212> TYPE: PRT
<213> ORGANISM: Artificial sequence
<220> FEATURE:
<223> OTHER INFORMATION: Synthetic peptide

<400> SEQUENCE: 86

Ile Ser Gly Ser Gly Asp Thr Thr
1               5

<210> SEQ ID NO 87
<211> LENGTH: 15
<212> TYPE: PRT
<213> ORGANISM: Artificial sequence
<220> FEATURE:
<223> OTHER INFORMATION: Synthetic peptide

<400> SEQUENCE: 87

Ala Lys Thr Met Gly Pro Val Ser Gly Gln Tyr Ala Phe Asp Ile
1               5                   10                  15

<210> SEQ ID NO 88
<211> LENGTH: 8
<212> TYPE: PRT
<213> ORGANISM: Artificial sequence
<220> FEATURE:
<223> OTHER INFORMATION: Synthetic peptide

<400> SEQUENCE: 88

Gly Phe Thr Phe Ser Ser Tyr Ala
1               5

<210> SEQ ID NO 89
<211> LENGTH: 8
<212> TYPE: PRT
<213> ORGANISM: Artificial sequence
<220> FEATURE:
<223> OTHER INFORMATION: Synthetic peptide

<400> SEQUENCE: 89

Ile Ser Leu Asp Gly Phe Asn Thr
1               5

<210> SEQ ID NO 90
<211> LENGTH: 16
<212> TYPE: PRT
<213> ORGANISM: Artificial sequence
<220> FEATURE:
<223> OTHER INFORMATION: Synthetic peptide

<400> SEQUENCE: 90

Val Lys Asp Arg Gly Pro Thr Gly Ser Gly Ser Tyr Gly Met Asp Val
1               5                   10                  15

<210> SEQ ID NO 91
<211> LENGTH: 9
<212> TYPE: PRT
<213> ORGANISM: Artificial sequence
<220> FEATURE:
<223> OTHER INFORMATION: Synthetic peptide

<400> SEQUENCE: 91
```

```
Gly Gly Ser Ile Gly Ser Ser His Trp
1               5

<210> SEQ ID NO 92
<211> LENGTH: 7
<212> TYPE: PRT
<213> ORGANISM: Artificial sequence
<220> FEATURE:
<223> OTHER INFORMATION: Synthetic peptide

<400> SEQUENCE: 92

Ile His His Thr Glu Ser Thr
1               5

<210> SEQ ID NO 93
<211> LENGTH: 13
<212> TYPE: PRT
<213> ORGANISM: Artificial sequence
<220> FEATURE:
<223> OTHER INFORMATION: Synthetic peptide

<400> SEQUENCE: 93

Ala Arg Ala Gly Ala Thr Phe Ala Glu Pro Phe Ser Leu
1               5                   10

<210> SEQ ID NO 94
<211> LENGTH: 9
<212> TYPE: PRT
<213> ORGANISM: Artificial sequence
<220> FEATURE:
<223> OTHER INFORMATION: Synthetic peptide

<400> SEQUENCE: 94

Gly Gly Ser Ile Ser Ser Ser Asn Trp
1               5

<210> SEQ ID NO 95
<211> LENGTH: 7
<212> TYPE: PRT
<213> ORGANISM: Artificial sequence
<220> FEATURE:
<223> OTHER INFORMATION: Synthetic peptide

<400> SEQUENCE: 95

Ile Tyr His Ser Gly Ser Thr
1               5

<210> SEQ ID NO 96
<211> LENGTH: 13
<212> TYPE: PRT
<213> ORGANISM: Artificial sequence
<220> FEATURE:
<223> OTHER INFORMATION: Synthetic peptide

<400> SEQUENCE: 96

Ala Arg Ala Arg Gly Glu Trp Leu Ala His Phe Asp Tyr
1               5                   10

<210> SEQ ID NO 97
<211> LENGTH: 8
<212> TYPE: PRT
<213> ORGANISM: Artificial sequence
<220> FEATURE:
<223> OTHER INFORMATION: Synthetic peptide

<400> SEQUENCE: 97

Gly Tyr Arg Phe Tyr Thr Tyr Trp
```

```
<210> SEQ ID NO 98
<211> LENGTH: 8
<212> TYPE: PRT
<213> ORGANISM: Artificial sequence
<220> FEATURE:
<223> OTHER INFORMATION: Synthetic peptide

<400> SEQUENCE: 98

Ile Tyr Pro Gly Asp Ser Asp Pro
1               5

<210> SEQ ID NO 99
<211> LENGTH: 10
<212> TYPE: PRT
<213> ORGANISM: Artificial sequence
<220> FEATURE:
<223> OTHER INFORMATION: Synthetic peptide

<400> SEQUENCE: 99

Val Arg Val Gln Gly Thr Met Leu Asp Tyr
1               5                   10

<210> SEQ ID NO 100
<211> LENGTH: 8
<212> TYPE: PRT
<213> ORGANISM: Artificial sequence
<220> FEATURE:
<223> OTHER INFORMATION: Synthetic peptide

<400> SEQUENCE: 100

Gly Gly Thr Phe Arg Ser Tyr Ser
1               5

<210> SEQ ID NO 101
<211> LENGTH: 8
<212> TYPE: PRT
<213> ORGANISM: Artificial sequence
<220> FEATURE:
<223> OTHER INFORMATION: Synthetic peptide

<400> SEQUENCE: 101

Ile Ile Pro Ile Phe Ser Thr Thr
1               5

<210> SEQ ID NO 102
<211> LENGTH: 12
<212> TYPE: PRT
<213> ORGANISM: Artificial sequence
<220> FEATURE:
<223> OTHER INFORMATION: Synthetic peptide

<400> SEQUENCE: 102

Ala Arg Pro Ser Asn Leu Leu Asn Trp Phe Asp Pro
1               5                   10

<210> SEQ ID NO 103
<211> LENGTH: 8
<212> TYPE: PRT
<213> ORGANISM: Artificial sequence
<220> FEATURE:
<223> OTHER INFORMATION: Synthetic peptide

<400> SEQUENCE: 103

Gly Phe Thr Phe Arg Ser Tyr Asp
1               5
```

<210> SEQ ID NO 104
<211> LENGTH: 8
<212> TYPE: PRT
<213> ORGANISM: Artificial sequence
<220> FEATURE:
<223> OTHER INFORMATION: Synthetic peptide

<400> SEQUENCE: 104

Ile Ser Tyr Asp Gly Arg Asn Lys
1               5

<210> SEQ ID NO 105
<211> LENGTH: 12
<212> TYPE: PRT
<213> ORGANISM: Artificial sequence
<220> FEATURE:
<223> OTHER INFORMATION: Synthetic peptide

<400> SEQUENCE: 105

Ala Arg Gly Ala Asp Asn Gly Leu Phe Thr Asp Ser
1               5                   10

<210> SEQ ID NO 106
<211> LENGTH: 8
<212> TYPE: PRT
<213> ORGANISM: Artificial sequence
<220> FEATURE:
<223> OTHER INFORMATION: Synthetic peptide

<400> SEQUENCE: 106

Gly Tyr Ser Phe Asn Asp Tyr Phe
1               5

<210> SEQ ID NO 107
<211> LENGTH: 8
<212> TYPE: PRT
<213> ORGANISM: Artificial sequence
<220> FEATURE:
<223> OTHER INFORMATION: Synthetic peptide

<400> SEQUENCE: 107

Val Lys Pro Ser Thr Gly Gly Thr
1               5

<210> SEQ ID NO 108
<211> LENGTH: 21
<212> TYPE: PRT
<213> ORGANISM: Artificial sequence
<220> FEATURE:
<223> OTHER INFORMATION: Synthetic peptide

<400> SEQUENCE: 108

Ala Arg Lys Leu Gly Pro Leu Gly Asp Cys Ser Ser Ser Cys Tyr
1               5                   10                  15

Ser Ala Leu Asp Val
            20

<210> SEQ ID NO 109
<211> LENGTH: 8
<212> TYPE: PRT
<213> ORGANISM: Artificial sequence
<220> FEATURE:
<223> OTHER INFORMATION: Synthetic peptide

<400> SEQUENCE: 109

```
Gly Tyr Thr Phe Thr Ser Tyr Phe
1               5

<210> SEQ ID NO 110
<211> LENGTH: 8
<212> TYPE: PRT
<213> ORGANISM: Artificial sequence
<220> FEATURE:
<223> OTHER INFORMATION: Synthetic peptide

<400> SEQUENCE: 110

Ile Asn Pro Ile Ser Gly Asn Thr
1               5

<210> SEQ ID NO 111
<211> LENGTH: 12
<212> TYPE: PRT
<213> ORGANISM: Artificial sequence
<220> FEATURE:
<223> OTHER INFORMATION: Synthetic peptide

<400> SEQUENCE: 111

Val Arg Trp Thr Thr Val Pro Ser Ser Phe Asp Phe
1               5                   10

<210> SEQ ID NO 112
<211> LENGTH: 10
<212> TYPE: PRT
<213> ORGANISM: Artificial sequence
<220> FEATURE:
<223> OTHER INFORMATION: Synthetic peptide

<400> SEQUENCE: 112

Gly Gly Ala Ile Thr Ser Gly Arg Asn Thr
1               5                   10

<210> SEQ ID NO 113
<211> LENGTH: 7
<212> TYPE: PRT
<213> ORGANISM: Artificial sequence
<220> FEATURE:
<223> OTHER INFORMATION: Synthetic peptide

<400> SEQUENCE: 113

Ile Tyr Tyr Ser Gly Ser Thr
1               5

<210> SEQ ID NO 114
<211> LENGTH: 17
<212> TYPE: PRT
<213> ORGANISM: Artificial sequence
<220> FEATURE:
<223> OTHER INFORMATION: Synthetic peptide

<400> SEQUENCE: 114

Ala Arg Ala Lys Pro Ser Asn Leu Asn Phe Tyr Tyr Tyr Gly Met Asp
1               5                   10                  15

Val

<210> SEQ ID NO 115
<211> LENGTH: 8
<212> TYPE: PRT
<213> ORGANISM: Artificial sequence
<220> FEATURE:
<223> OTHER INFORMATION: Synthetic peptide

<400> SEQUENCE: 115
```

```
Gly Phe Thr Phe Ser Asn Tyr Asn
1               5
```

<210> SEQ ID NO 116
<211> LENGTH: 8
<212> TYPE: PRT
<213> ORGANISM: Artificial sequence
<220> FEATURE:
<223> OTHER INFORMATION: Synthetic peptide

<400> SEQUENCE: 116

```
Ile Ser Ser Ser Gly Gly Thr Thr
1               5
```

<210> SEQ ID NO 117
<211> LENGTH: 13
<212> TYPE: PRT
<213> ORGANISM: Artificial sequence
<220> FEATURE:
<223> OTHER INFORMATION: Synthetic peptide

<400> SEQUENCE: 117

```
Val Arg Gly Arg Gly Gln Leu Ala Thr His Phe Asp Tyr
1               5                   10
```

<210> SEQ ID NO 118
<211> LENGTH: 8
<212> TYPE: PRT
<213> ORGANISM: Artificial sequence
<220> FEATURE:
<223> OTHER INFORMATION: Synthetic peptide

<400> SEQUENCE: 118

```
Gly Phe Arg Phe Ser Ser Tyr Ala
1               5
```

<210> SEQ ID NO 119
<211> LENGTH: 8
<212> TYPE: PRT
<213> ORGANISM: Artificial sequence
<220> FEATURE:
<223> OTHER INFORMATION: Synthetic peptide

<400> SEQUENCE: 119

```
Ile Trp Phe Asp Gly Thr Asn Glu
1               5
```

<210> SEQ ID NO 120
<211> LENGTH: 16
<212> TYPE: PRT
<213> ORGANISM: Artificial sequence
<220> FEATURE:
<223> OTHER INFORMATION: Synthetic peptide

<400> SEQUENCE: 120

```
Ala Arg Pro Ala Asn Gly Tyr Ser Asp Tyr Tyr Tyr Gly Met Asp Val
1               5                   10                  15
```

<210> SEQ ID NO 121
<211> LENGTH: 8
<212> TYPE: PRT
<213> ORGANISM: Artificial sequence
<220> FEATURE:
<223> OTHER INFORMATION: Synthetic peptide

<400> SEQUENCE: 121

```
Gly Tyr Thr Phe Thr Ala Tyr Phe
1               5

<210> SEQ ID NO 122
<211> LENGTH: 8
<212> TYPE: PRT
<213> ORGANISM: Artificial sequence
<220> FEATURE:
<223> OTHER INFORMATION: Synthetic peptide

<400> SEQUENCE: 122

Ile Asn Pro Ile Ser Gly Asp Thr
1               5

<210> SEQ ID NO 123
<211> LENGTH: 12
<212> TYPE: PRT
<213> ORGANISM: Artificial sequence
<220> FEATURE:
<223> OTHER INFORMATION: Synthetic peptide

<400> SEQUENCE: 123

Ala Arg Val Arg Ser Gly Tyr Ser Tyr Ile Asp Phe
1               5                   10

<210> SEQ ID NO 124
<211> LENGTH: 8
<212> TYPE: PRT
<213> ORGANISM: Artificial sequence
<220> FEATURE:
<223> OTHER INFORMATION: Synthetic peptide

<400> SEQUENCE: 124

Gly Phe Thr Phe Ser Ser Tyr Gly
1               5

<210> SEQ ID NO 125
<211> LENGTH: 8
<212> TYPE: PRT
<213> ORGANISM: Artificial sequence
<220> FEATURE:
<223> OTHER INFORMATION: Synthetic peptide

<400> SEQUENCE: 125

Val Trp Asn Asp Gly Gly Asn Lys
1               5

<210> SEQ ID NO 126
<211> LENGTH: 23
<212> TYPE: PRT
<213> ORGANISM: Artificial sequence
<220> FEATURE:
<223> OTHER INFORMATION: Synthetic peptide

<400> SEQUENCE: 126

Ala Arg Asp Gly Tyr Tyr Val Ser Ser Gly Tyr His Pro Leu Arg Tyr
1               5                   10                  15

Tyr Tyr Tyr Tyr Met Asp Val
            20

<210> SEQ ID NO 127
<211> LENGTH: 8
<212> TYPE: PRT
<213> ORGANISM: Artificial sequence
<220> FEATURE:
<223> OTHER INFORMATION: Synthetic peptide
```

```
<400> SEQUENCE: 127

Gly Phe Thr Phe Arg Asn Tyr Ala
1               5

<210> SEQ ID NO 128
<211> LENGTH: 8
<212> TYPE: PRT
<213> ORGANISM: Artificial sequence
<220> FEATURE:
<223> OTHER INFORMATION: Synthetic peptide

<400> SEQUENCE: 128

Ile Ser Ala Ser Gly Gly Ile Thr
1               5

<210> SEQ ID NO 129
<211> LENGTH: 18
<212> TYPE: PRT
<213> ORGANISM: Artificial sequence
<220> FEATURE:
<223> OTHER INFORMATION: Synthetic peptide

<400> SEQUENCE: 129

Ala Lys Gly Glu Ile Met Arg Asp Thr Gly Tyr His Asp Asp Ala Phe
1               5                   10                  15

Asp Val

<210> SEQ ID NO 130
<211> LENGTH: 8
<212> TYPE: PRT
<213> ORGANISM: Artificial sequence
<220> FEATURE:
<223> OTHER INFORMATION: Synthetic peptide

<400> SEQUENCE: 130

Gly Phe Thr Phe Ser His Tyr Asn
1               5

<210> SEQ ID NO 131
<211> LENGTH: 8
<212> TYPE: PRT
<213> ORGANISM: Artificial sequence
<220> FEATURE:
<223> OTHER INFORMATION: Synthetic peptide

<400> SEQUENCE: 131

Ile Asn Ser Arg Asn Gly Tyr Thr
1               5

<210> SEQ ID NO 132
<211> LENGTH: 21
<212> TYPE: PRT
<213> ORGANISM: Artificial sequence
<220> FEATURE:
<223> OTHER INFORMATION: Synthetic peptide

<400> SEQUENCE: 132

Ala Arg Asp Pro Pro Leu Tyr Ser Gly Tyr Asp Leu Gly Tyr Tyr Tyr
1               5                   10                  15

Tyr Gly Met Asp Val
            20

<210> SEQ ID NO 133
<211> LENGTH: 10
<212> TYPE: PRT
```

```
<213> ORGANISM: Artificial sequence
<220> FEATURE:
<223> OTHER INFORMATION: Synthetic peptide

<400> SEQUENCE: 133

Gly Gly Ser Ile Ser Ser Gly Gly Tyr Phe
1               5                   10

<210> SEQ ID NO 134
<211> LENGTH: 7
<212> TYPE: PRT
<213> ORGANISM: Artificial sequence
<220> FEATURE:
<223> OTHER INFORMATION: Synthetic peptide

<400> SEQUENCE: 134

Ile Tyr Tyr Ser Gly Ser Thr
1               5

<210> SEQ ID NO 135
<211> LENGTH: 9
<212> TYPE: PRT
<213> ORGANISM: Artificial sequence
<220> FEATURE:
<223> OTHER INFORMATION: Synthetic peptide

<400> SEQUENCE: 135

Ala Arg Asp Val Gly Gly Phe Asp Ile
1               5

<210> SEQ ID NO 136
<211> LENGTH: 8
<212> TYPE: PRT
<213> ORGANISM: Artificial sequence
<220> FEATURE:
<223> OTHER INFORMATION: Synthetic peptide

<400> SEQUENCE: 136

Gly Phe Thr Phe Arg Ser Tyr Gly
1               5

<210> SEQ ID NO 137
<211> LENGTH: 8
<212> TYPE: PRT
<213> ORGANISM: Artificial sequence
<220> FEATURE:
<223> OTHER INFORMATION: Synthetic peptide

<400> SEQUENCE: 137

Ile Ser Leu Asp Gly Ser Glu Lys
1               5

<210> SEQ ID NO 138
<211> LENGTH: 14
<212> TYPE: PRT
<213> ORGANISM: Artificial sequence
<220> FEATURE:
<223> OTHER INFORMATION: Synthetic peptide

<400> SEQUENCE: 138

Ala Lys Asp Arg Pro Tyr Ser Trp Arg Asp Val Leu Asp Tyr
1               5                   10

<210> SEQ ID NO 139
<211> LENGTH: 10
<212> TYPE: PRT
<213> ORGANISM: Artificial sequence
```

```
<220> FEATURE:
<223> OTHER INFORMATION: Synthetic peptide

<400> SEQUENCE: 139

Gly Asp Ser Val Ser Ser Asn Arg Ala Ala
1               5                   10

<210> SEQ ID NO 140
<211> LENGTH: 9
<212> TYPE: PRT
<213> ORGANISM: Artificial sequence
<220> FEATURE:
<223> OTHER INFORMATION: Synthetic peptide

<400> SEQUENCE: 140

Thr Tyr Tyr Arg Ser Lys Trp Tyr Asn
1               5

<210> SEQ ID NO 141
<211> LENGTH: 22
<212> TYPE: PRT
<213> ORGANISM: Artificial sequence
<220> FEATURE:
<223> OTHER INFORMATION: Synthetic peptide

<400> SEQUENCE: 141

Ala Arg Thr Pro Arg Ala Tyr Ser Ser Gly Trp His Val Pro Tyr Tyr
1               5                   10                  15

Tyr Ser Gly Met Asp Val
            20

<210> SEQ ID NO 142
<211> LENGTH: 10
<212> TYPE: PRT
<213> ORGANISM: Artificial sequence
<220> FEATURE:
<223> OTHER INFORMATION: Synthetic peptide

<400> SEQUENCE: 142

Gly Asp Ser Val Ser Ser Asn Ser Ala Ala
1               5                   10

<210> SEQ ID NO 143
<211> LENGTH: 9
<212> TYPE: PRT
<213> ORGANISM: Artificial sequence
<220> FEATURE:
<223> OTHER INFORMATION: Synthetic peptide

<400> SEQUENCE: 143

Thr Tyr Tyr Arg Ser Lys Trp Tyr Asn
1               5

<210> SEQ ID NO 144
<211> LENGTH: 21
<212> TYPE: PRT
<213> ORGANISM: Artificial sequence
<220> FEATURE:
<223> OTHER INFORMATION: Synthetic peptide

<400> SEQUENCE: 144

Ala Arg Asp Arg Arg Lys Leu Glu Pro Pro Pro Phe Ser Tyr Tyr Tyr
1               5                   10                  15

Tyr Gly Leu Asp Val
            20
```

<210> SEQ ID NO 145
<211> LENGTH: 8
<212> TYPE: PRT
<213> ORGANISM: Artificial sequence
<220> FEATURE:
<223> OTHER INFORMATION: Synthetic peptide

<400> SEQUENCE: 145

Gly Phe Thr Phe Ser Thr Tyr Glu
1               5

<210> SEQ ID NO 146
<211> LENGTH: 8
<212> TYPE: PRT
<213> ORGANISM: Artificial sequence
<220> FEATURE:
<223> OTHER INFORMATION: Synthetic peptide

<400> SEQUENCE: 146

Ile Arg Ser Ser Gly Ser Thr Val
1               5

<210> SEQ ID NO 147
<211> LENGTH: 13
<212> TYPE: PRT
<213> ORGANISM: Artificial sequence
<220> FEATURE:
<223> OTHER INFORMATION: Synthetic peptide

<400> SEQUENCE: 147

Ala Arg Ile Pro Gly Gly Tyr Thr Gly Tyr Phe Asp Tyr
1               5                   10

<210> SEQ ID NO 148
<211> LENGTH: 6
<212> TYPE: PRT
<213> ORGANISM: Artificial sequence
<220> FEATURE:
<223> OTHER INFORMATION: Synthetic peptide

<400> SEQUENCE: 148

Asn Leu Gly Asn Lys Phe
1               5

<210> SEQ ID NO 149
<211> LENGTH: 3
<212> TYPE: PRT
<213> ORGANISM: Artificial sequence
<220> FEATURE:
<223> OTHER INFORMATION: Synthetic peptide

<400> SEQUENCE: 149

Gln Asp Lys
1

<210> SEQ ID NO 150
<211> LENGTH: 8
<212> TYPE: PRT
<213> ORGANISM: Artificial sequence
<220> FEATURE:
<223> OTHER INFORMATION: Synthetic peptide

<400> SEQUENCE: 150

Gln Ala Trp His Ser Gly Ser Val
1               5

```
<210> SEQ ID NO 151
<211> LENGTH: 6
<212> TYPE: PRT
<213> ORGANISM: Artificial sequence
<220> FEATURE:
<223> OTHER INFORMATION: Synthetic peptide

<400> SEQUENCE: 151

Lys Leu Gly Asn Lys Phe
1               5

<210> SEQ ID NO 152
<211> LENGTH: 3
<212> TYPE: PRT
<213> ORGANISM: Artificial sequence
<220> FEATURE:
<223> OTHER INFORMATION: Synthetic peptide

<400> SEQUENCE: 152

Gln Asp Lys
1

<210> SEQ ID NO 153
<211> LENGTH: 9
<212> TYPE: PRT
<213> ORGANISM: Artificial sequence
<220> FEATURE:
<223> OTHER INFORMATION: Synthetic peptide

<400> SEQUENCE: 153

Gln Ala Trp Asp Ser Ser Asn Val Val
1               5

<210> SEQ ID NO 154
<211> LENGTH: 6
<212> TYPE: PRT
<213> ORGANISM: Artificial sequence
<220> FEATURE:
<223> OTHER INFORMATION: Synthetic peptide

<400> SEQUENCE: 154

Gln Ser Val Thr Asn Trp
1               5

<210> SEQ ID NO 155
<211> LENGTH: 3
<212> TYPE: PRT
<213> ORGANISM: Artificial sequence
<220> FEATURE:
<223> OTHER INFORMATION: Synthetic peptide

<400> SEQUENCE: 155

Lys Ala Ser
1

<210> SEQ ID NO 156
<211> LENGTH: 8
<212> TYPE: PRT
<213> ORGANISM: Artificial sequence
<220> FEATURE:
<223> OTHER INFORMATION: Synthetic peptide

<400> SEQUENCE: 156

Gln Gln Tyr Lys Ser His Arg Thr
1               5

<210> SEQ ID NO 157
```

```
<211> LENGTH: 6
<212> TYPE: PRT
<213> ORGANISM: Artificial sequence
<220> FEATURE:
<223> OTHER INFORMATION: Synthetic peptide

<400> SEQUENCE: 157

Gln Ser Ile Ser Arg Trp
1               5

<210> SEQ ID NO 158
<211> LENGTH: 3
<212> TYPE: PRT
<213> ORGANISM: Artificial sequence
<220> FEATURE:
<223> OTHER INFORMATION: Synthetic peptide

<400> SEQUENCE: 158

Lys Ala Ser
1

<210> SEQ ID NO 159
<211> LENGTH: 8
<212> TYPE: PRT
<213> ORGANISM: Artificial sequence
<220> FEATURE:
<223> OTHER INFORMATION: Synthetic peptide

<400> SEQUENCE: 159

Gln Gln Tyr Asn Thr Asp Lys Thr
1               5

<210> SEQ ID NO 160
<211> LENGTH: 9
<212> TYPE: PRT
<213> ORGANISM: Artificial sequence
<220> FEATURE:
<223> OTHER INFORMATION: Synthetic peptide

<400> SEQUENCE: 160

Ser Ser Asn Ile Gly Ala Gly Tyr Asp
1               5

<210> SEQ ID NO 161
<211> LENGTH: 3
<212> TYPE: PRT
<213> ORGANISM: Artificial sequence
<220> FEATURE:
<223> OTHER INFORMATION: Synthetic peptide

<400> SEQUENCE: 161

Gly Asn Ser
1

<210> SEQ ID NO 162
<211> LENGTH: 11
<212> TYPE: PRT
<213> ORGANISM: Artificial sequence
<220> FEATURE:
<223> OTHER INFORMATION: Synthetic peptide

<400> SEQUENCE: 162

Gln Ser Tyr Asp Ile Ser Leu Ser Gly Trp Val
1               5                   10

<210> SEQ ID NO 163
<211> LENGTH: 6
```

```
<212> TYPE: PRT
<213> ORGANISM: Artificial sequence
<220> FEATURE:
<223> OTHER INFORMATION: Synthetic peptide

<400> SEQUENCE: 163

Gln Ser Val Asn Ser Asn
1               5

<210> SEQ ID NO 164
<211> LENGTH: 3
<212> TYPE: PRT
<213> ORGANISM: Artificial sequence
<220> FEATURE:
<223> OTHER INFORMATION: Synthetic peptide

<400> SEQUENCE: 164

Gly Ala Ser
1

<210> SEQ ID NO 165
<211> LENGTH: 9
<212> TYPE: PRT
<213> ORGANISM: Artificial sequence
<220> FEATURE:
<223> OTHER INFORMATION: Synthetic peptide

<400> SEQUENCE: 165

Gln Gln Tyr Asp Asn Arg Pro Gln Thr
1               5

<210> SEQ ID NO 166
<211> LENGTH: 12
<212> TYPE: PRT
<213> ORGANISM: Artificial sequence
<220> FEATURE:
<223> OTHER INFORMATION: Synthetic peptide

<400> SEQUENCE: 166

Gln Ser Val Leu Tyr Gly Ser Thr Asn Lys Asn Phe
1               5                   10

<210> SEQ ID NO 167
<211> LENGTH: 3
<212> TYPE: PRT
<213> ORGANISM: Artificial sequence
<220> FEATURE:
<223> OTHER INFORMATION: Synthetic peptide

<400> SEQUENCE: 167

Trp Ala Ser
1

<210> SEQ ID NO 168
<211> LENGTH: 9
<212> TYPE: PRT
<213> ORGANISM: Artificial sequence
<220> FEATURE:
<223> OTHER INFORMATION: Synthetic peptide

<400> SEQUENCE: 168

Gln Gln Tyr Ser Ser Ile Pro Leu Thr
1               5

<210> SEQ ID NO 169
<211> LENGTH: 6
<212> TYPE: PRT
```

```
<213> ORGANISM: Artificial sequence
<220> FEATURE:
<223> OTHER INFORMATION: Synthetic peptide

<400> SEQUENCE: 169

Glu Ser Ile Ser Asn Trp
1               5

<210> SEQ ID NO 170
<211> LENGTH: 3
<212> TYPE: PRT
<213> ORGANISM: Artificial sequence
<220> FEATURE:
<223> OTHER INFORMATION: Synthetic peptide

<400> SEQUENCE: 170

Lys Ala Ser
1

<210> SEQ ID NO 171
<211> LENGTH: 9
<212> TYPE: PRT
<213> ORGANISM: Artificial sequence
<220> FEATURE:
<223> OTHER INFORMATION: Synthetic peptide

<400> SEQUENCE: 171

Gln Gln Tyr Asn Thr Tyr Ser Trp Thr
1               5

<210> SEQ ID NO 172
<211> LENGTH: 6
<212> TYPE: PRT
<213> ORGANISM: Artificial sequence
<220> FEATURE:
<223> OTHER INFORMATION: Synthetic peptide

<400> SEQUENCE: 172

Ala Leu Pro Asn Gln Tyr
1               5

<210> SEQ ID NO 173
<211> LENGTH: 3
<212> TYPE: PRT
<213> ORGANISM: Artificial sequence
<220> FEATURE:
<223> OTHER INFORMATION: Synthetic peptide

<400> SEQUENCE: 173

Lys Asp Asn
1

<210> SEQ ID NO 174
<211> LENGTH: 11
<212> TYPE: PRT
<213> ORGANISM: Artificial sequence
<220> FEATURE:
<223> OTHER INFORMATION: Synthetic peptide

<400> SEQUENCE: 174

Gln Ser Ala Asp Arg Thr Ala Thr Ser Val Ala
1               5                   10

<210> SEQ ID NO 175
<211> LENGTH: 6
<212> TYPE: PRT
<213> ORGANISM: Artificial sequence
```

```
<220> FEATURE:
<223> OTHER INFORMATION: Synthetic peptide

<400> SEQUENCE: 175

Gln Ser Val Ser Ser Asn
1               5

<210> SEQ ID NO 176
<211> LENGTH: 3
<212> TYPE: PRT
<213> ORGANISM: Artificial sequence
<220> FEATURE:
<223> OTHER INFORMATION: Synthetic peptide

<400> SEQUENCE: 176

Gly Ala Ser
1

<210> SEQ ID NO 177
<211> LENGTH: 10
<212> TYPE: PRT
<213> ORGANISM: Artificial sequence
<220> FEATURE:
<223> OTHER INFORMATION: Synthetic peptide

<400> SEQUENCE: 177

Gln Gln Ser Asp Asn Trp Pro Pro Ile Thr
1               5                   10

<210> SEQ ID NO 178
<211> LENGTH: 6
<212> TYPE: PRT
<213> ORGANISM: Artificial sequence
<220> FEATURE:
<223> OTHER INFORMATION: Synthetic peptide

<400> SEQUENCE: 178

Gln Ser Ile His Ile Asn
1               5

<210> SEQ ID NO 179
<211> LENGTH: 3
<212> TYPE: PRT
<213> ORGANISM: Artificial sequence
<220> FEATURE:
<223> OTHER INFORMATION: Synthetic peptide

<400> SEQUENCE: 179

Tyr Ala Ser
1

<210> SEQ ID NO 180
<211> LENGTH: 9
<212> TYPE: PRT
<213> ORGANISM: Artificial sequence
<220> FEATURE:
<223> OTHER INFORMATION: Synthetic peptide

<400> SEQUENCE: 180

His Gln Ser Asn Ser Leu Pro Trp Thr
1               5

<210> SEQ ID NO 181
<211> LENGTH: 9
<212> TYPE: PRT
<213> ORGANISM: Artificial sequence
<220> FEATURE:
```

```
<223> OTHER INFORMATION: Synthetic peptide

<400> SEQUENCE: 181

Ser Ser Asp Val Gly Thr Tyr Asn Leu
1               5

<210> SEQ ID NO 182
<211> LENGTH: 3
<212> TYPE: PRT
<213> ORGANISM: Artificial sequence
<220> FEATURE:
<223> OTHER INFORMATION: Synthetic peptide

<400> SEQUENCE: 182

Glu Val Asn
1

<210> SEQ ID NO 183
<211> LENGTH: 11
<212> TYPE: PRT
<213> ORGANISM: Artificial sequence
<220> FEATURE:
<223> OTHER INFORMATION: Synthetic peptide

<400> SEQUENCE: 183

Cys Ser Tyr Ala Asp Asn Arg Thr Pro Phe Leu
1               5                   10

<210> SEQ ID NO 184
<211> LENGTH: 6
<212> TYPE: PRT
<213> ORGANISM: Artificial sequence
<220> FEATURE:
<223> OTHER INFORMATION: Synthetic peptide

<400> SEQUENCE: 184

Ala Leu Ser Asn Gln Tyr
1               5

<210> SEQ ID NO 185
<211> LENGTH: 3
<212> TYPE: PRT
<213> ORGANISM: Artificial sequence
<220> FEATURE:
<223> OTHER INFORMATION: Synthetic peptide

<400> SEQUENCE: 185

Lys Tyr Ser
1

<210> SEQ ID NO 186
<211> LENGTH: 11
<212> TYPE: PRT
<213> ORGANISM: Artificial sequence
<220> FEATURE:
<223> OTHER INFORMATION: Synthetic peptide

<400> SEQUENCE: 186

Gln Ser Ala Asp Arg Leu Gly Thr Tyr Trp Val
1               5                   10

<210> SEQ ID NO 187
<211> LENGTH: 12
<212> TYPE: PRT
<213> ORGANISM: Artificial sequence
<220> FEATURE:
<223> OTHER INFORMATION: Synthetic peptide
```

<400> SEQUENCE: 187

Gln Ser Val Leu Tyr Ser Pro Asn Asn Lys Asn Tyr
1               5                   10

<210> SEQ ID NO 188
<211> LENGTH: 3
<212> TYPE: PRT
<213> ORGANISM: Artificial sequence
<220> FEATURE:
<223> OTHER INFORMATION: Synthetic peptide

<400> SEQUENCE: 188

Trp Ala Ser
1

<210> SEQ ID NO 189
<211> LENGTH: 10
<212> TYPE: PRT
<213> ORGANISM: Artificial sequence
<220> FEATURE:
<223> OTHER INFORMATION: Synthetic peptide

<400> SEQUENCE: 189

Gln Gln Tyr Tyr Ser Thr Pro Pro Leu Thr
1               5                   10

<210> SEQ ID NO 190
<211> LENGTH: 6
<212> TYPE: PRT
<213> ORGANISM: Artificial sequence
<220> FEATURE:
<223> OTHER INFORMATION: Synthetic peptide

<400> SEQUENCE: 190

Gln Gly Ile Ser Ser Tyr
1               5

<210> SEQ ID NO 191
<211> LENGTH: 3
<212> TYPE: PRT
<213> ORGANISM: Artificial sequence
<220> FEATURE:
<223> OTHER INFORMATION: Synthetic peptide

<400> SEQUENCE: 191

Thr Ala Ser
1

<210> SEQ ID NO 192
<211> LENGTH: 9
<212> TYPE: PRT
<213> ORGANISM: Artificial sequence
<220> FEATURE:
<223> OTHER INFORMATION: Synthetic peptide

<400> SEQUENCE: 192

Gln Gln Val Glu Ser Tyr Pro Tyr Ser
1               5

<210> SEQ ID NO 193
<211> LENGTH: 6
<212> TYPE: PRT
<213> ORGANISM: Artificial sequence
<220> FEATURE:
<223> OTHER INFORMATION: Synthetic peptide

```
<400> SEQUENCE: 193

Gln Asn Ile Ser Lys Trp
1               5

<210> SEQ ID NO 194
<211> LENGTH: 3
<212> TYPE: PRT
<213> ORGANISM: Artificial sequence
<220> FEATURE:
<223> OTHER INFORMATION: Synthetic peptide

<400> SEQUENCE: 194

Lys Ala Ser
1

<210> SEQ ID NO 195
<211> LENGTH: 9
<212> TYPE: PRT
<213> ORGANISM: Artificial sequence
<220> FEATURE:
<223> OTHER INFORMATION: Synthetic peptide

<400> SEQUENCE: 195

Gln Gln Tyr Asn Ser Tyr Pro Trp Ala
1               5

<210> SEQ ID NO 196
<211> LENGTH: 6
<212> TYPE: PRT
<213> ORGANISM: Artificial sequence
<220> FEATURE:
<223> OTHER INFORMATION: Synthetic peptide

<400> SEQUENCE: 196

Gln Asp Ile Asn Lys Tyr
1               5

<210> SEQ ID NO 197
<211> LENGTH: 3
<212> TYPE: PRT
<213> ORGANISM: Artificial sequence
<220> FEATURE:
<223> OTHER INFORMATION: Synthetic peptide

<400> SEQUENCE: 197

Asp Ala Ser
1

<210> SEQ ID NO 198
<211> LENGTH: 9
<212> TYPE: PRT
<213> ORGANISM: Artificial sequence
<220> FEATURE:
<223> OTHER INFORMATION: Synthetic peptide

<400> SEQUENCE: 198

Gln Gln Tyr Glu Asn Leu Pro Arg Thr
1               5

<210> SEQ ID NO 199
<211> LENGTH: 6
<212> TYPE: PRT
<213> ORGANISM: Artificial sequence
<220> FEATURE:
<223> OTHER INFORMATION: Synthetic peptide

<400> SEQUENCE: 199
```

Arg Asp Ile His Thr Ser
1               5

<210> SEQ ID NO 200
<211> LENGTH: 3
<212> TYPE: PRT
<213> ORGANISM: Artificial sequence
<220> FEATURE:
<223> OTHER INFORMATION: Synthetic peptide

<400> SEQUENCE: 200

Ala Ala Ser
1

<210> SEQ ID NO 201
<211> LENGTH: 9
<212> TYPE: PRT
<213> ORGANISM: Artificial sequence
<220> FEATURE:
<223> OTHER INFORMATION: Synthetic peptide

<400> SEQUENCE: 201

Gln Gln Tyr Asp Glu Leu Pro Leu Thr
1               5

<210> SEQ ID NO 202
<211> LENGTH: 6
<212> TYPE: PRT
<213> ORGANISM: Artificial sequence
<220> FEATURE:
<223> OTHER INFORMATION: Synthetic peptide

<400> SEQUENCE: 202

Gln Asp Ile Ser Asp His
1               5

<210> SEQ ID NO 203
<211> LENGTH: 3
<212> TYPE: PRT
<213> ORGANISM: Artificial sequence
<220> FEATURE:
<223> OTHER INFORMATION: Synthetic peptide

<400> SEQUENCE: 203

Asp Ala Ser
1

<210> SEQ ID NO 204
<211> LENGTH: 9
<212> TYPE: PRT
<213> ORGANISM: Artificial sequence
<220> FEATURE:
<223> OTHER INFORMATION: Synthetic peptide

<400> SEQUENCE: 204

Gln Gln Tyr Asp Glu Val Pro Pro Thr
1               5

<210> SEQ ID NO 205
<211> LENGTH: 6
<212> TYPE: PRT
<213> ORGANISM: Artificial sequence
<220> FEATURE:
<223> OTHER INFORMATION: Synthetic peptide

<400> SEQUENCE: 205

Gln Asp Ile Ser Asn Tyr
1               5

<210> SEQ ID NO 206
<211> LENGTH: 3
<212> TYPE: PRT
<213> ORGANISM: Artificial sequence
<220> FEATURE:
<223> OTHER INFORMATION: Synthetic peptide

<400> SEQUENCE: 206

Asp Ala Ser
1

<210> SEQ ID NO 207
<211> LENGTH: 9
<212> TYPE: PRT
<213> ORGANISM: Artificial sequence
<220> FEATURE:
<223> OTHER INFORMATION: Synthetic peptide

<400> SEQUENCE: 207

Gln Gln Tyr Asp Asn Val Pro Leu Thr
1               5

<210> SEQ ID NO 208
<211> LENGTH: 9
<212> TYPE: PRT
<213> ORGANISM: Artificial sequence
<220> FEATURE:
<223> OTHER INFORMATION: Synthetic peptide

<400> SEQUENCE: 208

Ser Ser Asn Ile Gly Ala Gly Tyr Tyr
1               5

<210> SEQ ID NO 209
<211> LENGTH: 3
<212> TYPE: PRT
<213> ORGANISM: Artificial sequence
<220> FEATURE:
<223> OTHER INFORMATION: Synthetic peptide

<400> SEQUENCE: 209

Gly Asn Asn
1

<210> SEQ ID NO 210
<211> LENGTH: 11
<212> TYPE: PRT
<213> ORGANISM: Artificial sequence
<220> FEATURE:
<223> OTHER INFORMATION: Synthetic peptide

<400> SEQUENCE: 210

Gln Ser Tyr Asp Ser Ser Leu Ser Gly Trp Val
1               5                   10

<210> SEQ ID NO 211
<211> LENGTH: 360
<212> TYPE: DNA
<213> ORGANISM: Artificial sequence
<220> FEATURE:
<223> OTHER INFORMATION: Synthetic antibody sequence

<400> SEQUENCE: 211
caggtcacct tgaaggagtc tggtcctgcg ctggtgaaac ccacacagac cctcacactg      60

```
acctgcacgt tctctgggtt ctcactcagc actagtggaa tgcgtgtgag ctggatccgt    120 cagccccag ggaaggccct ggagtggctt gcacgcattg attgggatga tgataaattc    180
tacagcacat ctctgaagac caggctcacc atctccaagg acacctccaa aaaccaggtg    240
gtccttataa tgaccaacat ggaccctgta gacacagcca cgtattactg tgcacggatg    300
atggttggcg agggaacatt tgactactgg ggccagggaa ccctggtcac cgtctcctca    360
```

<210> SEQ ID NO 212
<211> LENGTH: 318
<212> TYPE: DNA
<213> ORGANISM: Artificial sequence
<220> FEATURE:
<223> OTHER INFORMATION: Synthetic antibody sequence

<400> SEQUENCE: 212

```
gacatccaga tgacccagtt tccttccacc ctgtctgcat ctgtaggaga cagagtcacc     60
atcacttgcc gggccagtca ggatattagt agcttattgg cctggtatca gcagaaacca    120
gggaaagccc ctaagctcct gatctatacg gcgtctaatt tagaaggtgg ggtcccatca    180
agattcagcg gcagtggatc tgggacagaa ttcactctca ccatcagcag cctgcagcct    240
gatgattttg caacttatta ctgccaacaa tatattgata ttggacgtt cggccaaggg    300 accaaggtgg aaatcaaa                                                 318
```

<210> SEQ ID NO 213
<211> LENGTH: 363
<212> TYPE: DNA
<213> ORGANISM: Artificial sequence
<220> FEATURE:
<223> OTHER INFORMATION: Synthetic antibody sequence

<400> SEQUENCE: 213

```
caggtgcagc tggtgcagtc tggaggtgag gtgaagaagc ctggggcctc agtgaaggtc     60
tcctgcaagg cttctggtta caccttacc aactatggaa tcagctgggt gcgacaggcc    120
cctggacaag gccctgagtg gatgggatgg atcagcactt tcaatggtaa cacaaactat    180
gcacagaagc tccagggcag agtcaccatg actatagact catccacgag cacagcctac    240
ctggagctga ggagcctgag atctaacgac acggccgtgt attactgtgc gagacgtccg    300
ccttactatg atagtactgc ttttgatata tggggccaag gacaatggt catcgtctct    360 tca                                                                 363
```

<210> SEQ ID NO 214
<211> LENGTH: 330
<212> TYPE: DNA
<213> ORGANISM: Artificial sequence
<220> FEATURE:
<223> OTHER INFORMATION: Synthetic antibody sequence

<400> SEQUENCE: 214

```
cagtctgtgc tgactcagcc accctcagcg tctgggaccc ccgggcagag ggtcagcatc     60
tcttgttctg gaagcagctc caacatagga agtaatattg taaactggta ccagcagctc    120
ccaggaacgg ccccccaaact cctcatctat agtaataatc agcggccctc atgggtccct    180
gaccgattct ctggctccaa gtctggcacc tcagcctccc tggccatcag tgggctccag    240
tctgaggatg aggctgatta ttactgttca acatgggatg ccagcctgaa tggtgtggta    300
ttcggcggag ggaccaagct gaccgtccta                                     330
```

<210> SEQ ID NO 215
<211> LENGTH: 399
<212> TYPE: DNA
<213> ORGANISM: Artificial sequence
<220> FEATURE:
<223> OTHER INFORMATION: Synthetic antibody sequence

<400> SEQUENCE: 215

| | | | | | |
|---|---|---|---|---|---|
| ggggtgcagc | tggtggagtc | tgggggaggc | ttggtgaagc | ctggggggtc | ccttagactc | 60 |
| tcctgtacag | actctggact | caccttcggt | cacgcctgga | tgaactgggt | ccgccaggct | 120 |
| ccagggaagg | ggctggagtg | ggttggccgt | attaaaacca | aggctgatgg | tgagacaaca | 180 |
| gactacgctg | cagccgtgaa | gggaagattc | accatcttaa | gagatgattc | aaaaaagact | 240 |
| ctgtttctgc | aaatgaatgg | cctgaagacc | gaggacacag | gcgtctatta | ctgtactaca | 300 |
| gatttacggg | cttttggaggc | cttattatcc | ctgggttttg | tctacacgta | caactttatg | 360 |
| gacgtctggg | gccaagggac | cacggtcttc | gtctcctca | | | 399 |

<210> SEQ ID NO 216
<211> LENGTH: 324
<212> TYPE: DNA
<213> ORGANISM: Artificial sequence
<220> FEATURE:
<223> OTHER INFORMATION: Synthetic antibody sequence

<400> SEQUENCE: 216

| | | | | | |
|---|---|---|---|---|---|
| gaaattgtgt | tgacgcagtc | tccaggcacc | ctgtctttgt | ctccagggga | aagagccacc | 60 |
| ctctcctgca | gggccagtca | gattgtttcc | agcaactact | tagcctggtt | ccagcagaaa | 120 |
| cctggccagg | ctcccaggct | cgtcatctat | ggtgcctcca | gcagggccac | tggcatccca | 180 |
| gacaggttca | gtggcagtgg | gtctgcgaca | gacttcactc | tcaccatcag | cagactggag | 240 |
| cctgaagatt | ttgcagtgta | ttactgtcag | cagtatggta | gctcaccgta | cacttttggc | 300 |
| caggggacca | aggtggagat | caaa | | | | 324 |

<210> SEQ ID NO 217
<211> LENGTH: 381
<212> TYPE: DNA
<213> ORGANISM: Artificial sequence
<220> FEATURE:
<223> OTHER INFORMATION: Synthetic antibody sequence

<400> SEQUENCE: 217

| | | | | | |
|---|---|---|---|---|---|
| caggtgcagt | tgctgcagtc | tggggctgag | gtgaagaagc | ctgggtcctc | ggtgagggtc | 60 |
| tcctgtcagt | cttctggaga | catctacaac | tactatggta | tcagctgggt | gcgacaggcc | 120 |
| cctggacaag | ggcttgagtg | gatgggaggg | atcatccctg | tctatggaag | accaaaactac | 180 |
| gtacagaagt | ttaggggcag | agtcactttt | accgtggaca | aatccacgag | cacagcctac | 240 |
| atggagctga | gcaccctgag | agctgacgac | acggccgtct | attactgtgc | gagagacacg | 300 |
| gcccgctctc | attactttgg | ctcggggaac | gactacggta | tggacgtctg | gggccaaggg | 360 |
| accacggtca | tcgtctcttc | a | | | | 381 |

<210> SEQ ID NO 218
<211> LENGTH: 336
<212> TYPE: DNA
<213> ORGANISM: Artificial sequence
<220> FEATURE:
<223> OTHER INFORMATION: Synthetic antibody sequence

<400> SEQUENCE: 218

| | |
|---|---|
| gatattgtga tgactcagtc tccactctcc ctgcccgtca cccctggaga gccggcctcc | 60 |
| atctcctgca ggtctagtca gagcctcctg catagtaatg gattcaactt tgtggattgg | 120 |
| tacctgcaga agccagggca gtctccacag ctcctgatct atttgggttc tactcgggcc | 180 |
| tccggggtcc ctgacaggtt cagcggcagt ggatcaggca cagattttac actggaaatc | 240 |
| agcagagtgg aggctgagga tgttggcgtg tattactgca tgcaggctct acaatttcct | 300 |
| cggacttttg gccaggggac caagctggac atcaaa | 336 |

<210> SEQ ID NO 219
<211> LENGTH: 372
<212> TYPE: DNA
<213> ORGANISM: Artificial sequence
<220> FEATURE:
<223> OTHER INFORMATION: Synthetic antibody sequence

<400> SEQUENCE: 219

| | |
|---|---|
| caggtgcagc tccaggagtc gggcccagga ctggtgaagc cttcggggac cctgtccctc | 60 |
| acctgcactg tctctggtga ctccatcagc agtggtggtt tttactggag ctggattcgg | 120 |
| cagcccccag ggaagggact ggagtggatt gggtatatgt actacaatgg gaacaccaac | 180 |
| tacaatccct ccctcaagag tcgaatcacc atatcaatag acgcgtccaa gaaccagttt | 240 |
| tccctgacgg tggattctgt gacccctgcg gacacggccg tgtattattg tgcgagagga | 300 |
| ggcttatatg gtcaactcat ccgaggattt ttccacccct ggggccaggg aaccctggtc | 360 |
| accgtctcct ca | 372 |

<210> SEQ ID NO 220
<211> LENGTH: 333
<212> TYPE: DNA
<213> ORGANISM: Artificial sequence
<220> FEATURE:
<223> OTHER INFORMATION: Synthetic antibody sequence

<400> SEQUENCE: 220

| | |
|---|---|
| cagtctgtgc tgactcagtc accctcagtg tctgggaccc ccgggcagac ggtctccatc | 60 |
| tcttgttctg gaagctggtc caacatcgga cggaatcacg tatactggta tcaccaactc | 120 |
| ccaggatcgg cccccaaact tctcatctat atgagcagtc agcgacccct aggggtccct | 180 |
| gaccgattct ctggctccag gtctgacact tcagcctccc tggccatcag tgggctccgg | 240 |
| tccgaggatg aggctgatta ttactgtgtg gcatgggatg atagtctgag tggtttctat | 300 |
| gtcttcggaa ctgggaccaa ggtcaccgtc cta | 333 |

<210> SEQ ID NO 221
<211> LENGTH: 360
<212> TYPE: DNA
<213> ORGANISM: Artificial sequence
<220> FEATURE:
<223> OTHER INFORMATION: Synthetic antibody sequence

<400> SEQUENCE: 221

| | |
|---|---|
| gaggtgcagc tggtggagtc tgggggaggc ttggtccagc cggggggtc cctgagactc | 60 |
| tcctgtgcag cctctggatt cgcctttagt agttactgga tgacctgggt ccgccaggct | 120 |
| ccagggaagg gctggagtt tgtggccaac ataaagtatg atgcaagtga aaaatactat | 180 |
| gtggactccg tgaagggccg attcaccatt tccagagaca acgcaggaa ttcattctat | 240 |
| ttgcaaatga acagcctgag agccgaggac acggctgtgt attattgtgc ggttccgggc | 300 |

```
ccgggataca gttttgctta tgactactgg ggtcagggaa cccaggtcac cgtctcctca    360
```

<210> SEQ ID NO 222
<211> LENGTH: 321
<212> TYPE: DNA
<213> ORGANISM: Artificial sequence
<220> FEATURE:
<223> OTHER INFORMATION: Synthetic antibody sequence

<400> SEQUENCE: 222

```
gacatccaga tgacccaatc tccatcctcc ctgtctgcat ctgtaggaga cagaatcacc     60
atcacttgcc gggcaagtca gagcgttggc acctatttaa attggtatca gcaaaaacca    120
gggaaagccc ctaaactcct aatctatgaa gcatctagtt tgcagagtgg ggtcccatca    180
aggttcagtg gcagtggatc tgggacagat ttcactctca ccatcagtag gctgcaaccc    240
gaagattttg caacttactc ctgtcaacag agtgacattc cccgtggac gttcggccaa     300
gggactaagg tggagatcaa a                                              321
```

<210> SEQ ID NO 223
<211> LENGTH: 363
<212> TYPE: DNA
<213> ORGANISM: Artificial sequence
<220> FEATURE:
<223> OTHER INFORMATION: Synthetic antibody sequence

<400> SEQUENCE: 223

```
gaagtgaagt tggtggagtc tgggggaggc ttggtacagc ctggcaggtc cctgagactc     60
tcctgtgcag cctcaggatt cagttttgat gattacgcca tgcactgggt ccggcaacct    120
ctagggaagg gcctggagtg ggtctcaggt attagttgga cagcggaaa cacagcctat     180
gcggactctg tgaagggccg attcaccatt tccagagaca caccaagaa ctccctgtat     240
ctgcaaatga acagtctgag acctgaagac acggccttgt attactgtgg aaaagatcta    300
ggaggtatag tattggctcc gattgactcc tggggccagg gaaccctggt caccgtctcc    360
tca                                                                  363
```

<210> SEQ ID NO 224
<211> LENGTH: 330
<212> TYPE: DNA
<213> ORGANISM: Artificial sequence
<220> FEATURE:
<223> OTHER INFORMATION: Synthetic antibody sequence

<400> SEQUENCE: 224

```
cagtctgccc tgactcagcc tgcctccgtg tctgggtctc ctggacagtc ggtcaccatc     60
tcctgcactg gaaccagcag tgacgttggt gcttttaact atgtctcctg gtaccaacaa    120
cacccaggca aagcccccaa actcttgatt tctgcggtca ataatcggcc ctcagggggtt    180
tctaatcgct tctctatctc caagtctggc aacacggcct ccctgaccat ctctgggctc    240
caggctgagg acgaggctga ttatttctgc agctcatata cagtcagcta cactctcaca    300
ttcggcggag ggaccaagct gaccgtccta                                     330
```

<210> SEQ ID NO 225
<211> LENGTH: 387
<212> TYPE: DNA
<213> ORGANISM: Artificial sequence
<220> FEATURE:
<223> OTHER INFORMATION: Synthetic antibody sequence

<400> SEQUENCE: 225

| | |
|---|---|
| caggtgcagc tggtggagtc tggggagc gtggtccagc ctggaggtc cctcagactc | 60 |
| tcctgtgcag tctccggatt caccttcagg aactatgcca tgcactgggt ccgccaggct | 120 |
| ccaggcaagg ggctggagtg gtggcagtt atatcatatg acggaggtaa caaagattat | 180 |
| gcagcctccg tgaagggccg attcaccatc tccagacg attccaagaa cgcccttat | 240 |
| ctgcaaatga acagcctgag acctgaggac acggctgtgt attcctgtgt gaaagatctt | 300 |
| ggggagact atccccgct tgacccacac tactggtact acggtatgga tgtctggggc | 360 |
| caagggacca cggtcatcgt ctcctca | 387 |

<210> SEQ ID NO 226
<211> LENGTH: 329
<212> TYPE: DNA
<213> ORGANISM: Artificial sequence
<220> FEATURE:
<223> OTHER INFORMATION: Synthetic antibody sequence

<400> SEQUENCE: 226

| | |
|---|---|
| cagtctgtgc tgactcagcc accctcagcg tctgggaccc ccggacaggg ggtcaccatc | 60 |
| tcttgttctg gaagcagctc caacatcgga actaagtctg tactctgta ccagcaactc | 120 |
| ccaggaacgg cccccaaact cctgatctat aggaataatc agcggccctc aggggtccct | 180 |
| gaccggttct ctggctccaa gtccggcacc tctgcctccc tggccatcag tgggctccgg | 240 |
| tccgaggatg aggtgatta ctactgtgcc tcatgggatg tcagcctgag tgtttgggtg | 300 |
| ttcggcggac ggaccaagct gaccgtcct | 329 |

<210> SEQ ID NO 227
<211> LENGTH: 375
<212> TYPE: DNA
<213> ORGANISM: Artificial sequence
<220> FEATURE:
<223> OTHER INFORMATION: Synthetic antibody sequence

<400> SEQUENCE: 227

| | |
|---|---|
| caggtgcacc tggtgcagtc tggggggtgag ctgaggaagc ctgggtcctc ggtgaaggtc | 60 |
| tcctgcaagg cttctggagg caccttcagc agttttgcta ttacgtggct gcgacaggcc | 120 |
| cctggacagg ggcttgagtg gtgggagca tacattcctg tctttggctc agcaatccac | 180 |
| ggacagaagg tccacggcag agtcactctt accgcgacg aatccacgac acagcctac | 240 |
| atggagctga gcagcctgag atctgaggac acggccgtgt atttctgtgc gagaggaccg | 300 |
| acgcagaatt gggaatatag ttattatacc tactttgagt cctggggcca gggaaccctg | 360 |
| gtcaccgtct cctca | 375 |

<210> SEQ ID NO 228
<211> LENGTH: 327
<212> TYPE: DNA
<213> ORGANISM: Artificial sequence
<220> FEATURE:
<223> OTHER INFORMATION: Synthetic antibody sequence

<400> SEQUENCE: 228

| | |
|---|---|
| caaatcgtgt tgacgcagtc tccaggcacc ctgtctctgt ctccagggga aagagccacc | 60 |
| ctctcctgca gggccagtca gagtgttacc agcagatact tagcctggta ccagcagaaa | 120 |
| cccggccagg ctcccagact cctcatctat gatacctcga gcagggccac tggcatccca | 180 |
| gacaggttca gtggcagtgg gtctgagaca gacttcactc tcaccatcag cagactggcg | 240 |

```
cctgaagatt ttgcagtgta ttactgtcag cagtatggta cctcacctgc ggtcaccttc    300
ggccaaggga cacgactgga gattaaa                                        327
```

<210> SEQ ID NO 229
<211> LENGTH: 359
<212> TYPE: DNA
<213> ORGANISM: Artificial sequence
<220> FEATURE:
<223> OTHER INFORMATION: Synthetic antibody sequence

<400> SEQUENCE: 229

```
gaggagcagc tggtggagtc tgggggaggc ctggtcaagc cggggggtc cctgagactc      60 tcctgcgcag cctctggaat caccgtcaga agttacttca tcagctgggt ccgccaggct    120
ccagggaagg gactggaatg ggtctcctct ataagtaatg ggggctctta catatattac    180
gccgagtcag tgaagggccg attcaccatc tccagagacg acgccaagaa ctcagtgttt    240
ctgcaaatga gtagtctgag agtcgacgac acggctcttt actattgtgt gagaagtcca    300
aatctcggct tgatgtacca aggcatggac ctctggggcc atgggaccac ggtcagcgt     359
```

<210> SEQ ID NO 230
<211> LENGTH: 324
<212> TYPE: DNA
<213> ORGANISM: Artificial sequence
<220> FEATURE:
<223> OTHER INFORMATION: Synthetic antibody sequence

<400> SEQUENCE: 230

```
tcctatgtgc tgactcagcc accctcggtg tcagtggccc caggacagac ggccaggatt     60
tcctgtgggg gaaataatct tggcagtaaa agtgtgaact ggtaccagca gaaggcaggc    120
caggcccctg tgttggtcat ctatgataat acgaccggc cctcagggat ccctgagcga     180
ttctctggct ccacctctgg gaatgtggcc accctggcca tcagcagggt cgcagccggg    240
gatgaggccg acttttactg tcaggtgtgg gatattggta gtgaacattg ggtcttcggc    300
ggagggacca agctgaccgt ccta                                           324
```

<210> SEQ ID NO 231
<211> LENGTH: 362
<212> TYPE: DNA
<213> ORGANISM: Artificial sequence
<220> FEATURE:
<223> OTHER INFORMATION: Synthetic antibody sequence

<400> SEQUENCE: 231

```
cagctgcagt tgcaggagtc cggctcagga ctggtgaagc cttcacagac tctgtccctc     60
acctgcgctg tctctggtgg ctccatcagt agtggtggta gtcctggag ctggatccgg     120 cagtcaccac ggaagggcct ggagtggatt ggaagcatct ttcagagtgg cagcacctac    180
tacaacccgt ccctcaagag tcgagtcacc atatcagtag acaggtcgaa gaaccacctc    240
tccctaaaac tgaactccgt gaccggcgcg gacacggcct tgtattactg tgccagagac    300
cggagtgcca cccaagatgc ctttgatatc tggggccaag ggtaatggt caccgtctct    360 tc                                                                   362
```

<210> SEQ ID NO 232
<211> LENGTH: 327
<212> TYPE: DNA
<213> ORGANISM: Artificial sequence
<220> FEATURE:
<223> OTHER INFORMATION: Synthetic antibody sequence

<400> SEQUENCE: 232

```
tcctatgtgc tgactcagcc accctcggtg tcagtggccc caggacagac ggccaccatt    60
ccctgtgggg gtaacaacat tgaaactaaa agggtgcact ggtaccagca gaagccaggc   120
caggcccctg tgctggtcgt ctatgatgat tacgaccggc cctcagggat ccctgaccga   180
ttctctggct cacactctgg gaacacggcc accctgacca tcagcggggt cgaagccggg   240
gatgaggccg actattactg tcacgtgtgg gatatcagta gtgatcttcc ggtggtgttc   300
ggcggaggga cccagctgac cgtccta                                       327
```

<210> SEQ ID NO 233
<211> LENGTH: 369
<212> TYPE: DNA
<213> ORGANISM: Artificial sequence
<220> FEATURE:
<223> OTHER INFORMATION: Synthetic antibody sequence

<400> SEQUENCE: 233

```
caaatgcagc tggtgcagtc tgggcctgag gtgaagaagc ctgggacctc agtgaaggtc    60
tcctgcaagg cttctggatt cacctttagt aggtccactg tgcagtgggt gcgacagact   120
cgtggacaac gccttgagtg gattggatgg atcctcgttg caatggtga cacaaactac    180
gcacaggagt tccaggaaag agtcagcatt accacggaca tgtctacaag cactgtctac   240
atggaactga gcagcctgag atccgacgac acggccgtgt attattgtgc ggcgatgggc   300
agtggctggt ggtactacca ctacgatttg gacgtctggg gccacgggac cacggtcacc   360
gtctcctca                                                           369
```

<210> SEQ ID NO 234
<211> LENGTH: 333
<212> TYPE: DNA
<213> ORGANISM: Artificial sequence
<220> FEATURE:
<223> OTHER INFORMATION: Synthetic antibody sequence

<400> SEQUENCE: 234

```
caatctgtgc tgactcagcc accctcagcg tctgggaccc ccgggcagag ggtcaccatc    60
tcttgttctg gaagcagctc caacatcggg agaagttttg tgaactggta ccagcagctc   120
ccaggaacgg ccccccaact cctcatctac aaaaatgatc agcggccctc aggggtccct   180
gaccgattct ctgcctccaa gtctggcacc tcagcctccc tggccatcag tgggctccag   240
tctgaggatg aggctgatta tttctgtgca gcatgggttg acagcgtgaa tggtcttgtg   300
gtattcggcg gagggaccaa gctgaccgtc cta                                333
```

<210> SEQ ID NO 235
<211> LENGTH: 369
<212> TYPE: DNA
<213> ORGANISM: Artificial sequence
<220> FEATURE:
<223> OTHER INFORMATION: Synthetic antibody sequence

<400> SEQUENCE: 235

```
caggttcagc tggtgcagtc tggagctgag gtgaggaagc ctggggcctc agtgaaggtc    60
tcctgcaagg cttctggtta caccttcacc agcaatggtg tcagctgggt gcgacaggcc   120
cctggacaag gcttgagtg gatggggtgg atcgccggtt acgacggtta cacaaactat   180
acgcagaagt tccagggaag agtcaccatg accacagaca catccacgac tacggtctac   240
```

```
atggaactga ggagtctgag atttgacgac acggccgtgt attactgtgc gagagatgaa    300
ggcctacata actggaaatt caacgcgatg gacgtctggg gccaagggac cacggtcatc    360
gtctcctca                                                            369
```

<210> SEQ ID NO 236
<211> LENGTH: 324
<212> TYPE: DNA
<213> ORGANISM: Artificial sequence
<220> FEATURE:
<223> OTHER INFORMATION: Synthetic antibody sequence

<400> SEQUENCE: 236

```
gaaattgtgt tgacgcagtc tccaggcacc ctgtctttgt ctccagggga aagagccacc    60
ctctcctgca gggccagtca gagtgttagc agcagctact tagcctggta ccagcagaaa    120
cctggccagg ctcccaggct cctcatgtct gagacatcca ggagggccac tggcatccca    180
gacaggttca gtggcagtgt gtctgggaca gacttcattc tcaccatcaa cagagtggac    240
cctgaagatt ttgcagtgta ttactgtcag cagtatagta gccaccttg gacgttcggc      300 caagggacca aggtggaaat caaa                                           324
```

<210> SEQ ID NO 237
<211> LENGTH: 369
<212> TYPE: DNA
<213> ORGANISM: Artificial sequence
<220> FEATURE:
<223> OTHER INFORMATION: Synthetic antibody sequence

<400> SEQUENCE: 237

```
gaggtgcagc tggtggagtc ggggggaggc gtggtccagc ctgggaggtc cctgagactc    60
tcctgtgcag cgtctggatt caccttcagt ccctatggca tgcactgggt ccgccaggct    120
ccaggcaagg ggctggagtg ggtggcagtt gtatggtatg atggaaataa taaatactat    180
gcagactccg tgaagggccg attcaccatc tccagagaca attccaagaa cacgctatat    240
ctgcaaatga acagcctgag agccgaggac acggctgtat attactgtgc gagagagaat    300 accccccacat acaactctgg ttactacttt gactactggg gccagggaac cctggtcacc    360
gtctcctca                                                            369
```

<210> SEQ ID NO 238
<211> LENGTH: 330
<212> TYPE: DNA
<213> ORGANISM: Artificial sequence
<220> FEATURE:
<223> OTHER INFORMATION: Synthetic antibody sequence

<400> SEQUENCE: 238

```
cagtctgccc tgactcagcc tgcctccgtg tctgggtctc ctggacagtc gatcaccatc    60
tcctgcactg gaaccagcag tgatgttggg agttatgacc ttgtctcctg gtaccaacaa    120
cacccaggca aagcccccaa actcataatt tatgagggca gtaagcggcc ctcagggggtt    180 tctaatcgct tctctggctc caagtctggc aacacggcct ccctgacaat ctctgggctc    240
caggctgagg acgaggctga ttattactgc tgctcatatg caggtagtag cacttgggtg    300
ttcggcggag ggaccaaggt gaccgtccta                                     330
```

<210> SEQ ID NO 239
<211> LENGTH: 381
<212> TYPE: DNA
<213> ORGANISM: Artificial sequence
<220> FEATURE:
<223> OTHER INFORMATION: Synthetic antibody sequence

<400> SEQUENCE: 239

```
caggtggtac tgcaggagtc gggcccagga ctggtgaagc cttcggagac cctgtccctc    60
acctgcactg tctctggtgg gtccatcaat aattactact ggagctggat ccggcagccc   120
ccagggaagg gactggagtg gattggctgg ctctattaca gtgggatcac caccttcaac   180
ccctccctca agagtcgagt caccatatca atagacacgt ccaagaacca ggtctccctg   240
aatctgcgct ctgtgaccgc tgcggacacg gccgtgtatt attgtgcgag agtccagggg   300
tctgatagta gtggttatta ccacctgaag tcggactggt tcgaccctg gggccaggga   360
atcccggtca ccgtctcctc a                                             381
```

<210> SEQ ID NO 240
<211> LENGTH: 336
<212> TYPE: DNA
<213> ORGANISM: Artificial sequence
<220> FEATURE:
<223> OTHER INFORMATION: Synthetic antibody sequence

<400> SEQUENCE: 240

```
cagtctgtgt tgacgcagcc gccctcagtg tctgcggccc caggacagac ggtcaccatc    60
tcctgctctg gcagcagctc aacattcgg cataattttg tttcgtggta ccagcagctc   120
ccaggaacag cccccaaact cgtcatttat gaaaataata gcgaccctc agggattcct   180
gaccgattct ctggctccaa gtctggcacg tcagccaccc tgggcatcac cggactccag   240
actggggacg aggccgatta ttactgcgga acatgggata gcagcctgag tgctccccat   300
tgggtgttcg gcggagggac caggctgact gtccta                             336
```

<210> SEQ ID NO 241
<211> LENGTH: 375
<212> TYPE: DNA
<213> ORGANISM: Artificial sequence
<220> FEATURE:
<223> OTHER INFORMATION: Synthetic antibody sequence

<400> SEQUENCE: 241

```
caggtgcatc tgcaggagtc gggcccagga ctagtgaagc cttcggagac cctgtccctc    60
acctgcgctg tctctggcta ctccatcagc agtggttact gctggggctg gatccggcag   120
accccaggga aggggctgga gtggattggg agtatctggc atactgggac caccctactac   180
aacccgtccc tcaagagtcg agtcaccata tcactggaca cgtccaagaa ccagttctcc   240
ctgaagctga gttctctgac cgccgcagac acggccgtct attactgtgc gagagcgatc   300
tatgatagta gtggttattc cccgttcagc ggtttagaca tctggggcca agggactaca   360
gtcaccatct cctca                                                    375
```

<210> SEQ ID NO 242
<211> LENGTH: 330
<212> TYPE: DNA
<213> ORGANISM: Artificial sequence
<220> FEATURE:
<223> OTHER INFORMATION: Synthetic antibody sequence

<400> SEQUENCE: 242

```
cagtctgtgt tgacgcagcc gccctcagtg tctgcggccc caggacagaa ggtcaccatc    60
tcctgttctg gaagcagctc aacattggg aataattatg tatcctggta ccaacaagtc   120
```

```
cccggaacag ccccccaaact cctctttttat gacaataaca agcgaccctc agggattcct    180
taccgattct ctggctccaa gtctggcacg tccgccaccc tggccatcac cggactccag    240
actggggacg aggccgatta ttactgcgga acatgggata gcagcctgaa tctttgggtg    300
ttcggcggag ggaccaagct gaccgtccta                                      330
```

<210> SEQ ID NO 243
<211> LENGTH: 375
<212> TYPE: DNA
<213> ORGANISM: Artificial sequence
<220> FEATURE:
<223> OTHER INFORMATION: Synthetic antibody sequence

<400> SEQUENCE: 243

```
caggtgcatc tgcaggagtc gggcccagga ctagtgaagc cttcggagac cctgtccctc     60
acctgcgctg tctctggcta ctccatcagc agtggttact gctggggctg gatccggcag    120
accccaggga aggggctgga gtggattggg agtatctggc atactgggac cacctactac    180
aacccgtccc tcaagagtcg agtcaccata tcactgacac gtccaagaa ccagttctcc     240 ctgaagctga gttctctgac cgccgcagac acggccgtct attactgtgc gagagcgatc    300
tatgatagta gtggttattc cccgttcagc ggtttagaca tctggggcca agggactaca    360
gtcaccatct cctca                                                      375
```

<210> SEQ ID NO 244
<211> LENGTH: 327
<212> TYPE: DNA
<213> ORGANISM: Artificial sequence
<220> FEATURE:
<223> OTHER INFORMATION: Synthetic antibody sequence

<400> SEQUENCE: 244

```
tcctatgagc tgactcagcc acactcagtg tcagtggcca cagcacagat ggccaggatc     60
acctgtgggg gaaacaacat tggaagtaaa gctgtgcact ggtaccagca aaagccaggc    120
caggaccctg tgctggtcat ctatagcgat agcaaccggc cctcagggat ccctgagcga    180
ttctctggct ccaacccagg gaacaccgcc accctaacca tcagcaggat cgaggctggg    240
gatgaggctg actattactg tcaggtgtgg gacagtagta gtgatcatcg ctgggtgttc    300
ggcggaggga ccaagctgac cgtccta                                         327
```

<210> SEQ ID NO 245
<211> LENGTH: 120
<212> TYPE: PRT
<213> ORGANISM: Artificial sequence
<220> FEATURE:
<223> OTHER INFORMATION: Synthetic antibody sequence

<400> SEQUENCE: 245

```
Gln Val Thr Leu Lys Glu Ser Gly Pro Ala Leu Val Lys Pro Thr Gln
1               5                   10                  15

Thr Leu Thr Leu Thr Cys Thr Phe Ser Gly Phe Ser Leu Ser Thr Ser
            20                  25                  30

Gly Met Arg Val Ser Trp Ile Arg Gln Pro Pro Gly Lys Ala Leu Glu
        35                  40                  45

Trp Leu Ala Arg Ile Asp Trp Asp Asp Asp Lys Phe Tyr Ser Thr Ser
    50                  55                  60

Leu Lys Thr Arg Leu Thr Ile Ser Lys Asp Thr Ser Lys Asn Gln Val
65                  70                  75                  80
```

Val Leu Ile Met Thr Asn Met Asp Pro Val Asp Thr Ala Thr Tyr Tyr
                85                  90                  95

Cys Ala Arg Met Met Val Gly Glu Gly Thr Phe Asp Tyr Trp Gly Gln
            100                 105                 110

Gly Thr Leu Val Thr Val Ser Ser
        115                 120

<210> SEQ ID NO 246
<211> LENGTH: 106
<212> TYPE: PRT
<213> ORGANISM: Artificial sequence
<220> FEATURE:
<223> OTHER INFORMATION: Synthetic antibody sequence

<400> SEQUENCE: 246

Asp Ile Gln Met Thr Gln Phe Pro Ser Thr Leu Ser Ala Ser Val Gly
1               5                   10                  15

Asp Arg Val Thr Ile Thr Cys Arg Ala Ser Gln Asp Ile Ser Ser Leu
            20                  25                  30

Leu Ala Trp Tyr Gln Gln Lys Pro Gly Lys Ala Pro Lys Leu Leu Ile
        35                  40                  45

Tyr Thr Ala Ser Asn Leu Glu Gly Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Tyr Ile Arg Tyr Trp Thr
                85                  90                  95

Phe Gly Gln Gly Thr Lys Val Glu Ile Lys
            100                 105

<210> SEQ ID NO 247
<211> LENGTH: 121
<212> TYPE: PRT
<213> ORGANISM: Artificial sequence
<220> FEATURE:
<223> OTHER INFORMATION: Synthetic antibody sequence

<400> SEQUENCE: 247

Gln Val Gln Leu Val Gln Ser Gly Gly Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Gly Ile Ser Trp Val Arg Gln Ala Pro Gly Gln Gly Pro Glu Trp Met
        35                  40                  45

Gly Trp Ile Ser Thr Phe Asn Gly Asn Thr Asn Tyr Ala Gln Lys Leu
    50                  55                  60

Gln Gly Arg Val Thr Met Thr Ile Asp Ser Thr Ser Thr Ala Tyr
65                  70                  75                  80

Leu Glu Leu Arg Ser Leu Arg Ser Asn Asp Thr Ala Val Tyr Tyr Cys
                85                  90                  95

Ala Arg Arg Pro Pro Tyr Tyr Asp Ser Thr Ala Phe Asp Ile Trp Gly
            100                 105                 110

Gln Gly Thr Met Val Ile Val Ser Ser
        115                 120

<210> SEQ ID NO 248
<211> LENGTH: 110
<212> TYPE: PRT
<213> ORGANISM: Artificial sequence

```
<220> FEATURE:
<223> OTHER INFORMATION: Synthetic antibody sequence

<400> SEQUENCE: 248

Gln Ser Val Leu Thr Gln Pro Pro Ser Ala Ser Gly Thr Pro Gly Gln
1               5                   10                  15

Arg Val Ser Ile Ser Cys Ser Gly Ser Ser Asn Ile Gly Ser Asn
            20                  25                  30

Ile Val Asn Trp Tyr Gln Gln Leu Pro Gly Thr Ala Pro Lys Leu Leu
            35                  40                  45

Ile Tyr Ser Asn Asn Gln Arg Pro Ser Trp Val Pro Asp Arg Phe Ser
        50                  55                  60

Gly Ser Lys Ser Gly Thr Ser Ala Ser Leu Ala Ile Ser Gly Leu Gln
65                  70                  75                  80

Ser Glu Asp Glu Ala Asp Tyr Tyr Cys Ser Thr Trp Asp Ala Ser Leu
                85                  90                  95

Asn Gly Val Val Phe Gly Gly Gly Thr Lys Leu Thr Val Leu
            100                 105                 110

<210> SEQ ID NO 249
<211> LENGTH: 133
<212> TYPE: PRT
<213> ORGANISM: Artificial sequence
<220> FEATURE:
<223> OTHER INFORMATION: Synthetic antibody sequence

<400> SEQUENCE: 249

Gly Val Gln Leu Val Glu Ser Gly Gly Gly Leu Val Lys Pro Gly Gly
1               5                   10                  15

Ser Leu Arg Leu Ser Cys Thr Asp Ser Gly Leu Thr Phe Gly His Ala
            20                  25                  30

Trp Met Asn Trp Val Arg Gln Ala Pro Gly Lys Gly Leu Glu Trp Val
            35                  40                  45

Gly Arg Ile Lys Thr Lys Ala Asp Gly Glu Thr Thr Asp Tyr Ala Ala
        50                  55                  60

Ala Val Lys Gly Arg Phe Thr Ile Leu Arg Asp Asp Ser Lys Lys Thr
65                  70                  75                  80

Leu Phe Leu Gln Met Asn Gly Leu Lys Thr Glu Asp Thr Gly Val Tyr
                85                  90                  95

Tyr Cys Thr Thr Asp Leu Arg Ala Leu Glu Ala Leu Leu Ser Leu Gly
            100                 105                 110

Phe Val Tyr Thr Tyr Asn Phe Met Asp Val Trp Gly Gln Gly Thr Thr
            115                 120                 125

Val Phe Val Ser Ser
        130

<210> SEQ ID NO 250
<211> LENGTH: 108
<212> TYPE: PRT
<213> ORGANISM: Artificial sequence
<220> FEATURE:
<223> OTHER INFORMATION: Synthetic antibody sequence

<400> SEQUENCE: 250

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ile Val Ser Ser Asn
            20                  25                  30
```

```
Tyr Leu Ala Trp Phe Gln Gln Lys Pro Gly Gln Ala Pro Arg Leu Val
             35                  40                  45

Ile Tyr Gly Ala Ser Ser Arg Ala Thr Gly Ile Pro Asp Arg Phe Ser
 50                  55                  60

Gly Ser Gly Ser Ala Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
                 85                  90                  95

Tyr Thr Phe Gly Gln Gly Thr Lys Val Glu Ile Lys
                100                 105
```

<210> SEQ ID NO 251
<211> LENGTH: 127
<212> TYPE: PRT
<213> ORGANISM: Artificial sequence
<220> FEATURE:
<223> OTHER INFORMATION: Synthetic antibody sequence

<400> SEQUENCE: 251

```
Gln Val Gln Leu Leu Gln Ser Gly Ala Glu Val Lys Lys Pro Gly Ser
 1               5                  10                  15

Ser Val Arg Val Ser Cys Gln Ser Gly Asp Ile Tyr Asn Tyr Tyr
                 20                  25                  30

Gly Ile Ser Trp Val Arg Gln Ala Pro Gly Gln Gly Leu Glu Trp Met
             35                  40                  45

Gly Gly Ile Ile Pro Val Tyr Gly Arg Pro Asn Tyr Val Gln Lys Phe
 50                  55                  60

Arg Gly Arg Val Thr Phe Thr Val Asp Lys Ser Thr Ser Thr Ala Tyr
 65                  70                  75                  80

Met Glu Leu Ser Thr Leu Arg Ala Asp Asp Thr Ala Val Tyr Tyr Cys
                 85                  90                  95

Ala Arg Asp Thr Ala Arg Ser His Tyr Phe Gly Ser Gly Asn Asp Tyr
                100                 105                 110

Gly Met Asp Val Trp Gly Gln Gly Thr Thr Val Ile Val Ser Ser
             115                 120                 125
```

<210> SEQ ID NO 252
<211> LENGTH: 112
<212> TYPE: PRT
<213> ORGANISM: Artificial sequence
<220> FEATURE:
<223> OTHER INFORMATION: Synthetic antibody sequence

<400> SEQUENCE: 252

```
Asp Ile Val Met Thr Gln Ser Pro Leu Ser Leu Pro Val Thr Pro Gly
 1               5                  10                  15

Glu Pro Ala Ser Ile Ser Cys Arg Ser Ser Gln Ser Leu Leu His Ser
                 20                  25                  30

Asn Gly Phe Asn Phe Val Asp Trp Tyr Leu Gln Lys Pro Gly Gln Ser
             35                  40                  45

Pro Gln Leu Leu Ile Tyr Leu Gly Ser Thr Arg Ala Ser Gly Val Pro
 50                  55                  60

Asp Arg Phe Ser Gly Ser Gly Ser Gly Thr Asp Phe Thr Leu Glu Ile
 65                  70                  75                  80

Ser Arg Val Glu Ala Glu Asp Val Gly Val Tyr Tyr Cys Met Gln Ala
                 85                  90                  95

Leu Gln Phe Pro Arg Thr Phe Gly Gln Gly Thr Lys Leu Asp Ile Lys
                100                 105                 110
```

<210> SEQ ID NO 253
<211> LENGTH: 124
<212> TYPE: PRT
<213> ORGANISM: Artificial sequence
<220> FEATURE:
<223> OTHER INFORMATION: Synthetic antibody sequence

<400> SEQUENCE: 253

Gln Val Gln Leu Gln Glu Ser Gly Pro Gly Leu Val Lys Pro Ser Gly
1               5                   10                  15

Thr Leu Ser Leu Thr Cys Thr Val Ser Gly Asp Ser Ile Ser Ser Gly
            20                  25                  30

Gly Phe Tyr Trp Ser Trp Ile Arg Gln Pro Pro Gly Lys Gly Leu Glu
        35                  40                  45

Trp Ile Gly Tyr Met Tyr Tyr Asn Gly Asn Thr Asn Tyr Asn Pro Ser
    50                  55                  60

Leu Lys Ser Arg Ile Thr Ile Ser Ile Asp Ala Ser Lys Asn Gln Phe
65                  70                  75                  80

Ser Leu Thr Val Asp Ser Val Thr Pro Ala Asp Thr Ala Val Tyr Tyr
                85                  90                  95

Cys Ala Arg Gly Gly Leu Tyr Gly Gln Leu Ile Arg Gly Phe Phe His
            100                 105                 110

Pro Trp Gly Gln Gly Thr Leu Val Thr Val Ser Ser
        115                 120

<210> SEQ ID NO 254
<211> LENGTH: 111
<212> TYPE: PRT
<213> ORGANISM: Artificial sequence
<220> FEATURE:
<223> OTHER INFORMATION: Synthetic antibody sequence

<400> SEQUENCE: 254

Gln Ser Val Leu Thr Gln Ser Pro Ser Val Ser Gly Thr Pro Gly Gln
1               5                   10                  15

Thr Val Ser Ile Ser Cys Ser Gly Ser Trp Ser Asn Ile Gly Arg Asn
            20                  25                  30

His Val Tyr Trp Tyr His Gln Leu Pro Gly Ser Ala Pro Lys Leu Leu
        35                  40                  45

Ile Tyr Met Ser Ser Gln Arg Pro Leu Gly Val Pro Asp Arg Phe Ser
    50                  55                  60

Gly Ser Arg Ser Asp Thr Ser Ala Ser Leu Ala Ile Ser Gly Leu Arg
65                  70                  75                  80

Ser Glu Asp Glu Ala Asp Tyr Tyr Cys Val Ala Trp Asp Asp Ser Leu
                85                  90                  95

Ser Gly Phe Tyr Val Phe Gly Thr Gly Thr Lys Val Thr Val Leu
            100                 105                 110

<210> SEQ ID NO 255
<211> LENGTH: 120
<212> TYPE: PRT
<213> ORGANISM: Artificial sequence
<220> FEATURE:
<223> OTHER INFORMATION: Synthetic antibody sequence

<400> SEQUENCE: 255

Glu Val Gln Leu Val Glu Ser Gly Gly Gly Leu Val Gln Pro Gly Gly
1               5                   10                  15

```
Ser Leu Arg Leu Ser Cys Ala Ala Ser Gly Phe Ala Phe Ser Ser Tyr
            20                  25                  30

Trp Met Thr Trp Val Arg Gln Ala Pro Gly Lys Gly Leu Glu Phe Val
        35                  40                  45

Ala Asn Ile Lys Tyr Asp Ala Ser Glu Lys Tyr Tyr Val Asp Ser Val
    50                  55                  60

Lys Gly Arg Phe Thr Ile Ser Arg Asp Asn Gly Arg Asn Ser Phe Tyr
65                  70                  75                  80

Leu Gln Met Asn Ser Leu Arg Ala Glu Asp Thr Ala Val Tyr Tyr Cys
                85                  90                  95

Ala Val Pro Gly Pro Gly Tyr Ser Phe Ala Tyr Asp Tyr Trp Gly Gln
            100                 105                 110

Gly Thr Gln Val Thr Val Ser Ser
            115                 120

<210> SEQ ID NO 256
<211> LENGTH: 107
<212> TYPE: PRT
<213> ORGANISM: Artificial sequence
<220> FEATURE:
<223> OTHER INFORMATION: Synthetic antibody sequence

<400> SEQUENCE: 256

Asp Ile Gln Met Thr Gln Ser Pro Ser Ser Leu Ser Ala Ser Val Gly
1               5                   10                  15

Asp Arg Ile Thr Ile Thr Cys Arg Ala Ser Gln Ser Val Gly Thr Tyr
            20                  25                  30

Leu Asn Trp Tyr Gln Gln Lys Pro Gly Lys Ala Pro Lys Leu Leu Ile
        35                  40                  45

Tyr Glu Ala Ser Ser Leu Gln Ser Gly Val Pro Ser Arg Phe Ser Gly
    50                  55                  60

Ser Gly Ser Gly Thr Asp Phe Thr Leu Thr Ile Ser Arg Leu Gln Pro
65                  70                  75                  80

Glu Asp Phe Ala Thr Tyr Ser Cys Gln Gln Ser Asp Ile Pro Pro Trp
                85                  90                  95

Thr Phe Gly Gln Gly Thr Lys Val Glu Ile Lys
            100                 105

<210> SEQ ID NO 257
<211> LENGTH: 121
<212> TYPE: PRT
<213> ORGANISM: Artificial sequence
<220> FEATURE:
<223> OTHER INFORMATION: Synthetic antibody sequence

<400> SEQUENCE: 257

Glu Val Lys Leu Val Glu Ser Gly Gly Gly Leu Val Gln Pro Gly Arg
1               5                   10                  15

Ser Leu Arg Leu Ser Cys Ala Ala Ser Gly Phe Ser Phe Asp Asp Tyr
            20                  25                  30

Ala Met His Trp Val Arg Gln Pro Leu Gly Lys Gly Leu Glu Trp Val
        35                  40                  45

Ser Gly Ile Ser Trp Asn Ser Gly Asn Thr Ala Tyr Ala Asp Ser Val
    50                  55                  60

Lys Gly Arg Phe Thr Ile Ser Arg Asp Asn Thr Lys Asn Ser Leu Tyr
65                  70                  75                  80

Leu Gln Met Asn Ser Leu Arg Pro Glu Asp Thr Ala Leu Tyr Tyr Cys
                85                  90                  95
```

```
Gly Lys Asp Leu Gly Gly Ile Val Leu Ala Pro Ile Asp Ser Trp Gly
            100                 105                 110

Gln Gly Thr Leu Val Thr Val Ser Ser
            115                 120
```

<210> SEQ ID NO 258
<211> LENGTH: 110
<212> TYPE: PRT
<213> ORGANISM: Artificial sequence
<220> FEATURE:
<223> OTHER INFORMATION: Synthetic antibody sequence

<400> SEQUENCE: 258

```
Gln Ser Ala Leu Thr Gln Pro Ala Ser Val Ser Gly Ser Pro Gly Gln
1               5                   10                  15

Ser Val Thr Ile Ser Cys Thr Gly Thr Ser Ser Asp Val Gly Ala Phe
            20                  25                  30

Asn Tyr Val Ser Trp Tyr Gln Gln His Pro Gly Lys Ala Pro Lys Leu
        35                  40                  45

Leu Ile Ser Ala Val Asn Asn Arg Pro Ser Gly Val Ser Asn Arg Phe
    50                  55                  60

Ser Ile Ser Lys Ser Gly Asn Thr Ala Ser Leu Thr Ile Ser Gly Leu
65                  70                  75                  80

Gln Ala Glu Asp Glu Ala Asp Tyr Phe Cys Ser Ser Tyr Thr Val Ser
                85                  90                  95

Tyr Thr Leu Thr Phe Gly Gly Gly Thr Lys Leu Thr Val Leu
            100                 105                 110
```

<210> SEQ ID NO 259
<211> LENGTH: 129
<212> TYPE: PRT
<213> ORGANISM: Artificial sequence
<220> FEATURE:
<223> OTHER INFORMATION: Synthetic antibody sequence

<400> SEQUENCE: 259

```
Gln Val Gln Leu Val Glu Ser Gly Gly Val Val Gln Pro Gly Arg
1               5                   10                  15

Ser Leu Arg Leu Ser Cys Ala Val Ser Gly Phe Thr Phe Arg Asn Tyr
            20                  25                  30

Ala Met His Trp Val Arg Gln Ala Pro Gly Lys Gly Leu Glu Trp Val
        35                  40                  45

Ala Val Ile Ser Tyr Asp Gly Asn Lys Asp Tyr Ala Ala Ser Val
    50                  55                  60

Lys Gly Arg Phe Thr Ile Ser Arg Asp Ser Lys Asn Ala Leu Tyr
65                  70                  75                  80

Leu Gln Met Asn Ser Leu Arg Pro Glu Asp Thr Ala Val Tyr Ser Cys
                85                  90                  95

Val Lys Asp Leu Gly Gly Asp Tyr Pro Pro Leu Asp Pro His Tyr Trp
            100                 105                 110

Tyr Tyr Gly Met Asp Val Trp Gly Gln Gly Thr Thr Val Ile Val Ser
        115                 120                 125

Ser
```

<210> SEQ ID NO 260
<211> LENGTH: 110
<212> TYPE: PRT
<213> ORGANISM: Artificial sequence
<220> FEATURE:
<223> OTHER INFORMATION: Synthetic antibody sequence

<400> SEQUENCE: 260

Gln Ser Val Leu Thr Gln Pro Pro Ser Ala Ser Gly Thr Pro Gly Gln
1               5                   10                  15

Gly Val Thr Ile Ser Cys Ser Gly Ser Ser Asn Ile Gly Thr Lys
            20                  25                  30

Ser Val Leu Trp Tyr Gln Gln Leu Pro Gly Thr Ala Pro Lys Leu Leu
        35                  40                  45

Ile Tyr Arg Asn Asn Gln Arg Pro Ser Gly Val Pro Asp Arg Phe Ser
    50                  55                  60

Gly Ser Lys Ser Gly Thr Ser Ala Ser Leu Ala Ile Ser Gly Leu Arg
65                  70                  75                  80

Ser Glu Asp Glu Gly Asp Tyr Tyr Cys Ala Ser Trp Asp Val Ser Leu
                85                  90                  95

Ser Val Trp Val Phe Gly Gly Arg Thr Lys Leu Thr Val Leu
            100                 105                 110

<210> SEQ ID NO 261
<211> LENGTH: 125
<212> TYPE: PRT
<213> ORGANISM: Artificial sequence
<220> FEATURE:
<223> OTHER INFORMATION: Synthetic antibody sequence

<400> SEQUENCE: 261

Gln Val His Leu Val Gln Ser Gly Gly Glu Leu Arg Lys Pro Gly Ser
1               5                   10                  15

Ser Val Lys Val Ser Cys Lys Ala Ser Gly Gly Thr Phe Ser Ser Phe
            20                  25                  30

Ala Ile Thr Trp Leu Arg Gln Ala Pro Gly Gln Gly Leu Glu Trp Val
        35                  40                  45

Gly Ala Tyr Ile Pro Val Phe Gly Ser Ala Ile His Gly Gln Lys Val
    50                  55                  60

His Gly Arg Val Thr Leu Thr Ala Asp Glu Ser Thr Thr Thr Ala Tyr
65                  70                  75                  80

Met Glu Leu Ser Ser Leu Arg Ser Glu Asp Thr Ala Val Tyr Phe Cys
                85                  90                  95

Ala Arg Gly Pro Thr Gln Asn Trp Glu Tyr Ser Tyr Tyr Thr Tyr Phe
            100                 105                 110

Glu Ser Trp Gly Gln Gly Thr Leu Val Thr Val Ser Ser
        115                 120                 125

<210> SEQ ID NO 262
<211> LENGTH: 109
<212> TYPE: PRT
<213> ORGANISM: Artificial sequence
<220> FEATURE:
<223> OTHER INFORMATION: Synthetic antibody sequence

<400> SEQUENCE: 262

Gln Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Thr Ser Arg
            20                  25                  30

Tyr Leu Ala Trp Tyr Gln Gln Lys Pro Gly Gln Ala Pro Arg Leu Leu
        35                  40                  45

```
Ile Tyr Asp Thr Ser Ser Arg Ala Thr Gly Ile Pro Asp Arg Phe Ser
    50                  55                  60

Gly Ser Gly Ser Glu Thr Asp Phe Thr Leu Thr Ile Ser Arg Leu Ala
65                  70                  75                  80

Pro Glu Asp Phe Ala Val Tyr Tyr Cys Gln Gln Tyr Gly Thr Ser Pro
                85                  90                  95

Ala Val Thr Phe Gly Gln Gly Thr Arg Leu Glu Ile Lys
                100                 105
```

<210> SEQ ID NO 263
<211> LENGTH: 120
<212> TYPE: PRT
<213> ORGANISM: Artificial sequence
<220> FEATURE:
<223> OTHER INFORMATION: Synthetic antibody sequence

<400> SEQUENCE: 263

```
Glu Glu Gln Leu Val Glu Ser Gly Gly Gly Leu Val Lys Pro Gly Gly
1               5                   10                  15

Ser Leu Arg Leu Ser Cys Ala Ala Ser Gly Ile Thr Val Arg Ser Tyr
                20                  25                  30

Phe Ile Ser Trp Val Arg Gln Ala Pro Gly Lys Gly Leu Glu Trp Val
                35                  40                  45

Ser Ser Ile Ser Asn Gly Gly Ser Tyr Ile Tyr Tyr Ala Glu Ser Val
    50                  55                  60

Lys Gly Arg Phe Thr Ile Ser Arg Asp Asp Ala Lys Asn Ser Val Phe
65                  70                  75                  80

Leu Gln Met Ser Ser Leu Arg Val Asp Asp Thr Ala Leu Tyr Tyr Cys
                85                  90                  95

Val Arg Ser Pro Asn Leu Gly Leu Met Tyr Gln Gly Met Asp Leu Trp
                100                 105                 110

Gly His Gly Thr Thr Val Ser Val
                115                 120
```

<210> SEQ ID NO 264
<211> LENGTH: 108
<212> TYPE: PRT
<213> ORGANISM: Artificial sequence
<220> FEATURE:
<223> OTHER INFORMATION: Synthetic antibody sequence

<400> SEQUENCE: 264

```
Ser Tyr Val Leu Thr Gln Pro Pro Ser Val Ser Val Ala Pro Gly Gln
1               5                   10                  15

Thr Ala Arg Ile Ser Cys Gly Gly Asn Asn Leu Gly Ser Lys Ser Val
                20                  25                  30

Asn Trp Tyr Gln Gln Lys Ala Gly Gln Ala Pro Val Leu Val Ile Tyr
                35                  40                  45

Asp Asn Tyr Asp Arg Pro Ser Gly Ile Pro Glu Arg Phe Ser Gly Ser
    50                  55                  60

Thr Ser Gly Asn Val Ala Thr Leu Ala Ile Ser Arg Val Ala Ala Gly
65                  70                  75                  80

Asp Glu Ala Asp Phe Tyr Cys Gln Val Trp Asp Ile Gly Ser Glu His
                85                  90                  95

Trp Val Phe Gly Gly Gly Thr Lys Leu Thr Val Leu
                100                 105
```

<210> SEQ ID NO 265

```
<211> LENGTH: 108
<212> TYPE: PRT
<213> ORGANISM: Artificial sequence
<220> FEATURE:
<223> OTHER INFORMATION: Synthetic antibody sequence

<400> SEQUENCE: 265

Ser Tyr Val Leu Thr Gln Pro Pro Ser Val Ser Val Ala Pro Gly Gln
1               5                   10                  15

Thr Ala Arg Ile Ser Cys Gly Gly Asn Asn Leu Gly Ser Lys Ser Val
            20                  25                  30

Asn Trp Tyr Gln Gln Lys Ala Gly Gln Ala Pro Val Leu Val Ile Tyr
        35                  40                  45

Asp Asn Tyr Asp Arg Pro Ser Gly Ile Pro Glu Arg Phe Ser Gly Ser
    50                  55                  60

Thr Ser Gly Asn Val Ala Thr Leu Ala Ile Ser Arg Val Ala Ala Gly
65                  70                  75                  80

Asp Glu Ala Asp Phe Tyr Cys Gln Val Trp Asp Ile Gly Ser Glu His
                85                  90                  95

Trp Val Phe Gly Gly Gly Thr Lys Leu Thr Val Leu
            100                 105

<210> SEQ ID NO 266
<211> LENGTH: 109
<212> TYPE: PRT
<213> ORGANISM: Artificial sequence
<220> FEATURE:
<223> OTHER INFORMATION: Synthetic antibody sequence

<400> SEQUENCE: 266

Ser Tyr Val Leu Thr Gln Pro Pro Ser Val Ser Val Ala Pro Gly Gln
1               5                   10                  15

Thr Ala Thr Ile Pro Cys Gly Gly Asn Asn Ile Glu Thr Lys Arg Val
            20                  25                  30

His Trp Tyr Gln Gln Lys Pro Gly Gln Ala Pro Val Leu Val Val Tyr
        35                  40                  45

Asp Asp Tyr Asp Arg Pro Ser Gly Ile Pro Asp Arg Phe Ser Gly Ser
    50                  55                  60

His Ser Gly Asn Thr Ala Thr Leu Thr Ile Ser Gly Val Glu Ala Gly
65                  70                  75                  80

Asp Glu Ala Asp Tyr Tyr Cys His Val Trp Asp Ile Ser Ser Asp Leu
                85                  90                  95

Pro Val Val Phe Gly Gly Gly Thr Gln Leu Thr Val Leu
            100                 105

<210> SEQ ID NO 267
<211> LENGTH: 123
<212> TYPE: PRT
<213> ORGANISM: Artificial sequence
<220> FEATURE:
<223> OTHER INFORMATION: Synthetic antibody sequence

<400> SEQUENCE: 267

Gln Met Gln Leu Val Gln Ser Gly Pro Glu Val Lys Lys Pro Gly Thr
1               5                   10                  15

Ser Val Lys Val Ser Cys Lys Ala Ser Gly Phe Thr Phe Ser Arg Ser
            20                  25                  30

Thr Val Gln Trp Val Arg Gln Thr Arg Gly Gln Arg Leu Glu Trp Ile
        35                  40                  45
```

Gly Trp Ile Leu Val Gly Asn Gly Asp Thr Asn Tyr Ala Gln Glu Phe
    50                  55                  60

Gln Glu Arg Val Ser Ile Thr Thr Asp Met Ser Thr Ser Thr Val Tyr
65                  70                  75                  80

Met Glu Leu Ser Ser Leu Arg Ser Asp Thr Ala Val Tyr Tyr Cys
                85                  90                  95

Ala Ala Met Gly Ser Gly Trp Trp Tyr Tyr His Tyr Asp Leu Asp Val
            100                 105                 110

Trp Gly His Gly Thr Thr Val Thr Val Ser Ser
            115                 120

<210> SEQ ID NO 268
<211> LENGTH: 111
<212> TYPE: PRT
<213> ORGANISM: Artificial sequence
<220> FEATURE:
<223> OTHER INFORMATION: Synthetic antibody sequence

<400> SEQUENCE: 268

Gln Ser Val Leu Thr Gln Pro Pro Ser Ala Ser Gly Thr Pro Gly Gln
1               5                   10                  15

Arg Val Thr Ile Ser Cys Ser Gly Ser Ser Asn Ile Gly Arg Ser
            20                  25                  30

Phe Val Asn Trp Tyr Gln Gln Leu Pro Gly Thr Ala Pro Gln Leu Leu
            35                  40                  45

Ile Tyr Lys Asn Asp Gln Arg Pro Ser Gly Val Pro Asp Arg Phe Ser
    50                  55                  60

Ala Ser Lys Ser Gly Thr Ser Ala Ser Leu Ala Ile Ser Gly Leu Gln
65                  70                  75                  80

Ser Glu Asp Glu Ala Asp Tyr Phe Cys Ala Ala Trp Val Asp Ser Val
                85                  90                  95

Asn Gly Leu Val Val Phe Gly Gly Gly Thr Lys Leu Thr Val Leu
            100                 105                 110

<210> SEQ ID NO 269
<211> LENGTH: 123
<212> TYPE: PRT
<213> ORGANISM: Artificial sequence
<220> FEATURE:
<223> OTHER INFORMATION: Synthetic antibody sequence

<400> SEQUENCE: 269

Gln Val Gln Leu Val Gln Ser Gly Ala Glu Val Arg Lys Pro Gly Ala
1               5                   10                  15

Ser Val Lys Val Ser Cys Lys Ala Ser Gly Tyr Thr Phe Thr Ser Asn
            20                  25                  30

Gly Val Ser Trp Val Arg Gln Ala Pro Gly Gln Gly Leu Glu Trp Met
            35                  40                  45

Gly Trp Ile Ala Gly Tyr Asp Gly Tyr Thr Asn Tyr Thr Gln Lys Phe
    50                  55                  60

Gln Gly Arg Val Thr Met Thr Thr Asp Thr Ser Thr Thr Thr Val Tyr
65                  70                  75                  80

Met Glu Leu Arg Ser Leu Arg Phe Asp Asp Thr Ala Val Tyr Tyr Cys
                85                  90                  95

Ala Arg Asp Glu Gly Leu His Asn Trp Lys Phe Asn Ala Met Asp Val
            100                 105                 110

Trp Gly Gln Gly Thr Thr Val Ile Val Ser Ser
            115                 120

<210> SEQ ID NO 270
<211> LENGTH: 108
<212> TYPE: PRT
<213> ORGANISM: Artificial sequence
<220> FEATURE:
<223> OTHER INFORMATION: Synthetic antibody sequence

<400> SEQUENCE: 270

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Met Ser Glu Thr Ser Arg Arg Ala Thr Gly Ile Pro Asp Arg Phe Ser
    50                  55                  60

Gly Ser Val Ser Gly Thr Asp Phe Ile Leu Thr Ile Asn Arg Val Asp
65                  70                  75                  80

Pro Glu Asp Phe Ala Val Tyr Tyr Cys Gln Gln Tyr Ser Ser Pro Pro
                85                  90                  95

Trp Thr Phe Gly Gln Gly Thr Lys Val Glu Ile Lys
            100                 105

<210> SEQ ID NO 271
<211> LENGTH: 123
<212> TYPE: PRT
<213> ORGANISM: Artificial sequence
<220> FEATURE:
<223> OTHER INFORMATION: Synthetic antibody sequence

<400> SEQUENCE: 271

Glu Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Pro Tyr
            20                  25                  30

Gly Met His Trp Val Arg Gln Ala Pro Gly Lys Gly Leu Glu Trp Val
        35                  40                  45

Ala Val Val Trp Tyr Asp Gly Asn Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Glu Asn Thr Pro Thr Tyr Asn Ser Gly Tyr Tyr Phe Asp Tyr
            100                 105                 110

Trp Gly Gln Gly Thr Leu Val Thr Val Ser Ser
        115                 120

<210> SEQ ID NO 272
<211> LENGTH: 110
<212> TYPE: PRT
<213> ORGANISM: Artificial sequence
<220> FEATURE:
<223> OTHER INFORMATION: Synthetic antibody sequence

<400> SEQUENCE: 272

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Gly Ser Tyr
                20                  25                  30

Asp Leu Val Ser Trp Tyr Gln Gln His Pro Gly Lys Ala Pro Lys Leu
            35                  40                  45

Ile Ile Tyr Glu Gly Ser Lys Arg Pro Ser Gly Val Ser Asn Arg Phe
        50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Cys Ser Tyr Ala Gly Ser
                85                  90                  95

Ser Thr Trp Val Phe Gly Gly Gly Thr Lys Val Thr Val Leu
            100                 105                 110

<210> SEQ ID NO 273
<211> LENGTH: 127
<212> TYPE: PRT
<213> ORGANISM: Artificial sequence
<220> FEATURE:
<223> OTHER INFORMATION: Synthetic antibody sequence

<400> SEQUENCE: 273

Gln Val Val Leu Gln Glu Ser Gly Pro Gly Leu Val Lys Pro Ser Glu
1               5                   10                  15

Thr Leu Ser Leu Thr Cys Thr Val Ser Gly Gly Ser Ile Asn Asn Tyr
                20                  25                  30

Tyr Trp Ser Trp Ile Arg Gln Pro Pro Gly Lys Gly Leu Glu Trp Ile
            35                  40                  45

Gly Trp Leu Tyr Tyr Ser Gly Ile Thr Thr Phe Asn Pro Ser Leu Lys
        50                  55                  60

Ser Arg Val Thr Ile Ser Ile Asp Thr Ser Lys Asn Gln Val Ser Leu
65                  70                  75                  80

Asn Leu Arg Ser Val Thr Ala Ala Asp Thr Ala Val Tyr Tyr Cys Ala
                85                  90                  95

Arg Val Gln Gly Ser Asp Ser Ser Gly Tyr Tyr His Leu Lys Ser Asp
            100                 105                 110

Trp Phe Asp Pro Trp Gly Gln Gly Ile Pro Val Thr Val Ser Ser
            115                 120                 125

<210> SEQ ID NO 274
<211> LENGTH: 112
<212> TYPE: PRT
<213> ORGANISM: Artificial sequence
<220> FEATURE:
<223> OTHER INFORMATION: Synthetic antibody sequence

<400> SEQUENCE: 274

Gln Ser Val Leu Thr Gln Pro Pro Ser Val Ser Ala Ala Pro Gly Gln
1               5                   10                  15

Thr Val Thr Ile Ser Cys Ser Gly Ser Ser Ser Asn Ile Arg His Asn
                20                  25                  30

Phe Val Ser Trp Tyr Gln Gln Leu Pro Gly Thr Ala Pro Lys Leu Val
            35                  40                  45

Ile Tyr Glu Asn Asn Lys Arg Pro Ser Gly Ile Pro Asp Arg Phe Ser
        50                  55                  60

Gly Ser Lys Ser Gly Thr Ser Ala Thr Leu Gly Ile Thr Gly Leu Gln
65                  70                  75                  80

Thr Gly Asp Glu Ala Asp Tyr Tyr Cys Gly Thr Trp Asp Ser Ser Leu
                85                  90                  95

Ser Ala Pro His Trp Val Phe Gly Gly Gly Thr Arg Leu Thr Val Leu
            100                 105                 110

<210> SEQ ID NO 275
<211> LENGTH: 125
<212> TYPE: PRT
<213> ORGANISM: Artificial sequence
<220> FEATURE:
<223> OTHER INFORMATION: Synthetic antibody sequence

<400> SEQUENCE: 275

Gln Val His Leu Gln Glu Ser Gly Pro Gly Leu Val Lys Pro Ser Glu
1               5                   10                  15

Thr Leu Ser Leu Thr Cys Ala Val Ser Gly Tyr Ser Ile Ser Ser Gly
            20                  25                  30

Tyr Cys Trp Gly Trp Ile Arg Gln Thr Pro Gly Lys Gly Leu Glu Trp
        35                  40                  45

Ile Gly Ser Ile Trp His Thr Gly Thr Thr Tyr Tyr Asn Pro Ser Leu
    50                  55                  60

Lys Ser Arg Val Thr Ile Ser Leu Asp Thr Ser Lys Asn Gln Phe Ser
65                  70                  75                  80

Leu Lys Leu Ser Ser Leu Thr Ala Ala Asp Thr Ala Val Tyr Tyr Cys
                85                  90                  95

Ala Arg Ala Ile Tyr Asp Ser Ser Gly Tyr Ser Pro Phe Ser Gly Leu
            100                 105                 110

Asp Ile Trp Gly Gln Gly Thr Thr Val Thr Ile Ser Ser
        115                 120                 125

<210> SEQ ID NO 276
<211> LENGTH: 110
<212> TYPE: PRT
<213> ORGANISM: Artificial sequence
<220> FEATURE:
<223> OTHER INFORMATION: Synthetic antibody sequence

<400> SEQUENCE: 276

Gln Ser Val Leu Thr Gln Pro Pro Ser Val Ser Ala Ala Pro Gly Gln
1               5                   10                  15

Lys Val Thr Ile Ser Cys Ser Gly Ser Ser Ser Asn Ile Gly Asn Asn
            20                  25                  30

Tyr Val Ser Trp Tyr Gln Gln Val Pro Gly Thr Ala Pro Lys Leu Leu
        35                  40                  45

Phe Tyr Asp Asn Asn Lys Arg Pro Ser Gly Ile Pro Tyr Arg Phe Ser
    50                  55                  60

Gly Ser Lys Ser Gly Thr Ser Ala Thr Leu Ala Ile Thr Gly Leu Gln
65                  70                  75                  80

Thr Gly Asp Glu Ala Asp Tyr Tyr Cys Gly Thr Trp Asp Ser Ser Leu
                85                  90                  95

Asn Leu Trp Val Phe Gly Gly Gly Thr Lys Leu Thr Val Leu
            100                 105                 110

<210> SEQ ID NO 277
<211> LENGTH: 125
<212> TYPE: PRT
<213> ORGANISM: Artificial sequence
<220> FEATURE:
<223> OTHER INFORMATION: Synthetic antibody sequence

<400> SEQUENCE: 277

```
Gln Val His Leu Gln Glu Gly Pro Gly Leu Val Lys Pro Ser Glu
1               5                   10                  15

Thr Leu Ser Leu Thr Cys Ala Val Ser Gly Tyr Ser Ile Ser Ser Gly
            20                  25                  30

Tyr Cys Trp Gly Trp Ile Arg Gln Thr Pro Gly Lys Gly Leu Glu Trp
        35                  40                  45

Ile Gly Ser Ile Trp His Thr Gly Thr Thr Tyr Asn Pro Ser Leu
50                  55                  60

Lys Ser Arg Val Thr Ile Ser Leu Asp Thr Ser Lys Asn Gln Phe Ser
65                  70                  75                  80

Leu Lys Leu Ser Ser Leu Thr Ala Ala Asp Thr Ala Val Tyr Tyr Cys
                85                  90                  95

Ala Arg Ala Ile Tyr Asp Ser Ser Gly Tyr Ser Pro Phe Ser Gly Leu
                100                 105                 110

Asp Ile Trp Gly Gln Gly Thr Thr Val Thr Ile Ser Ser
            115                 120                 125
```

<210> SEQ ID NO 278
<211> LENGTH: 109
<212> TYPE: PRT
<213> ORGANISM: Artificial sequence
<220> FEATURE:
<223> OTHER INFORMATION: Synthetic antibody sequence

<400> SEQUENCE: 278

```
Ser Tyr Glu Leu Thr Gln Pro His Ser Val Ser Val Ala Thr Ala Gln
1               5                   10                  15

Met Ala Arg Ile Thr Cys Gly Gly Asn Asn Ile Gly Ser Lys Ala Val
            20                  25                  30

His Trp Tyr Gln Gln Lys Pro Gly Gln Asp Pro Val Leu Val Ile Tyr
        35                  40                  45

Ser Asp Ser Asn Arg Pro Ser Gly Ile Pro Glu Arg Phe Ser Gly Ser
    50                  55                  60

Asn Pro Gly Asn Thr Ala Thr Leu Thr Ile Ser Arg Ile Glu Ala Gly
65                  70                  75                  80

Asp Glu Ala Asp Tyr Tyr Cys Gln Val Trp Asp Ser Ser Asp His
                85                  90                  95

Arg Trp Val Phe Gly Gly Gly Thr Lys Leu Thr Val Leu
            100                 105
```

<210> SEQ ID NO 279
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 279

```
Gly Phe Ser Leu Ser Thr Ser Gly Met Arg
1               5                   10
```

<210> SEQ ID NO 280
<211> LENGTH: 7
<212> TYPE: PRT
<213> ORGANISM: Artificial sequence
<220> FEATURE:
<223> OTHER INFORMATION: Synthetic antibody sequence

<400> SEQUENCE: 280

```
Ile Asp Trp Asp Asp Asp Lys
1               5
```

```
1               5
```

<210> SEQ ID NO 281
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 281

```
Ala Arg Met Met Val Gly Glu Gly Thr Phe Asp Tyr
1               5                   10
```

<210> SEQ ID NO 282
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 282

```
Gly Tyr Thr Phe Thr Asn Tyr Gly
1               5
```

<210> SEQ ID NO 283
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 283

```
Ile Ser Thr Phe Asn Gly Asn Thr
1               5
```

<210> SEQ ID NO 284
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 284

```
Ala Arg Arg Pro Pro Tyr Tyr Asp Ser Thr Ala Phe Asp Ile
1               5                   10
```

<210> SEQ ID NO 285
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 285

```
Gly Leu Thr Phe Gly His Ala Trp
1               5
```

<210> SEQ ID NO 286
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 286

```
Ile Lys Thr Lys Ala Asp Gly Glu Thr Thr
1               5                   10
```

<210> SEQ ID NO 287
<211> LENGTH: 24
<212> TYPE: PRT
<213> ORGANISM: Artificial sequence
<220> FEATURE:
<223> OTHER INFORMATION: Synthetic antibody sequence

<400> SEQUENCE: 287

Thr Thr Asp Leu Arg Ala Leu Glu Ala Leu Leu Ser Leu Gly Phe Val
1               5                   10                  15

Tyr Thr Tyr Asn Phe Met Asp Val
            20

<210> SEQ ID NO 288
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 288

Gly Asp Ile Tyr Asn Tyr Tyr Gly
1               5

<210> SEQ ID NO 289
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 289

Ile Ile Pro Val Tyr Gly Arg Pro
1               5

<210> SEQ ID NO 290
<211> LENGTH: 20
<212> TYPE: PRT
<213> ORGANISM: Artificial sequence
<220> FEATURE:
<223> OTHER INFORMATION: Synthetic antibody sequence

<400> SEQUENCE: 290

Ala Arg Asp Thr Ala Arg Ser His Tyr Phe Gly Ser Gly Asn Asp Tyr
1               5                   10                  15

Gly Met Asp Val
            20

<210> SEQ ID NO 291
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 291

Gly Asp Ser Ile Ser Ser Gly Gly Phe Tyr
1               5                   10

<210> SEQ ID NO 292
<211> LENGTH: 7
<212> TYPE: PRT
<213> ORGANISM: Artificial sequence
<220> FEATURE:
<223> OTHER INFORMATION: Synthetic antibody sequence

<400> SEQUENCE: 292

Met Tyr Tyr Asn Gly Asn Thr
1               5

<210> SEQ ID NO 293
<211> LENGTH: 16
<212> TYPE: PRT
<213> ORGANISM: Artificial sequence
<220> FEATURE:
<223> OTHER INFORMATION: Synthetic antibody sequence

<400> SEQUENCE: 293

Ala Arg Gly Gly Leu Tyr Gly Gln Leu Ile Arg Gly Phe Phe His Pro
1               5                   10                  15

<210> SEQ ID NO 294
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 294

Gly Phe Ala Phe Ser Ser Tyr Trp
1               5

<210> SEQ ID NO 295
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 295

Ile Lys Tyr Asp Ala Ser Glu Lys
1               5

<210> SEQ ID NO 296
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 296

Ala Val Pro Gly Pro Gly Tyr Ser Phe Ala Tyr Asp Tyr
1               5                   10

<210> SEQ ID NO 297
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 297

Gly Phe Ser Phe Asp Asp Tyr Ala
1               5

<210> SEQ ID NO 298
<211> LENGTH: 8
<212> TYPE: PRT
<213> ORGANISM: Artificial sequence
<220> FEATURE:
<223> OTHER INFORMATION: Synthetic antibody sequence

```
<400> SEQUENCE: 298

Ile Ser Trp Asn Ser Gly Asn Thr
1               5

<210> SEQ ID NO 299
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 299

Gly Lys Asp Leu Gly Gly Ile Val Leu Ala Pro Ile Asp Ser
1               5                   10

<210> SEQ ID NO 300
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 300

Gly Phe Thr Phe Arg Asn Tyr Ala
1               5

<210> SEQ ID NO 301
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 301

Ile Ser Tyr Asp Gly Gly Asn Lys
1               5

<210> SEQ ID NO 302
<211> LENGTH: 22
<212> TYPE: PRT
<213> ORGANISM: Artificial sequence
<220> FEATURE:
<223> OTHER INFORMATION: Synthetic antibody sequence

<400> SEQUENCE: 302

Val Lys Asp Leu Gly Gly Asp Tyr Pro Pro Leu Asp Pro His Tyr Trp
1               5                   10                  15

Tyr Tyr Gly Met Asp Val
            20

<210> SEQ ID NO 303
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 303

Gly Gly Thr Phe Ser Ser Phe Ala
1               5

<210> SEQ ID NO 304
<211> LENGTH: 8
<212> TYPE: PRT
<213> ORGANISM: Artificial sequence
<220> FEATURE:
```

```
<223> OTHER INFORMATION: Synthetic antibody sequence

<400> SEQUENCE: 304

Tyr Ile Pro Val Phe Gly Ser Ala
1               5

<210> SEQ ID NO 305
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 305

Ala Arg Gly Pro Thr Gln Asn Trp Glu Tyr Ser Tyr Tyr Thr Tyr Phe
1               5                   10                  15

Glu Ser

<210> SEQ ID NO 306
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 306

Gly Ile Thr Val Arg Ser Tyr Phe
1               5

<210> SEQ ID NO 307
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 307

Ile Ser Asn Gly Gly Ser Tyr Ile
1               5

<210> SEQ ID NO 308
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 308

Val Arg Ser Pro Asn Leu Gly Leu Met Tyr Gln Gly Met Asp Leu
1               5                   10                  15

<210> SEQ ID NO 309
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 309

Gly Gly Ser Ile Ser Ser Gly Gly Lys Ser
1               5                   10

<210> SEQ ID NO 310
<211> LENGTH: 7
<212> TYPE: PRT
<213> ORGANISM: Artificial sequence
```

```
<220> FEATURE:
<223> OTHER INFORMATION: Synthetic antibody sequence

<400> SEQUENCE: 310

Ile Phe Gln Ser Gly Ser Thr
1               5

<210> SEQ ID NO 311
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 311

Ala Arg Asp Arg Ser Ala Thr Gln Asp Ala Phe Asp Ile
1               5                   10

<210> SEQ ID NO 312
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 312

Gly Phe Thr Phe Ser Arg Ser Thr
1               5

<210> SEQ ID NO 313
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 313

Ile Leu Val Gly Asn Gly Asp Thr
1               5

<210> SEQ ID NO 314
<211> LENGTH: 16
<212> TYPE: PRT
<213> ORGANISM: Artificial sequence
<220> FEATURE:
<223> OTHER INFORMATION: Synthetic antibody sequence

<400> SEQUENCE: 314

Ala Ala Met Gly Ser Gly Trp Trp Tyr His Tyr Asp Leu Asp Val
1               5                   10                  15

<210> SEQ ID NO 315
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 315

Gly Tyr Thr Phe Thr Ser Asn Gly
1               5

<210> SEQ ID NO 316
<211> LENGTH: 8
<212> TYPE: PRT
<213> ORGANISM: Artificial sequence
<220> FEATURE:
```

<223> OTHER INFORMATION: Synthetic antibody sequence

<400> SEQUENCE: 316

Ile Ala Gly Tyr Asp Gly Tyr Thr
1               5

<210> SEQ ID NO 317
<211> LENGTH: 16
<212> TYPE: PRT
<213> ORGANISM: Artificial sequence
<220> FEATURE:
<223> OTHER INFORMATION: Synthetic antibody sequence

<400> SEQUENCE: 317

Ala Arg Asp Glu Gly Leu His Asn Trp Lys Phe Asn Ala Met Asp Val
1               5                   10                  15

<210> SEQ ID NO 318
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 318

Gly Phe Thr Phe Ser Pro Tyr Gly
1               5

<210> SEQ ID NO 319
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 319

Val Trp Tyr Asp Gly Asn Asn Lys
1               5

<210> SEQ ID NO 320
<211> LENGTH: 16
<212> TYPE: PRT
<213> ORGANISM: Artificial sequence
<220> FEATURE:
<223> OTHER INFORMATION: Synthetic antibody sequence

<400> SEQUENCE: 320

Ala Arg Glu Asn Thr Pro Thr Tyr Asn Ser Gly Tyr Tyr Phe Asp Tyr
1               5                   10                  15

<210> SEQ ID NO 321
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 321

Gly Gly Ser Ile Asn Asn Tyr Tyr
1               5

<210> SEQ ID NO 322
<211> LENGTH: 7
<212> TYPE: PRT
<213> ORGANISM: Artificial sequence
<220> FEATURE:
<223> OTHER INFORMATION: Synthetic antibody sequence

<400> SEQUENCE: 322

Leu Tyr Tyr Ser Gly Ile Thr
1               5

<210> SEQ ID NO 323
<211> LENGTH: 21
<212> TYPE: PRT
<213> ORGANISM: Artificial sequence
<220> FEATURE:
<223> OTHER INFORMATION: Synthetic antibody sequence

<400> SEQUENCE: 323

Ala Arg Val Gln Gly Ser Asp Ser Ser Gly Tyr Tyr His Leu Lys Ser
1               5                   10                  15

Asp Trp Phe Asp Pro
            20

<210> SEQ ID NO 324
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 324

Gly Tyr Ser Ile Ser Ser Gly Tyr Cys
1               5

<210> SEQ ID NO 325
<211> LENGTH: 7
<212> TYPE: PRT
<213> ORGANISM: Artificial sequence
<220> FEATURE:
<223> OTHER INFORMATION: Synthetic antibody sequence

<400> SEQUENCE: 325

Ile Trp His Thr Gly Thr Thr
1               5

<210> SEQ ID NO 326
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 326

Ala Arg Ala Ile Tyr Asp Ser Ser Gly Tyr Ser Pro Phe Ser Gly Leu
1               5                   10                  15

Asp Ile

<210> SEQ ID NO 327
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 327

Gly Tyr Ser Ile Ser Ser Gly Tyr Cys
1               5

<210> SEQ ID NO 328
<211> LENGTH: 7

```
<212> TYPE: PRT
<213> ORGANISM: Artificial sequence
<220> FEATURE:
<223> OTHER INFORMATION: Synthetic antibody sequence

<400> SEQUENCE: 328

Ile Trp His Thr Gly Thr Thr
1               5

<210> SEQ ID NO 329
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 329

Ala Arg Ala Ile Tyr Asp Ser Ser Gly Tyr Ser Pro Phe Ser Gly Leu
1               5                   10                  15

Asp Ile

<210> SEQ ID NO 330
<211> LENGTH: 6
<212> TYPE: PRT
<213> ORGANISM: Artificial sequence
<220> FEATURE:
<223> OTHER INFORMATION: Synthetic antibody sequence

<400> SEQUENCE: 330

Gln Asp Ile Ser Ser Leu
1               5

<210> SEQ ID NO 331
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 331

Thr Ala Ser
1

<210> SEQ ID NO 332
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 332

Gln Gln Tyr Ile Arg Tyr Trp Thr
1               5

<210> SEQ ID NO 333
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 333

Ser Ser Asn Ile Gly Ser Asn Ile
1               5

<210> SEQ ID NO 334
```

```
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 334

Ser Asn Asn
1

<210> SEQ ID NO 335
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 335

Ser Thr Trp Asp Ala Ser Leu Asn Gly Val Val
1               5                   10

<210> SEQ ID NO 336
<211> LENGTH: 7
<212> TYPE: PRT
<213> ORGANISM: Artificial sequence
<220> FEATURE:
<223> OTHER INFORMATION: Synthetic antibody sequence

<400> SEQUENCE: 336

Gln Ile Val Ser Ser Asn Tyr
1               5

<210> SEQ ID NO 337
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 337

Gly Ala Ser
1

<210> SEQ ID NO 338
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 338

Gln Gln Tyr Gly Ser Ser Pro Tyr Thr
1               5

<210> SEQ ID NO 339
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 339

Gln Ser Leu Leu His Ser Asn Gly Phe Asn Phe
1               5                   10

<210> SEQ ID NO 340
<211> LENGTH: 3
```

```
<212> TYPE: PRT
<213> ORGANISM: Artificial sequence
<220> FEATURE:
<223> OTHER INFORMATION: Synthetic antibody sequence

<400> SEQUENCE: 340

Leu Gly Ser
1

<210> SEQ ID NO 341
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 341

Met Gln Ala Leu Gln Phe Pro Arg Thr
1               5

<210> SEQ ID NO 342
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 342

Trp Ser Asn Ile Gly Arg Asn His
1               5

<210> SEQ ID NO 343
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 343

Met Ser Ser
1

<210> SEQ ID NO 344
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 344

Val Ala Trp Asp Asp Ser Leu Ser Gly Phe Tyr Val
1               5                   10

<210> SEQ ID NO 345
<211> LENGTH: 6
<212> TYPE: PRT
<213> ORGANISM: Artificial sequence
<220> FEATURE:
<223> OTHER INFORMATION: Synthetic antibody sequence

<400> SEQUENCE: 345

Gln Ser Val Gly Thr Tyr
1               5

<210> SEQ ID NO 346
<211> LENGTH: 3
<212> TYPE: PRT
```

```
<213> ORGANISM: Artificial sequence
<220> FEATURE:
<223> OTHER INFORMATION: Synthetic antibody sequence

<400> SEQUENCE: 346

Glu Ala Ser
1

<210> SEQ ID NO 347
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 347

Gln Gln Ser Asp Ile Pro Pro Trp Thr
1               5

<210> SEQ ID NO 348
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 348

Ser Ser Asp Val Gly Ala Phe Asn Tyr
1               5

<210> SEQ ID NO 349
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 349

Ala Val Asn
1

<210> SEQ ID NO 350
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 350

Ser Ser Tyr Thr Val Ser Tyr Thr Leu Thr
1               5                   10

<210> SEQ ID NO 351
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 351

Ser Ser Asn Ile Gly Thr Lys Ser
1               5

<210> SEQ ID NO 352
<211> LENGTH: 3
<212> TYPE: PRT
<213> ORGANISM: Artificial sequence
```

```
<220> FEATURE:
<223> OTHER INFORMATION: Synthetic antibody sequence

<400> SEQUENCE: 352

Arg Asn Asn
1

<210> SEQ ID NO 353
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 353

Ala Ser Trp Asp Val Ser Leu Ser Val Trp Val
1               5                   10

<210> SEQ ID NO 354
<211> LENGTH: 7
<212> TYPE: PRT
<213> ORGANISM: Artificial sequence
<220> FEATURE:
<223> OTHER INFORMATION: Synthetic antibody sequence

<400> SEQUENCE: 354

Gln Ser Val Thr Ser Arg Tyr
1               5

<210> SEQ ID NO 355
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 355

Asp Thr Ser
1

<210> SEQ ID NO 356
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 356

Gln Gln Tyr Gly Thr Ser Pro Ala Val Thr
1               5                   10

<210> SEQ ID NO 357
<211> LENGTH: 6
<212> TYPE: PRT
<213> ORGANISM: Artificial sequence
<220> FEATURE:
<223> OTHER INFORMATION: Synthetic antibody sequence

<400> SEQUENCE: 357

Asn Leu Gly Ser Lys Ser
1               5

<210> SEQ ID NO 358
<211> LENGTH: 3
<212> TYPE: PRT
<213> ORGANISM: Artificial sequence
<220> FEATURE:
```

<223> OTHER INFORMATION: Synthetic antibody sequence

<400> SEQUENCE: 358

Asp Asn Tyr
1

<210> SEQ ID NO 359
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 359

Gln Val Trp Asp Ile Gly Ser Glu His Trp Val
1               5                   10

<210> SEQ ID NO 360
<211> LENGTH: 6
<212> TYPE: PRT
<213> ORGANISM: Artificial sequence
<220> FEATURE:
<223> OTHER INFORMATION: Synthetic antibody sequence

<400> SEQUENCE: 360

Asn Ile Glu Thr Lys Arg
1               5

<210> SEQ ID NO 361
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 361

Asp Asp Tyr
1

<210> SEQ ID NO 362
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 362

His Val Trp Asp Ile Ser Ser Asp Leu Pro Val Val
1               5                   10

<210> SEQ ID NO 363
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 363

Ser Ser Asn Ile Gly Arg Ser Phe
1               5

<210> SEQ ID NO 364
<211> LENGTH: 3
<212> TYPE: PRT
<213> ORGANISM: Artificial sequence
<220> FEATURE:
<223> OTHER INFORMATION: Synthetic antibody sequence

```
<400> SEQUENCE: 364

Lys Asn Asp
1

<210> SEQ ID NO 365
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 365

Ala Ala Trp Val Asp Ser Val Asn Gly Leu Val Val
1               5                   10

<210> SEQ ID NO 366
<211> LENGTH: 7
<212> TYPE: PRT
<213> ORGANISM: Artificial sequence
<220> FEATURE:
<223> OTHER INFORMATION: Synthetic antibody sequence

<400> SEQUENCE: 366

Gln Ser Val Ser Ser Ser Tyr
1               5

<210> SEQ ID NO 367
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 367

Glu Thr Ser
1

<210> SEQ ID NO 368
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 368

Gln Gln Tyr Ser Ser Pro Pro Trp Thr
1               5

<210> SEQ ID NO 369
<211> LENGTH: 9
<212> TYPE: PRT
<213> ORGANISM: Artificial sequence
<220> FEATURE:
<223> OTHER INFORMATION: Synthetic antibody sequence

<400> SEQUENCE: 369

Ser Ser Asp Val Gly Ser Tyr Asp Leu
1               5

<210> SEQ ID NO 370
<211> LENGTH: 3
<212> TYPE: PRT
<213> ORGANISM: Artificial sequence
<220> FEATURE:
<223> OTHER INFORMATION: Synthetic antibody sequence
```

```
<400> SEQUENCE: 370

Glu Gly Ser
1

<210> SEQ ID NO 371
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 371

Cys Ser Tyr Ala Gly Ser Ser Thr Trp Val
1               5                   10

<210> SEQ ID NO 372
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 372

Ser Ser Asn Ile Arg His Asn Phe
1               5

<210> SEQ ID NO 373
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 373

Glu Asn Asn
1

<210> SEQ ID NO 374
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 374

Gly Thr Trp Asp Ser Ser Leu Ser Ala Pro His Trp Val
1               5                   10

<210> SEQ ID NO 375
<211> LENGTH: 8
<212> TYPE: PRT
<213> ORGANISM: Artificial sequence
<220> FEATURE:
<223> OTHER INFORMATION: Synthetic antibody sequence

<400> SEQUENCE: 375

Ser Ser Asn Ile Gly Asn Asn Tyr
1               5

<210> SEQ ID NO 376
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 376
```

Asp Asn Asn
1

<210> SEQ ID NO 377
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 377

Gly Thr Trp Asp Ser Ser Leu Asn Leu Trp Val
1               5                   10

<210> SEQ ID NO 378
<211> LENGTH: 6
<212> TYPE: PRT
<213> ORGANISM: Artificial sequence
<220> FEATURE:
<223> OTHER INFORMATION: Synthetic antibody sequence

<400> SEQUENCE: 378

Asn Ile Gly Ser Lys Ala
1               5

<210> SEQ ID NO 379
<211> LENGTH: 3
<212> TYPE: PRT
<213> ORGANISM: Artificial sequence
<220> FEATURE:
<223> OTHER INFORMATION: Synthetic antibody sequence

<400> SEQUENCE: 379

Ser Asp Ser
1

<210> SEQ ID NO 380
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 380

Gln Val Trp Asp Ser Ser Ser Asp His Arg Trp Val
1               5                   10

<210> SEQ ID NO 381
<211> LENGTH: 23
<212> TYPE: PRT
<213> ORGANISM: Artificial sequence
<220> FEATURE:
<223> OTHER INFORMATION: Synthetic antibody sequence

<400> SEQUENCE: 381

Cys Ala Arg Asp Arg Arg Lys Leu Glu Pro Pro Pro Phe Ser Tyr Tyr
1               5                   10                  15

Tyr Tyr Gly Leu Asp Val Trp
            20

<210> SEQ ID NO 382
<211> LENGTH: 25
<212> TYPE: PRT
<213> ORGANISM: Artificial sequence
<220> FEATURE:
<223> OTHER INFORMATION: Synthetic antibody sequence

```
<400> SEQUENCE: 382

Cys Ala Arg Asp Gly Tyr Tyr Val Ser Ser Gly Tyr His Pro Leu Arg
1               5                   10                  15

Tyr Tyr Tyr Tyr Tyr Met Asp Val Trp
            20                  25

<210> SEQ ID NO 383
<211> LENGTH: 17
<212> TYPE: PRT
<213> ORGANISM: Artificial sequence
<220> FEATURE:
<223> OTHER INFORMATION: Synthetic antibody sequence

<400> SEQUENCE: 383

Cys Ala Lys Thr Met Gly Pro Val Ser Gly Gln Tyr Ala Phe Asp Ile
1               5                   10                  15

Trp

<210> SEQ ID NO 384
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 384

Cys Ala Arg Ala Arg Gly Glu Trp Leu Ala His Phe Asp Tyr Trp
1               5                   10                  15

<210> SEQ ID NO 385
<211> LENGTH: 23
<212> TYPE: PRT
<213> ORGANISM: Artificial sequence
<220> FEATURE:
<223> OTHER INFORMATION: Synthetic antibody sequence

<400> SEQUENCE: 385

Cys Ala Arg Lys Leu Gly Pro Leu Gly Asp Cys Ser Ser Ser Cys
1               5                   10                  15

Tyr Ser Ala Leu Asp Val Trp
            20

<210> SEQ ID NO 386
<211> LENGTH: 25
<212> TYPE: PRT
<213> ORGANISM: Artificial sequence
<220> FEATURE:
<223> OTHER INFORMATION: Synthetic antibody sequence

<400> SEQUENCE: 386

Asp Thr Ala Val Tyr Tyr Cys Ala Arg Ala Lys Pro Ser Asn Leu Asn
1               5                   10                  15

Phe Tyr Tyr Tyr Gly Met Asp Val Trp
            20                  25

<210> SEQ ID NO 387
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 387
```

Cys Ala Arg Pro Ser Asn Leu Leu Asn Trp Phe Asp Pro Trp
1               5                   10

<210> SEQ ID NO 388
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 388

Cys Ala Arg Pro Ala Asn Gly Tyr Ser Asp Tyr Tyr Gly Met Asp
1               5                   10                  15

Val Trp

<210> SEQ ID NO 389
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 389

Cys Ala Arg Gly Ala Asp Asn Gly Leu Phe Thr Asp Ser Trp
1               5                   10

<210> SEQ ID NO 390
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 390

Cys Ala Arg Ile Pro Gly Gly Tyr Thr Gly Tyr Phe Asp Tyr Trp
1               5                   10                  15

<210> SEQ ID NO 391
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 391

Cys Val Arg Gly Arg Gly Gln Leu Ala Thr His Phe Asp Tyr Trp
1               5                   10                  15

<210> SEQ ID NO 392
<211> LENGTH: 20
<212> TYPE: PRT
<213> ORGANISM: Artificial sequence
<220> FEATURE:
<223> OTHER INFORMATION: Synthetic antibody sequence

<400> SEQUENCE: 392

Cys Ala Lys Gly Glu Ile Met Arg Asp Thr Gly Tyr His Asp Asp Ala
1               5                   10                  15

Phe Asp Val Trp
            20

<210> SEQ ID NO 393
<211> LENGTH: 12
<212> TYPE: PRT
<213> ORGANISM: Artificial sequence
<220> FEATURE:

<223> OTHER INFORMATION: Synthetic antibody sequence

<400> SEQUENCE: 393

Cys Val Arg Val Gln Gly Thr Met Leu Asp Tyr Trp
1               5                   10

<210> SEQ ID NO 394
<211> LENGTH: 23
<212> TYPE: PRT
<213> ORGANISM: Artificial sequence
<220> FEATURE:
<223> OTHER INFORMATION: Synthetic antibody sequence

<400> SEQUENCE: 394

Cys Ala Arg Asp Pro Pro Leu Tyr Ser Gly Tyr Asp Leu Gly Tyr Tyr
1               5                   10                  15

Tyr Tyr Gly Met Asp Val Trp
            20

<210> SEQ ID NO 395
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 395

Cys Val Lys Asp Arg Gly Pro Thr Gly Ser Gly Ser Tyr Gly Met Asp
1               5                   10                  15

Val Trp

<210> SEQ ID NO 396
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 396

Cys Val Arg Trp Thr Thr Val Pro Ser Ser Phe Asp Phe Trp
1               5                   10

<210> SEQ ID NO 397
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 397

Cys Ala Arg Asp Val Gly Gly Phe Asp Ile Trp
1               5                   10

<210> SEQ ID NO 398
<211> LENGTH: 16
<212> TYPE: PRT
<213> ORGANISM: Artificial sequence
<220> FEATURE:
<223> OTHER INFORMATION: Synthetic antibody sequence

<400> SEQUENCE: 398

Cys Ala Lys Asp Arg Pro Tyr Ser Trp Arg Asp Val Leu Asp Tyr Trp
1               5                   10                  15

<210> SEQ ID NO 399

```
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 399

Cys Ala Arg Val Arg Ser Gly Tyr Ser Tyr Ile Asp Phe Trp
1               5                   10

<210> SEQ ID NO 400
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 400

Cys Ala Arg Ala Gly Ala Thr Phe Ala Glu Pro Phe Ser Leu Trp
1               5                   10                  15

<210> SEQ ID NO 401
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 401

Cys Gln Gln Tyr Asp Asn Val Pro Leu Thr Phe
1               5                   10

<210> SEQ ID NO 402
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 402

Cys Gln Gln Tyr Tyr Ser Thr Pro Pro Leu Thr Phe
1               5                   10

<210> SEQ ID NO 403
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 403

Cys Gln Ala Trp His Ser Gly Ser Val Phe
1               5                   10

<210> SEQ ID NO 404
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 404

Cys Gln Gln Tyr Asn Thr Asp Lys Thr Phe
1               5                   10

<210> SEQ ID NO 405
<211> LENGTH: 11
```

```
<212> TYPE: PRT
<213> ORGANISM: Artificial sequence
<220> FEATURE:
<223> OTHER INFORMATION: Synthetic antibody sequence

<400> SEQUENCE: 405

Cys Gln Gln Tyr Asn Thr Tyr Ser Trp Thr Phe
1               5                   10

<210> SEQ ID NO 406
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 406

Cys Gln Gln Ser Asp Asn Trp Pro Pro Ile Thr Phe
1               5                   10

<210> SEQ ID NO 407
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 407

Cys Gln Gln Tyr Asp Asn Arg Pro Gln Thr Phe
1               5                   10

<210> SEQ ID NO 408
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 408

Cys Cys Ser Tyr Ala Asp Asn Arg Thr Pro Phe Leu Phe
1               5                   10

<210> SEQ ID NO 409
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 409

Cys Gln Gln Tyr Ser Ser Ile Pro Leu Thr Phe
1               5                   10

<210> SEQ ID NO 410
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 410

Cys Gln Ser Tyr Asp Ser Ser Leu Ser Gly Trp Val Phe
1               5                   10

<210> SEQ ID NO 411
<211> LENGTH: 11
<212> TYPE: PRT
```

<213> ORGANISM: Artificial sequence
<220> FEATURE:
<223> OTHER INFORMATION: Synthetic antibody sequence

<400> SEQUENCE: 411

Cys His Gln Ser Asn Ser Leu Pro Trp Thr Phe
1               5                   10

<210> SEQ ID NO 412
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 412

Cys Gln Gln Val Glu Ser Tyr Pro Tyr Ser Phe
1               5                   10

<210> SEQ ID NO 413
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 413

Cys Gln Ser Tyr Asp Ile Ser Leu Ser Gly Trp Val Phe
1               5                   10

<210> SEQ ID NO 414
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 414

Cys Gln Gln Tyr Asn Ser Tyr Pro Trp Ala Phe
1               5                   10

<210> SEQ ID NO 415
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 415

Cys Gln Ala Trp Asp Ser Ser Asn Val Val Phe
1               5                   10

<210> SEQ ID NO 416
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 416

Cys Gln Ser Ala Asp Arg Thr Ala Thr Ser Val Ala Phe
1               5                   10

<210> SEQ ID NO 417
<211> LENGTH: 11
<212> TYPE: PRT
<213> ORGANISM: Artificial sequence

```
<220> FEATURE:
<223> OTHER INFORMATION: Synthetic antibody sequence

<400> SEQUENCE: 417

Cys Gln Gln Tyr Glu Asn Leu Pro Arg Thr Phe
1               5                   10

<210> SEQ ID NO 418
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 418

Cys Gln Gln Tyr Asp Glu Leu Pro Leu Thr Phe
1               5                   10

<210> SEQ ID NO 419
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 419

Cys Gln Ser Ala Asp Arg Leu Gly Thr Tyr Trp Val Phe
1               5                   10

<210> SEQ ID NO 420
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 420

Cys Gln Gln Tyr Lys Ser His Arg Thr Phe
1               5                   10

<210> SEQ ID NO 421
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 421

Cys Ala Arg Met Met Val Gly Glu Gly Thr Phe Asp Tyr Trp
1               5                   10

<210> SEQ ID NO 422
<211> LENGTH: 16
<212> TYPE: PRT
<213> ORGANISM: Artificial sequence
<220> FEATURE:
<223> OTHER INFORMATION: Synthetic antibody sequence

<400> SEQUENCE: 422

Cys Ala Arg Arg Pro Pro Tyr Tyr Asp Ser Thr Ala Phe Asp Ile Trp
1               5                   10                  15

<210> SEQ ID NO 423
<211> LENGTH: 26
<212> TYPE: PRT
<213> ORGANISM: Artificial sequence
<220> FEATURE:
```

```
<223> OTHER INFORMATION: Synthetic antibody sequence

<400> SEQUENCE: 423

Cys Thr Thr Asp Leu Arg Ala Leu Glu Ala Leu Leu Ser Leu Gly Phe
1               5                   10                  15
Val Tyr Thr Tyr Asn Phe Met Asp Val Trp
            20                  25

<210> SEQ ID NO 424
<211> LENGTH: 22
<212> TYPE: PRT
<213> ORGANISM: Artificial sequence
<220> FEATURE:
<223> OTHER INFORMATION: Synthetic antibody sequence

<400> SEQUENCE: 424

Cys Ala Arg Asp Thr Ala Arg Ser His Tyr Phe Gly Ser Gly Asn Asp
1               5                   10                  15
Tyr Gly Met Asp Val Trp
            20

<210> SEQ ID NO 425
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 425

Cys Ala Arg Gly Gly Leu Tyr Gly Gln Leu Ile Arg Gly Phe Phe His
1               5                   10                  15
Pro Trp

<210> SEQ ID NO 426
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 426

Cys Ala Val Pro Gly Pro Gly Tyr Ser Phe Ala Tyr Asp Tyr Trp
1               5                   10                  15

<210> SEQ ID NO 427
<211> LENGTH: 16
<212> TYPE: PRT
<213> ORGANISM: Artificial sequence
<220> FEATURE:
<223> OTHER INFORMATION: Synthetic antibody sequence

<400> SEQUENCE: 427

Cys Gly Lys Asp Leu Gly Gly Ile Val Leu Ala Pro Ile Asp Ser Trp
1               5                   10                  15

<210> SEQ ID NO 428
<211> LENGTH: 24
<212> TYPE: PRT
<213> ORGANISM: Artificial sequence
<220> FEATURE:
<223> OTHER INFORMATION: Synthetic antibody sequence

<400> SEQUENCE: 428

Cys Val Lys Asp Leu Gly Gly Asp Tyr Pro Pro Leu Asp Pro His Tyr
1               5                   10                  15
```

Trp Tyr Tyr Gly Met Asp Val Trp
            20

<210> SEQ ID NO 429
<211> LENGTH: 20
<212> TYPE: PRT
<213> ORGANISM: Artificial sequence
<220> FEATURE:
<223> OTHER INFORMATION: Synthetic antibody sequence

<400> SEQUENCE: 429

Cys Ala Arg Gly Pro Thr Gln Asn Trp Glu Tyr Ser Tyr Tyr Thr Tyr
1               5                   10                  15

Phe Glu Ser Trp
            20

<210> SEQ ID NO 430
<211> LENGTH: 17
<212> TYPE: PRT
<213> ORGANISM: Artificial sequence
<220> FEATURE:
<223> OTHER INFORMATION: Synthetic antibody sequence

<400> SEQUENCE: 430

Cys Val Arg Ser Pro Asn Leu Gly Leu Met Tyr Gln Gly Met Asp Leu
1               5                   10                  15

Trp

<210> SEQ ID NO 431
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 431

Cys Ala Arg Asp Arg Ser Ala Thr Gln Asp Ala Phe Asp Ile Trp
1               5                   10                  15

<210> SEQ ID NO 432
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 432

Cys Ala Ala Met Gly Ser Gly Trp Trp Tyr Tyr His Tyr Asp Leu Asp
1               5                   10                  15

Val Trp

<210> SEQ ID NO 433
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 433

Cys Ala Arg Asp Glu Gly Leu His Asn Trp Lys Phe Asn Ala Met Asp
1               5                   10                  15

Val Trp

-continued

```
<210> SEQ ID NO 434
<211> LENGTH: 18
<212> TYPE: PRT
<213> ORGANISM: Artificial sequence
<220> FEATURE:
<223> OTHER INFORMATION: Synthetic antibody sequence

<400> SEQUENCE: 434

Cys Ala Arg Glu Asn Thr Pro Thr Tyr Asn Ser Gly Tyr Tyr Phe Asp
1               5                   10                  15

Tyr Trp

<210> SEQ ID NO 435
<211> LENGTH: 23
<212> TYPE: PRT
<213> ORGANISM: Artificial sequence
<220> FEATURE:
<223> OTHER INFORMATION: Synthetic antibody sequence

<400> SEQUENCE: 435

Cys Ala Arg Val Gln Gly Ser Asp Ser Ser Gly Tyr Tyr His Leu Lys
1               5                   10                  15

Ser Asp Trp Phe Asp Pro Trp
            20

<210> SEQ ID NO 436
<211> LENGTH: 20
<212> TYPE: PRT
<213> ORGANISM: Artificial sequence
<220> FEATURE:
<223> OTHER INFORMATION: Synthetic antibody sequence

<400> SEQUENCE: 436

Cys Ala Arg Ala Ile Tyr Asp Ser Ser Gly Tyr Ser Pro Phe Ser Gly
1               5                   10                  15

Leu Asp Ile Trp
            20

<210> SEQ ID NO 437
<211> LENGTH: 10
<212> TYPE: PRT
<213> ORGANISM: Artificial sequence
<220> FEATURE:
<223> OTHER INFORMATION: Synthetic antibody sequence

<400> SEQUENCE: 437

Cys Gln Gln Tyr Ile Arg Tyr Trp Thr Phe
1               5                   10

<210> SEQ ID NO 438
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 438

Cys Ser Thr Trp Asp Ala Ser Leu Asn Gly Val Val Phe
1               5                   10

<210> SEQ ID NO 439
<211> LENGTH: 11
<212> TYPE: PRT
<213> ORGANISM: Artificial sequence
<220> FEATURE:
<223> OTHER INFORMATION: Synthetic antibody sequence
```

<400> SEQUENCE: 439

Cys Gln Gln Tyr Gly Ser Ser Pro Tyr Thr Phe
1               5                   10

<210> SEQ ID NO 440
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 440

Cys Met Gln Ala Leu Gln Phe Pro Arg Thr Phe
1               5                   10

<210> SEQ ID NO 441
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 441

Cys Val Ala Trp Asp Asp Ser Leu Ser Gly Phe Tyr Val Phe
1               5                   10

<210> SEQ ID NO 442
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 442

Cys Gln Gln Ser Asp Ile Pro Pro Trp Thr Phe
1               5                   10

<210> SEQ ID NO 443
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 443

Cys Ser Ser Tyr Thr Val Ser Tyr Thr Leu Thr Phe
1               5                   10

<210> SEQ ID NO 444
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 444

Cys Ala Ser Trp Asp Val Ser Leu Ser Val Trp Val Phe
1               5                   10

<210> SEQ ID NO 445
<211> LENGTH: 12
<212> TYPE: PRT
<213> ORGANISM: Artificial sequence
<220> FEATURE:
<223> OTHER INFORMATION: Synthetic antibody sequence

```
<400> SEQUENCE: 445

Cys Gln Gln Tyr Gly Thr Ser Pro Ala Val Thr Phe
1               5                   10

<210> SEQ ID NO 446
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 446

Cys Gln Val Trp Asp Ile Gly Ser Glu His Trp Val Phe
1               5                   10

<210> SEQ ID NO 447
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 447

Cys His Val Trp Asp Ile Ser Ser Asp Leu Pro Val Val Phe
1               5                   10

<210> SEQ ID NO 448
<211> LENGTH: 14
<212> TYPE: PRT
<213> ORGANISM: Artificial sequence
<220> FEATURE:
<223> OTHER INFORMATION: Synthetic antibody sequence

<400> SEQUENCE: 448

Cys Ala Ala Trp Val Asp Ser Val Asn Gly Leu Val Val Phe
1               5                   10

<210> SEQ ID NO 449
<211> LENGTH: 11
<212> TYPE: PRT
<213> ORGANISM: Artificial sequence
<220> FEATURE:
<223> OTHER INFORMATION: Synthetic antibody sequence

<400> SEQUENCE: 449

Cys Gln Gln Tyr Ser Ser Pro Pro Trp Thr Phe
1               5                   10

<210> SEQ ID NO 450
<211> LENGTH: 12
<212> TYPE: PRT
<213> ORGANISM: Artificial sequence
<220> FEATURE:
<223> OTHER INFORMATION: Synthetic antibody sequence

<400> SEQUENCE: 450

Cys Cys Ser Tyr Ala Gly Ser Ser Thr Trp Val Phe
1               5                   10

<210> SEQ ID NO 451
<211> LENGTH: 15
<212> TYPE: PRT
<213> ORGANISM: Artificial sequence
<220> FEATURE:
<223> OTHER INFORMATION: Synthetic antibody sequence

<400> SEQUENCE: 451
```

```
Cys Gly Thr Trp Asp Ser Ser Leu Ser Ala Pro His Trp Val Phe
1               5                   10                  15

<210> SEQ ID NO 452
<211> LENGTH: 13
<212> TYPE: PRT
<213> ORGANISM: Artificial sequence
<220> FEATURE:
<223> OTHER INFORMATION: Synthetic antibody sequence

<400> SEQUENCE: 452

Cys Gly Thr Trp Asp Ser Ser Leu Asn Leu Trp Val Phe
1               5                   10

<210> SEQ ID NO 453
<211> LENGTH: 21
<212> TYPE: DNA
<213> ORGANISM: Artificial sequence
<220> FEATURE:
<223> OTHER INFORMATION: Synthetic phosphorothioate-modified
      oligodeoxynucleotide
<220> FEATURE:
<221> NAME/KEY: modified_base
<222> LOCATION: (1)..(21)
<223> OTHER INFORMATION: phosphorothioate base

<400> SEQUENCE: 453
tcgtcgtttt tcggtcgttt t                                           21
```